United States Patent
Simpson

(10) Patent No.: US 12,106,365 B2
(45) Date of Patent: *Oct. 1, 2024

(54) WEB BROWSER AND OPERATING SYSTEM PORTAL AND SEARCH PORTAL WITH PRICE TIME PRIORITY QUEUES

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,813

(22) Filed: Feb. 2, 2021

(65) Prior Publication Data

US 2021/0158447 A1   May 27, 2021

Related U.S. Application Data

(63) Continuation-in-part of application No. 16/274,490, filed on Feb. 13, 2019, now Pat. No. 11,215,466, and a continuation-in-part of application No. 16/258,658, filed on Jan. 27, 2019, now Pat. No. 11,035,682, and a continuation-in-part of application No. 16/257,032, filed on Jan. 24, 2019, now abandoned, and a
(Continued)

(51) Int. Cl.
| | | |
|---|---|---|
| G06Q 30/02 | (2023.01) | |
| G06F 21/62 | (2013.01) | |
| G06Q 30/0251 | (2023.01) | |
| G06Q 30/0273 | (2023.01) | |
| G06Q 40/04 | (2012.01) | |
| G06Q 50/00 | (2012.01) | |

(52) U.S. Cl.
CPC ......... *G06Q 40/04* (2013.01); *G06F 21/6218* (2013.01); *G06Q 30/0255* (2013.01); *G06Q 30/0269* (2013.01); *G06Q 30/0273* (2013.01); *G06Q 50/01* (2013.01)

(58) Field of Classification Search
CPC ............ G06Q 30/02–0277; G06Q 4/04; G06F 21/6218; G06F 21/62
See application file for complete search history.

(56) References Cited

U.S. PATENT DOCUMENTS

| | | |
|---|---|---|
| D209,710 S | 12/1967 | Bruce |
| 4,476,954 A | 10/1984 | Johnson et al. |
| | (Continued) | |

FOREIGN PATENT DOCUMENTS

| | | |
|---|---|---|
| CN | 107341968 A | 11/2017 |
| GB | 2539556 A | 12/2016 |
| | (Continued) | |

OTHER PUBLICATIONS

PCT International Search Report and Written Opinion; PCT/US2020/027543; dated Jul. 1, 2020.
(Continued)

*Primary Examiner* — Raquel Alvarez
(74) *Attorney, Agent, or Firm* — Pramudji Law Group PLLC; Ari Pramudji

(57) ABSTRACT

Implementations of various methods and systems to transform socket communication streams combined with vaulted user characteristic data over an advertising trading exchange with price time priority queues.

20 Claims, 90 Drawing Sheets

Related U.S. Application Data continuation-in-part of application No. 16/242,981, filed on Jan. 8, 2019, now abandoned, and a continuation-in-part of application No. 16/242,967, filed on Jan. 8, 2019, and a continuation-in-part of application No. 16/239,485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, and a continuation-in-part of application No. 15/484,059, filed on Apr. 10, 2017, and a continuation-in-part of application No. 15/266,326, filed on Sep. 15, 2016, now Pat. No. 11,138,827.

(60) Provisional application No. 62/969,301, filed on Feb. 3, 2020.

(56) References Cited

U.S. PATENT DOCUMENTS

| | | |
|---|---|---|
| D318,073 S | 7/1991 | Jang |
| 5,249,259 A | 9/1993 | Harvey |
| 5,412,560 A | 5/1995 | Dennison |
| 5,604,676 A | 2/1997 | Penzias |
| 5,726,885 A | 3/1998 | Klein et al. |
| 5,751,245 A | 5/1998 | Janky et al. |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,400,996 B1 | 6/2002 | Hoffberg |
| D460,952 S | 7/2002 | Kataoka |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcorn et al. |
| D628,171 S | 11/2010 | Hakopian |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Haney |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 3/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,832,337 B1 | 11/2020 | Floyd et al. |
| 10,872,381 B1 | 12/2020 | Leise et al. |
| D910,758 S | 2/2021 | Leong |
| 11,138,827 B2 | 10/2021 | Simpson |
| D938,375 S | 12/2021 | Zhang |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 | 1/2023 | Simpson |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,734,618 B2 | 8/2023 | Ogden |
| D1,000,137 S | 10/2023 | Shuster |
| D1,007,451 S | 12/2023 | Im |
| D1,024,065 S | 4/2024 | Kim |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomaian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh |
| 2006/0184321 A1 | 8/2006 | Kawakami et al. |
| 2007/0005224 A1 | 1/2007 | Sutardja |
| 2008/0033833 A1 | 2/2008 | Senior |
| 2008/0040232 A1 | 2/2008 | Perchthaler |
| 2008/0077309 A1 | 3/2008 | Cobbold |

(56) References Cited

U.S. PATENT DOCUMENTS

| | | |
|---|---|---|
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1* | 2/2010 | Bai .................... G06Q 30/0255 705/37 |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Ajjarapu et al. |
| 2011/0202418 A1 | 8/2011 | Kempton et al. |
| 2012/0023032 A1 | 1/2012 | Visdomini |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0038781 A1 | 2/2014 | Foley |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0310019 A1 | 10/2014 | Blander et al. |
| 2014/0310149 A1 | 10/2014 | Singh |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0041628 A1 | 2/2016 | Verma |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0224935 A1 | 8/2016 | Burnett |
| 2016/0225115 A1 | 8/2016 | Levy et al. |
| 2016/0253662 A1 | 9/2016 | Sriram |
| 2016/0307276 A1 | 9/2016 | Young |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2018/0012149 A1 | 1/2018 | Yust |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0173742 A1 | 6/2018 | Liu et al. |
| 2018/0173800 A1 | 6/2018 | Chang et al. |
| 2018/0209803 A1 | 7/2018 | Rakah |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0047427 A1 | 2/2019 | Pogorelik |
| 2019/0050634 A1 | 2/2019 | Nerayoff et al. |

(56) References Cited

U.S. PATENT DOCUMENTS

| | | |
|---|---|---|
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Chaudhary et al. |
| 2019/0160958 A1 | 5/2019 | Chaudhary et al. |
| 2019/0178654 A1 | 6/2019 | Hare |
| 2019/0186942 A1 | 6/2019 | Rubin |
| 2019/0188450 A1 | 6/2019 | Spivack et al. |
| 2019/0204110 A1 | 7/2019 | Dubielzyk |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0318286 A1 | 10/2019 | Simpson |
| 2019/0325541 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |
| 2021/0012278 A1 | 1/2021 | Alon et al. |
| 2021/0041258 A1 | 2/2021 | Simpson |
| 2021/0042835 A1 | 2/2021 | Simpson |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1 | 10/2021 | Simpson |
| 2021/0326872 A1 | 10/2021 | Robotham |
| 2021/0379447 A1 | 12/2021 | Lee |
| 2022/0020073 A1 | 1/2022 | Farmer |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | | |
|---|---|---|---|
| JP | 2003177034 A | | 12/2001 |
| WO | 2001041084 A2 | | 6/2001 |
| WO | 2015059691 A1 | | 4/2015 |
| WO | 2015161307 A1 | | 4/2015 |
| WO | 2018024844 A1 | | 2/2018 |
| WO | 2019/134005 A1 | | 7/2019 |
| WO | 2019183468 A1 | | 9/2019 |
| WO | 2021/163675 A1 | | 8/2021 |

OTHER PUBLICATIONS

PCT International Search Report and Written Opinion; PCT/US2020/023223; dated Jun. 19, 2020.

PCT International Search Report and Written Opinion; PCT/US2020/023729; dated Jun. 18, 2020.

PCT International Search Report and Written Opinion; PCT/US2020/021546; dated Jun. 8, 2020.

PCT International Search Report and Written Opinion; PCT/US2020/018012; dated Apr. 21, 2020.

PCT International Search Report and Written Opinion; PCT/US2020/012208; dated Mar. 24, 2020.

Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020). https://www.nature.com/articles/s41598-018-33008-7.

Ahmed, et al.; Energy Trading with Electric Vehicles in Smart Campus Parking Lots; Applied Sciences; Sep. 7, 2018.

Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?.

Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.

The Wayback Machine, Interest Rate Swaps, https://web.archive.org/web/20171006212154/https://global.pimco.com/en/gbl/resources/education/understanding-interest-rate-swaps, 2016, pp. 1-7.

Freight Derivatives—a Vital Tool For Your Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.

Barry, Kieth, App lets drivers auction public parking spaces, Wired, Aug. 11, 2011, pp. 1-4.

Jiang, Landu, et al., Sun Chase: Energy-Efficient Route Planning for solar-powered Evs, IEEE 37th international conference on distrubuted computing systems, 2017, pp. 1-11.

Netlingo, https://web.archive.org/web/20170122184857/https://www.netlingo.com/word/electronic-exchange.php,dated Oct. 22, 2017.

Laseter, Tim, "B2B benchmark: The State of Electronic Exchanges", Tech & Innovation, dated Oct. 1, 2001.

Directed Graph, https://en.wikipedia.org/wiki/Directed_graph, pp. 1-6, 2022.

About IBM Food Trust, https://www.ibm.com/downloads/cas/E9DBNDJG, pp. 1-17, 2019.

IBM Blockchain Transparent Supply, https://www.ibm.com/downloads/cas/BKQDK0M2, pp. 1-14, Aug. 2020.

Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.

Change the World, https://fortune.com/change-the-world/2019/IBM/, Fortune Media IP Limited, pp. 1-5, 2022.

IBM Food Trust, https://www.constellationr.com/node/17601/vote/application/view/588, Constellation Research Inc., pp. 1-4, 2010-2022.

Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.

Wyzant, https://web.archive.org/web/20190327185429/https://www.wyzant.com/hotitworks/students, Wyzant tutoring, pp. 1-13 , Mar. 27, 2019.

PCT International Search Report and Written Opinion; PCT/US2021/065855; dated Mar. 29, 2022.

PCT International Search Report and Written Opinion; PCT/US2022/012717; dated Mar. 30, 2022.

Peters, et al.; Student Support Services for Online Learning Re-Imagined and Re-Invigorated: Then, Now and What's To Come; Contact North | Contact Nord; Sep. 2017.

Soccer ball-shaped drone might be the safest flying robot yet https://mashable.com/2015/12/21/soccer-ball-drone/ ; Dec. 21, 2015.

(56) References Cited

OTHER PUBLICATIONS

Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
PCT International Search Report and Written Opinion; PCT/US2022/027077; dated Nov. 1, 2022.
EP23168879.7 European Search Report, dated Jul. 5, 2023, pp. 1-13.
Wei, et al. "impact of aircraft size and seat availability on airlines demand and market share in duopoly markets" Published by Elsevier, 2005, pp. 315-327.
PCT International Search Report and Written Opinion; PCT/US2022/052969; dated Mar. 21, 2023.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; dated Mar. 8, 2023.
EP23153137.7 European Search Report, dated May 24, 2023, pp. 1-10.
EP20787830.7 European Search Report, dated May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
Papa, U., & Del Core, G., "Design of Sonar Sensor Model for Safe Landing of an UAV," IEEE Metrology for Aerospace, 2015, pp. 346-350.
Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
Freebeat, Smart Exercise Bike; retrieved from internet: https://www.amazon.com/Resistance-Cushioned-Detection-Altoritm-Instructors/dp/BOBZKKZ6B3/?th=1; Mar. 3, 2023; p. 1.
Aratani, Lori, "This app wants to reward you for smart commuting choices," The Washington Post, Aug. 18, 2018, pp. 1-3.
Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.
"Node Influence Metric", Wikipedia, Nov. 6, 2020, pp. 1-5.
EP21916571 European Search Report, Jun. 18, 2024, pp. 1-9.

\* cited by examiner

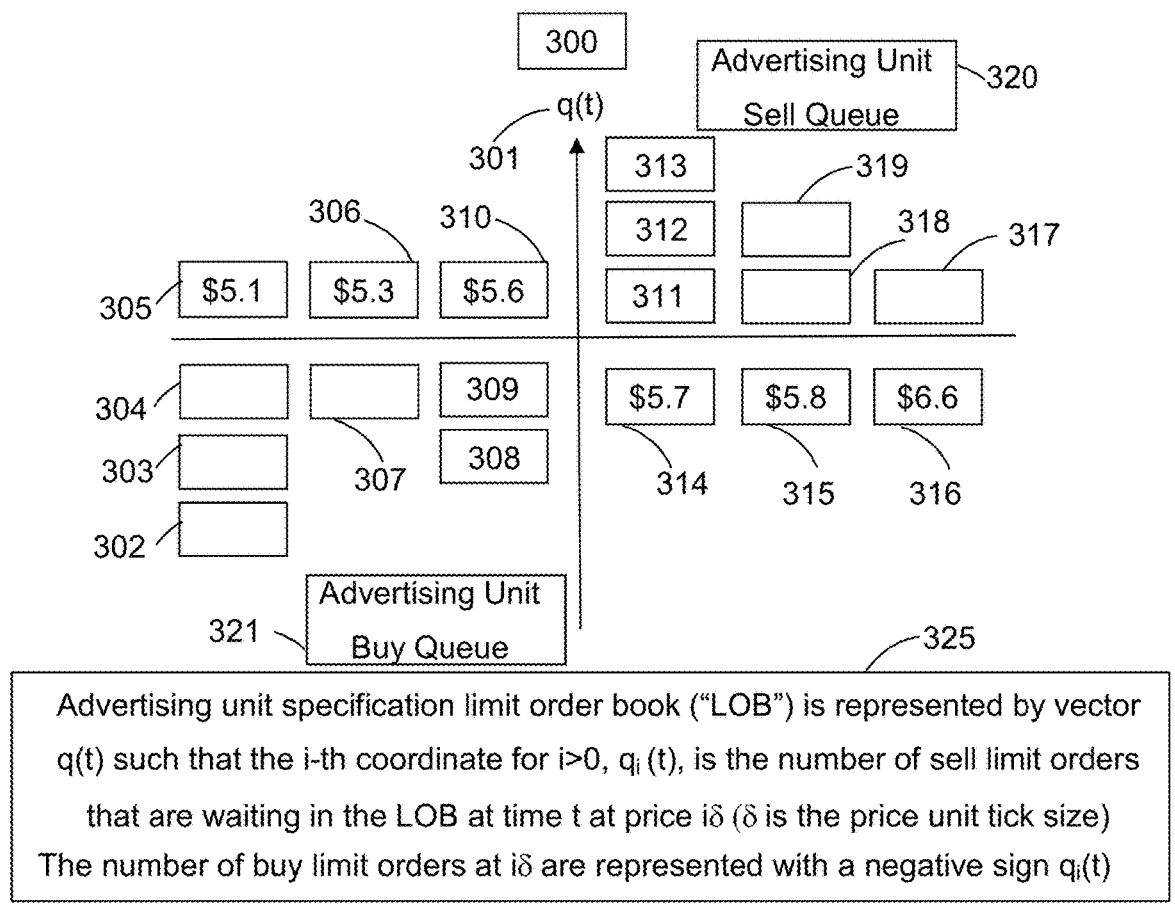
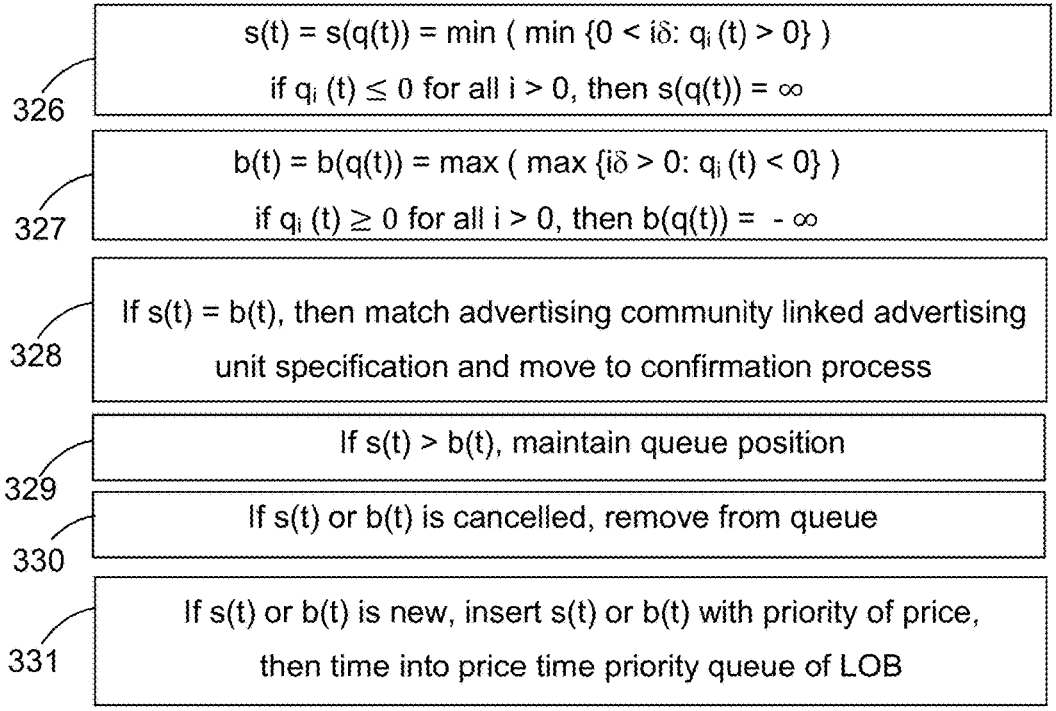
FIG. 3

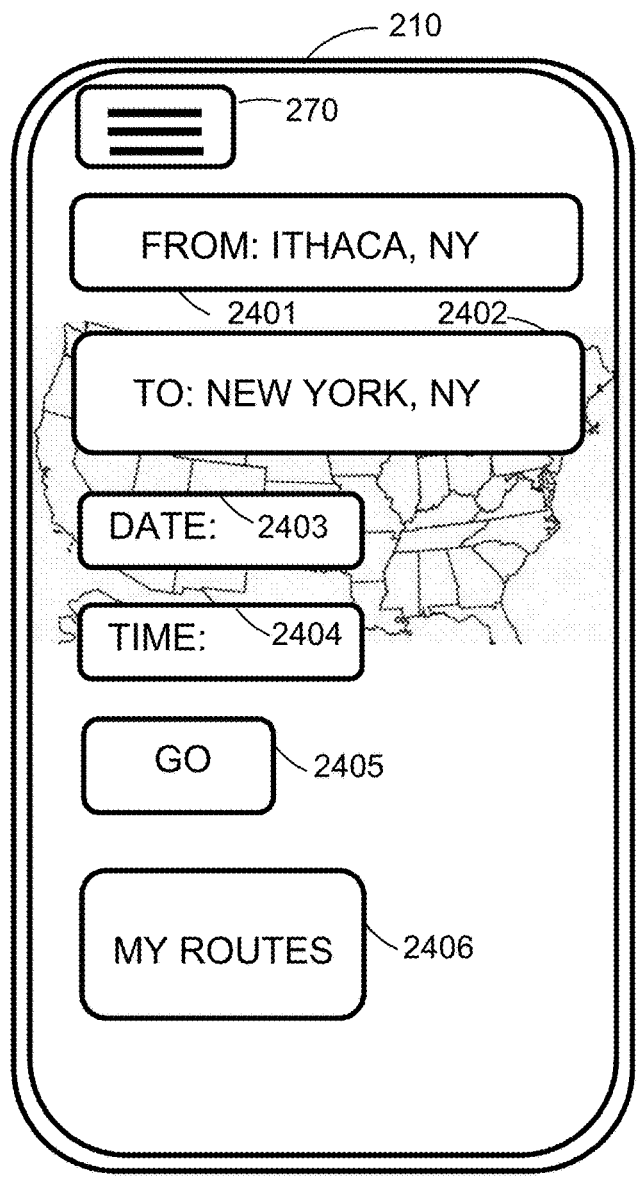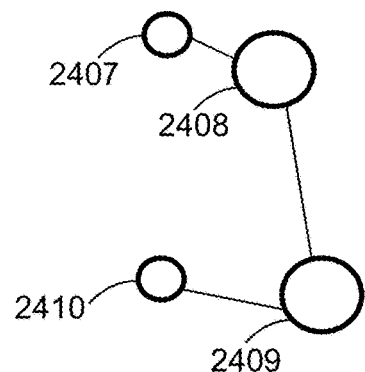
FIG. 24

4000

4010

MODEL MAKE — 4015   4051

- ACURA ✓ — 4020
- BMW ☐
- DAIMLER ☐
- FORD ☐
- GM, HONDA, ETC ☐

MODEL TYPE — 4025

- MDX ✓ — 4030
- RDX ☐
- NSX ☐
- TLX ☐
- ILX ☐

MODEL YEAR — 4035

- 2019 ✓ — 4040
- 2020 ☐

MODEL FUEL TYPE — 4045

- ELECTRIC ☐
- GASOLINE ✓ — 4050
- DIESEL ☐
- SOLAR ☐

ADVERTISING COMMUNITY INVENTORY UPLINK INTERFACE

| PRODUCT | QUANTITY | SPECIFICATION | PRICE | DATE/TIME |
|---|---|---|---|---|
| 👤 | 255 | Men 18-49 | 5.00 | 2/26/19 |
| 👤 | 300 | Women 18-49 | 5.00 | 2/26/19 |
| 👤 | 500 | Adults 25-54 | 10.00 | 2/26/19 |
| 👤 | 50 | Women 25-54 | 5.00 | 2/26/19 |
| 👤 | 50 | Men 25-54 | 5.00 | 2/26/19 |
| 👤 | 100 | Children 10-18 | 10.00 | 2/26/19 |
| 👤 | 100 | Seniors 54-74 | 0.25 | 2/26/19 |
| 👤 | 100 | Mothers 18-49 | 1.99 | 2/26/19 |
| 🚚 | 1000 | Mobile Driver 18-49 | 1.99 | 2/26/19 |

General Terms & Conditions Relating to Advertising Capacity Unit Transfers

OSX, LLC

GTCs Dated as of September 18, 2019

PREAMBLE

These General Terms & Conditions including this preamble (the "General Terms" or "GTCs") shall be applicable to all Transactions related to the sale and purchase and/or resale and purchase, transfer and assignment of those certain contracts for Advertising Capacity Unit(s) as arranged and accommodated by OSX, LLC ("OSX"), including (i) for an original Transaction, from Seller to Buyer, as arranged and accommodated by OSX and (ii) for a resale Transaction, from Seller (who acquired such rights through a prior original Transaction, as accommodated by OSX), to Buyer, as arranged and accommodated by OSX. In any Transaction hereto, Seller shall be Party A and Buyer shall be Party B. OSX is not a Party to the Transaction but provides a platform and marketplace to bring together and match willing Buyers and Sellers. For Resale Transactions, prior to use or consumption of the underlying Advertising Capacity Units by Party A, Party A desires to resell its Advertising Capacity Units and, through the use of OSX's electronic trading platform and proprietary software and system for matching Buyers and Sellers in a forward marketplace ("OSX Trade Hub"), a Buyer ("Party B") desires to and agrees to purchase and take possession of said Advertising Capacity Units from Party A pursuant to the terms of these GTCs and the Transaction Confirmation, and Party A is willing to sell and dispose of such Advertising Capacity Units pursuant to the terms of these GTCs and the Transaction Confirmation. To the extent that differing terms are specifically otherwise agreed between Party A and Party B, and approved by OSX, in its discretion, and included in the Confirmation, the Confirmation shall control; provided, however, that in a resale Transaction, such Confirmation must be consistent with the Confirmation of the original Transaction being resold. The Confirmation, together with these General Terms and the OSX Terms of Use, shall constitute the binding agreement of the Parties with respect to any Transaction. These General Terms may be amended from time to time by OSX.

By establishing an account with OSX and by executing trades on the OSX Trade Hub, you acknowledge and agree to these GTCs. OSX's GTCs and/or amended General Terms shall be available electronically on the OSX Trade Hub. It is the Parties' responsibility to know and understand each's respective duties and obligations hereunder. OSX shall have no further obligation to Parties with respect to such amendments other than to provide access to such amendments on the OSX Trade Hub.

Certain larger users that either offer for purchase or that purchase large volumes of ASUs on the OSX Trade Hub (each "Margin Party") may, in OSX discretion, be asked to post additional credit support in the form of margin or in such other form as such Party and OSX may mutually agree; provided, however, in no instance shall OSX bear any liability to any Party hereunder for any decision to request margin from a Margin Party.

Party A and Party B have entered and/or anticipate entering into one or more Transactions that are or will be governed by these GTCs, as well as the OSX Terms of Use.

ARTICLE I

DEFINITIONS

As used in these GTCs, the following terms have the respective meanings set forth below:

"Affiliate" means, with respect to any Person, any other Person that directly or indirectly, through one or more intermediaries, controls or is controlled by, or is under common control with, such Person. For these purposes, "control" of any Person shall mean the ownership of, or the power to direct the voting of, more than ten percent (10%) of the common stock or issued share capital or other equity interests having ordinary voting power for the election of directors (or Persons performing comparable functions) of such Person.

"Agreement" has the meaning set forth in Section 2.2.

"Applicable Interest Rate" means, with respect to any cash held as collateral or margin by OSX posted by the applicable Margin Party the Federal Funds (effective) rate as set forth in the most recent H.15 (5/9) released and publicly available by the Federal Reserve Board of Governors.

"Assigning Party" has the meaning set forth in Section 10.4.

"Bankrupt" means any entity, if such entity a. files a petition or otherwise commences, authorizes or acquiesces in the commencement of a proceeding or cause of action under any bankruptcy, insolvency, reorganization, debt restructuring, liquidation or similar law, or has any such petition filed or commenced against it, b. makes an assignment or any general arrangement for the benefit of creditors, c. otherwise becomes bankrupt or insolvent (however evidenced), d. has a liquidator, administrator, receiver, trustee, conservator or similar official appointed with respect to it or any substantial portion of its property or assets, or e. is generally unable to pay its debts as they fall due.

"Business Day" means (i) with respect to payments, a day, other than a Saturday or Sunday, on which the banks in Texas are open for business.

"Buyer" means the Party to an original Transaction or resale Transaction that is obligated to purchase a Product.

"Claiming Party" has the meaning set forth in Article 3.

"Claims" means all third-party claims, demands or actions in connection with this Agreement, threatened or filed, that directly or indirectly relate to the subject matter of an indemnity or remedy hereunder, and the resulting losses, liabilities, obligations, damages, expenses, attorneys' fees and court

FIG. 70

7100 costs, whether incurred by or in connection with a settlement or otherwise, and whether such claims, demands or actions are threatened or filed prior to or after the termination of this Agreement.

"Confirmation" has the meaning set forth in Section 2.3.

"Contract Price" means the price per Period agreed to be paid by Buyer to Seller executed through the OSX Trade Hub in connection with a Transaction.

"Contract Value" means, with respect to a Terminated Transaction, as applicable, the net present value (discounted at the Present Value Discount Rate to the first day of the term applicable to such Terminated Transaction) of the Contract Price applicable to such Terminated Transaction.

"Contractual Currency" means United States Dollars.

"Costs" means, with respect to the Non-Defaulting Party, agency fees, brokerage fees, attorneys' fees and expenses, commissions and other similar third party transaction costs and expenses reasonably incurred by such Party (i) in terminating any arrangement or entering into new arrangements which replace a Terminated Transaction, or (ii) in connection with the enforcement and protection of such Party's rights and remedies under this Agreement.

"Defaulting Party" means a Party that is responsible for an Event of Default.

"Default Rate" means, for any day, the annual prime commercial lending rate (or comparable rate), from time to time published in the Wall Street Journal, as such rate may change, plus two (2) percent per annum; provided that the Default Rate shall never exceed the maximum interest rate permitted by applicable law.

"Delivery" means the delivery and transfer of the Product from Seller to Buyer in accordance with the Agreement.

"Early Termination Date" means the day designated by the Non-Defaulting Party pursuant to Section 5.2 as the early termination date, upon which date, all Transactions between Party A and Party B will terminate.

"Effective Date" with respect to a given Party, unless as otherwise provided, means the earliest date on which both Parties A and B have signed up to transact on the OSX Trade Hub.

"Event of Default" means the occurrence of any of the events listed in Section 5.1.

"Force Majeure" means an event or circumstance which prevents a Party from performing its obligations under one or more Transactions, which is not within the reasonable control of, or the result of the negligence or willful misconduct of, the Claiming Party, and which, by the exercise of due diligence, the Claiming Party is unable to overcome or avoid or cause to be avoided. Force Majeure shall not include or be based on (i) the loss of Buyer's markets; (ii) Buyer's inability to economically use or resell the Product purchased hereunder; (iii) the loss or failure of Seller's supply (except as set forth above); or (iv) Seller's ability to sell the Product at a price greater than the Contract Price.

"GTCs" has the meaning set forth in the Preamble.

"Independent Amount" means with respect to a Margin Party, the amount determined by OSX as appropriate in its commercially reasonable discretion is warranted under the circumstances, or if no amount is specified, zero.

"Letter(s) of Credit" means one or more irrevocable, transferable standby letters of credit issued by a U.S. commercial bank or a foreign bank with a U.S. branch having a credit rating of at least A- by S&P and A3 by Moody's, in a form acceptable to the Party in whose favor the letter of credit is issued. Costs of a Letter of Credit shall be borne by the applicant for such Letter of Credit.

"Margin Party" shall have the meaning ascribed to it in the introductory paragraphs hereof.

"Non-Defaulting Party" means the Party that is not a Defaulting Party.

"Option" means the right but not the obligation to enter into a Transaction.

"Option Buyer" means the Party specified as the purchaser of an Option.

"Option Seller" means the Party specified as the seller of an Option.

"Party" or "Parties" means Party A and Party B, individually or collectively, as applicable and their respective permitted successors or assigns. For the avoidance of doubt, in providing access to the OSX Trade Hub, Seats X shall not be considered a Party for purposes of these GTCs with respect to a Transaction.

"Party B" has the meaning set forth in the Transaction Confirmation.

"Payment Date" means, with respect to a Transaction, the Trade Date of such Transaction with payment made through the OSX Trade Hub and settlement made by OSX pursuant to the Terms of Use.

"Performance Assurance" means collateral (other than the Independent Amount, if any) in the form of either cash, Letter(s) of Credit, or other security acceptable to OSX with respect to Margin Parties.

"Person" means an individual, partnership, corporation, limited liability company, association, organization, business trust, joint stock company, trust, unincorporated association, joint venture, firm or other entity, or a government or any political subdivision or agency, department or instrumentality thereof.

"Premium" means the premium to be paid or collected, if any, related to the purchase or sale of an Option that is specified by the Parties.

"Present Value Discount Rate" means at a particular date, (i) if the term of the Terminated Transaction, as applicable, is one year or less, the "Ask Yield" interest rate for the appropriate U.S. Government Treasury bill or note with a term closest to the time remaining in such term, plus 100 basis points, or (ii) if the time remaining in the term of the Terminated Transaction is greater than one year, the "Ask Yield" interest rate for the appropriate U.S. Government Treasury note with a term closest to the time remaining in such term, plus 100 basis points, in each case, as quoted in the "Treasury, Bonds, Notes & Bills" section of the Default Rate Source most recently published as of such date.

"Product" means the specified Advertising Capacity Unit during a specified time window during the Period to be made available by Seller to Buyer in connection with a Transaction in accordance with these GTCs.

"Recording" has the meaning set forth in Section 2.4.

"Replacement Value" means, with respect to a Terminated Transaction, as applicable, the net present value (discounted at the Present Value Discount Rate to the first day of the term applicable to such Terminated Transaction) of the Termination Replacement Price.

"Seller" means the Party to an original Transaction or resale Transaction that is obligated to sell and make available, or cause to be made available, a Product.

"Settlement Amount" has the meaning set forth in Section 5.3(i).

"Taxes" means any and all present or future ad valorem, consumption, excise, gross receipts, privilege, property, sales, transaction, transport, use and other taxes, levies, duties, imposts, governmental charges, licenses, fees, permits and assessments or increases therein, other than (i) income taxes required to be withheld at the source, (ii) taxes based on net income or net worth, and (iii) gross receipts taxes imposed in lieu of income taxes in jurisdictions that do not assess a corporate income tax.

"Term" means the aggregate duration of all Periods in respect of a Product.

"Terms of Use" means the terms and conditions that a user of the OSX Platform must agree to in the first instance, which may be found at https://OSX.com/about/termsandconditions, (as may be amended from time to time).

"Terminated Transaction" means each Transaction terminated pursuant to Section 5.2, such Transaction having a term deemed to (i) commence on the Early Termination Date, and (ii) end on the last day of the Term applicable to such Transaction.

"Termination Payment" means the payment made by either Party pursuant to Section 5.3(ii).

"Termination Replacement Price" means with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction). The Termination Replacement Price shall be based on an actual Termination Replacement Transaction or the applicable forward price for the Product posted by OSX on the OSX Trade Hub.

"Termination Replacement Transaction" means one or more Transactions for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:

a.    commencing on the Early Termination Date; and

FIG. 73

7400 b.  ending on the last day of the term of the Terminated Transaction had it not been terminated.

"Trade Date" means the date on which the Parties execute a trade and agree to enter into a Transaction on the OSX Trade Hub.

"Transaction" means a particular transaction (including an Option) agreed to by the Parties relating to the sale and purchase of one or more Products.

"Advertising Capacity Unit" or "ASU" means the base unit of a given Product related to an advertising impression based on a specification offered on the OSX Trade Hub.

ARTICLE II

TRANSACTION TERMS AND CONDITIONS 2.1  Transactions. Each of Party A and Party B shall be in full compliance with OSX's registration and other requirements to participate. A Transaction shall be entered into upon agreement of the Parties through OSX Trade Hub and the proprietary matching execution procedures, including by means of electronic communication. Each Party agrees not to contest, or assert any defense to, the validity or enforceability of the Transaction entered into in accordance with these GTCs (i) based on any law requiring agreements to be in writing or to be signed by the Parties, or (ii) based on any lack of authority of the Party or any lack of authority of any employee of the Party to enter into a Transaction.

2.2  Governing Terms. Each Transaction matched and executed through OSX Trade Hub between the Parties shall be governed by these GTCs, the applicable Confirmation and Terms of Use. These GTCs, all Transactions and all Confirmations, as the same may be amended, supplemented or otherwise modified from time to time, shall form a single integrated agreement (the "Agreement") between the Parties. The Parties shall comply with all rules for use and Terms of Use of OSX's Trade Hub.

2.3  Confirmation. OSX, through its proprietary electronic matching platform has in place a procedure for documenting the terms of a given Transaction, to which the Parties previously had agreed. OSX shall confirm any Transaction arranged on the OSX Trade Hub by electronically sending the Parties a Confirmation ("Confirmation"). If either other Party objects to any term(s) of such Confirmation, it shall notify OSX and the other Party in writing via facsimile or electronic communication of such objections within two (2) Business Days of the Parties' receipt thereof, failing which a Party shall be deemed to have accepted the terms as sent; provided, however, that upon receipt of such objection, OSX shall determine the prior agreed-upon commercial terms of the Transaction and shall confirm the Confirmation to the agreed-upon terms if different than the prior Confirmation. Any such amended Confirmation shall be binding.

2.4  Recording. Unless a Party expressly objects at the beginning of a telephone conversation, each Party consents to the creation of a tape or electronic recording ("Recording") of all telephone conversations between the Parties to these GTCs, and agrees that any such Recordings will be retained in confidence, secured from improper access, and may be submitted in evidence in any proceeding or action relating to this Agreement. Each Party waives any further notice of such monitoring or recording and agrees to notify its officers and employees of such monitoring or recording and to obtain any

FIG. 74

7500 necessary consent of such officers and employees. The Recording, and the terms and conditions described therein, if admissible, shall be the controlling evidence for the Parties' agreement with respect to a particular Transaction in the event a Confirmation is not fully executed (or deemed accepted) by both Parties.

2.5 Inconsistency. In the event of any inconsistency among the terms of a Confirmation, a Recording, or the GTCs, the terms of the following shall prevail in order listed: (i) these GTCs; (ii) a Confirmation; and (iii) such Recording.

2.6 Parties' Responsibilities. With respect to each Transaction, unless the Parties otherwise agree, (i) Seller agrees to provide Buyer a advertising specification impression in the specified class or type of vehicle along the specified travel route within the agreed-upon time period during the designated Time Window in the contracted Market, pursuant to the Agreement and Terms of Use. Seller shall provide the services associated with the Advertising Capacity Unit via routes and during the Time Period specified for the Product sold. Seller and Buyer shall take such steps as necessary to comply with all the Terms of Use and rules of the OSX Trade Hub. Payments related to any Transaction, any Margin and/or collateral shall be made to and held by OSX through the OSX Trade Hub with settlement to occur through the OSX Trade Hub and conducted by OSX pursuant to the rules of the Terms of Use. Seller shall sell and make available, or cause to be made available, the Product(s) to Buyer for the Contract Price for the agreed upon Term. Buyer shall purchase the Product from Seller for the Contract Price for the agreed upon Term.

ARTICLE III

FORCE MAJEURE 3.1 To the extent either Party is prevented by Force Majeure from carrying out, in whole or part, its obligations in respect of a Transaction, such Party (the "Claiming Party") shall orally notify the other Party and OSX of the Force Majeure as soon as practicable after the occurrence thereof and shall provide to the other Party a written description of the details of such Force Majeure within one (1) Business Day after the date of such oral notice. The Claiming Party shall make reasonable efforts to mitigate the effects of such Force Majeure with reasonable dispatch. If the Claiming Party complies with the foregoing procedures, such Claiming Party shall be excused from the performance of its obligations with respect to such Transaction (other than the obligation to make payments then due or becoming due with respect to performance prior to the Force Majeure). The non-Claiming Party shall not be required to perform or resume performance of its obligations to the Claiming Party which correspond to the obligations of the Claiming Party excused by Force Majeure; provided, however, that upon the occurrence of a Force Majeure, Buyer shall have the ability to reschedule the ASU for a time after the Force Majeure has ended, and the Delivery Period shall be extended by the number of days that such Force Majeure lasted.

ARTICLE IV

REMEDIES FOR PRODUCT DELIVERY FAILURES 4.1 Unless excused by Force Majeure or caused by failure of Buyer to deliver the Product hereunder pursuant to the terms hereof and in the Confirmation, upon a Product Delivery Failure during any Period, the non-failing Party shall be entitled to the price of such ASU as liquidated damages.

ARTICLE V

EVENTS OF DEFAULT; REMEDIES 5.1 Events of Default. An Event of Default shall be deemed to have occurred with respect to a Party upon the occurrence of any of the following:

a. the failure to make or apply, when due, any payment required pursuant to this Agreement, if such failure is not remedied within five (5) days after written notice thereof;

b. any representation or warranty made by such Party under this Agreement is false or misleading in any material respect when made or when deemed made or repeated;

c. the failure to perform any material covenant or obligation set forth in this Agreement (other than an Event of Default under this Section 5.1, any default for which the exclusive remedy is provided in Article 3, Article 4 or any default that arises as a result of Buyer's failure to deliver Content to Seller pursuant to Section 2.7), if such failure is not remedied within ten (10) days after written notice thereof;

d. such Party becomes Bankrupt;

e. such Party merges with or into, or reorganizes, amalgamates, consolidates or enters into any other transaction in which substantially all of its assets are transferable to, another Person who either (a) fails to assume all of such Party's obligations under this Agreement, or (b) assumes such Party's obligation under this Agreement, but whose creditworthiness is materially weaker than that of such Party immediately prior to such merger, reorganization, amalgamation, consolidation or other transaction; or f. any event of default under the Credit terms with respect to a Margin Party.

5.2 Effect of Event of Default. If an Event of Default with respect to a Defaulting Party shall have occurred and be continuing or if the Non-Claiming Party shall have the right to terminate its obligations pursuant to Article 3, the Non-Defaulting Party or Non-Claiming Party, as applicable, shall have the right to designate an Early Termination Date and to liquidate and terminate all, but not less than all, Transactions. For purposes of Sections 5.3, 5.4 and 5.5, the Non-Claiming Party, shall be deemed to

7700 be the "Non-Defaulting Party" and the other Party shall be deemed to be the "Defaulting Party"; Section 5.6 shall not be applicable to any Transaction terminated pursuant to Article 3 and Section 5.2.

5.3    Calculation of Termination Payment.

a.    If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

i.    If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii.    If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

iii.    If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv.    If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v.    If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non- Defaulting Party is greater than the sum of the Settlement Amounts payable by the Defaulting Party, then a single payment in the amount of such excess Settlement Amounts will be payable by the Non-

Defaulting Party to the Defaulting Party on the date specified in Section 5.4.

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and OSX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and OSX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

5.6 Closeout Setoff. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the OSX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash.

ARTICLE VI

PAYMENT 6.1 <u>Payments and Billings</u>. All monthly payments and invoices shall be governed and will occur according to the OSX Terms of Use, unless otherwise specified herein. For the avoidance of doubt, payments for ASU Transactions shall occur online and provided to OSX for ultimate payment to the appropriate Party; provided, however, that payments associated with the early termination of a Transaction shall be invoiced and paid directly between the Parties. All payments shall be made in United States Dollars.

6.2 <u>Disputes of Invoices</u>. Payment terms and invoicing shall be done pursuant to the methods and procedures on the Terms of Use and credit card arrangements between the Parties and OSX. A Party may, in good faith, dispute the correctness of any credit and/or debit memos related to this Agreement within ten (10) days of the date that the invoice was rendered. In the event that any charge is disputed, payment of the undisputed portion shall be required to be made when due, with notice of the dispute given to the other Party and OSX in writing and stating the basis for the dispute. Payment of the disputed amount shall not be required until the dispute is resolved. Upon resolution of the dispute, any required payment shall be made within two (2) Business Days of such resolution along with interest accrued at the Default Rate from and including the due date to but excluding the date paid. Any dispute with respect to an invoice is waived unless the other Party is notified in accordance with this Section within sixty (60) days after the applicable invoice is rendered.

ARTICLE VII

LIMITATION OF REMEDIES, LIABILITY AND DAMAGES 7.1 This Article VII addresses the Parties' agreement to limit their liabilities which might otherwise be available at law. The Parties acknowledge that they have read carefully, understand, and intend for these provisions to be interpreted in a manner consistent with the acknowledgment that the Parties understand the provisions hereof and as if they had an equal responsibility for drafting the language.

7.2 NEITHER OSX NOR SELLER MAKE ANY WARRANTY WITH RESPECT TO ANY PRODUCT, INCLUDING WITH RESPECT TO MERCHANTABILITY AND FITNESS FOR A SPECIFIC PURPOSE, AND ANY AND ALL IMPLIED WARRANTIES, REPRESENTATIONS, CONDITIONS, AND TERMS OF QUALITY ARE HEREBY DISCLAIMED. IN PARTICULAR, SELLER MAKES NO WARRANTY WITH RESPECT TO THE EFFECT THAT ANY PRODUCT WILL HAVE ON BUYER'S SALES OR BUSINESS.

7.3 The Parties confirm that the express remedies and measures of damages provided in this agreement satisfy the essential purposes hereof. For breach of any provision for which an express remedy or measure of damages is provided, such express remedy or measure of damages shall be the sole and exclusive remedy of the non-breaching Party. The breaching Party's liability shall be limited as set forth in such provision and all other remedies or damages at law or in equity are waived. If no remedy or measure of damages is expressly provided herein or in a transaction, the breaching Party's liability shall be limited to direct actual damages, which shall be the sole and exclusive remedy available to the non-

FIG. 79

8000 breaching Party and the non-breaching Party hereby waives all other remedies or damages at law or in equity.

7.4 Notwithstanding anything in this agreement to the contrary, neither Party nor OSX shall be liable for consequential, incidental, punitive, exemplary or indirect damages, lost profits or other business interruption damages, by statute, in tort or contract, under the indemnity provisions set forth in this agreement or otherwise.

7.5 To the extent any damages required to be paid hereunder are liquidated, the Parties acknowledge that the damages are difficult or impossible to determine, or obtaining an adequate remedy is otherwise inconvenient and the damages calculated hereunder constitute a reasonable approximation of the harm or loss.

7.6 BOTH PARTIES AGREE THAT OSX SHALL HAVE NO LIABILITY TO EITHER PARTY A OR PARTY B BASED UPON AN EVENT OF DEFAULT THAT MAY OCCUR WITH RESPECT TO ANY TRANSACTION HEREUNDER NOR FOR ANY PART IN ACCOMODATING AND ARRANGING ANY TRANSACTIION, UNLESS SUCH ACCOMODATING AND ARRANGING WAS SHOWN TO HAVE BEEN GROSSLY NEGLIGENT OR THAT OSX ACTED IN BAD FAITH. BOTH PARTIES EXPRESSLY WAIVE ANY AND ALL CLAIMS AGAINST OSX RELATED TO ANY ACTION OR INACTION TO THE SELLER OR THE BUYER, TO THE MAXIMUM EXTENT OF THE LAW.

7.7 Any and all additional limitations of liability in favor of OSX contained in the Terms of Use are expressly incorporated herein in their entirety and shall apply as if the text of such provisions are written in full herein, but without regard to the Terms of Use choice of law.

ARTICLE VIII

FINANCIAL INFORMATION 8.1 OSX may request periodically request either or both Parties to provide financial information, which may include, as applicable income statements, financial statements and/or credit reports, which the Party from which such financial information is requested shall provide OSX the information promptly.

ARTICLE IX

TAXES 9.1 Buyer is liable for and shall pay or cause to be paid (or reimburse Seller if Seller has paid) all Taxes applicable to the Transaction, including any Taxes imposed or collected by a taxing authority with jurisdiction over Buyer, unless Buyer has presented Seller with a valid tax exemption certificate. Buyer agrees to pay any such applicable Taxes and to defend, indemnify and hold Seller harmless from any Claims for such Taxes. Buyer shall provide all information reasonably required by Seller to ascertain the proper treatment and handling of tax liability hereunder.

ARTICLE X

CREDIT SUPPORT 10.1 <u>Credit Protection</u>. If at any time and from time to time during the term of this Agreement (and whether or not an Event of Default has occurred), OSX determines in its discretion that the financial condition of a Margin Client has materially changed so as to increase the likelihood of an Event of Default or of its ability to meet its payment obligations hereunder to the other Party or OSX, then OSX, on any Business Day, may request that such Party provide Performance Assurance in an amount of up to the amount OSX estimates would be due from such Party upon the occurrence of an Event of Default and early termination of all such Party's Transactions hereunder less any Performance Assurance already held by OSX from such Party. Such Performance Assurance shall be delivered to OSX within two (2) Business Days after the date of such request.

10.2 <u>Grant of Security Interest/Remedies</u>. To secure its obligations under these GTCs and, to the extent either or both Parties deliver Performance Assurance hereunder, each Party (a "Pledger") hereby grants to OSX (as Secured Party and/or as collateral agent for such other Party) and the other Party (collectively, the "Secured Party") a present and continuing security interest in, and lien on (and right of setoff against), and assignment of, all such Performance Assurance and any and all proceeds resulting therefrom or the liquidation thereof, whether now or hereafter held by, on behalf of, or for the benefit of, such Secured Party, and each Party agrees to take such action as the other Party reasonably requires in order to perfect the Secured Party's first- priority security interest in, and lien on (and right of setoff against), such Performance Assurance and any and all proceeds resulting therefrom or from the liquidation thereof. Any Secured Party (other than OSX) appoints to the extent necessary OSX as its collateral agent.

ARTICLE XI

MISCELLANEOUS 11.1 <u>Representations and Warranties</u>. On the Effective Date and on each Trade Date, each Party represents and warrants to the other Party that:

a.    it is duly organized or registered, as applicable, validly existing and in good standing under the laws of the jurisdiction of its formation;

b.    it has all authorizations, licenses and consents necessary for it to legally perform its obligations under this Agreement;

c.    the execution, delivery and performance of this Agreement are within its powers, have been duly authorized by all necessary action and do not violate any of its governing documents, any contracts to which it is a party or any law, rule, regulation, order or the like applicable to it;

d.    this Agreement and every other document and/or Terms of Use executed and delivered in accordance with this Agreement constitutes its legally valid and binding obligation enforceable against it in accordance with its terms, subject to any equitable defenses;

FIG. 81

8200 e. it is not Bankrupt and there are no proceedings pending or being contemplated by it or, to its knowledge, threatened against it which would result in it being or becoming Bankrupt;

f. there is not pending nor, to its knowledge, threatened against it or any of its Affiliates any legal proceedings that could materially adversely affect its ability to perform its obligations under this Agreement;

g. no Event of Default, or any event that with the passage of time would constitute an Event of Default, with respect to it has occurred and is continuing and no such event or circumstance would occur as a result of its entering into or performing its obligations under this Agreement;

h. it is acting for its own account, has made its own independent decision to enter into this Agreement and as to whether this Agreement is appropriate or proper for it based upon its own judgment, is not relying upon the advice or recommendations of the other Party in so doing, and is capable of assessing the merits of and understanding, and understands and accepts, the terms, conditions and risks of this Agreement;

i. the material economic terms of each Transaction are subject to individual negotiation by the Parties; and j. it has a valid, existing and current account on the OSX Trade Hub.

11.2 <u>Indemnity</u>. Each Party shall defend, indemnify and hold harmless the other Party and OSX, and each's Affiliates, directors, officers, employees, agents and representatives from and against any and all Claims for physical property damage, personal injury or wrongful death, to the extent that such Claims arise out of or result from the negligence or willful misconduct of the indemnifying Party or such Party's employees, agents or contractors in connection with the provision of a Product or any other performance hereunder. Buyer shall defend, indemnify and hold harmless Seller and its Affiliates, directors, officers, employees, agents and representatives from and against any Claims arising or resulting from any defect in or failure to provide a Product.

11.3 <u>Successors and Assigns; Assignment</u>.

a. Transactions arising under this Agreement shall be binding upon and inure to the benefit of, and may be performed by, the respective successors and assigns of the Parties, except that no assignment, pledge, or other transfer by either Party (the "Assigning Party") shall operate to release the Assigning Party from any of its obligations under this Agreement unless: (i) consent to such release is given in writing by the non-Assigning Party, which consent shall not be unreasonably withheld or delayed by OSX; (ii) such assignment, pledge or transfer is made to an Affiliate of the Assigning Party and such Affiliate is at least as creditworthy as the Assigning Party (as long as such Affiliate also has a valid account on the OSX Trade Hub and shall be deemed to make representations and warranties thereunder on the dated of such assignment), or (iii) such assignment, pledge or transfer is incident to a merger, reorganization, consolidation or other transaction in which

FIG. 82

8300 substantially all of the assets of the Assigning Party are transferred to another Person who assumes all of the obligations of the Assigning Party under this Agreement and such Person is at least as creditworthy as the Assigning Party.

b. Seller hereby acknowledges and agrees that Buyer shall, without further consent of Seller have the ability to assign and transfer all its rights or obligations under a Transaction to any other Person qualified by OSX. Pursuant to a resale Transaction executed on the OSX Trade Hub.

11.4 Governing Law. THIS AGREEMENT AND THE RIGHTS AND DUTIES OF THE PARTIES HEREUNDER SHALL BE GOVERNED BY AND CONSTRUED, ENFORCED AND PERFORMED IN ACCORDANCE WITH THE LAWS OF NEW YORK, WITHOUT REGARD TO PRINCIPLES OF CONFLICTS OF LAW, IF APPLICABLE.

11.5 Dispute Resolution.

a. For any Dispute (as defined below) with an amount in controversy of less than $25,000, each Party shall provide a written summary of its position on the Dispute to OSX Designee who will evaluate and determine the validity of the Dispute and the appropriate amounts due with respect to the Dispute within fifteen (15) days. Such determination shall bind both Parties.

b. Agreement to Arbitrate. Any and all claims, counterclaims, demands, causes of action, disputes, controversies, and other matters in question arising out of or relating to these GTCs and any Transaction thereunder, or the alleged breach hereof or thereof, or in any way relating to the subject matter of any Transaction or the relationship between the Parties created by these GTCs and any Transaction thereunder (hereafter a "Dispute") with an amount in controversy of $25,000 or greater shall be finally resolved by binding arbitration administered by the American Arbitration Association ("AAA") under the Commercial Arbitration Rules (the "Rules") then in force, to the extent such Rules are not inconsistent with the provisions of these GTCs.

i. Number and Appointment of Arbitrator. One arbitrator ("the Arbitrator") shall preside over and adjudicate the Dispute and then make a final and binding determination of the merits. Except as provided by this clause, the appointment and confirmation of the Arbitrator shall be made in accordance with the relevant provisions of the Rules or failing that, as provided by applicable law. The Party requesting arbitration (the "Claimant") shall ask AAA to appoint the Arbitrator. The other Party other than the Claimant shall be the Respondent.

ii. Venue; Procedural Issues. The seat of the arbitration shall be in Houston, Texas in the United States of America. The hearings in this arbitration shall be held at the seat or at such other place as the Parties may agree. The arbitration shall be conducted and the award rendered in the English language. Subject to any relevant legal privilege against disclosure, the

Arbitrator shall have the power to make all orders necessary for the disclosure contemplated above, which orders the Parties consent in advance to obey. If a Party fails or refuses to comply with an order for discovery, the Arbitrator may take that failure into account when deciding the issues and may infer that the documents not produced would have supported the opposing Party's claims.

iii. Powers of the Arbitrators; Limitations on Remedies. The validity, construction, and interpretation of this agreement to arbitrate, and all procedural aspects of the arbitration conducted pursuant to this agreement to arbitrate, including but not limited to, the determination of the issues that are subject to arbitration (i.e., arbitrability), the scope of the arbitrable issues, allegations of "fraud in the inducement" to enter into these GTCs or this agreement to arbitrate, allegations of corruption, allegations of waiver, laches, delay or other defenses to arbitrability, and the rules governing the conduct of the arbitration shall be decided by the Arbitrator. The Arbitrator shall have the power to award all remedies available under the applicable law, except as limited by these GTCs. The Arbitrator shall not decide the Dispute ex aequo et bono or as amiable compositeur or by reliance on any other doctrine or principle that would permit the Arbitrator to avoid the application of these GTCs and/or the governing law. The Arbitrator shall not have the authority to modify or amend any term or provision of these GTCs or any Transaction thereto.

iv. Arbitration Awards. The award shall be final and binding on the Parties and may be confirmed in, and judgment upon the award entered by, any court having jurisdiction over the Parties. The Arbitrator's award shall be entitled to all of the protections and benefits of a final judgment as to any Dispute, including compulsory counterclaims, that were or could have been presented to the Arbitrator, and shall be final and binding on the Parties and non-appealable to the maximum extent permitted by law.

v. A Claimant must arbitrate a dispute only in its individual capacity; it may not do so as a plaintiff or representative class member in a purported class-action, collective-action, or representative proceeding, nor in a capacity of private attorney general. Moreover, the Arbitrator shall have no power to determine whether arbitration is allowed other than by a Party acting solely in an individual capacity.

vi. All Disputes arising out of the Agreement that are not required to be resolved by other means (such as, for example, arbitration) may be heard in Harris County, Texas if at least one of the Parties' primary domicile is in the State of Texas or in the state capital of the state in which the Claimant has his or her primary domicile (the state capital or Harris County, as applicable, referred to herein as the "Selected Forum"), which shall be the exclusive forum, unless the individual has its primary domicile in another state and then such Select Forum shall be the capital of that state where the

FIG. 84

8500 individual has its primary domicile. No Party will seek to transfer a dispute that is properly brought there under this Clause. Notwithstanding that the choice of the Selected Forum is exclusive, the Parties and OSX do not intend to negate or limit any provision of the Agreement, nor of any other agreement between or among them that requires (i) binding arbitration or other non-judicial dispute resolution procedure nor (ii) non-binding action to attempt to resolve a dispute by agreement, such as (for example) escalation of the dispute to higher levels of the parties' managements; early neutral evaluation; and/or mediation.

vii. Confidentiality. Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law. However, a violation of this covenant shall not affect the enforceability of this agreement to arbitrate or of the Arbitrator's award.

viii. EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

11.6   Notices. All notices required or permitted to be given hereunder in writing shall, unless expressly provided otherwise, be in writing, properly addressed, postage pre-paid and delivered by hand, facsimile, certified or registered mail, courier or electronic messaging system to the appropriate address listed on the notice schedule hereto or such other address as either Party may designate from time to time by providing notice thereof to the other Party and OSX. A notice will be deemed effective as indicated: (i) if in writing and delivered in person or by courier, on the date it is delivered; (ii) if sent by facsimile transmission, on the date that transmission is received in legible form by a responsible employee of the recipient; (iii) if sent by certified or registered mail (airmail, if overseas) or the equivalent (return receipt requested), on the date that mail is delivered or its delivery is attempted; or (iv) if sent by electronic messaging system, on the date that the electronic message is received, unless, in each case, the date of that delivery (or attempted delivery) or that receipt, as applicable, is not a Business Day or that communication is delivered (or attempted) or received, as applicable, after the close of business in the location of the recipient on a Business Day, in which case that communication shall be deemed given and effective on the first following day that is a Business Day.

11.7   Entire Agreement. This Agreement constitutes the entire agreement between and among the Parties and OSX relating to the subject matter hereof and supersedes all prior agreements, understandings, negotiations, whether oral or written, of the Parties but hereby incorporates by reference

FIG. 85

8600 all applicable provisions of OSX's Terms of Use. If there is a conflict between an applicable provision of the Terms of Use and this Agreement, the terms of this Agreement shall control.

11.8 <u>Non-Waiver; No Partnership or Third Party Beneficiaries</u>. No waiver by any Party of any of its rights with respect to the other Party or with respect to these GTCs or any matter or default arising in connection with these GTCs, shall be construed as a waiver of any other right, matter or default. Any waiver shall be in writing signed by the waiving Party. Neither Party shall be deemed to be the employee, agent, partner, joint venturer or contractor of any other Party under or in connection with these GTCs. This Agreement is made and entered into for the sole benefit of the Parties, and their permitted successors and assigns, and no other Person shall be a direct or indirect legal beneficiary of, have any rights under, or have any direct or indirect cause of action or claim in connection with these GTCs.

11.9 <u>Severability</u>. If, at any time, any provision of these GTCs is or becomes illegal, invalid or unenforceable in any respect under the law of any jurisdiction, neither the legality, validity or enforceability of the remaining provisions hereof nor the legality, validity or enforceability of such provision under the law of any other jurisdiction shall in any way be affected or impaired thereby and the Parties shall promptly negotiate to restore these GTCs as near as possible to its original intent and economic effect.

11.10 <u>Confidentiality</u>. Neither Party shall disclose the terms of any Transaction to a third party (other than the employees, lenders, counsel or accountants of the Party and its Affiliates or prospective purchasers, directly or indirectly, of a Party of all or substantially all of a Party's assets or of any rights under these GTCs, provided such Persons shall have agreed to keep such terms confidential) except:

a. in order to comply with any applicable law, order, regulation or exchange rule, and (ii) to the extent necessary to implement any Transaction, or (iii) to the extent such information is delivered to such third party for the sole purpose of calculating a published index.

Each Party shall notify the other Party of any proceeding of which it is aware which may result in disclosure of the terms of any Transaction (other than as permitted hereunder) and use reasonable efforts to prevent or limit the disclosure. The existence of these GTCs is not subject to this confidentiality obligation. The Parties shall be entitled to all remedies available at law or in equity to enforce or seek relief in connection with this confidentiality obligation.

11.11 <u>Limitation on Rights</u>. All rights related to the Product purchased and sold under these GTCs and all obligations incurred under these GTCs are purely contractual in nature. In the event of a dispute involving both Parties with a customer of one Party, both Parties shall assert the applicability of any limitations on liability to customers that may be contained in either Party's applicable contracts.

11.12 <u>Headings and References</u>. The headings contained in these GTCs are for convenience of reference only and do not constitute a part of these GTCs. Any reference to an "Article", "Section" or "Exhibit" refers to an article, section or exhibit, as the case may be, of these GTCs.

11.13 <u>Bankruptcy Acknowledgments</u>. The Parties intend that each Transaction and the Agreement shall constitute a "forward contract", that these General Terms shall constitute a "master netting agreement, and that each Party shall be a "forward contract merchant", and "master netting agreement participant", as such terms are defined in Title 11 of the United States Code, as amended from

FIG. 86

8700 time to time (the "Bankruptcy Code"), and as such, that the Non-Defaulting Party shall have the rights granted in the Bankruptcy Code, including Sections 362, 546, 556, 560, 561, and 562, to terminate, liquidate, accelerate, net out, and offset in connection with the Agreement. This Agreement is entered into in reliance on the fact that these GTCs and all Transactions between the Parties form a single agreement between the Parties.

11.14  Counterparts. These GTCs may be executed in several counterparts, each of which is an original and all of which constitute one and the same instrument.

NOTICE

| Notices and Correspondence: | Notices and Correspondence: |
|---|---|
| Attn: _____ <br> Phone No.: _____ <br> Fax No.: _____ | Attn: _____ <br> Phone No.: _____ <br> Fax No.: _____ |
| Payments: <br><br> Attn: _____ <br> Phone: _____ <br> Fax: _____ <br> Bank: _____ <br> Account No.: _____ <br> ABA Routing No.: _____ | Payments: <br><br> Attn: _____ <br> Phone: _____ <br> Fax: _____ <br> Bank: _____ <br> Account No.: _____ <br> ABA Routing No.: _____ |
| Scheduling Matters: <br><br> Attn: _____ <br> Phone No.: _____ <br> Fax No.: _____ <br> Cell No.: _____ <br> Email: _____ | Scheduling Matters: <br><br> Attn: _____ <br> Phone No.: _____ <br> Fax No.: _____ <br> Cell No.: _____ <br> Email: _____ |

FIG. 88

WEB BROWSER AND OPERATING SYSTEM PORTAL AND SEARCH PORTAL WITH PRICE TIME PRIORITY QUEUES

RELATED APPLICATIONS

THIS application IS RELATED TO THE FOLLOWING applications: (1) U.S. patent application Ser. No. 15/266,326, "IMPLEMENTATIONS OF VARIOUS METHODS TO CREATE ECONOMIC INCENTIVES TO DIRECTLY LINK USERS OF A SOCIAL NETWORK OR SOCIAL NETWORK REALITY GAME TO ACTUAL PROJECTS AND PEOPLE WITHIN A CHARITY OR DEVELOPING WORLD AREA," FILED Sep. 15, 2016; (2) U.S. patent application Ser. No. 15/484,059, "BLOOD AND SALIVA BIOMARKER OPTIMIZED FOOD CONSUMPTION AND DELIVERY WITH ARTIFICIAL INTELLIGENCE," FILED Apr. 10, 2017; (3) U.S. patent application Ser. No. 15/877,393, "ELECTRONIC FORWARD MARKET EXCHANGE FOR ADVERTISING ATTRIBUTE SPECIFICATION SEATS AND CAPACITY IN ADVERTISING ATTRIBUTE SPECIFICATION SPACES AND VEHICLES," FILED Jan. 23, 2018; (4) U.S. patent application Ser. No. 16/167,525, "MULTI-LAYERED NODAL NETWORK TOPOLOGY FOR A MULTI-MODAL SECURE FORWARD MARKET AUCTION IN ADVERTISING ATTRIBUTE SPECIFICATION CAPACITY AND SPACE," FILED Oct. 22, 2018; (5) U.S. patent application Ser. No. 16/183,647 "FINANCIAL SWAP PAYMENT STRUCTURE METHOD AND SYSTEM ON ADVERTISING ATTRIBUTE SPECIFICATION CAPACITY UNIT ASSETS," FILED Nov. 7, 2018; (6) U.S. patent application Ser. No. 16/239,485, "MARKET LAYER PRICE QUEUE ROUTING FOR MULTI-LAYERED NODAL NETWORK TOPOLOGY FOR A MULTI-MODAL SECURE FORWARD MARKET AUCTION IN ADVERTISING ATTRIBUTE SPECIFICATION CAPACITY AND SPACE," FILED Jan. 3, 2019; (7) U.S. patent application Ser. No. 16/242,967, "PRICE BASED NAVIGATION," FILED Jan. 8, 2019; (8) U.S. patent application Ser. No. 16/242,981, "STRATEGY GAME LAYER OVER PRICE BASED NAVIGATION," FILED Jan. 8, 2019; (9) U.S. patent application Ser. No. 16/257,032 "SECURITIZATION OF ADVERTISING ATTRIBUTE SPECIFICATION UNITS," FILED Jan. 24, 2019; (10) U.S. patent application Ser. No. 16/258,658 "NAVIGATION ROUTES AS COMMUNITY OBJECT VIRTUAL HUB SEQUENCES TO WHICH USERS MAY SUBSCRIBE", FILED Jan. 27, 2019; (11) U.S. patent application Ser. No. 16/274,490 "ROUTE COMMUNITY OBJECTS WITH PRICE TIME PRIORITY QUEUES FOR TRANSFORMED ADVERTISING ATTRIBUTE SPECIFICATION UNITS", FILED Feb. 13, 2019; ALL OF THESE APPLICATIONS ARE INCORPORATED BY REFERENCE HEREIN IN THEIR ENTIRETY.

BACKGROUND OF THE INVENTION

Field of the Invention

Implementations of various methods and systems to transform socket communication streams combined with vaulted user characteristic data over an advertising exchange with price time priority queues. The present disclosed invention relates to combining the concepts of objected oriented programming, market price-time priority queues, forward and futures trading markets, vaulted user characteristic data, navigation systems, operating system portals, web browsers, social networking and advertising units as a fungible tradable asset class as an open market. Web browsing or portal content viewing and operating system use by a user, typically is done by a web browser or web app where the browser collects user data while viewing a plurality of web sites from the internet without their control of data or without payment for the information. Further, there exists no such prior art which securitizes or unitizes the data attributes of a user or group of users to a designated specification which facilitates a forward or futures trading market for the designated specification of user attributes. The present disclosed invention transforms a user or user group attribute specification into assets or securities or unitized objects which may be traded as forward contracts or futures contracts or ETF synthetic equity or debt products as well as allowing the user to control what user attribute specification data is placed on the forward or futures or ETF or equity or debt exchange for the specification in the web browser or socket communication portal. The web browser or content portal or content portal OS may be in the environment of a mobile computing device, standard personal computer, laptop, augmented reality device, mixed reality device, head mounted gear, audio interface, neural interface or any computing interface connecting the web portal to the web. Prior to the disclosed invention, users could not control their data in a uniform and controlled manner or in context of a fair exchange with super technology companies. Internet users are powerless and super technology companies are multi-trillion-dollar monopolies. Consumers have no working knowledge how website cookies work, application data collection or what data is moving from their operating system, web portal or operating system portal. While former systems may have been incrementally useful, they do not place a cost or an economic value to the user with permission of the user which causes abuse, privacy issues and an unequal playing field. Further, no invention has previously existed that transforms a user specification into a tradable asset, security or unitized asset. We reason, the invention of a legal specification pool for user groups has never existed because the legal and technical transformations are complex and novel. Companies such as Google or Facebook mine user data on search, YouTube viewing, Social Media viewing to then sell their customers with little knowledge to no knowledge of what is being sold for advertising dollars but they do not define specifications that are transformed into forward commodities in the context of assigning a price-time priority queue to an advertising user specification or even making an advertising community specification object out of a plurality of transformed user specification units. Commodity markets have very specific data transformations which allow for features and specifications of portability between various term structures and even types of service or user specification pools. As an example, a typical natural gas commodity transaction may have a plurality of portable elements that have been combined such as natural gas transmission, natural gas storage, natural gas firm delivery, natural gas spot non-firm delivery for the transaction needs of a producer or consumer of natural gas. Similar needs are present for an advertiser or general internet user or internet content user or internet app user, but because there is no market structure or data transformations to form a forward market, these deficiencies prevent users from a fair and forthright exchange for their data. The deficiencies of these prior methods and inventions required data transformations that have created massive disconnects in the efficiency of peoples' lives, economic disparities and advertiser budgets that bloat super tech companies, but leave advertisers without any return on investment as there is no third party audit function over the specifications that would not be present if these data transformations were present from the disclosed invention. Often, futures and swaps markets are regulated by the Commodity Futures Trading Commission unlike forwards which creates a balanced competitive environment for a market such as seen in oil, power, wheat, gold, foreign exchange, pork bellies or many more. Current dark consumer advertising marketplaces and internet socket communication methods keep data hidden under the veil of super techs and the general people are left powerless over their own lives and they are left to only get the crumbs from the super technology companies. Further, advertising users as a method has lacked efficiency since its invention because the advertising placement spots are not substitutable such as oil and gas or power or wheat commodity markets and they have not been transformed to legally or specification wise perform in this manner. After considering the effects of non-substitutability of traditional advertising, media and super tech are setting hidden agendas in prioritization which are counter to free and open markets governed by the people and democratic forces. While U.S. patent application Ser. No. 15/266,326, "Implementations of a computerized business transaction exchange for various users," filed Sep. 16, 2016, lays a general framework method for business exchange units which makes people and general user attribute specification fully fungible or exchangeable, further matter is considered to continue the cloud based socket exchange which may be used for general internet browsing, internet search, hosting applications, hosting photos and videos, hosting calendars, hosting video content, mixed reality content, file storage, travel, fitness, food, shopping, augmented reality content, health data, weather data, home security data, banking data, insurance data, travel data, social media data and applications, or any other computerized programs that exchange data through a socket exchange. Further advertising systems have generally assumed advertising is a non-uniform good (all people have varied interests) rather than a commodity which is substitutable or that can be pooled. Machine learning may bridge these differences by allowing for commodity specification premiums and discounts for various different specifications between general pools to facilitate liquid markets for the data exchange. The current algorithms of advertising network companies are not based on fair and open pricing mechanisms and there is no community or third-party audit mechanism to enforce accountability around the pricing structures. We could not imagine going to a grocery store and seeing two customers with the same cup of coffee be charged two different prices for the same cup of coffee because of the way they look or the fact that their smart phone has a different origin location or a plurality of other factors. These deficiencies in the market are not only illegal from a federal trade commission perspective, but the government does not have the resources to police such illegal activity. The disclosed invention, eliminates price discrimination among many other deficiencies because of the virtual hub community data transformation as well as advertising specification unit market structure data transformations allows complete transparency for similar commodity services (Federal Trade Commission, "Price Discrimination: Robinson-Patman Violations.", https://www.ftc.gov/tips-advice/competition-guidance/guide-antitrust-laws/price-discrimination-robinson-patman). The disclosed invention also creates a viable alternative to the weak implementation of the general data protection regulations as controlled by Europe and more recently in California (Wikipedia, "General Data Protection Regulation", https://en.wikipedia.org/wiki/General_Data_Protection_Regulation). The General Data and Protection Regulation recently implemented a procedure where Google must present other search engines in coordination with Android operating systems. The regulation is therefore ineffective as it requires no change in behavior and consumers are left holding the losses and continue to lose control of their data to monopolies.

In the development of the method and system of transforming a series of user specifications into virtual communities, a general socket portal can then become a virtual community or general user attribute specification commodities where accountability, transparency and economic markets may form. Current methods and systems leave most in the dark or subject to hidden information because there is no "community" and certainly no third party that can objectively measure the delivery of a certain user specification delivered to advertisers. Prior art does not transform data structures or sequences of user attribute specification combinations into virtual communities or general legal commodity assets, securities, or units which are fungible and tradable. Accordingly, in a very real way, all the people or users, when someone opens their computer or mobile phone have no knowledge of the data exchange between content providers, technology companies, web browsers, web applications, general computer applications or any internet of things devices. The implementation of the disclosed method and system creates a community and general user attribute specification that the user controls on a given socket data communication stream which is further transformed into an object to which people may subscribe, friend, follow, comment, post, trade bilaterally, trade on exchange or structure and using U.S. patent application Ser. No. 15/266,326, "Implementations of a computerized business transaction exchange for various users," filed Sep. 16, 2016, they may transact on an open and transparent advertising user specification security or asset or unitization market which guides to the lowest cost, transparent and non-price discriminatory solution since all participants have equal access to the market method and system for advertising specification user units or securities or assets or unitization structures. It is a well-known fact that transparent open access markets create the lowest price for a good or service with fungible characteristics such as occurred in airlines, telecom and electricity markets (Pentland, W., "After decades of doubt, deregulation delivers lower electricity prices.", Oct. 13, 2013, https://www.forbes.com/sites/williampentland/2013/10/13/after-decades-of-doubt-deregulation-delivers-lower-electricity-prices/#710fb94b1d13). The lowest cost and most efficient solution will greatly increase privacy, provide employment and residual income streams for users, reduce pollution, increase advertising capacity utilization rates, reduce privacy abuse, increase service frequency and save consumers of advertising services trillions in cost by increasing utilization rates and regaining control over privacy. A method to create a community advertising user specification object to provide a gateway to open access transparent systems for data socket communication in computerized programs and content capacity will also ensure that new technologies do not trick consumers or mislead consumers to fall into technology data traps they are unaware of. Advertising delivery and information exchange is currently one of the most inefficient markets in the world and a community advertising user attribute specification sequence structure to provide a gateway for open forward market for advertising user specification capacity units will bring market discipline and low-cost commodity pricing to all classes and forms of advertising capacity and services.

If people on a given communication portal or series of portals or mobile portals with given waypoint destination or series of waypoints on a route have a method and system to make a community and a gateway to provide each other economic benefits in that community data structure waypoint sequence, substantial privacy and unequal market issues will be reduced.

Description of the Related Art

The following descriptions and examples are not admitted to be prior art by virtue of their inclusion within this section.

The current implementations of methods to buy and sell advertising space are between content hosts such as Apple or Google or Facebook or YouTube or Netflix or Disney or News outlets or television outlets or other media and network content providers and advertisers. There is not prior art or existing implementations of advertisers buying exposures directly from consumers through an exchange for given advertising consumer specifications. Further, most implementations of methods do not allow price discovery between various sellers and buyers of advertising because the systems are disparate and are not open access or transparent. Anyone skilled in the art of advertising knows that prior art has not made the required technical or legal transformations to given user advertising attribute specifications which would allow for asset based unitization or securitization required for multiple purchase and resale trading in security, forward or futures markets with the transformations of replacement cost calculations, liquidated damages and price-time priority queue transformations of the advertising attribute specifications. Secondary trading markets for advertising attribute specifications simply do not exist. The majority of advertising unit sellers are content and search and social media hosts which mine user data and then auction that data in hidden monopolistic markets which users do not control and users do not have the ability to understand what is being exchanged which is fundamentally different than viewing advertising attribute specification units as a securitized commodity and as a commodity market and forming advertising attribute specification unit virtual route waypoint sequence communities or general advertising attribute specification units which the disclosed system and method accomplish. Furthermore, prior art in these services and methods do not foster accountability in service. Typical prior art advertising systems do not have third party audit of specification delivery as seen in commodity markets and prior art systems do not enforce delivery penalties for non-performance as the method is not firm and it does not transform the advertising attribute specification unit into a standardized security assets with the properties of cost of cover, liquidated damages and force majeure among many additional attributes of the contract specification. Additional competing implementations of methods do not allow for forward selling or forward purchasing of advertising attribute specification units linked to user advertising attribute specifications beyond a single transaction which a commodity forward market for user advertising attribute specification unit securities allows through the disclosed systems and methods which are a bridged gateway from the data transformation of a social network portal, web portal, application portal or any data socket portal into advertising attribute specification units based virtual communities of the disclosed invention. Additionally, the disclosed creation of advertising attribute user specification virtual community objects to provide a gateway to a forward market of an advertising attribute specification unit security between virtual hubs along map routes has also never held the attributes of a forward contract security which allows for advertising attribute specification unit security to be substitutable for another advertising attribute specification unit security. In other words, if user A bought a advertising attribute specification unit security from user B, but then user A was not able to perform the obligation to purchase the advertising attribute specification unit security from user B, user A could resell the advertising attribute specification unit security contract to a third party user C on the forward advertising attribute specification unit price-time priority queue auction market to retrieve the financial payment made for their original purchase from user B and then user C would replace user A and be matched with user B while incorporating the data transformation of the overall method and system while considering additional subordinate concepts such as cost of cover, liquidated damages and force majeure. No prior art transforms a series of advertising attribute specification sequences into a advertising attribute specification unit community object that have features which allow users to subscribe, friend, follow or member, trade, retrade, securitize or to gain benefits of a gateway to an economic mechanism to trade advertising attribute specification as a transformed advertising attribute specification unit(s). No prior art discloses the disclosed advertising attribute specification unit communities which provide gateways to advertising attribute specification transportation unit securities to incorporate the concepts of cost of cover, liquidated damages, force majeure, contract specifications or firm service to ensure reliability and asset performance. No prior art further allows for users to have full control over advertising attribute specification in its entirety and control the economic rent charged for that advertising attribute specification in a real time transparent auction or price-time priority queue auction. No other system or method performs the aforementioned data transformation combination, nor do the prior art methods and systems capture the technical elements that make the data transformations or data vault ownership sequence possible.

Not only does the formation of advertising attribute specification unit route based or advertising attribute specification waypoint sequence based community objects increase accountability mechanisms along a give route or single community waypoint, it provides an efficient gateway and market data transformation structure for an open and transparent market for advertising attribute specification unit securities and allows for large increases in price discovery and by economic theory results in the lowest possible price for consumers. Cites, States and Governments have long grappled with privacy concerns and have provided no viable alternative that benefits and protects the very consumers they are charged with protecting.

Additionally, no prior art system or method proposes a technically capable solution of integrating the technical software and hardware requirements and data transformations for integrating the tasks of a community forming system for specific routes or advertising attribute specification unit virtual hub sequences of waypoints which are an object to which one may subscribe, friend, follow, trade, resell, securitize, rebuy or become a member alongside a network, GPS system, mobile computing devices, servers, forward commodity markets, grouping software for hubs, community route processors, my route processors, advertising processors, advertising grouping specification processors, sequence route processors, transparent open access pricing systems, blockchain audit, price-time priority queues, safety methods and systems, virtual hub systems, map routing systems, algorithms for no arbitrage conditions in a simple easy to use graphical user interface format for mobile or virtual computing over various mediums which are connected via a network.

1) U.S. Patent application No. 60/035,205 filed Jan. 10, 1997 by Lawrence Page discloses an improved text searching in hypertext systems. The prior art relates to database searching, but is void of markets, price-time priority queues or portals or operating system communication streams. The systems and methods would not be able to replicate each other and therefore the art is not overlapping.

SUMMARY

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

The aforementioned deficiencies and other problems associated with the general advertising markets, lack of connectivity between users and advertisers, social network communities that lack technical capabilities or are controlled by the company rather than the user, navigation systems, price-time priority queues, advertising markets, securitization of advertising attribute specification linked advertising attribute specification units, other novel systems and interfaces and how advertising attribute specification linked advertising attribute specification functions with large inefficiencies which use electronic devices to connect advertisers with users. In some embodiments, the methods and systems are on portable computing devices or augmented reality devices or virtual reality devices or ordinary stationary computing devices. In some embodiments, the disclosed method and system is a layer on mapping and map routing software on a plurality of computing devices. In some embodiments, the disclosed method and systems are advertising attribute specification community networks with geolocation logistic data transformations, associated geolocation transformations and price-time priority queues. In some embodiments, the methods and systems use subordinate legal contracts to transform the data. In some embodiments, the methods and systems are on stationary devices or internet of things devices. In yet other embodiments, the methods and system disclosed may use mixed reality, augmented reality or virtual reality or other audio interface or visualization interface methods to allow a user to transact and trade advertising attribute specification community linked advertising attribute specification capacity as a forward commodity security with associated price-time priority queues. In some embodiments the graphical user interface ("GUI") on any mobile or stationary computer device interfaces with one or more processors, memory and one or more modules, programs or sets of instructions stored in the memory for performing multiple functions. In some embodiments, the user interacts with the GUI primarily through finger contacts or voice commands or other sensory methods to interface with the GUI. In some embodiments, the functions may include the user directing the GUI to place a user profile in a advertising attribute specification community linked virtual hub so that they may participate, transact or trade a combination of advertising attribute specification community linked virtual hub advertising attribute specification routes as a forward commodity for advertising attribute specification community linked advertising attribute specification or advertising attribute specification capacity with associated price-time priority queues. In some embodiments, the functions may include the user instructing the GUI to participate, transact, or trade various modes of advertising attribute specification community linked advertising attribute specification capacity units such as home, business, automobile, air, autonomous vehicle, bike, boat, bus, drone, limo, motorcycle, moped, shuttle, spaceship, subway, taxi, train, travel, food, eating, fitness, commuting, sleeping, listening, reading, money, weather, streaming, movies, games, photos, mail, my life, home appliances or other advertising attribute specification locations or methods, cargo advertising, package advertising, virtual or various combinations of the aforementioned modes. In some embodiments, the functions may include the user instructing the GUI to form a new or existing advertising attribute specification community linked virtual hub or virtual hub combination which then has a specification function which forms a basis for the GUI to present the plurality of buyers and sellers of advertising attribute specification community linked advertising attribute specification and advertising attribute specification capacity securities between two or more virtual hubs or at a single hub location.

In an aspect of the invention, a computer-implemented method for use in conjunction with a computing device with various display formats comprises: a user at a mobile or fixed computing device with a touchscreen or a computing device without a touchscreen or augmented reality non-screen display or audio non-screen interface detecting a user network login, detecting a secure login based on facial recognition, fingerprint recognition or photo scan or biometric interface recognition of the user, performing multiple local and external security and crime checks on the user, detecting and receiving from the user an origin location through the GUI user input or GPS coordinate input from the computing device and detecting from the user input a destination coordinate and transmission of said coordinates, generating and applying specific data legal contract transformations to incorporate general specifications as well as the concepts of cost of cover, liquidated damages, and force majeure, generating and applying one or more optimization techniques to form a virtual hub with other users that have similar advertising attribute specification community linked advertising attribute specification requests within a geographic boundary, determining if two or more advertising attribute specification community linked virtual hubs are required for the path of the auction between a said starting point and ending point, generating instructions to index and rank pricing for a plurality of routes or stationary hubs in context of advertising attribute specification community linked virtual hubs or navigation routing, generating instructions to index navigation routes based on pricing for advertising attribute specification community linked advertising attribute specification units along the routes, generating instructions for a plurality of computing devices, networks, community grouping processor and database instructions, virtual hub database servers, network member database servers, advertising attribute specification platform market database servers to form a combination of virtual hubs and contract specifications for delivery of advertising attribute specification services or advertising attribute specification capacity between the virtual hubs in a format presented by a GUI which allows the user to submit prices to sell (offer)

or bid (buy) in a price-time priority queue advertising attribute specification community linked advertising attribute specification or advertising attribute specification capacity between advertising attribute specification community linked virtual hub combinations, generating instructions to interface a plurality networks, navigation routing based on price of advertising attribute specification community linked advertising attribute specification unit securities, global positioning systems networks, servers, securitization, forward commodity markets, grouping software for virtual hubs, map routing systems and methods, transparent open access pricing systems which form a price auction with price-time priority queues of a given quality advertising attribute specification, blockchain audit and safety systems, advertising attribute specification community linked virtual hub topology servers and systems, no arbitrage constraint condition systems which form one system to implement a forward commodity advertising attribute specification community linked advertising attribute specification and advertising attribute specification capacity unit market with price-time priority queues system and method. The programs and instructions are stored in memory and configured to be executed by one or more processes by a plurality of users. The programs may include a plurality of configurations and specification instructions for various modes of advertising attribute specification community linked advertising attribute specification capacity. The programs also may include as specification options to select user attributes such as by example but not limiting by example, user hair color, user weight, user sex, user height, user address, user city, user state, user zip code, user location, user dietary preferences, user historical orders of merchandise food or other goods and services, user purchasing frequency, user login frequency, user music tastes, user color tastes, user family size, user family type, user friends, user travel patterns, user reading lists, user movie preferences, user text preferences, user mail preferences, user mail content, user text content, user application preferences, user browsing history, user date of birth, user country of birth, user parents, user siblings, user fitness patterns, user fitness preferences, user travel location, user career, user job history, user worker colleagues, user advertising patterns, user shipping patterns, user mood, user education, user love life, user dating life, user divorce, user children, user extended family, user alumni network, user school or work network, user religious network or religious affiliation, user credit score, user payment patterns, user investments, user music preferences and comparison, user comparison rankings of all preferences, user philosophies, user news consumption, user dietary consumption, user sexual orientation, user love languages, user housing preferences, user environment preferences, user city preferences, user birthday preferences, user holiday preferences, user story preferences, user television history, user movie history, user sleep preferences, user driving preferences, user distance from work, user distance from home, user distance from places of importance to user, user mode of transportation, user beverage preferences, user health data, user doctor exam, user blood and biomarker exam laboratory work, user psychology, user vacation preferences, user hero preferences, user dreams, user visions, user languages spoken, user mother tongue, user conversations, user patents, user perceptions, user income, user economic class, user race, user ethnicity, user awards, user accomplishments, user attitude, a plurality of timings, quality levels of capacity and service, cost of cover, liquidated damages, force majeure, term of timings such as by the second, minute, hour, day, weekday, weekend, month, annual or day of the week, various order types such as day, good till cancelled, immediate or cancel, good till date, day till cancelled, limit, market, market if touched, snap market, snap mid, snap to primary, peg to benchmark, adaptive custom orders. The programs may also include a plurality of instruction modes such as home, business, apartment, automobile, air, autonomous vehicle, bike, boat, bus, drone, limo, motorcycle, moped, shuttle, spaceship, subway, taxi, train, packages, multimodal and cargo for advertising attribute specification community linked advertising attribute specification. The programs also may include: instructions for virtual hub pick up and drop off points as well as instructions to set various constraints such as cheapest route, single mode, multi-mode, fastest route, most scenic route, highest rating, routing alternatives based on the prices of the advertising attribute specification community linked advertising attribute specification unit securities between two hubs, most available or liquid, highest volume, most frequent, service level, security, user hair color, user weight, user sex, user height, user address, user city, user state, user zip code, user location, user dietary preferences, user historical orders of merchandise food or other goods and services, user purchasing frequency, user login frequency, user music tastes, user color tastes, user family size, user family type, user friends, user travel patterns, user reading lists, user movie preferences, user text preferences, user mail preferences, user mail content, user text content, user application preferences, user browsing history, user date of birth, user country of birth, user parents, user siblings, user fitness patterns, user fitness preferences, user travel location, user career, user job history, user worker colleagues, user advertising patterns, user shipping patterns, user mood, user education, user love life, user dating life, user divorce, user children, user extended family, user alumni network, user school or work network, user religious network or religious affiliation, user credit score, user payment patterns, user investments, user music preferences and comparison, user comparison rankings of all preferences, user philosophies, user news consumption, user dietary consumption, user sexual orientation, user love languages, user housing preferences, user environment preferences, user city preferences, user birthday preferences, user holiday preferences, user story preferences, user television history, user movie history, user sleep preferences, user driving preferences, user distance from work, user distance from home, user distance from places of importance to user, user mode of transportation, user beverage preferences, user health data, user doctor exam, user blood and biomarker exam laboratory work, user psychology, user vacation preferences, user hero preferences, user dreams, user visions, user languages spoken, user mother tongue, user conversations, user patents, user perceptions, user income, user economic class, user race, user ethnicity, user awards, user accomplishments, user attitude and safety and group restricted modes. The programs may include a plurality of interfaces with map routing software such as Google Maps, Apple Maps, TomTom Maps, Open Street Maps, Bing Maps, Nokia Maps, MapBox or a plurality of other map routing technologies to place the advertising attribute specification community linked forward advertising attribute specification unit security pricing on the map navigation routes as an integration layer. The programs and instructions from the GUI provide master instructions for the plurality of computing devices and servers which interface to allow the user to participate, transact and trade a plurality of advertising attribute specification community linked advertising attribute specification modes between a plurality of virtual hubs over a plurality of portal computing devices.

In another aspect of the invention, a computing system comprises: a plurality of networks, global positioning systems networks, servers, forward commodity market servers and instructions, securitization legal data transformations, grouping program instructions for virtual hubs and associated servers, transparent open access pricing servers and instructions, community grouping processor and database instructions, GPS map routing servers, indexing databases and programs to rank alternative navigation routes based on advertising attribute specification community linked advertising attribute specification unit security pricing, blockchain audit and safety servers and instructions, price-time priority queues, user identification history and instructions against crime databases and identity databases to confirm security of the system and users, virtual hub servers and instructions, no arbitrage constraint condition servers and instructions which form one system to implement a forward commodity advertising attribute specification community linked advertising attribute specification and advertising attribute specification capacity unit security market system and method.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3 illustrates an exemplary price-time priority queue for advertising attribute specification community linked route objects or waypoint combinations and community route object sequences for transformed advertising attribute specification community linked advertising attribute specification units.

FIG. 24 illustrates an exemplary user interface to display a multi-hub, virtual-hub sequence given a start and end point for a transaction auction for advertising attribute specification community linked forward advertising attribute specification capacity units with associated price-time priority queues in accordance with some embodiments.

FIG. 40 illustrates an exemplary user interface and database configuration which allow the user to select model, make, type, year, fuel type in configuration for advertising attribute specification community linked price based navigation with associated advertising attribute specification price-time priority queues.

FIG. 49 illustrates an exemplary advertising attribute specification unit uplink inventory interface with advertising attribute specification community linked virtual hub advertising attribute specification sequence unit market system and method with associated price-time priority queues.

FIG. 69 illustrates an exemplary advertising capacity unit legal transformations and general terms and conditions linked to advertising attribute specification price-time priority market pricing and trading exchange queues.

FIG. 70 illustrates an exemplary advertising capacity unit legal transformations linked to advertising attribute specification price-time priority market pricing and trading exchange queues.

FIG. 71 illustrates an exemplary advertising capacity unit legal transformations linked to advertising attribute specification price-time priority market pricing and trading exchange queues.

FIG. 72 illustrates an exemplary advertising capacity unit legal transformations linked to advertising attribute specification price-time priority market pricing and trading exchange queues.

FIG. 73 illustrates an exemplary advertising capacity unit legal transformations linked to advertising attribute specification price-time priority market pricing and trading exchange queues.

FIG. 74 illustrates an exemplary advertising capacity unit legal transformations linked to advertising attribute specification price-time priority market pricing and trading exchange queues.

FIG. 75 illustrates an exemplary advertising capacity unit legal transformations linked to advertising attribute specification price-time priority market pricing and trading exchange queues.

FIG. 76 illustrates an exemplary advertising capacity unit legal transformations linked to advertising attribute specification price-time priority market pricing and trading exchange queues.

FIG. 77 illustrates an exemplary advertising capacity unit legal transformations linked to advertising attribute specification price-time priority market pricing and trading exchange queues.

FIG. 78 illustrates an exemplary advertising capacity unit legal transformations linked to advertising attribute specification price-time priority market pricing and trading exchange queues.

FIG. 79 illustrates an exemplary advertising capacity unit legal transformations linked to advertising attribute specification price-time priority market pricing and trading exchange queues.

FIG. 80 illustrates an exemplary advertising capacity unit legal transformations linked to advertising attribute specification price-time priority market pricing and trading exchange queues.

FIG. 81 illustrates an exemplary advertising capacity unit legal transformations linked to advertising attribute specification price-time priority market pricing and trading exchange queues.

FIG. 82 illustrates an exemplary advertising capacity unit legal transformations linked to advertising attribute specification price-time priority market pricing and trading exchange queues.

FIG. 83 illustrates an exemplary advertising capacity unit legal transformations linked to advertising attribute specification price-time priority market pricing and trading exchange queues.

FIG. 84 illustrates an exemplary advertising capacity unit legal transformations linked to advertising attribute specification price-time priority market pricing and trading exchange queues.

FIG. 85 illustrates an exemplary advertising capacity unit legal transformations linked to advertising attribute specification price-time priority market pricing and trading exchange queues.

FIG. 86 illustrates an exemplary advertising capacity unit legal transformations linked to advertising attribute specification price-time priority market pricing and trading exchange queues.

FIG. 87 illustrates an exemplary advertising capacity unit legal transformations linked to advertising attribute specification price-time priority market pricing and trading exchange queues.

FIG. 88 illustrates an exemplary advertising capacity unit legal transformations linked to advertising attribute specification price-time priority market pricing and trading exchange queues.

DETAILED DESCRIPTION

Figure 1:
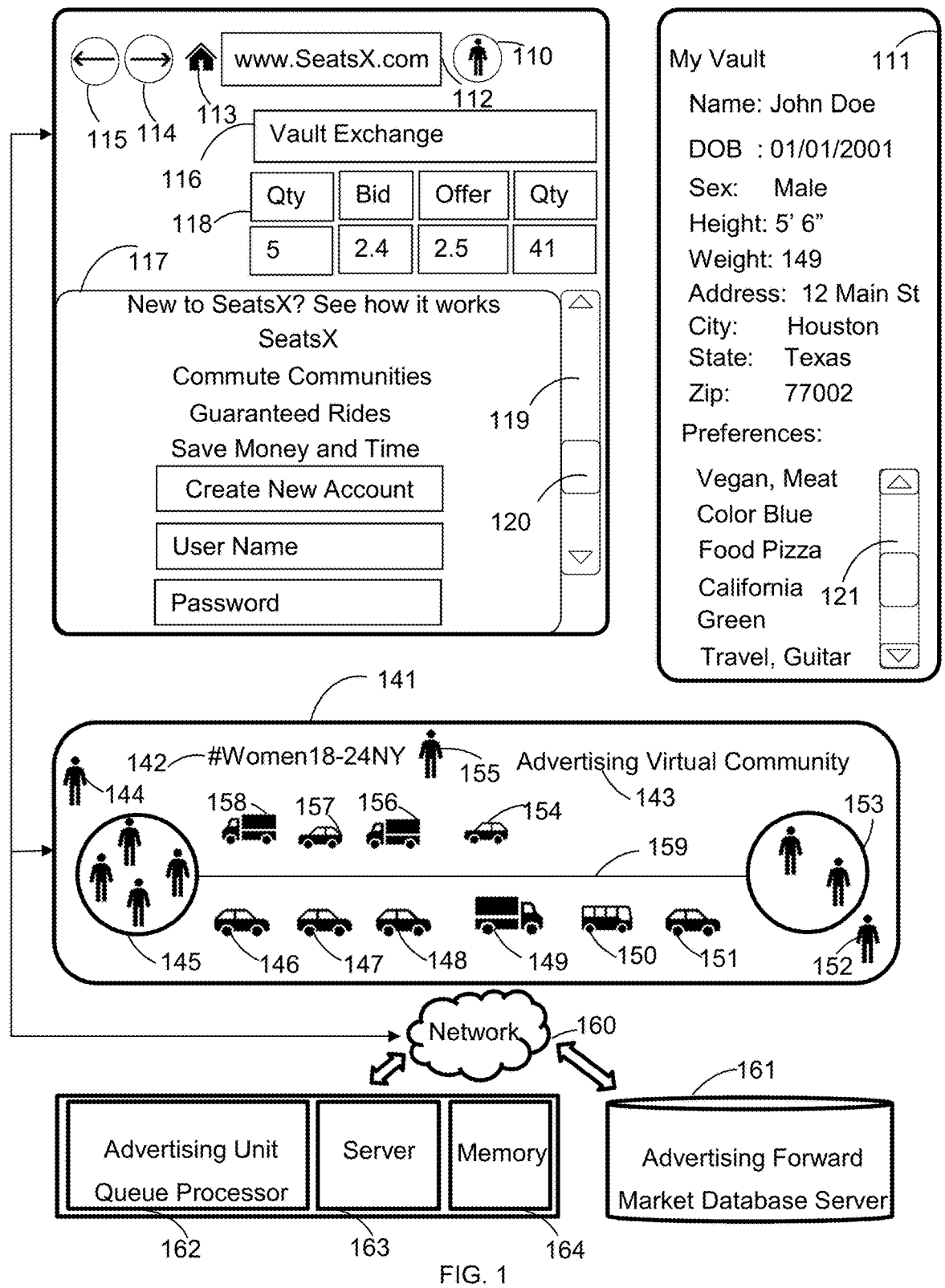
FIG. 1 illustrates a schematic diagram of an internet socket communication portal to visit a plurality of web site addresses and locations, a data vault of user advertising attribute specifications of a plurality of advertising attribute specification community linked virtual hub sequence data transformations into advertising attribute specification combinations as community objects to which users may subscribe and associate price-time priority queues for advertising impressions.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact advertising capacity units with associated price-time priority queues as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a mobile computing device may be substituted for a fixed stationary computing device or a virtual reality headset or a mixed reality headset or an augmented reality headset or an audio interfaced computer device. Embodiments may also occur on a projection computing device or in any other method or system which communicates and integrates the use of a network, community route processor, my route processor, sequence route processor, global positioning system network, mobile computing devices, servers, advertising forward commodity forward market price-time priority auction database, price-time priority queues, grouping software instructions for hubs, securitization transformations and specifications, game servers, advertising community linked objects, indexing algorithms for advertising community linked advertising attribute specification capacity unit securities on various navigation routes, navigation servers, fixed hub locations, virtual hub topology methods and systems, transparent open access user interface pricing systems, blockchain audit and safety methods, facial recognition, fingerprint recognition or photo recognition of users for security and identity check, algorithms for no arbitrage conditions and constraints with a user interface or graphical user interface formatted on mobile or stationary computing devices over various mediums which are connected through a network for the purpose of grouping users into virtual hub sequences of community objects as a gateway to participating, transacting or trading advertising attribute specification capacity units between combinations of virtual hubs as a forward or futures commodity or swap or option in an auction with price-time priority queues.

The following paragraphs provide various techniques of various embodiments described herein such as illustrated as in FIG. 1. In one implementation as illustrated in FIG. 1, a user 110 may be assigned or may join an advertising attribute specification capacity unit community 111 linked virtual route community which is a sequence of virtual hub(s) or a single stationary location or hub. In one implementation as illustrated in the user advertising attribute specification capacity vault 111 attributes may be characteristics or attributes of the user such as name, date of birth, sex, height, weight, address, city, state, zip code, preferences, food preferences, color preferences, location preferences, environmental preferences, travel preferences, music preferences and a plurality of other preferences that a user may use the scroll bar 121 to add which may be logged in the user data vault 111 for the advertising attribute specification for the advertising capacity unit to which the advertising attribute specification may be assigned. In some embodiments, the advertising attribute specification capacity unit community linked virtual hub sequence may be assigned a metadata tag such as #Women18-24NY 142 which is short for a longer full name sequence such as a user with a advertising attribute specification of a woman, between the ages of 18-24 in New York City, NY In some embodiments, the origin advertising community linked virtual hub 145, may be a specific address and geolocation data in the city of Ithaca, NY 145. In some embodiments, the route 159 between the Ithaca, NY advertising community linked virtual hub 145 and the New York City, NY advertising community linked virtual hub 153 may be a sequence of two advertising community linked virtual hubs. In some embodiments, there may be many one or more trucks 158 along the route 159 or cars 157 or additional trucks 156 or additional cars 154 which are headed in a certain direction along the route 159. In some embodiments, additional vehicles 146, 147, 148, 149, 150, 151 may be headed the other direction along the virtual hub sequence 159 between two advertising community linked virtual hub points 145, 153. In some embodiments, additional user(s) 152 may join the virtual hub route sequence community 141. In some embodiments, the advertising community attribute specification 141 may be a single location, where the hubs 145, 152 are the same location. In some embodiments, a data socket exchange graphical user interface 117 may connect to the internet through a DNS server with a URL 112. In some embodiments, the data socket exchange graphical user interface 117 may have a back button 115 to retrieve previous web URL's or a forward button 114 to retrieve forward based web URLs from the user visiting data socket sequence exchange. In some embodiments, the data socket exchange graphical user interface contains an advertising exchange 116 with associated price time priority queues 118 for advertising attribute specifications 111 associated with the users data vault of personal characteristics and histories 111.

In some embodiments the price time priority queue 118 is described in great detail in FIG. 3 or diagram 300, however with brevity, the price time priority queue for the advertising attribute specification unit associated with the user attributes 111 contains a Bid Quantity of 5 or five impressions that an advertising wants to pay at a price of $2.40 per impression. In some embodiments the price time priority queue for the advertising attribute specification unit 118 may contain the user's offer to sell his impression at $2.50 per impression and there exists 41 impressions for sale for the advertising attribute specification for the advertising community specification.

In some embodiments, advertising community linked virtual hub sequences such as Ithaca, NY advertising community linked virtual hub 145 to New York City, NY advertising community linked virtual hub 153 are transformed into community objects which may then be assigned a plurality of attributes in the same sense as a class in the Java programming language has methods as a part of the class object in object oriented programming. In some embodiments, the data transformation of a advertising community linked virtual hub sequence into a community object allows the similar benefits of the data transformations involved in computing languages with methods which help the instructions of the computer program communicate in an organized manner using modular logic. In some embodiments, advertising community linked virtual hub sequences such as 145 to 153 #Women18-24NY 141, 142 may be combined with other advertising community linked virtual hub sequences to extend the series sequence. In some embodiments, advertising community linked virtual hub sequences such as 145 to 153 #Women18-24NY 142 which is short for a longer full name sequence such as an advertising community linked sequence such as #Adults18-24NY as a advertising product originating in Ithaca, NY with a waypoint advertising destination of New York, New York. In some embodiments, advertising community linked virtual hub sequences with price-time priority queues may be two virtual hubs that are next door to your home and only 500 feet between waypoints or the same location or they may be many miles apart. As we have discussed at length in the previous sections of the disclosed invention, while there may be hundreds or thousands or millions of people along various advertising community linked advertising attribute specification unit virtual hub sequences, there currently exists no method or system of organizing an advertising community linked route or advertising community linked virtual hub sequence into a transformed data community object. The attributes of communities allow for superior communication, accountability and even transactions to occur within a community object 141. In some embodiments, the data transformation of a advertising community linked virtual hub sequence community object 141 allows a plurality of network members 144, 152 to be assigned advertising attribute specification unit community linked virtual route communities 141 based on a plurality of attributes, prior GPS location histories, prior search histories, user granted attributes, navigation on search queries or other attributes. In some embodiments, advertising community linked virtual hub sequences which have been transformed into community objects 141 provide greater communication and organizational ability for a market to transact advertising community linked advertising attribute specification unit(s) and provide a gateway for those advertising attribute specification unit transactions as described in U.S. patent application Publication Ser. No. 15/266,326, "Implementations of a computerized business transaction exchange for various users," filed Sep. 15, 2016, the entirety of which is incorporated by reference herein.

In some embodiments, advertising community linked virtual hub sequences which have been transformed into community objects 141 communicate through a network 160 to associate a price-time priority queue for a transformed advertising community linked advertising attribute specification unit community object using a advertising community linked advertising attribute specification unit queue processor 162, a server 163, memory 164 and a advertising community linked advertising attribute specification unit forward market database server 161. In some embodiments, the virtual hub sequences or community objects 141 may be independent or sequenced to construct a waypoint sequence of multiple linked advertising community linked virtual hub route community objects 141. In some embodiments, the associated price-time priority queue 300 for advertising community linked advertising attribute specification units may have generated processing and user interface display instructions from the advertising community linked advertising attribute specification unit queue processor 162, the server 163, the memory 164 and a advertising community linked advertising attribute specification unit forward market database server 161 through a network 160. In some embodiments, the price-time priority queue 300 for transformed advertising community linked advertising attribute specification units may process and display a plurality of time and date sequences for a plurality of forward delivery periods for advertising community linked transformed advertising attribute specification unit(s).

Figure 2:
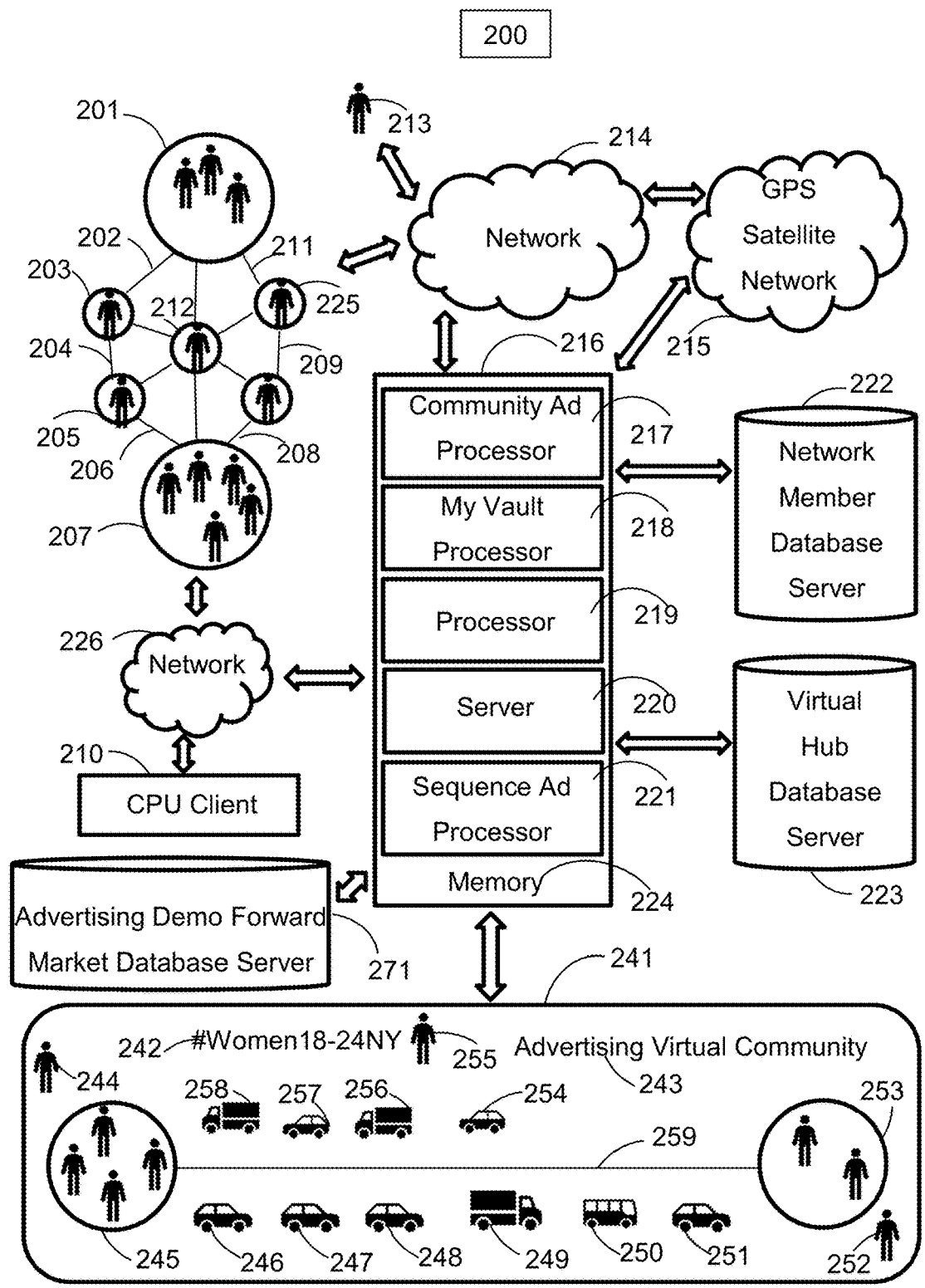
FIG. 2 illustrates a schematic diagram of an exemplary network configuration and of an advertising attribute specification community linked virtual hub sequence data transformation into a waypoint combination as community advertising attribute specification object to which users may subscribe and associate price-time priority queues.

FIG. 2 illustrates in some embodiments, an exemplary network configuration 200. In some embodiments a network of advertising community linked virtual advertising attribute specification unit hubs 201, 203, 205, 207, 212, 225 may represent an advertising community linked virtual advertising attribute specification unit network of a neighborhood, village, city, county, state, country, continent or even inter-virtual hub networks across geographies. Prior art as well as current inventions carry no methods or data transformations to transform advertising community linked navigation routes 202 which are a virtual hub sequence 202 between a series of virtual advertising transportation hubs 201 and 203 or 203 and 212 or even multi-leg advertising community linked combinations such as 201 to 203 and 203 to 212 as a sequence. In some embodiments, user(s) 213 or the network 214 have input hundreds or thousands or millions or more advertising community linked virtual hubs 201 to form a network topology for advertising community linked advertising attribute specification unit virtual hub sequences 241. In some embodiments, the advertising community is linked advertising attribute specification unit data transformation to a series of virtual advertising attribute specification unit hubs 245, 253 allows for network structure 201, 203, 212, 205, 207, 225, 212 and organization such as a hub and spoke model which is heavily utilized within the airline advertising attribute specification unit industry or a plurality of other competing network topologies which are not dependent on pathways. In some embodiments, advertising community linked virtual advertising attribute specification unit hub topologies 241 over road structures 259 allows for the benefits of public advertising attribute specification unit networks to be combined with private advertising attribute specification unit networks. In some embodiments, the advertising community linked virtual advertising attribute specification unit hub network 201, 203, 212, 205, 207, 225, 212 has been input into the network 214. In some embodiments, the topology of the virtual hub network 201, 203, 212, 205, 207, 225, 212 then moves for further data transformation in the community route processor 217 which transforms subsections of the advertising community linked advertising attribute specification unit network topology 201, 203, 212, 205, 207, 225, 212 into a advertising community linked virtual hub sequence 241 which represents two addresses 245, 253 along a advertising community linked virtual hub sequence 242 such as Palo Alto, California 245 to San Francisco, California 253 corresponding each advertising community linked virtual hub address 245, 252 with a physical address. Advertising community linked virtual route communities 243 may be one to one, one to two or one to many and any superset or subset combination thereof. The My Route Processor 218 further processes advertising community linked virtual hub combination and advertising community linked virtual advertising attribute specification unit hub sequences into a specific network members account on the network member database server 222. In some embodiments, the advertising community linked sequence route processor 221 may connect a plurality of virtual hub sequences 201, 203 205, 207 in a logical order to complete a path combination 201 to 207 for advertising community linked navigation or community object construction. In some embodiments, community objects may be made from simple direct path routes 202 between two virtual hubs 201 and 203 or multi-virtual hub constructions between two advertising community linked virtual hub sequences 201 to 207 by waypoints of 201 to 203 to 212 to 207 or any combination or superset or subset thereof. In some embodiments, the advertising community linked virtual route community objects 243 allow attributes to be assigned to the community objects. In some embodiments, users may be assigned to a plurality or advertising community virtual hub sequence objects 241. In some embodiments, network members 213 may be assigned to a advertising community linked virtual route community 241 because the user(s) route history on the GPS satellite network 215 suggests the route has overlap with advertising community linked virtual hub route sequences the user has used or queried on various search methods on the system for the advertising product. In some embodiments, the search interface 5000 interprets a keyword, such as car, which then queries the advertising community linked virtual route object, which then indexes search results based on the following priority of advertising attribute specification 242, then geolocation 242, 245, 253, then advertising community linked virtual route object price-time priority queue 271. In some embodiments the user 213 may use a CPU client 210 that is a visual, audio or other type of computing interface with the network 226 of advertising community linked navigation route communities 243. In some embodiments, the advertising community linked advertising attribute specification unit forward market database server 271 may interface with a processor 219 or sequence route processor 221 or my route processor 218 or advertising community linked community route object processor 217 to process a plurality of price-time priority queues 300 for transformed advertising attribute specification unit(s). In some embodiments, a plurality of vehicles 258, 257, 256, 254, 246, 247, 248, 249, 250, 251 may be in route between a said first virtual hub 245 and a second said virtual hub 253. In some embodiments, vehicles 257, 247 may be moving in opposite directions along a route 259. In some embodiments, a truck 258 may contain a advertising attribute specification unit(s) or a car 251 may contain a transformed advertising attribute specification unit(s) or a bus 250 may contain a transformed advertising attribute specification unit(s) or a plurality of other vehicle types or user attribute type specifications may contain a transformed advertising community linked advertising attribute specification unit(s) under a specification which is substitutable. In some embodiments, the advertising community linked virtual hub or community object sequence of waypoints may be reversed from waypoint 245 to waypoint 253 to waypoint 253 to waypoint 245. In some embodiments, the advertising community linked route object 241 or advertising linked community route object sequence 101, 121, 141 may have an infinite series of associated price-time queues 300 whereby any subset or superset comprise a forward market for transformed advertising community linked advertising attribute specification unit(s), transformed advertising community linked route object(s) and the associated transformed advertising community linked advertising attribute specification unit(s). In some embodiments advertising community linked virtual route communities 241,141 are transformed data structures that form objects which community users 213 may subscribe, friend, join, follow to more efficiently have news and understanding for the advertising community linked advertising attribute specification unit transactions.

FIG. 3 illustrates exemplary user price-time priority queue 300 for transacting or matching transformed advertising community linked advertising attribute specification unit data, participating, transacting and/or trading advertising community linked advertising attribute specification unit(s), representing the transformed advertising community linked advertising attribute specification unit value as a homogeneous asset specification or as a physical forward commodity security between combinations of virtual hubs over various advertising attribute specification unit modes. In some embodiments, user transformed advertising community linked advertising attribute specification unit(s) or transformed advertising community linked advertising attribute specification unit(s) associated with advertising community linked route community objects interface 300 includes the following instructions, transformations and elements, or a subset or superset thereof:

exemplary transformed advertising community linked advertising attribute specification unit price-time priority sell queue 320;

exemplary transformed advertising community linked advertising attribute specification unit price-time priority buy queue 321;

exemplary transformed advertising community linked advertising attribute specification unit price priority bucket 305 in the advertising attribute specification unit buy queue of $5.10;

exemplary transformed advertising community linked advertising attribute specification unit price priority bucket 306 in the advertising attribute specification unit buy queue of $5.30;

exemplary transformed advertising community linked advertising attribute specification unit price priority bucket 310 in the advertising attribute specification unit buy queue of $5.60;

exemplary transformed advertising community linked advertising attribute specification unit price priority bucket 314 in the advertising attribute specification unit sell queue of $5.70;

exemplary transformed advertising community linked advertising attribute specification unit price priority bucket 315 in the advertising attribute specification unit sell queue of $5.80;

exemplary transformed advertising community linked advertising attribute specification unit price priority bucket 316 in the advertising attribute specification unit sell queue of $6.60;

exemplary transformed advertising community linked advertising attribute specification unit price-time priority buy price 304 in the first time position of the price priority bucket 305 of $5.10;

exemplary transformed advertising community linked advertising attribute specification unit price-time priority buy price 303 in the second time position of the price priority bucket 305 of $5.10;

exemplary transformed advertising community linked advertising attribute specification unit price-time priority buy price 302 in the third time position of the price priority bucket 305 of $5.10;

exemplary transformed advertising community linked advertising attribute specification unit price-time priority buy price 307 in the first time position of the price priority bucket 306 of $5.30;

exemplary transformed advertising community linked advertising attribute specification unit price-time priority buy price 309 in the first time position of the price priority bucket 310 of $5.60;

exemplary transformed advertising community linked advertising attribute specification unit price-time priority buy price 308 in the second time position of the price priority bucket 310 of $5.60;

exemplary transformed advertising community linked advertising attribute specification unit price-time priority sell price 311 in the first time position of the price priority bucket 314 of $5.70;

exemplary transformed advertising community linked advertising attribute specification unit price-time priority sell price 312 in the second time position of the price priority bucket 314 of $5.70;

exemplary transformed advertising community linked advertising attribute specification unit price-time priority sell price 313 in the third time position of the price priority bucket 314 of $5.70;

exemplary transformed advertising community linked advertising attribute specification unit price-time priority sell price 318 in the first time position of the price priority bucket 315 of $5.80;

exemplary transformed advertising community linked advertising attribute specification unit price-time priority sell price 319 in the second time position of the price priority bucket 315 of $5.80;

exemplary transformed advertising community linked advertising attribute specification unit price-time priority sell price 317 in the first time position of the price priority bucket 316 of $6.60;

exemplary transformed advertising community linked advertising attribute specification unit price time priority limit order book ("LOB") 325 is represented by the vector q(t) 301, such that the i-th coordinate for i>0, $q_i(t)$, is the number of sell limit orders of transformed advertising attribute specification units that are waiting in the LOB at time t a price iδ (δ is the price unit tick size of the transformed advertising community linked advertising attribute specification unit), the number of buy limit orders for transformed advertising community linked advertising attribute specification units at iδ are represented with a negative sign $q_i(t)$;

exemplary benchmark price 326 of all sell limit orders at time t are computed as $s(t)=s(q(t))=\min(\min\{0<i\delta:q_i(t)>0\})$, if $q_i(t)$ is less than or equal to 0 for all i>0, then $s(q(t))=\infty$;

exemplary benchmark price 327 of all buy limit orders at time t are computed as $b(t)=b(q(t))=\max(\max\{i\delta>0:q_i(t)<0\})$, if $q_i(t)$ is greater than or equal to 0 for all $i>0$, then $b(q(t))$=negative infinity;

exemplary order match 328 in the transformed advertising community linked advertising attribute specification unit limit order book where $s(t)=b(t)$, which then moves the method and system to the matched transformed advertising community linked advertising attribute specification unit limit order confirmation and delivery process;

exemplary limit order book status of no order match 329, where $s(t)>b(t)$;

exemplary limit order book i-th $q_i(t)$ element 330 of LOB is cancelled, remove from queue;

exemplary i-th $q_i(t)$ element is a new transformed advertising community linked advertising attribute specification unit order 331 in LOB, insert into respective limit order buy queue 321 or limit order sell queue 320 with priority of price, then time into the price time priority queues 300.

In some embodiments, the price—time priority queue 300 for transformed advertising community linked advertising attribute specification units may be assigned to an advertising community linked advertising community object 241 which is a waypoint sequence of transformed advertising community linked advertising attribute specification units. In some embodiments, the price—time priority queue 300 may be assigned to two waypoints as an advertising community linked advertising community object 241 or the price—time prior queue 300 may be assigned to an advertising community linked advertising community waypoint object sequence of many waypoints 203 to 205 to 207 to 212 which have been added together to form one continuous advertising community linked advertising community object 241 and respective price—time priority queue for transformed advertising community linked advertising attribute specification units through processing instructions from the advertising community linked Community Route Processor 217 and advertising community linked Sequence Route Processor 221 via the network(s) 226 and 214 and 215. In some embodiments, the limit order book 301 vector may be assigned to a specific date and time for the advertising community linked advertising community waypoint object which is a forward market price for transformed advertising community linked advertising attribute specification unit(s) 271 and advertising community linked advertising community waypoint object(s) 241. In some embodiments, a specific transformed advertising community linked advertising attribute specification unit price—time priority queue limit buy order 304 with a specific price stamp bucket 305 of $5.10, may be cancelled, if the 304 order is cancelled, the 303 price—time priority limit order book buy queue price then moves to the higher price—time priority queue position of 304 and price—time priority price of 302 moves to position 303. In some embodiments, the price—time priority limit order sell price 319 of price—time priority bucket price 315 of $5.80 may be cancelled, if 319 price—time priority of the transformed advertising community linked advertising attribute specification unit is cancelled, then order 317 moves to a higher position in the overall transformed advertising community linked advertising attribute specification queue 320 even though the limit order book price 317 remains in the price bucket of 316 which is $6.60. In some embodiments, price—time priority insertion may occur where a new order is inserted into either the transformed advertising community linked advertising attribute specification unit buy queue 320 or transformed advertising community linked advertising attribute specification unit sell queue 321. In some embodiments, by example but not limiting by example, a new price—time limit order for a transformed advertising community linked advertising attribute specification unit may be inserted as a sell order at a price of $5.70 at position 313 which would then assume order 312 was also at a price of $5.70 and that order 312 was placed with a time that was before order 313 was placed. In the aforementioned example of the price—time order insertion of 313, price—time orders of 319, 318 and 317 have moved lower in their relative position even though they remain in distinctly different price buckets of 315 and 316 respectively as the price—time priority queue 300, price is first priority, then time stamp in the price—time priority queue 300 for transformed advertising community linked advertising attribute specification units.

In some embodiments, the lowest selling price $s(t)$ 326 may equal the highest buying price $b(t)$ 327, in which case the highest transformed advertising community linked advertising attribute specification unit buy queue price bucket 310 is equal to the lowest transformed advertising community linked advertising attribute specification unit sell queue 320 selling bucket price 314 and therefore a transaction match occurs. In the example 300 of the limit order book 301, but not limiting by example, the highest transformed advertising community linked advertising attribute specification unit buy price 310 of $5.60 is lower than the lowest advertising community linked advertising attribute specification unit sell queue 320 lowest selling bucket 314 of $5.70 so no match occurs because $s(t)>b(t)$ 329. In some embodiments, many order insertions 331 or order cancellations 330 may occur for transformed advertising community linked advertising attribute specification units from the advertising community linked advertising attribute specification forward market database server 271 associated with advertising community linked community objects which are series of waypoints or a single waypoint 241.

In some embodiments, the LOB 300 for transformed advertising community linked advertising attribute specification units may contain many different types of instruction structures and specifications such as limit orders 720, market orders 720, market if touched orders 720, snap market orders 720, snap mid orders 720, snap to primary orders 720, peg to benchmark orders 720, or adaptive custom orders 720 which are custom customer designed instructions which are all standard order types for anyone skilled in the art of markets. In some embodiments, the LOB 300 for transformed advertising attribute specification units may also contain instructions for order times such as good for the day 710, good till cancelled 710, immediate or cancel 710, good till date 710, day till cancelled 710 or a plurality of additional custom instructions for the timing of the order of the transformed advertising attribute specification unit in the LOB 300 that is associate with an advertising community linked advertising community object 241. In some embodiments, a plurality of additional instructions and specifications may also be unique to each transformed advertising community linked advertising attribute specification unit LOB 300 such as automobile mode 811, air mode 812, autonomous vehicle mode 813, bike mode 814, boat mode 815, bus mode 816, drone mode 817, limo mode 818, motorcycle mode 819, moped mode 820, shuttle mode 821, spaceship mode 822, subway mode 823, taxi mode 824, train mode 825, fastest optimized mode 826 which may combine many modes 810 or a single mode 810 for a waypoint advertising community object 241 or waypoint advertising community linked sequence 201 to 203 to 205 to 212 to 207 of many advertising community linked advertising communities 241.

In some embodiments, the LOB 300 may be assigned to transformed advertising community linked advertising attribute specification unit packages 828 that have associated advertising community linked advertising community objects 241. In some embodiments, the LOB 300 for transformed advertising attribute specification units may be assigned to cargo 829 such as a trailer of a rig or container of a boat or container on a truck or any type of cargo that takes up the space of a transformed advertising community linked advertising attribute specification unit. In some embodiments, the LOB 300 may even be assigned to the virtual transformed advertising community linked advertising attribute specification unit or a virtual location 830 which would be space along a packet moving medium such as a telecom pipeline, satellite telecom or wireless telecom that moves packets of data which are transformed advertising attribute specification units.

Figure 4:
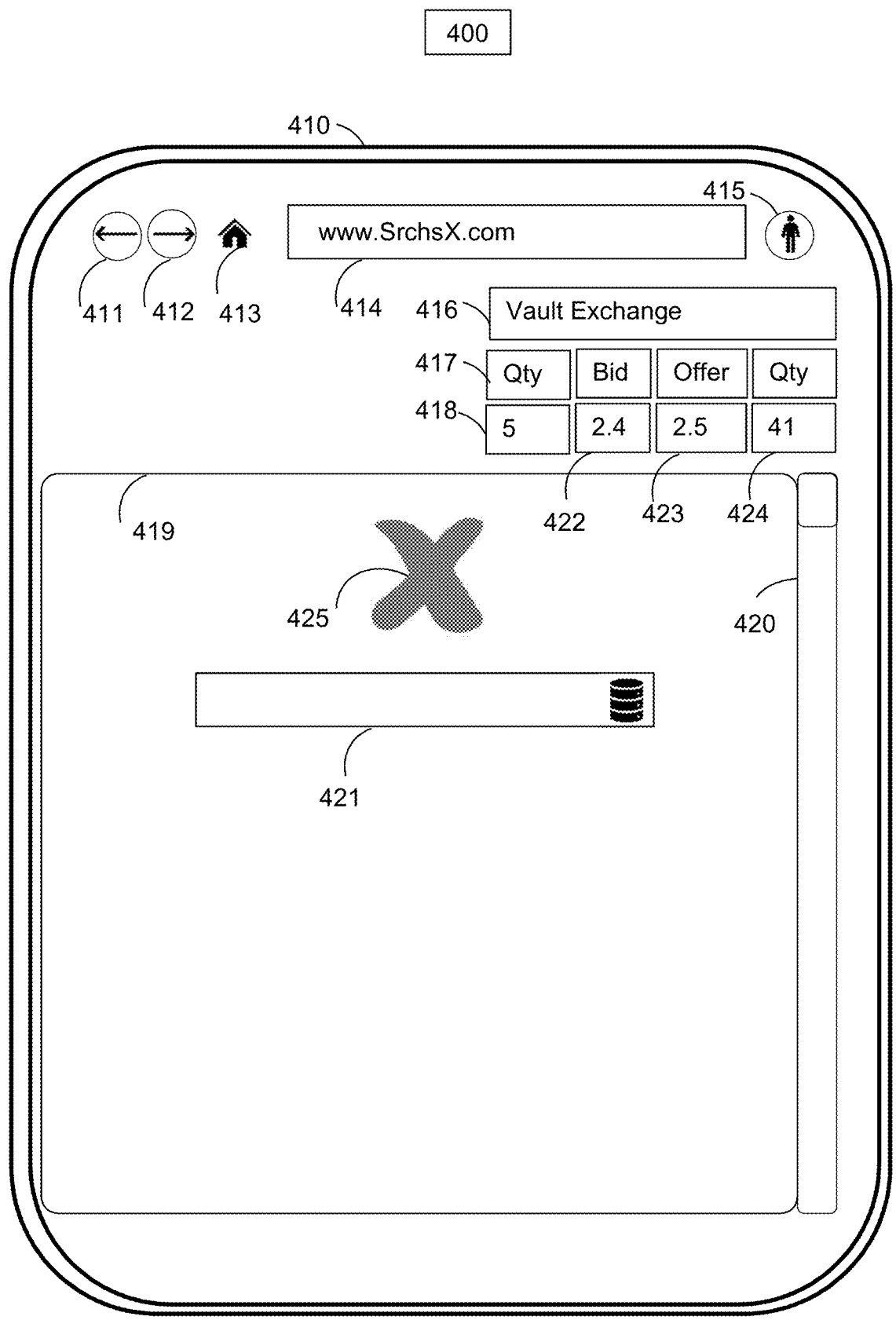
FIG. 4 illustrates an exemplary user portal interface with a search engine implementation to rank user search requests over the world wide web and applications on the cloud based operation system with associated advertising attribute specification price-time priority queues in accordance with some embodiments.

FIG. 4 illustrates exemplary user interfaces 410 for participating, transacting and/or trading advertising community linked advertising attribute specification as a physical forward data transformed advertising community linked advertising attribute specification unit commodity or security between combinations of virtual hubs which may be community objects 241 over various advertising attribute specification modes. In some embodiments, user interface 210 includes the following elements, or a subset or superset thereof:

exemplary advertising community linked data socket web browser portal back button 411;

exemplary advertising community linked data socket web browser portal forward button 412;

exemplary advertising community linked data socket web browser portal home button to navigate to a set home page in the settings 413;

exemplary advertising community linked data socket web browser portal URL address entry field to navigate to a user directed URL or general search 414;

exemplary advertising community linked data socket web browser portal vault advertising attribute specification price time priority queue exchange grid 416;

exemplary advertising community linked data socket web browser portal vault advertising attribute specification price time priority queue exchange grid first priority quantity bid field title 417;

exemplary advertising community linked data socket web browser portal vault advertising attribute specification price time priority queue exchange grid first priority quantity bid field quantity of five 418;

exemplary advertising community linked data socket web browser portal vault advertising attribute specification price time priority queue exchange grid first priority price bid field price of $2.40 422;

exemplary advertising community linked data socket web browser portal vault advertising attribute specification price time priority queue exchange grid first priority price offer field price of $2.50 423;

exemplary advertising community linked data socket web browser portal vault advertising attribute specification price time priority queue exchange grid first priority quantity offer field quantity of forty-one units 424;

exemplary advertising community linked data socket web browser portal vault advertising attribute specification price time priority queue exchange grid graphical user interface for text, image, video and data display 419;

exemplary advertising community linked data socket web browser portal vault advertising attribute specification price time priority queue exchange grid graphical user interface picture or logo field 425;

exemplary advertising community linked data socket web browser portal vault advertising attribute specification price time priority queue exchange grid graphical user interface search entry field 421;

exemplary advertising community linked data socket web browser portal vault advertising attribute specification price time priority queue exchange grid graphical user interface slider bar to scroll up and down the web interface with text, data, pictures, images, videos or other audio or visual or augmented reality or mixed reality or virtual reality representations 420;

In some embodiments the user 110 may enter an advertising community linked transaction quantity and price for transformed advertising community linked advertising attribute specification or advertising capacity unit securities to participate, transact and/or trade by the GUI 410 detecting user 110 contact with a bid/buy price 422 or offer/sell price 423. The GUI 410 detects user 110 contact with any of the GUI 410 buttons which have been aforementioned. The GUI 410 may detect user contact 110 with any of the GUI 410 buttons 411, 412, 413, 414, 416, 417, 418, 419, 420, 421, 422, 423, 424 or user 110 voice interface with the application 410 method. Upon user 110 contact with buttons on the GUI 410, instructions are instantiated which allows the user 110 to change the specifications of the respective advertising community linked virtual hub combination 415. A plurality of prices and markets may be presented based on a plurality of contract specifications. In some embodiments, the best bid/buy price 422 may be moving up in price or down in price depending on the market conditions at any given time. In some embodiments the last auction trade or last transacted price for a given specification is listed to help the user 110 understand how the market is moving so that the user 110 may submit a competitive offer/selling price 423 or bid/buying price 422. In some embodiments, users 110 may adjust settings of the GUI 410 to show more bid/buying prices 422 or more offer/selling prices 423. In some embodiments the matrix of advertising community linked market quantities and prices 415, 416, 417, 418, 419, 420, 421, 424, 425, 426 may be referred to as market depth or advertising attribute specification market grid in the GUI 410 embodiment. In some embodiments the number of users 110 may be displayed as user icons 415 for the amount of people logged in as well as geographical location which desire to transact, trade or participate in a given advertising community linked virtual hub 410 to advertising community linked virtual hub 241 combination auction with price-time priority queues. In some embodiments, users 110 may select the advertising community linked advertising attribute specification mode 415, 111 such that the user allows a market for only one form of transformed advertising community linked advertising attribute specification capacity as a commodity or security or the user 110 may allow the system to show multiple forms of transformed advertising community linked advertising attribute specification capacity between two virtual advertising community linked advertising attribute specification capacity hubs 241. In some embodiments the user may toggle between the GUI 410 market view screen in FIG. 4 and other menu 5100, 5200 and application options and settings by the user 110 selecting the hamburger button 270 and the GUI 210 detecting the user 110 input or contact. In some embodiments the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 410, 422 with a plurality of specifications 427 at specific market prices.

Figure 5:
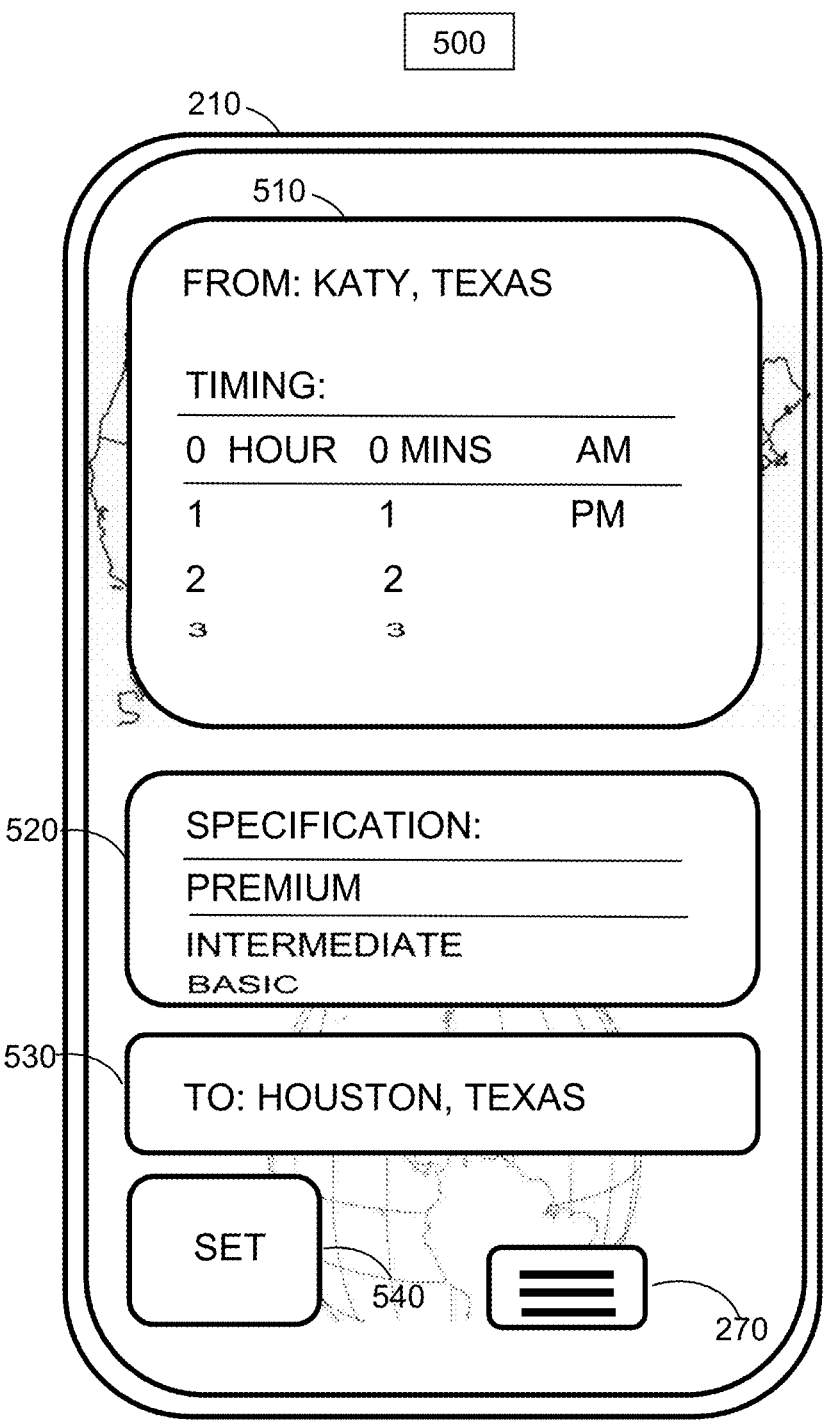
FIG. 5 illustrates an exemplary user interface to select a specification grade of advertising attribute specification community linked advertising attribute specification with associated price-time priority queues with various timing specifications in accordance with some embodiments.

FIG. 5 illustrates an exemplary user interface 210 for listing timing specifications 510 on a portable multifunction device in accordance with some embodiments. In some embodiments, user interface 210 includes the following elements, or a subset or superset thereof:

origin/From virtual hub timing (a data transformation) 510;

specification of quality of advertising community linked advertising attribute specification capacity (a data transformation) 520;

destination/To virtual hub (a data transformation) 530;

setting button 540 to transmit the timings 510 and quality specification grade 520 (a data transformation);

hamburger button 270 to instruct the GUI 210 to take the user 110 to the menu screen.

In some embodiments, the user 110 may select a plurality of timing options in the timing selection specification 510. The timing specification constraint may be the time at which the transformed advertising community linked advertising attribute specification or advertising capacity unit security departs from the origin/from advertising community linked virtual hub 410. As in any commodity market, if a user 110 is late and they have purchased the advertising community linked advertising attribute specification capacity unit, the user must still pay for the advertising community linked advertising attribute specification or advertising capacity unit regardless if the user 110 is present at the time of delivery, departure or not. The user has the option if they know they will be late to sell back the advertising community linked advertising attribute specification or advertising capacity unit to the market at the then current price. Accordingly, for the purpose of example, but not limiting by example, if a user 110 bought a transformed advertising community linked advertising attribute specification capacity unit security for $2.50 423 and the user 110 realized they would be late for the 8 am departure specification, then the user 110 may either pay for the advertising community linked advertising attribute specification unit even though the user 110 was present and did not take delivery of the advertising community linked advertising attribute specification unit security, or the user 110 may preemptively sell back the advertising community linked advertising attribute specification capacity unit security to the market at the then current bid price 422. The user 110 would then have offset their obligation in a timely manner and another user 110 on the network 141, 160 may then purchase the available advertising community linked advertising attribute specification or advertising capacity unit security. By eliminating the initial obligation by an creating an offset obligation, the additional data advertising community linked transformation concepts such as cost of cover, liquidated damages or force majeure are not employed by the method. In some embodiments, virtual advertising community linked advertising attribute specification or advertising hub combination units may or may not have the available liquidity if the user 110 were to wait too long before delivery of the advertising community linked advertising attribute specification capacity unit to make an adjustment and therefore may need to take delivery even if they are not present. In some embodiments, the user 110 may select a grade specification 520. For the purpose of example, but not limiting by example, a plurality of specification grades may exist, such as "premium" which may be defined by certain classes of advertising community linked advertising attribute specification capacity units and/or certain quality levels. Similarly, for the purpose of example, but not limiting by example, a plurality of specification grades may exist such as "intermediate" or "basic" which may be defined by certain classes of advertising community linked advertising attribute specification or advertising capacity unit securities and/or certain quality levels. Lastly, for purpose of example, but not limiting by example, there may be thousands or millions of specification gradings for a plurality of advertising attribute specifications. In some embodiments, the user 110 may select the destination/to advertising community linked virtual hub 530 to change the advertising community linked virtual hub combination. In some embodiments, the user 110, may contact the "set" button 540 to transmit the transformed advertising community linked advertising attribute specification capacity unit security specification data by using the GUI 210 detecting the user 110 input or contact. In some embodiments the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 253 with a plurality of specifications at specific market prices.

Figure 6:
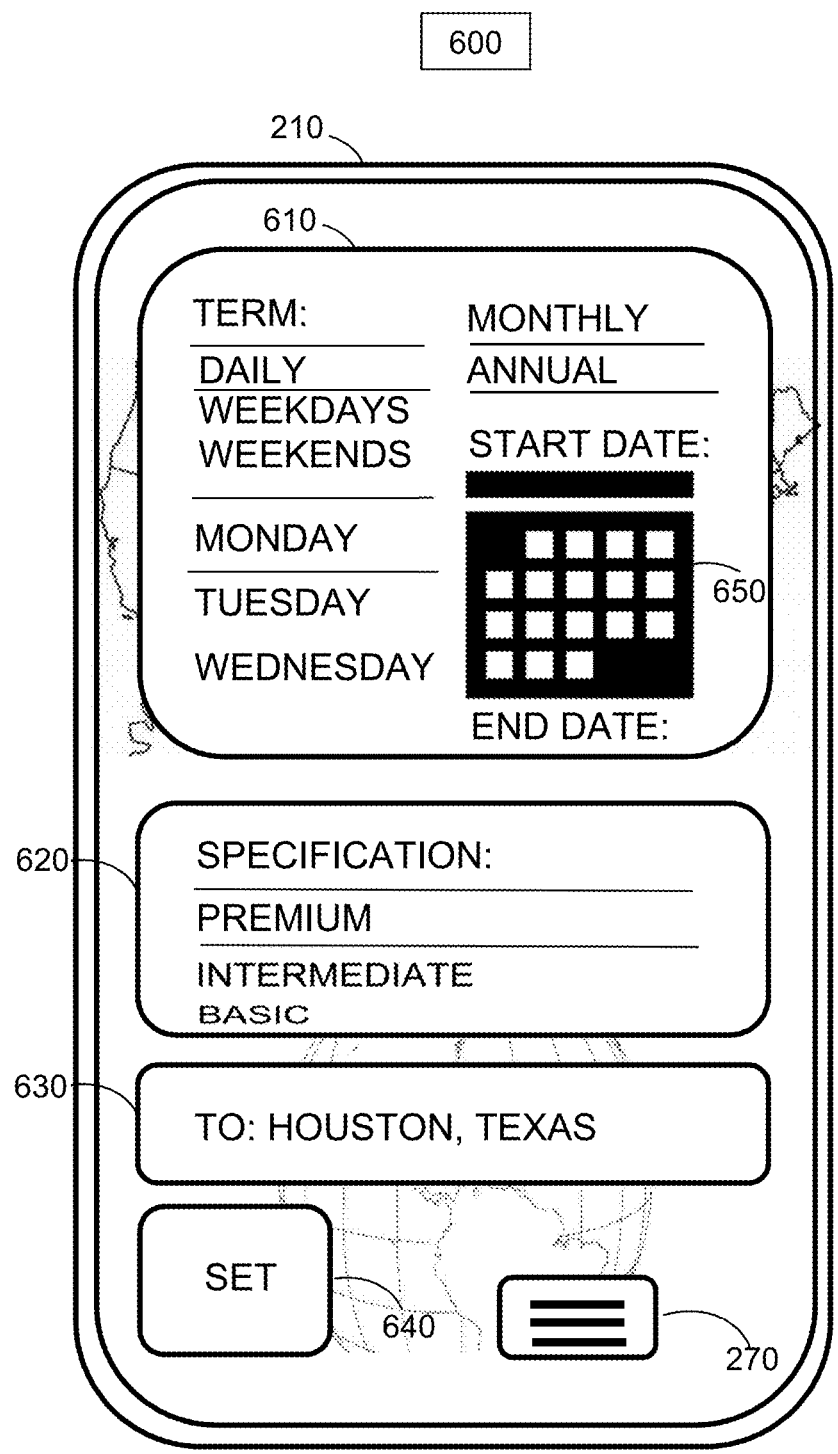
FIG. 6 illustrates an exemplary user interface with various term specifications for advertising attribute specification community linked advertising attribute specification capacity with associated price-time priority queues in accordance with some embodiments.

FIG. 6 illustrates an exemplary user interface 210 for selecting the term transformation specification 610 on a portable multifunction device in accordance with some embodiments. In some embodiments, user interface 210 includes the following elements, or a subset or superset thereof:

term specification options (a data transformation) 610;

specification of quality of advertising community linked advertising attribute specification or advertising capacity (a data transformation) 620;

destination/To advertising community linked virtual hub (a data transformation) 630;

setting button 640 to transmit the term 610 and quality specification grade (a data transformation) 620;

calendar button 650 to select specification start dates and end dates for a plurality of advertising community linked virtual advertising attribute specification or advertising hub combinations (a data transformation);

hamburger button 270 to instruct the GUI 210 to take the user 110 to the menu screen.

In some embodiments, the term specification 610 may be used to participate, transact and/or trade in a specific advertising community linked virtual hub combination for a specific time period specification. Users 110 may set the term to daily, weekly, monthly, annual, weekdays, weekends, specific days such as Monday, Tuesday, Wednesday, Thursday, Friday, Saturday, Sunday or any combination of term selections the user 110 sets as relevant for participating, transacting or trading in the transformed advertising community linked advertising attribute specification or advertising capacity unit securities market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650 (a data transformation). In some embodiments, the user 110 may select "weekends" 610 during a specification calendar window of dates 650 (a data transformation). In some embodiments, the user 110, may contact the "set" button 640 to transmit the transformed advertising community linked advertising attribute specification or advertising capacity unit specification data by using the GUI 210 detecting the user 110 input or contact. In some embodiments the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 410, 422 with a plurality of specifications at specific market prices.

Figure 7:
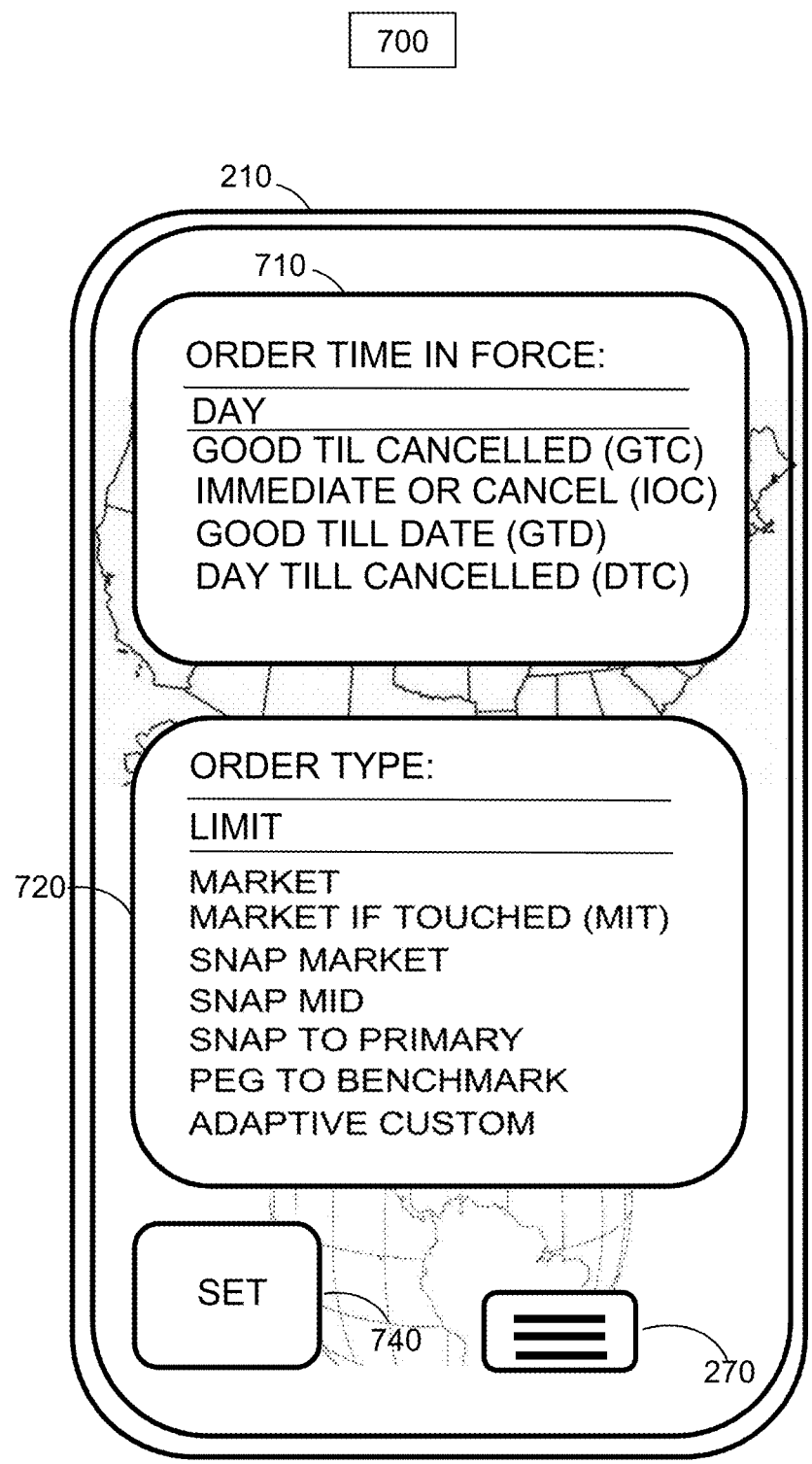
FIG. 7 illustrates an exemplary user interface with various order types and order time in force designations for advertising attribute specification community linked advertising attribute specification capacity with associated price-time priority queues in accordance with some embodiments.

FIG. 7 illustrates an exemplary user interface 210 for selecting order time in force order types 710 (a data transformation) as well as order types 720 (a data transformation) on a portable multifunction device in accordance with some embodiments. In some embodiments, user interface 210 includes the following elements, or a subset or superset thereof:

order time in force specification options (a data transformation) 710;

order type specification options (a data transformation) 720;

setting button 740 to transmit the order time in force specification 710 and Order type specification option 720 (a data transformation);

hamburger button 270 to instruct the GUI 210 to take the user 110 to the menu screen.

In some embodiments, user interface 210 may be used by the user 110 to select a plurality of order time in force 710 specifications. In some embodiments, order time in force selections 710 may include a subset or superset thereof: day (DAY) order 710; good till cancelled order (GTC) 710; immediate or cancel order (IOC) 710; good till date order (GTD) 710; day till cancelled order (DTC) 710. Order time in force 710 specifications may be used to designate how long a user 110 order may be valid. In some embodiments, the GUI 210 may display the definitions of a plurality of order time in force 710 characteristics so that the user 110 may select the appropriate order time in force 710 specification for the advertising community linked advertising attribute specification or advertising capacity unit that the user 110 may participate, transact and/or trade. In some embodiments, the user interface 210 may be used to select the order type 720 specifications. In some embodiments, order type selections 720 may include a subset or superset thereof: Limit 720, Market 720, Market if Touched (MIT) 720; Snap to Market 720; Snap to Mid 720; Snap to primary 720; Peg to benchmark 720; adaptive custom 720. In some embodiments, the GUI 210 may display the definitions of a plurality of order types 720 characteristics so that the user 110 may select the appropriate order type 720 specification for the advertising community linked advertising attribute specification or advertising capacity unit that the user 110 may participate, transact and/or trade. In some embodiments, the user 110, may contact the "set" button 740 to transmit the advertising community linked advertising attribute specification or advertising capacity unit specification data by using the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 252 with a plurality of specifications at specific market prices.

Figure 8:
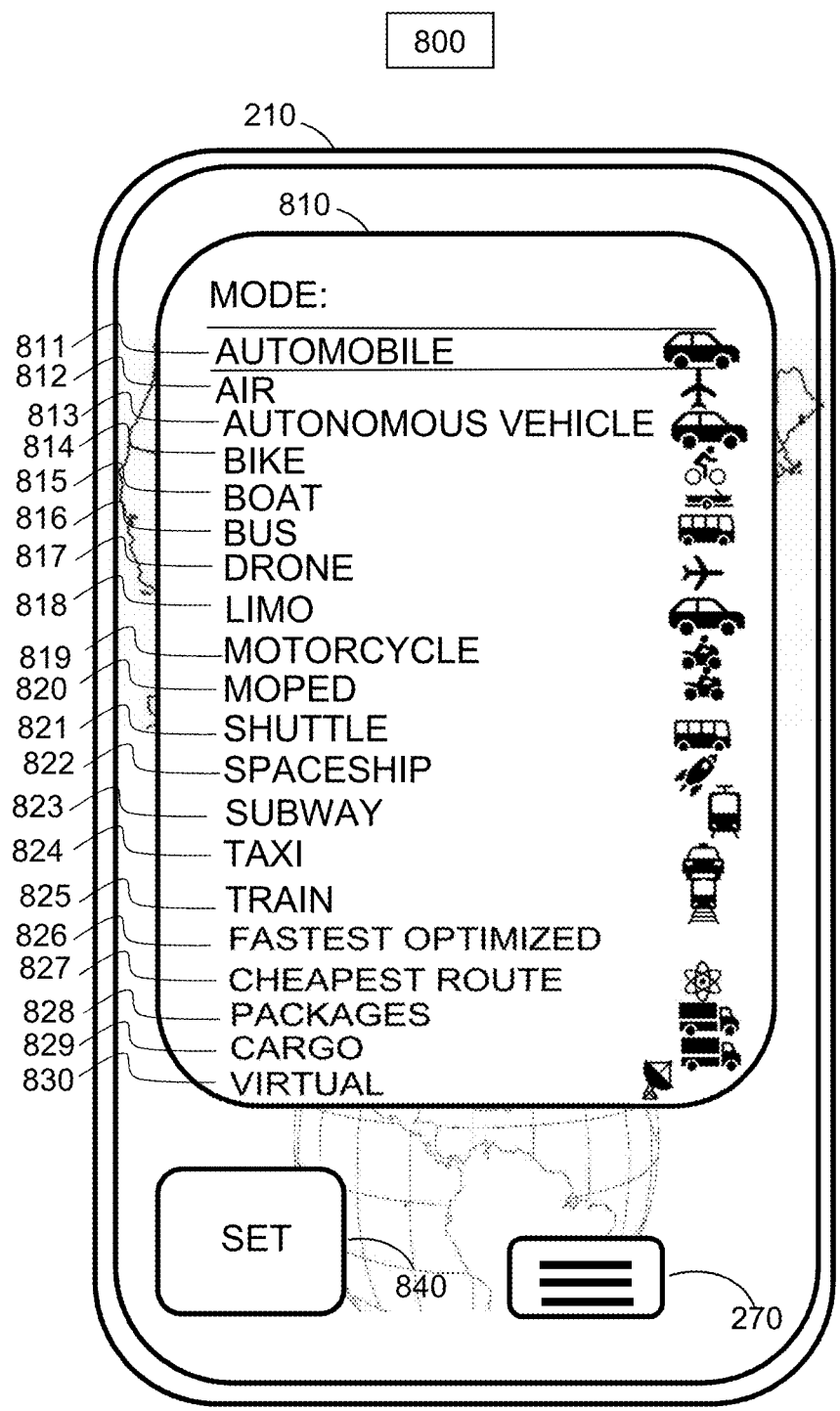
FIG. 8 illustrates an exemplary user interface with various geolocation or mobility modes of advertising attribute specification community linked advertising attribute specification capacity with associated price-time priority queues in accordance with some embodiments.

FIG. 8 illustrates an exemplary user interface 210 for selecting advertising community linked virtual hub advertising attribute specification capacity unit modes 810 (a data transformation) on a portable multifunction device in accordance with some embodiments. In some embodiments, user interface 210 includes the following elements, or a subset or superset thereof:

virtual hub advertising community linked advertising attribute specification capacity unit modes 810 (a data transformation);

setting button 840 to transmit the advertising community linked virtual hub advertising attribute specification capacity unit modes 810;

hamburger button 270 to instruct the GUI 210 to take the user 110 to the menu screen.

In some embodiments, user interface 210 may be used by the user 110 to select a plurality of advertising community linked virtual hub transformed advertising attribute specification capacity unit security modes 810 specifications. In some embodiments, advertising community linked virtual hub advertising attribute specification capacity unit mode selections 810 may include a subset or superset thereof: Automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; virtual 830. In some embodiments, virtual hub advertising community linked advertising attribute specification capacity unit modes are simply that a user 110 would have a virtual advertising attribute specification or advertising capacity unit for an automobile or an airplane or as a single location in work or home or school or at any location as examples, but not limiting by example. In some embodiments, the user 110 may bid on cargo 829 or package capacity 828 in any mode or multi-modal of transformed advertising community linked advertising attribute specification or advertising capacity between a combination of virtual advertising community linked advertising attribute specification hub locations. In some embodiments, the user 110 may use one or multiple modes of advertising community linked advertising attribute specification between a combination of advertising community linked virtual advertising attribute specification hub capacity points. In some embodiments, the user 110, may contact the "set" button 840 to transmit the transformed advertising community linked advertising attribute specification or advertising capacity unit specification mode data by using the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 253 with a plurality of specifications at specific market prices.

Figure 9:
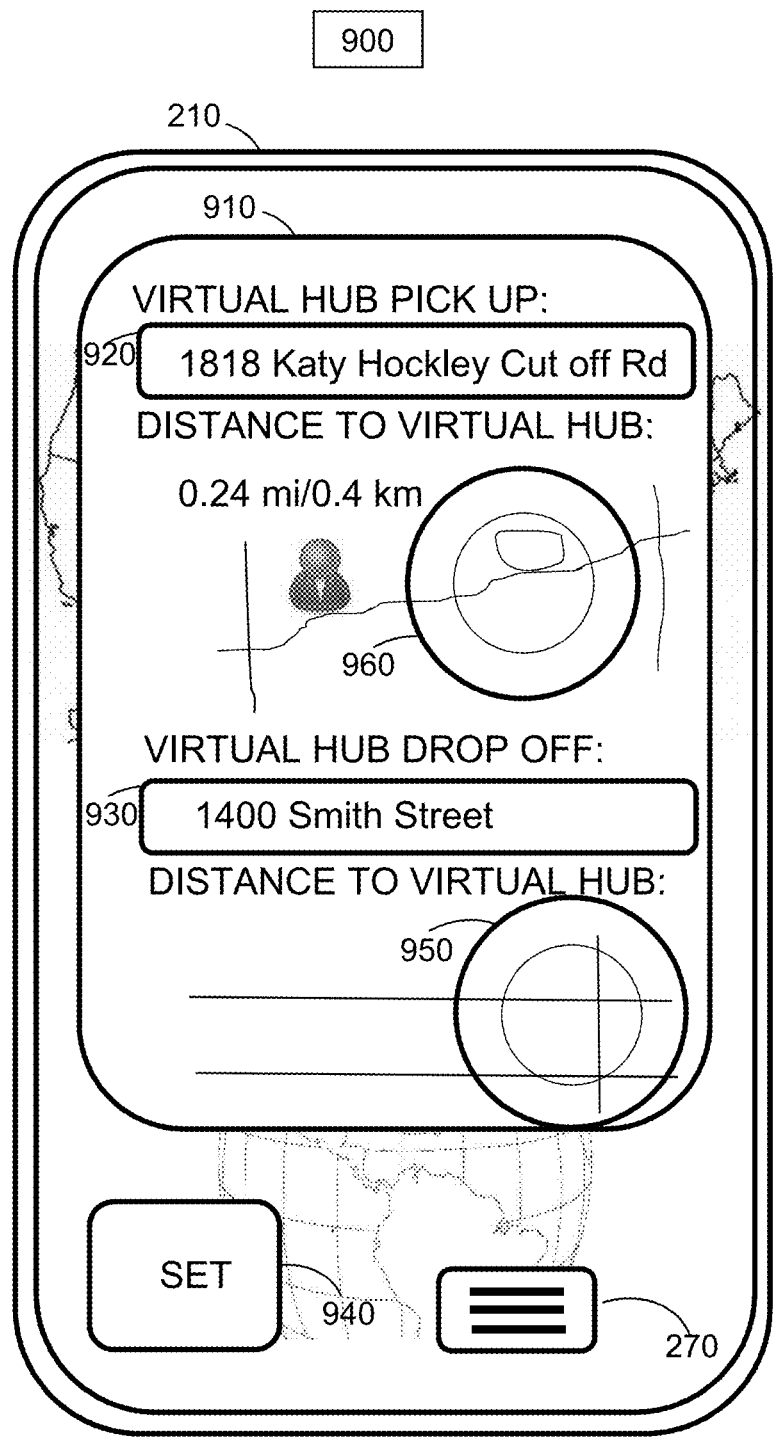
FIG. 9 illustrates an exemplary user interface with the distance between the user and a advertising attribute specification community linked virtual hub pick up point for advertising attribute specification community linked advertising attribute specification capacity with associated price-time priority queues as well as the distance between a user and a virtual drop off point for advertising attribute specification community linked advertising attribute specification capacity with associated price-time priority queues in accordance with some embodiments.

FIG. 9 illustrates an exemplary user interface 210 for identifying the distance the user 110 is from the advertising community linked virtual hub from a map and distance perspective on a portable multifunction device in accordance with some embodiments. In some embodiments, user interface 210 includes the following elements, or a subset or superset thereof:

virtual hub advertising community linked advertising attribute specification capacity unit pick up display 910;

virtual hub advertising community linked advertising attribute specification capacity unit pick up address 920;

virtual hub advertising community linked advertising attribute specification capacity unit drop off address 930;

virtual hub advertising community linked advertising attribute specification capacity pick-up target zone 960;

virtual hub advertising community linked advertising attribute specification capacity drop-off target zone 950;

setting button 940 to transmit the advertising community linked virtual hub advertising attribute specification capacity unit addresses 920, 930;

hamburger button 270 to instruct the GUI 210 to take the user 110 to the menu screen.

In some embodiments, user interface 210 may be used by the user 110 to select a plurality of advertising community linked virtual hub advertising attribute specification capacity unit address 910 specifications. In some embodiments, advertising community linked virtual hub advertising attribute specification or advertising capacity unit address selections 910 may include a subset or superset thereof: advertising community linked virtual hub pick up address 920; advertising community linked virtual hub drop off address 930. In some embodiments, advertising community linked virtual hub advertising attribute specification capacity unit addresses 920 and 930 may be changed before delivery of a advertising community linked virtual advertising attribute specification capacity unit. The user interface map and address tool 910 displays the users 110 distance from the address of the advertising community linked virtual advertising attribute specification or advertising hub as well as a map to assist the user 110 in finding the location of the advertising community linked virtual advertising attribute specification hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110, may contact the "set" button 940 to transmit the advertising community linked advertising attribute specification capacity unit specification address data by using the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 410, 422 with a plurality of specifications at specific market prices.

Figure 10:
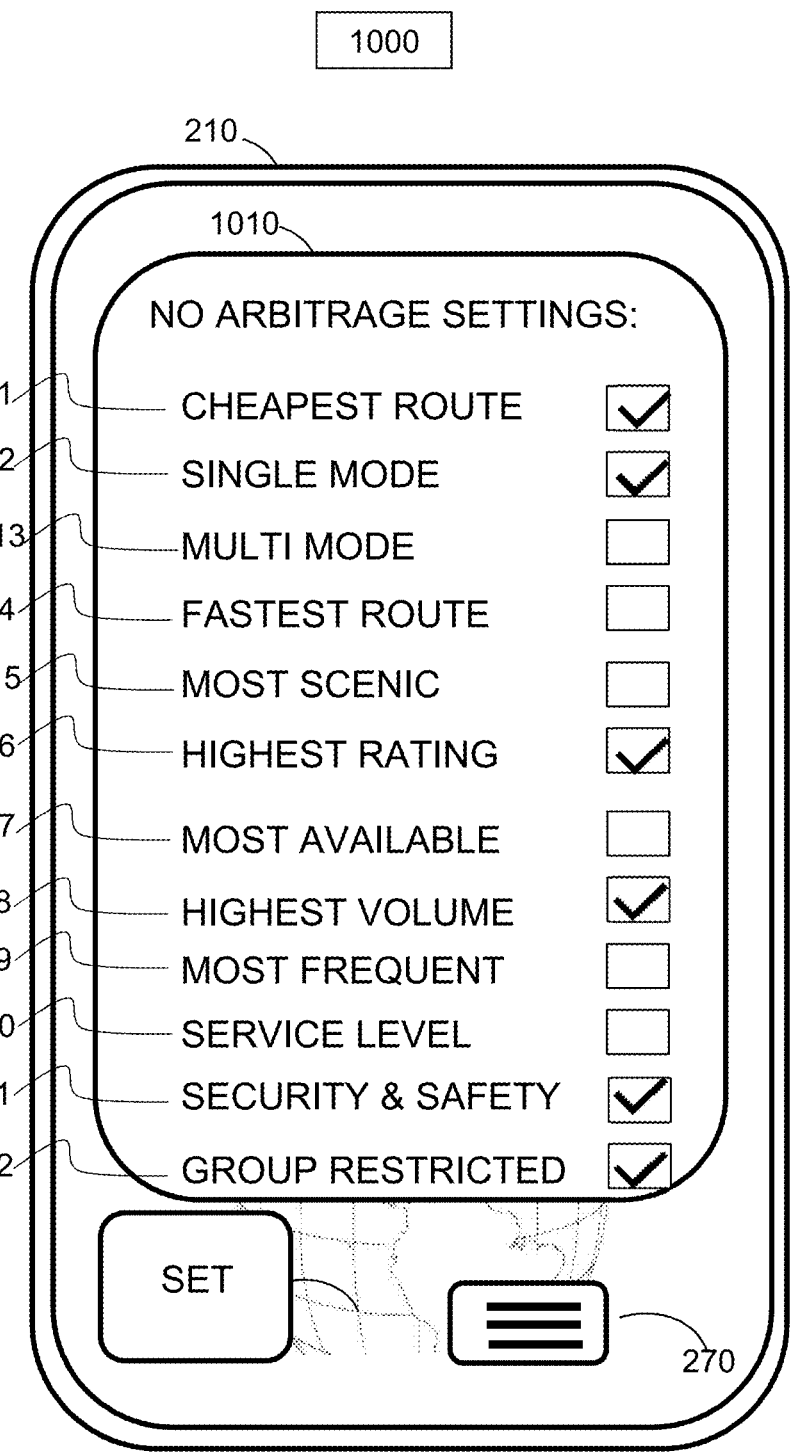
FIG. 10 illustrates an exemplary user interface for settings and constraints of the advertising attribute specification community linked advertising attribute specification capacity with associated price-time priority queues trading method and system in accordance with some embodiments.

FIG. 10 illustrates an exemplary user interface 210 for identifying the constraints and no arbitrage settings 1010 the user 110 selects on a portable multifunction device in accordance with some embodiments (multiple data transformations). In some embodiments, user interface 210 includes the following elements, or a subset or superset thereof:

constraint and no arbitrage settings 1010 (a data transformation);

setting button 1040 to transmit the advertising community linked virtual hub advertising attribute specification capacity constraints and no arbitrage settings;

hamburger button 270 to instruct the GUI 210 to take the user 110 to the menu screen.

In some embodiments, user interface 210 may be used by the user 110 to select a plurality of advertising community linked virtual hub advertising attribute specification capacity constraint and no arbitrage settings 1010. In some embodiments, advertising community linked virtual hub advertising attribute specification capacity unit constraint and no arbitrage selections 1010 may include a subset or superset thereof: cheapest route 1011 (a data transformation); single mode 1012 (a data transformation); multi-mode 1013 (a data transformation); fastest route 1014 (a data transformation); most scenic 1015 (a data transformation); highest rating 1016 (a data transformation); most available 1017 (a data transformation); highest volume 1018 (a data transformation); most frequent 1019 (a data transformation); service level 1020 (a data transformation); security and safety 1021 (a data transformation). In some embodiments, the "cheapest route setting" 1011 instantiates instructions in the memory of the CPU 210 to complete a standard cost minimization linear program to assist the user 110 to complete the advertising community linked advertising attribute specification capacity unit between two virtual hubs with the lowest cost. In some embodiments, the "single mode" 1012 instantiates instructions in the memory of the CPU 210 to set a constraint for the user 110 to complete the advertising community linked advertising attribute specification capacity unit between two virtual hubs with the only one mode of advertising attribute specification. In some embodiments, the "multi mode" 1013 instantiates instructions in the memory of the CPU 210 to set a constraint for the user 110 to complete the advertising community linked advertising attribute specification capacity unit between two virtual hubs with more than one mode of advertising attribute specification. In some embodiments, the "fastest route" 1014 instantiates instructions in the memory of the CPU 210 to complete standard linear programming equation to minimize travel time for the user 110 to complete the advertising community linked advertising attribute specification capacity unit between two virtual hubs with the shortest time. In some embodiments, the settings 1010 may set instructions for the advertising community linked price based navigation routing index and GUI presentation on the user(s) 110 attribute interface 111. In some embodiments, the "most scenic" 1015 instantiates instructions in the memory of the CPU 210 to complete an algorithm with the highest ratings for scenery to assist the user 110 to complete the transformed advertising community linked advertising attribute specification capacity unit between two virtual hubs with highest scenery rating. In some embodiments, the "highest rating" 1016 instantiates instructions in the memory of the CPU 210 to complete a rating algorithm to assist the user 110 to complete the advertising community linked advertising attribute specification capacity unit between two virtual hubs with the highest rating. In some embodiments, the "most available" 1017 instantiates instructions in the memory of the CPU 210 to complete an algorithm to search for the route with the most open advertising community linked advertising attribute specification capacity units to assist the user 110 to complete the advertising community linked advertising attribute specification capacity unit between two advertising community linked virtual hubs with the most available open seats or open advertising community linked advertising attribute specification capacity units. In some embodiments, the "highest volume" 1018 instantiates instructions in the memory of the CPU 210 to complete an algorithm to select the route with the highest volume of participants to assist the user 110 to complete the transformed advertising community linked advertising attribute specification capacity unit between two virtual hubs with the largest number of users 110. In some embodiments, the "most frequent" 1019 instantiates instructions in the memory of the CPU 210 to complete most frequent route analysis from a timing constraint perspective to assist the user 110 to complete the advertising community linked advertising attribute specification capacity unit between two advertising community linked virtual hubs with the most frequent departures. In some embodiments, the "service level" 1020 instantiates instructions in the memory of the CPU 210 to align the constraint to select the service level to assist the user 110 to complete the advertising community linked advertising attribute specification capacity unit between two virtual hubs with the correct level of service. In some embodiments, the "security and safety" 1021 instantiates instructions in the memory of the CPU 210 to run safety and security algorithms on the user's 110 based on block chain performance of drivers and riders to assist the user 110 to complete the advertising community linked advertising attribute specification capacity unit between two virtual hubs with the highest level of safety and security. In some embodiments, the "group restricted" 1022 instantiates instructions in the memory of the CPU 210 to run grouping limitation algorithms on the user's 110 price-time priority queue market auction based on limiting the pool of advertising community linked drivers and riders or advertising providers and shippers to assist the user 110 to complete the advertising community linked advertising attribute specification or advertising capacity unit between two advertising community linked virtual hubs with a limit on the pool of available users. In some embodiments, a plurality of settings which transform the data may be sequenced for presenting as a transformed market 400 or as a transformed market as a layer on a navigation system with indexed routes based on price 4200. A user(s) 110 pool for group restricted 1022 (a data transformation) settings may limit the user pool displayed by email, security, sex, rating or a plurality of other restrictions. In some embodiments, the user 110, may contact the "set" button 1040 to transmit the advertising community linked advertising attribute specification or advertising capacity unit security specification constraint and arbitrage data by using the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 253 with a plurality of specifications at specific market prices in an price-time priority queue auction format.

Figure 11:
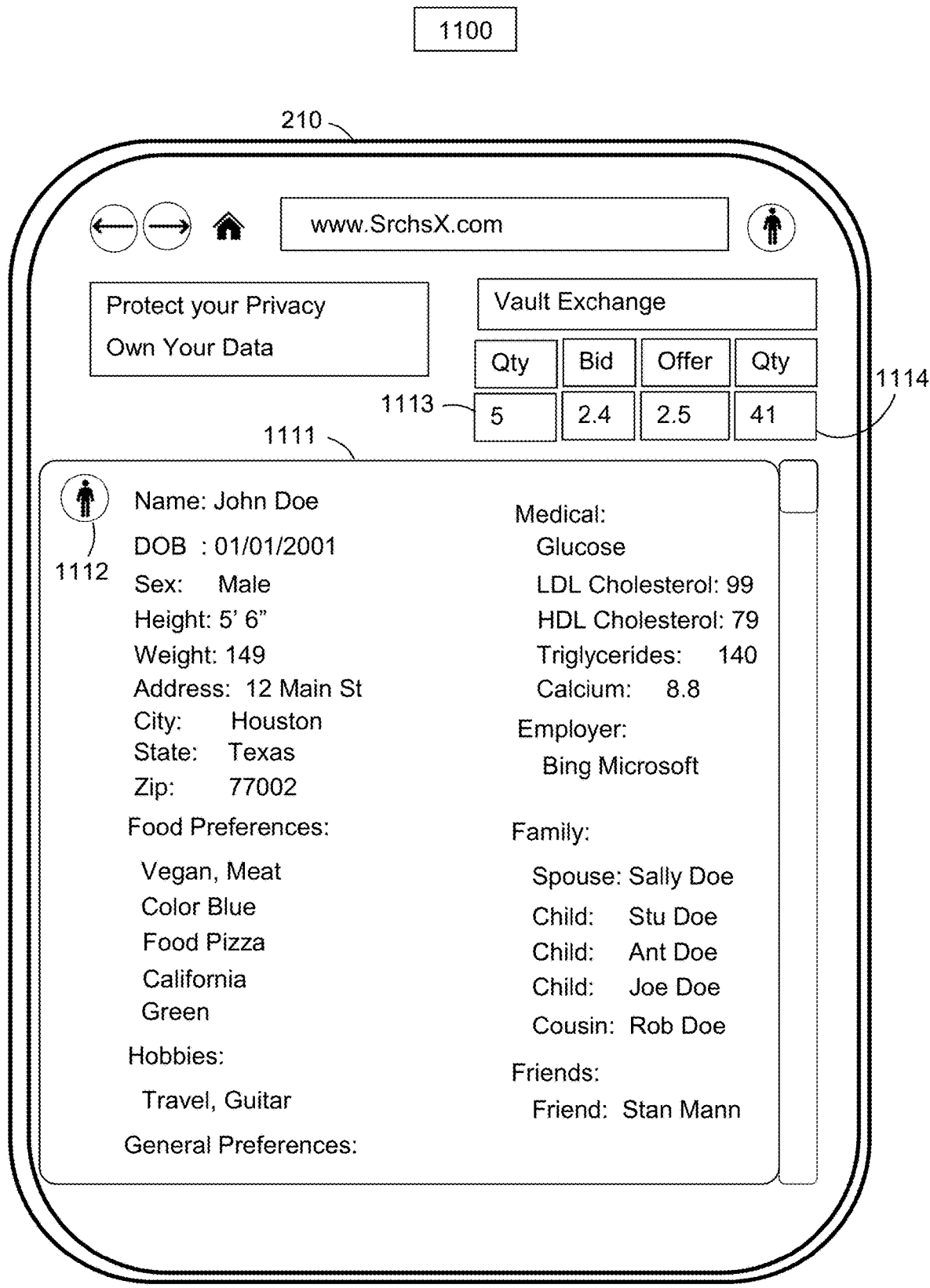
FIG. 11 illustrates an exemplary user interface for user advertising attribute specification settings in the user controlled data vault with associated price-time priority queues in accordance with some embodiments.

FIG. 11 illustrates exemplary user attribute interfaces 210 for participating, transacting and/or trading transformed advertising community linked advertising attribute specification or advertising as a physical forward commodity or security between combinations of advertising community linked virtual hubs over various advertising attribute specification modes. In some embodiments, user interface 210 includes the following elements, or a subset or superset thereof:

exemplary advertising community linked advertising attribute user specification settings and update 1111;

exemplary advertising community linked advertising attribute user specification settings and update for a specific login credential 1112;

In some embodiments the user 110 may enter a transaction quantity and price for transformed advertising community linked advertising attribute specification or advertising capacity unit securities to participate, transact and/or trade by the GUI 210 detecting user 110 contact or audio interface with a bid/buy price 1113 or offer/sell price 1114. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective advertising attribute unit combination 1111. A plurality of prices and markets may be presented based on a plurality of contract specifications. In some embodiments, the best bid/buy price 1113 may be moving up in price or down in price depending on the market conditions at any given time. In some embodiments the last trade or last transacted price for a given specification is listed to help the user 110 understand how the market is moving so that the user 110 may submit a competitive offer/selling price 1114 or bid/buying price 1113. In some embodiments, users 110 may adjust settings of the GUI 210 to show more bid/buying prices 1113 or more offer/selling prices 1114. In some embodiments the matrix of market quantities and prices may be referred to as market depth in the GUI 210 embodiment. In some embodiments the number of users 110 may be displayed as user icons for the amount of people logged in which desire to transact, trade or participate in a given advertising attribute specification virtual hub 245 to virtual hub 253 combination. In some embodiments, users 110 may select the advertising community linked advertising attribute specification mode 1111 such that the user allows a market for only one form of advertising community linked advertising attribute specification capacity as a commodity or the user 110 may allow the system to show multiple forms of advertising attribute specification capacity between two advertising community linked virtual advertising attribute specification capacity hubs 245, 253. In some embodiments the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 253 with a plurality of specifications 1111 at specific market prices 1113, 1114.

Figure 12:
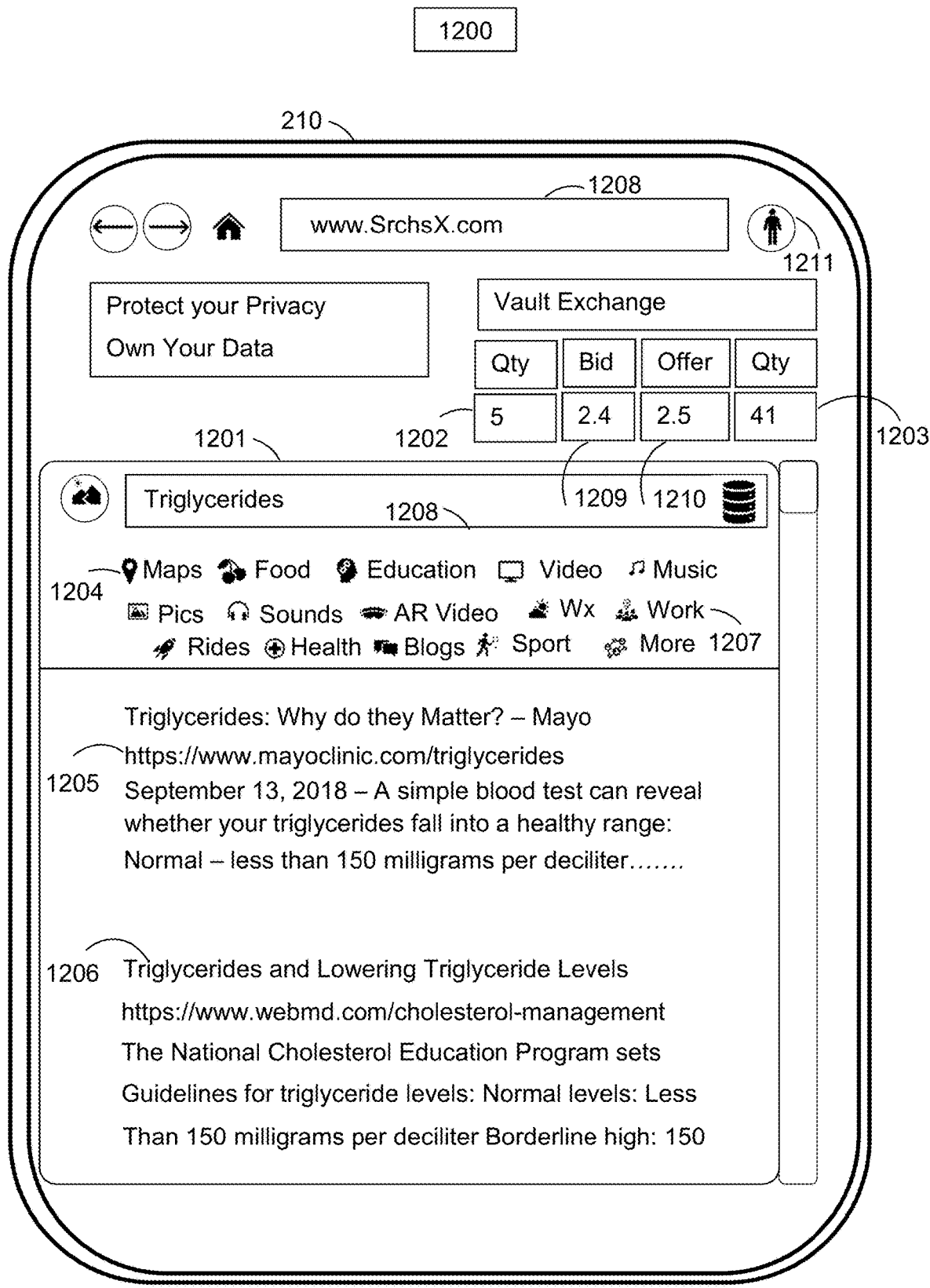
FIG. 12 illustrates an exemplary user interface for transacting and trading advertising attribute specification community linked search engine portal web and portal application interface associated advertising attribute specification price-time priority queues in accordance with some embodiments.

FIG. 12 illustrates exemplary user interfaces 210 for participating, transacting and/or trading transformed advertising community linked advertising attribute specification as a physical forward commodity or security between combinations of advertising community linked virtual hubs over various advertising attribute specification modes. In some embodiments, user interface 210 includes the following elements, or a subset or superset thereof:

exemplary advertising community linked URL address form field 1211;

exemplary advertising community linked data socket graphic user interface rendering interface 1201;

exemplary advertising community linked data socket graphic user interface rendering interface with advertising attribute specification price time priority queue trading engine interface quantity price bid of five units for the first priority bid price 1202;

exemplary advertising community linked data socket graphic user interface rendering interface with advertising attribute specification price time priority queue trading engine interface quantity price offer of forty-one units for the first priority offer price 1203;

exemplary advertising community linked data socket graphic user interface rendering interface with advertising attribute specification price time priority queue trading engine interface module selection of a Mapping interface 1204;

exemplary advertising community linked data socket graphic user interface rendering interface with advertising attribute specification price time priority queue trading engine interface module selection of a work and career interface 1207;

exemplary advertising community linked data socket graphic user interface rendering interface with advertising attribute specification price time priority queue trading engine interface module search engine highest ranked result in first priority position 1205;

exemplary advertising community linked data socket graphic user interface rendering interface with advertising attribute specification price time priority queue trading engine interface module search engine second highest ranked result in first priority position 1206;

exemplary advertising community linked data socket graphic user interface rendering interface with advertising attribute specification price time priority queue trading engine interface module search engine input field with an input of Triglycerides 1208.

exemplary advertising community linked data socket graphic user interface rendering interface with advertising attribute specification price time priority queue trading engine interface quantity price bid of $2.40 for the first priority bid price 1209;

exemplary advertising community linked data socket graphic user interface rendering interface with advertising attribute specification price time priority queue trading engine interface price bid of $2.50 for the first priority bid price 1210;

exemplary advertising community linked data socket graphic user interface rendering interface with advertising attribute specification for a user 1211.

In some embodiments the user 110 may enter a transaction quantity and price for advertising community linked advertising attribute specification or advertising capacity units to participate, transact and/or trade by the GUI 210 detecting user 110 contact with a bid/buy price 1209 or offer/sell price 1210. The GUI 210 detects user 110 contact with any of the GUI 210 buttons which have been aforementioned. Upon user 110 contact with buttons or audio interface on the GUI 210, instructions are instantiated which allows the user 110 to change the specifications of the respective advertising community linked virtual hub combination 1211. A plurality of transformed prices and transformed markets may be presented based on a plurality of transformed contract specifications. In some embodiments, the best bid/buy price 1209 may be moving up in price or down in price depending on the market conditions at any given time. In some embodiments the last trade or last transacted price for a given specification is listed to help the user 110 understand how the market is moving so that the user 110 may submit a competitive offer/selling price 1210 or bid/buying price 1209. In some embodiments, users 110 may adjust settings of the GUI 210 to show more bid/buying prices 1209 or more offer/selling prices 1210. In some embodiments the matrix of market quantities and prices 1202, 1209, 1210, 1203 may be referred to as market depth in the GUI 210 embodiment. In some embodiments the number of users 110 may be displayed as user icons 1204 for the amount of people logged in which desire to transact, trade or participate in a given advertising community linked virtual hub 245 to advertising community linked virtual hub 253 combination. In some embodiments, users 110 may select the advertising community linked advertising attribute specification mode 1211 such that the user allows a market for only one form or mode of advertising community linked advertising attribute specification capacity as a commodity or security or the user 110 may allow the system to show multiple forms (multi-modal) of advertising attribute specification capacity between two virtual advertising community linked advertising attribute specification capacity hubs 245, 253 or at a single location hub 245. In some embodiments the user may toggle between the GUI 210 market view screen in FIG. 12 and other menu 1204 options and settings by the user 110 selecting the other menu items 1204, 1207 which options may include but are not limited to mapping, food, education, video, music, pictures, images, sounds, augmented reality video, mixed reality video, Weather, work and carrier, rides and transportation, health blogs, sports and more, the GUI 210 detecting the user 110 input or contact or audio instructions. In some embodiments the GUI 210 may instantiate instructions in the memory of the mobile or stationary computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs to users 110 from and to a plurality of virtual hubs 245, 253 with a plurality of specifications at specific market prices. In some embodiments, the search engine graphical user interface search input field 1208 may contain a user inputted search input such as triglycerides which then may produce a list of ranked search results in the node database from ranking algorithms or from optimization vector rankings in U.S. patent application Publication Ser. No. 15,484, 059, "System and Method for blood and saliva food consumption and delivery", filed Apr. 10, 2017, the entirety of which is incorporated by reference herein. In some embodiments, the search engine graphical user interface may produce ranked search results by keyword search priority history block-chained by the user data vault or other search ranking methods.

Figure 13:
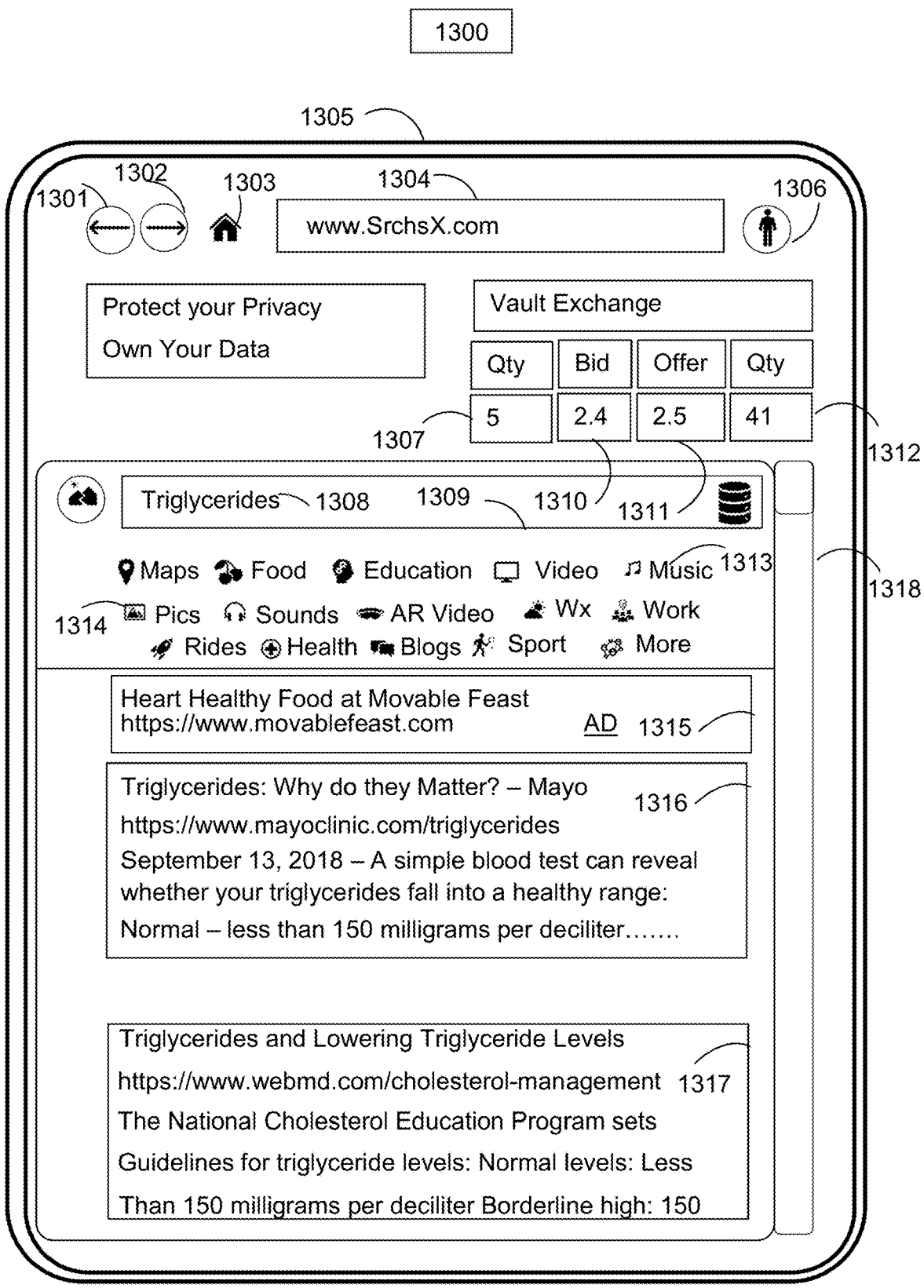
FIG. 13 illustrates an exemplary user interface for transacting and trading advertising attribute specification community linked search engine web portal and application portal results with associated advertising attribute specification price-time priority queues and advertising placement in accordance with some embodiments.

FIG. 13 illustrates exemplary user interfaces 1305 for participating, transacting and/or trading transformed advertising community linked advertising attribute specification as a physical forward commodities or securities between combinations of advertising community linked virtual hubs over various advertising attribute specification modes. In some embodiments, user interface 1305 includes the following elements, or a subset or superset thereof:

exemplary advertising community linked attribute specification trading market price time priority queue web data socket browser back button 1301;

exemplary advertising community linked attribute specification trading market price time priority queue web data socket browser forward button 1302;

exemplary advertising community linked attribute specification trading market price time priority queue web data socket browser home setting URL button 1303:

exemplary advertising community linked attribute specification trading market price time priority queue web data socket browser URL input field 1304;

exemplary advertising community linked attribute specification trading market price time priority queue web data socket browser user data back specification link icon 1306;

exemplary advertising community linked attribute specification trading market price time priority queue web data socket browser price-time priority queue bid quantity of five units 1307;

exemplary advertising community linked attribute specification trading market price time priority queue web data socket browser search input field request of "Triglycerides" 1308;

exemplary advertising community linked attribute specification trading market price time priority queue web data socket browser search input field 1309;

exemplary advertising community linked attribute specification trading market price time priority queue web data socket browser price-time priority queue bid price of $2.40 1310;

exemplary advertising community linked attribute specification trading market price time priority queue web data socket browser price-time priority queue offer price of $2.50 1311;

exemplary advertising community linked attribute specification trading market price time priority queue web data socket browser price-time priority queue offer quantity of forty-one units 1312;

exemplary advertising community linked attribute specification trading market price time priority queue web data socket browser application menu item for music 1313;

exemplary advertising community linked attribute specification trading market price time priority queue web data socket browser application menu item for pictures or images 1314;

exemplary advertising community linked attribute specification trading market price time priority queue web data socket browser advertisement where the user sold the security or forward contract right to their eyeball impression or audio impression or impression over any medium linked to the data socket 1315;

exemplary advertising community linked attribute specification trading market price time priority queue web data socket browser first priority search engine ranked result 1316;

exemplary advertising community linked attribute specification trading market price time priority queue web data socket browser second priority search engine ranked result 1317.

In some embodiments the user 110 may enter a transaction quantity and price for advertising community linked advertising attribute specification or advertising capacity units to participate, transact and/or trade by the GUI 1305 detecting user 110 contact or audio instructions with a bid/buy price 1310 or offer/sell price 1311. The GUI 1305 detects user 110 contact with any of the GUI 1305 buttons which have been aforementioned. Upon user 110 contact or audio interface with buttons or audio instructions on the GUI 1305, instructions are instantiated which allows the user 110 to change the specifications of the respective virtual hub combination or single location advertising attribute specification 1306. In some embodiments, a plurality of prices and markets may be presented based on a plurality of transformed contract specifications. In some embodiments, the best bid/buy price 1310 may be moving up in price or down in price depending on the market conditions at any given time. In some embodiments the last trade or last transacted price for a given transformed specification is listed to help the user 110 understand how the market is moving so that the user 110 may submit a competitive offer/selling price 1311 or bid/buying price 1310. In some embodiments, users 110 may adjust settings of the GUI 1305 to show more bid/buying prices 1310 or more offer/selling prices 1311. In some embodiments the matrix of market quantities and prices 1307, 1310, 1311, 1312 may be referred to as market depth in the GUI 1305 embodiment. In some embodiments the number of users 110 may be displayed as user icons for the amount of people logged in which desire to transact, trade or participate in a given virtual hub 245 to virtual hub 253 transformed combination. In some embodiments, users 110 may select the advertising community linked advertising attribute specification mode 1306 such that the user allows a market for only one form of advertising community linked advertising attribute specification capacity as a commodity or the user 110 may allow the system to show multiple forms of transformed advertising community linked advertising attribute specification or advertising capacity or securities between two advertising community linked virtual advertising attribute specification capacity hubs 245, 253. In some embodiments, by way of example and not to limit by example to avoid doubt, transformed advertising community linked advertising attribute specification units or transformed advertising attribute specification unit securities may even be substitutable between modes if the other specifications meet the grade category of the transformed advertising community linked advertising attribute specification unit specification or transformed advertising community linked advertising attribute specification unit security. A user(s) 110 may have bought a transformed advertising community linked advertising attribute specification unit with a specification and the delivery mechanism was a web browser, however the web browser user 110 bought back their transformed advertising community linked advertising attribute specification unit or transformed advertising community linked advertising attribute specification unit security and now the original purchaser may be matched with a advertising buyer of another advertiser who will deliver the transformed advertising community linked advertising attribute specification unit or transformed advertising community linked advertising attribute specification unit security. In some embodiments, bus 816, train 825, airplane 812, car 811, or a plurality of other modes may be substitutable if the transformed advertising community linked advertising attribute specification unit or transformed advertising community linked advertising attribute specification unit security meets the delivery transformed specification grade. In some embodiments the GUI 1305 may instantiate instructions in the memory of the mobile computing device 1305 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 253 with a plurality of specifications at specific market prices. In some embodiments, a user 110 may use the search engine input field 1309 to request a certain search request topic such as "Triglycerides" 1308. In some embodiments, the search engine search field request 1308 may instantiate a ranked database listing of the search results based on a plurality of optimization formulas based on a plurality of user based vectors that rank search based on the generalized formula contained in U.S. patent application Publication Ser. No. 15,484,059, "System and Method for Blood and Saliva Optimized Food consumption and delivery", filed Apr. 10, 2017, which may be generalized for parameters to include more than food and the parameters may include user preferences in place of the Foodie Allocation Line and the vectors may be search histories, topic correlations, topic relevancies as determined by the variance and covariance relationships between topic in search request keyword frequencies and relevance that determine the variance, covariance and correlation between topics and the point in the overall matrix that ranks in order of the highest expected topic return over the variance of the search topic result. In some embodiments, the user 110 may select the first priority topic 1316 or the second priority topic 1317 or user the scroll bar 1318 to see additional lower ranked topics in the ranked search engine database. In some embodiments, the user 110 may select a plurality of other application topics such as pics 1314 or music 1313 to go to applications hosted on the general operating system of the cloud based portal data socket or web browser data socket interface or application data socket interface by example but not limiting by example mapping, food, education, video, music, pictures, sounds, augmented reality video, weather, work, work social media, general social media, transportation and rides, health, blogs, sports and athletics and more or other application options that may be scrolled towards in the horizontal scrolling elements.

Figure 14:
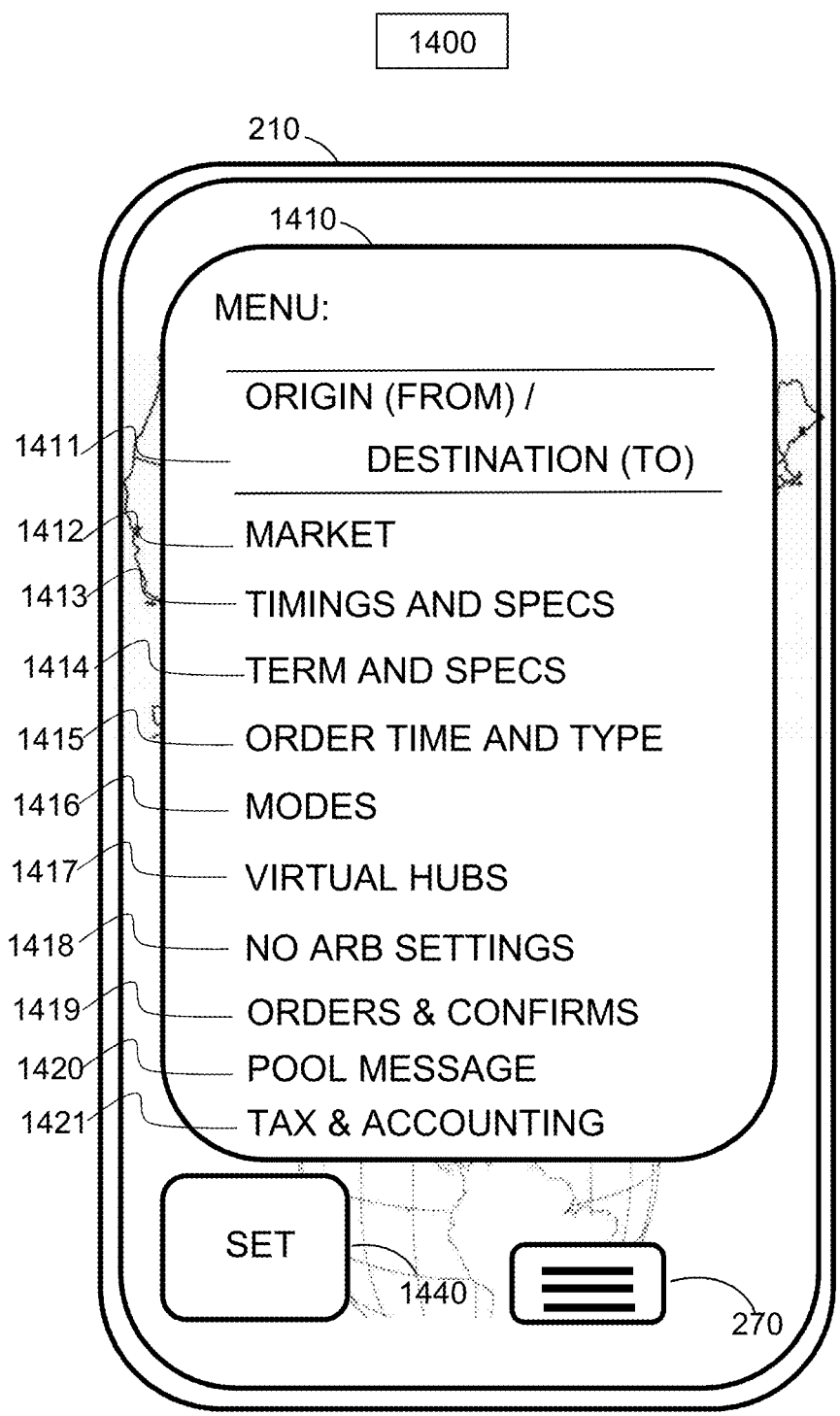
FIG. 14 illustrates an exemplary user interface for advertising attribute specification community linked objects with associated price-time priority queues transacting and trading various menu options within the system and method in accordance with some embodiments.

FIG. 14 illustrates an exemplary user interface 210 for selecting menu options 1410 on a portable multifunction device in accordance with some embodiments. In some embodiments, user interface 210 includes the following elements, or a subset or superset thereof:

menu options 1410;
origin (From)/Destination (to) menu option 1411;
market menu option 1412;
timings and Specs menu option 1413;
term and Specs menu option 1414;
order time and type menu option 1415;
modes menu option 1416;
virtual Hubs menu option 1417;
no arb settings menu option 1418;
orders and Confirms menu option 1419;
pool Message menu option 1420;
tax and Accounting menu option 1421;
setting button 1440 to transmit the menu option;
hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 2400 and/or FIG. 24. In some embodiments, the user 110, may contact the "market" menu option 1412 which may instruct the GUI 210 to render a market participation, transaction and/or trading screen combined with a data socket rendering browser or application such as 100, 400, 1200, 1300, 5100, 5200, 5300, 5400, 5500, 5600, 5700, 5800, 5900, 6000, 6100, 6200, 6300, 6400, 6500, 6600, 6700 or 6800. In some embodiments the user may toggle between the GUI 210 market view screen in FIG. 51 and other menu 5105 options and settings by the user 110 selecting the "x" button 5106 or hamburger menu button 270 and the GUI 210 detecting the user 110 input or contact. In some embodiments, the user 110, may contact the "timings and specs" menu option 1413 which may instruct the GUI 210 to render a timings and specs screen such as 500. In some embodiments, the user 110, may contact the "term and specs" menu option 1414 which may instruct the GUI 210 to render a term and specs screen such as 600. In some embodiments, the user 110, may contact the "order time and type" menu option 1415 which may instruct the GUI 210 to render an order time and type screen such as 700. In some embodiments, the user 110, may contact the "modes" menu option 1416 which may instruct the GUI 210 to render a mode screen such as 800. In some embodiments, the user 110, may contact the "Virtual Hubs" menu option 1417 which may instruct the GUI 210 to render a virtual hubs screen such as 900. In some embodiments, the user 110, may contact the "no arb settings" menu option 1418 which may instruct the GUI 210 to render a no arbitrage constraint screen such as 1000. In some embodiments, the user 110, may contact the "orders and confirms" menu option 1419 which may instruct the GUI 210 to render the market orders and transaction confirmations for the user 110. In some embodiments, the user 110, may contact the "pool message" menu option 1420 which may instruct the GUI 210 to message either the actual advertising community linked advertising attribute specification capacity unit 241 or the opposite seller user 110 or buyer user 110 depending on if the user 110 was an opposite buyer or seller of the advertising community linked advertising attribute specification capacity unit. In some embodiments, the user 110, may contact the "tax and accounting" menu option 1421 which may instruct the GUI 210 to render tax and accounting information for the respective user 110. In some embodiments the GUI 210 menu option selection 1410 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my route virtual hub processor 218, application processor 219, server 220, sequence route processor 221, and memory which all interface together to make one system which may deliver advertising community linked advertising attribute specification or advertising capacity units to users 110 from and to a plurality of virtual hubs 245, 253 with a plurality of specifications at specific market prices.

Figure 15:
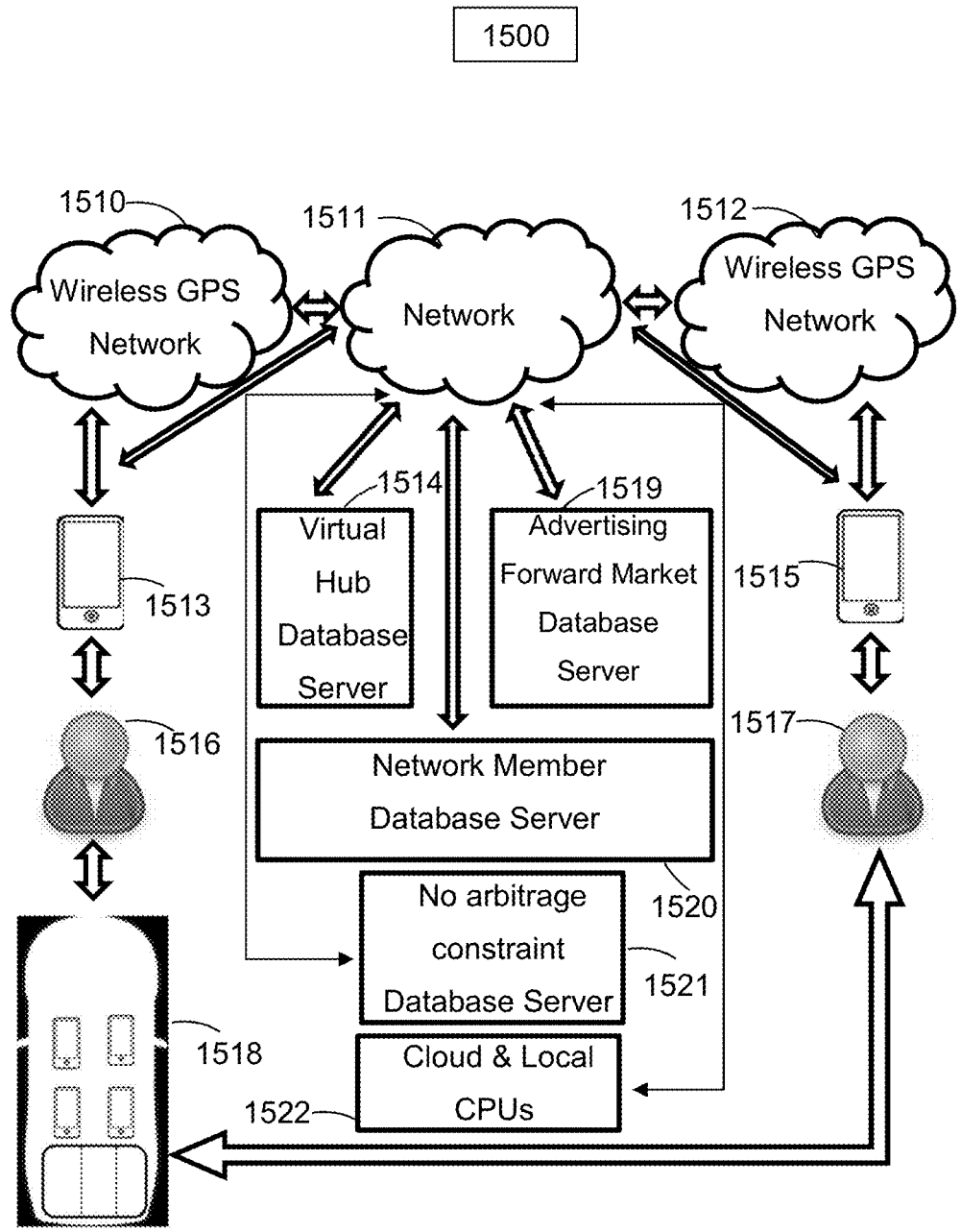
FIG. 15 illustrates a schematic diagram of a network configuration and implementations of methods which support the method and system of trading advertising attribute specification community linked advertising attribute specification capacity with associated price-time priority queues in accordance with some embodiments.

FIG. 15 illustrates an exemplary network configuration 1500 in one exemplary implementation of participating, transacting and/or trading transformed advertising community linked advertising attribute specification or advertising capacity units or securities in accordance with some embodiments. In some embodiments, network configuration 1500 includes the following elements, or a subset or superset thereof:
  wireless global positioning system (GPS) network 1510;
  network/s 1511;
  additional global positioning system (GPS) network 1512;
  user member portable multifunction device 1513;
  virtual hub database server 1514;
  advertising community linked advertising attribute specification forward market database server 1519;
  additional user member portable multifunction device 1515;
  network member database server 1520;
  network member user 1516;
  additional network member user 1517;
  no arbitrage constraint database server 1521;
  cloud and Local CPUs 1522;
  advertising community linked advertising attribute specification or advertising capacity unit mode 1518.

In some embodiments, the software and/or instructions stored in memory of the cloud & local CPUs 1522 and portable multifunction devices 1513, 1515 may include additional instructions to instantiate specification requirements, participation, transactions, and/or trading on the advertising community linked advertising attribute specification or advertising capacity unit network 1511. In some embodiments, instructions may include standard database web services with the database as service provider (i.e. calling from the outside in, which lets the client GUI 210 or 1513 call each of the advertising community linked virtual hub database server 1514 and/or advertising community linked advertising attribute specification forward market database server 1519 and/or network member database server 1520 and/or no arbitrage constraint database server 1521 and/or cloud & local CPUs 1522 through the wireless GPS network 1510 or network 1511. In some embodiments, each of the advertising community linked virtual hub database server 1514 and/or advertising community linked advertising attribute specification forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the advertising community linked advertising attribute specification or advertising capacity unit market GUI 210 so that the users 1516 and/or 1517 may participate, transact and/or trade advertising community linked advertising attribute specification or advertising capacity units. In some embodiments, the virtual hub database server 1514 stores map tile data in addition to user location data which is utilized by the GUI 210 to display or render location of virtual hubs and user 1516 proximity to those virtual hubs 245, 253. In some embodiments, the advertising community linked advertising attribute specification forward market database server 1519 stores bid and offer data for respective quantities of users as well as transaction data and a plurality of market data for each advertising community attribute specification linked virtual hub combination. In some embodiments, the network member database server 1520 stores user profile, user transaction, user trade, user settings, user specifications, user rating, user search histories, user application histories, user preferences, user dietary choices, user work out preferences, user medical records and user biometric laboratory results, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 may interface through the network 1511 and/or wireless GPS networks 1510, 1512 such that advertising community linked advertising attribute specification or advertising capacity units may be participated in, transacted and/or traded efficiently in the context of a market for advertising attribute specification capacity units or securities. Included aforementioned data elements may be a subset or superset of data used for any specific calculation or transformation to participate, transact or trade advertising community linked advertising attribute specification or advertising capacity units or securities.

Figure 16:
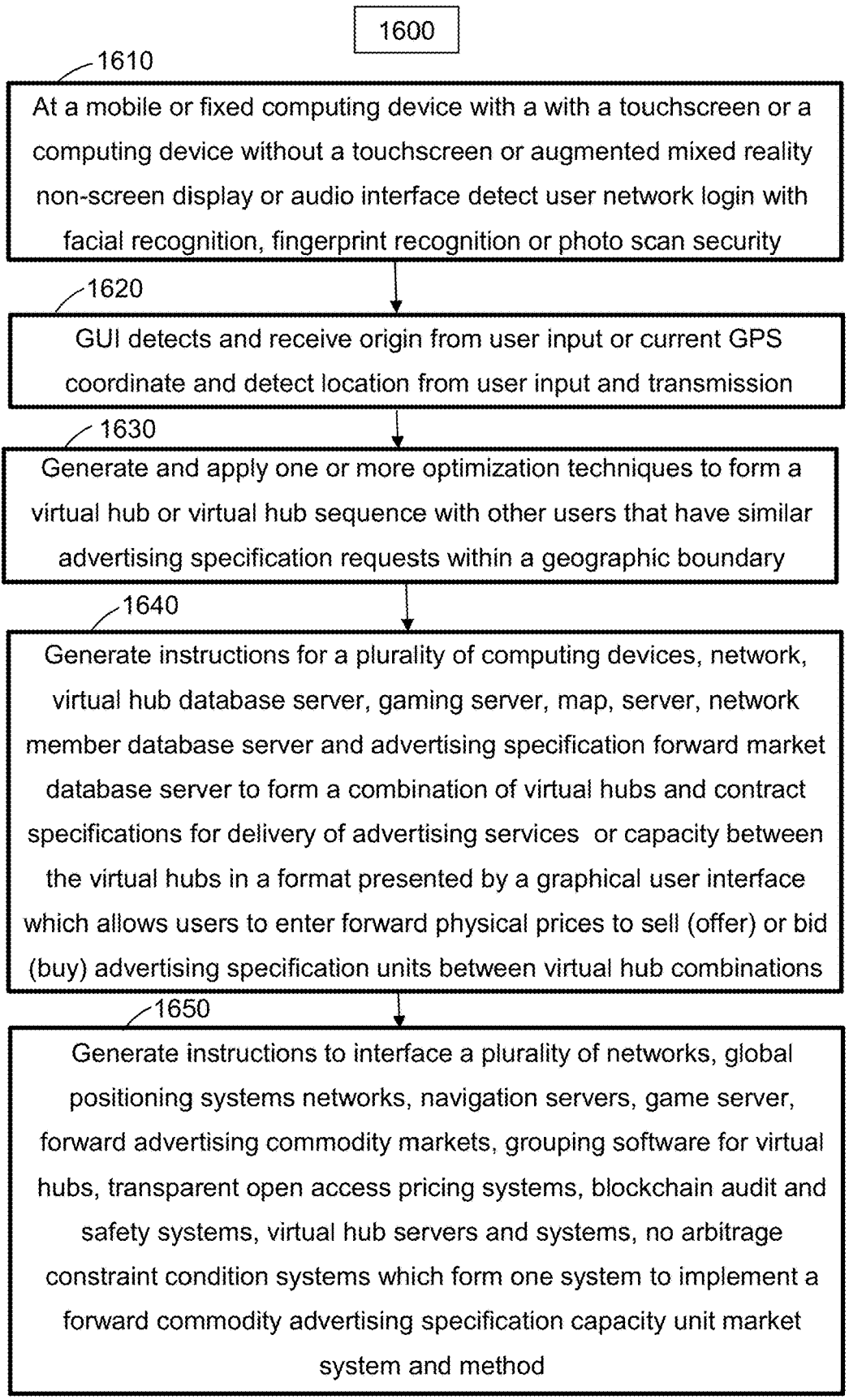
FIG. 16 is a flow diagram illustrating methods exemplary users move through while participating, transacting and trading advertising attribute specification community linked advertising attribute specification capacity with associated price-time priority queues in accordance with some embodiments.

FIG. 16 illustrates a flowchart embodiment of steps a user may perform to participate, transact and/or trade transformed advertising community linked advertising attribute specification capacity units or securities between virtual hub combinations. In some embodiments a user at a mobile or portable multifunction device and/or fixed computing device with a touchscreen or a computing device without a touchscreen or augmented, audio interface computing device, mixed reality non-screen display may detect user login to the advertising community linked advertising attribute specification capacity unit network 1610. In some embodiments, the GUI of the advertising attribute specification capacity unit network may detect and receive origin location from user input or current GPS coordinate information and detect destination address from user input and transmission of data 1620. In some embodiments, the GUI and/or CPUs and/or databases may generate and apply one or more optimization techniques to form a advertising community linked virtual hub with other users that have similar advertising community linked advertising attribute specification requests within a geographic boundary 1630. In some embodiments, the GUI and/or CPUs and or databases may generate instructions for a plurality of computing devices, network, virtual hub database server, network member database server and advertising community linked advertising attribute specification forward market database server 130 to form a combination of virtual hubs and transformed contract specifications for delivery of advertising community linked advertising attribute specification services or advertising attribute specification or advertising capacity between the virtual hubs in a format presented by a graphical user interface which allows users to enter forward physical prices to sell (offer) or bid (buy) advertising attribute specification capacity units or securities between virtual hub combinations 1640 in an open market auction format with an associated price-time priority queue. In some embodiments, the GUI and/or CPUs and or databases may generate instructions to interface a plurality of networks, global positioning systems networks, servers, forward commodity advertising market auctions, map routing servers, grouping instruction software for virtual hubs, navigation servers, transparent open access pricing systems, game servers, blockchain audit and safety systems, virtual hub servers and systems, no arbitrage constraint condition systems which form one system to implement a forward commodity advertising attribute specification or advertising capacity unit forward market system and method 1650.

Figure 17:
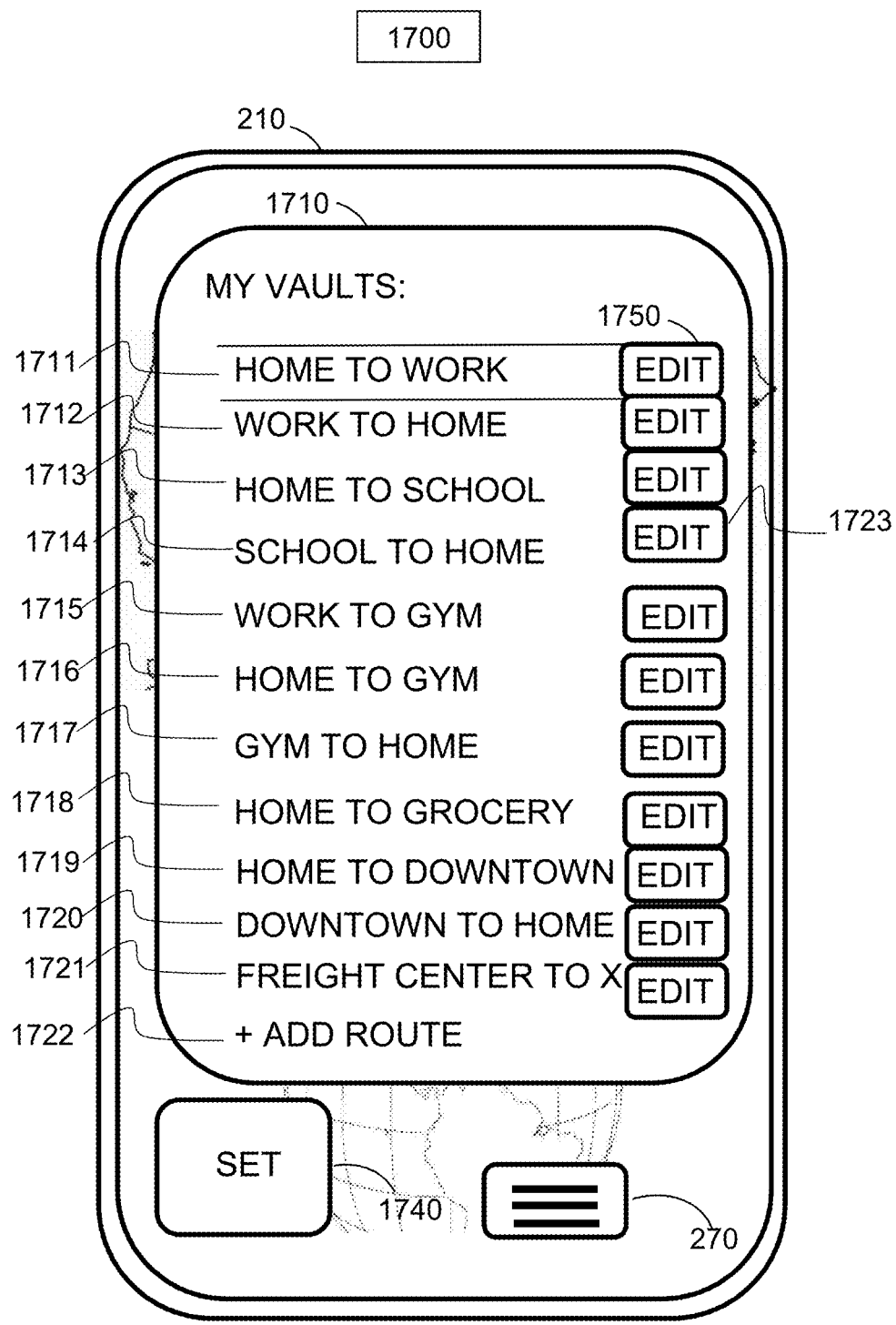
FIG. 17 illustrates an exemplary user interface for displaying most frequent routes or a single location user data vault in accordance with some embodiments.

FIG. 17 illustrates an exemplary embodiment of a user 110 most frequent advertising attribute specification or advertising unit routes 1710 in one exemplary implementation of participating, transacting and/or trading advertising community linked advertising attribute specification or advertising capacity units in accordance with some embodiments. In some embodiments, most frequent my routes include the following elements, or a subset or superset thereof:

Home to Work 1711 (may have subsets of transformed data);
Work to Home 1712 (may have subsets of transformed data);
Home to School 1713 (may have subsets of transformed data);
School to Home 1714 (may have subsets of transformed data);
Work to Gym 1715 (may have subsets of transformed data);
Home to Gym 1716 (may have subsets of transformed data);
Gym to Home 1717 (may have subsets of transformed data);
Home to Grocery 1718 (may have subsets of transformed data);
Home to Downtown 1719 (may have subsets of transformed data);
Downtown to Home 1720 (may have subsets of transformed data);
Advertising Center to X where X is a delivery route or multi virtual hub combination 1721 (may have subsets of transformed data);
+Add Route 1722 (may have subsets of transformed data);
Edit 1723 (may have subsets of transformed data);
Setting button 1740 to transmit the My Routes data;
Hamburger button 270 to instruct the GUI 210 to take the user 110 to the menu screen.

In some embodiments, the GUI 210 may be used to select, store and/or edit user 110 frequent or preferred routes ("MY ROUTES") 1710 for more efficient access to advertising community linked advertising attribute specification capacity unit markets over various modes and specifications of advertising attribute specification capacity. In some embodiments, the user 110 may select, store and/or edit address and specification data for "Home to Work" 1711 and/or "Work to Home" 1712 and/or "Home to School" 1713 and/or "School to Home" 1714 and/or "Work to Gym" 1715 and/or "Home to Gym" 1716 and/or "Gym to Home" 1717 and/or "Home to Grocery" 1718 and/or "Home to Downtown" 1719 and/or "Downtown to Home" 1720 and/or "Advertising Center to X" 1721 and/or "+Add Route" 1722. In some embodiments, the My Routes 1710 module may include any route a user 110 may request on any advertising community linked advertising attribute specification or advertising capacity unit mode and/or specification. In some embodiments the user may toggle between the GUI 210 market view screen in FIG. 51 and other menu 5100 options and settings by the user 110 selecting the "x" button 5106 and the GUI 210 detecting the user 110 input or contact. In some embodiments, the user 110 is notified via SMS text, in application, email or a plurality of other well-known communication methods when market activity occurs on a given route or virtual hub combination. In other words, the "my routes" 1710 feature not only allows for one touch access to a saved route, but also performs notification features between users. Lastly, in some embodiments, the EDIT 1750 button allows a user 110 to modify a plurality of notification settings such as email, SMS text, in application, voice, messaging or other notification methods.

Figure 18:
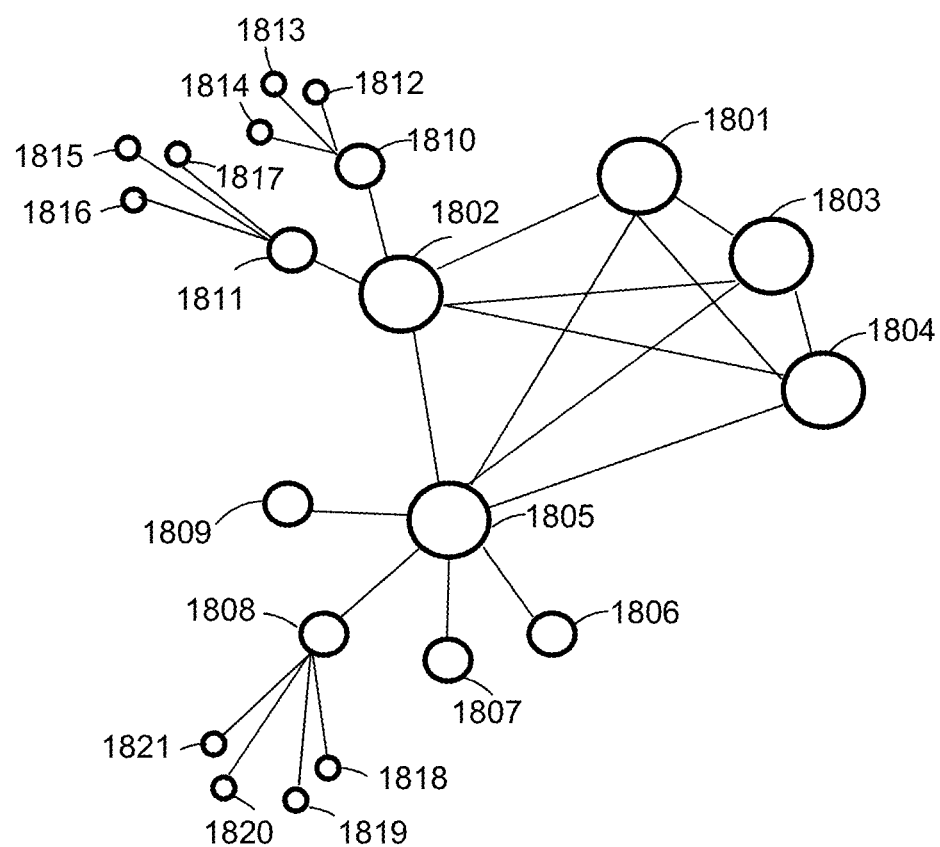
FIG. 18 illustrates an exemplary network topology of a advertising attribute specification community linked virtual hub combination or series of multiple advertising attribute specification community linked virtual hub combinations for use in the market auction platform for forward advertising attribute specification community linked advertising attribute specification capacity with associated price-time priority queues method in accordance with some embodiments.

FIG. 18 illustrates an exemplary network topology configuration 1800 in one exemplary implementation of participating, transacting and/or trading transformed advertising community linked advertising attribute specification or advertising capacity units or securities in accordance with some embodiments. In some embodiments, network configuration 1800 includes the following elements, or a subset or superset thereof:

large advertising community linked Virtual Hub nodes such as 1801, 1802, 1803, 1804, 1805;

medium advertising community linked Virtual Hub nodes such as 1810, 1811, 1809, 1808, 1807, 1806;

small advertising community linked Virtual Hub nodes such as 1812, 1813, 1814, 1815, 1816, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual hub locations in a city, multiple cities or even countries or multiple countries. In some embodiments, advertising community linked forward advertising attribute specification market price-time priority queue auctions may occur directly between two exemplary points such as 1815 and 1818 or the method and system may combine a series of smaller auctions to comprise a larger price-time priority queue auction between two endpoints on the system. In some embodiments, a series of smaller price-time priority queue auctions may be combined between 1815 and 1811 as well as 1811 and 1802 as well as 1802 and 1805 as well as 1805 and 1808 as well as 1808 and 1818 which would be added together to make a combined advertising community linked virtual hub price-time priority queue auction. A combined series of smaller auctions may be constrained by instructions which form auctions based on cheapest advertising community linked advertising attribute specification or advertising route 1011, single mode advertising community linked transport or advertising auctions 1012, multi-mode transport or advertising 1013, fastest transport or advertising constraints 1014, most scenic auctions 1015, highest rating auctions 1016, most available or liquid auctions 1017, highest volume advertising community linked auctions 1018, most frequent advertising community linked auctions 1019, service level advertising community linked auctions 1020, security and safety level advertising community linked auctions 1021, group restricted auctions by sex, email, organization, gender or other 1022. In some embodiments, the constraints allow for many types of auctions which are unique and novel for advertising community linked transformed advertising attribute specification and advertising capacity units or securities in a forward advertising attribute specification and advertising market. In some embodiments, the user 110 may specify instructions that set advertising community linked forward market price-time priority queue auction constraints based on one or a plurality of constraints. In some embodiments, the constrained auctions may have fungible units which allow many participants to transact in the auctions. In some embodiments, the disclosed creation of an advertising community linked forward market of advertising attribute specification units between virtual hubs 1801 and 1804 or other combinations along map routes has the attributes of a fungible forward contract which allows for one advertising community linked advertising attribute specification unit to be substitutable for another advertising attribute specification unit because the unit has been transformed and defined as a commodity contract. In other words, if user A bought an advertising community linked advertising attribute specification unit from user B between 1801 virtual hub and 1804 virtual hub, but then user A was not able to perform the obligation to purchase the advertising community linked advertising attribute specification unit between 1801 advertising community linked virtual hub and 1804 advertising community linked virtual hub from user B, user A could resell the advertising community linked advertising attribute specification unit contract between advertising community linked virtual hub 1801 and advertising community linked virtual hub 1804 to a third party user C on the advertising community linked forward advertising attribute specification unit auction market between virtual hub 1804 and advertising community linked virtual hub 1801 to retrieve the financial payment made for their original purchase from user B and then user C would replace user A and be matched with user B for the advertising community linked advertising attribute specification unit transformation between advertising community linked virtual hub 1804 and advertising community linked virtual hub 1801. No other prior art system or method performs the aforementioned data transformation combination. In some embodiments, the advertising community linked advertising attribute specification or advertising unit auction substitutability dynamic creates a unique and novel invention that does not exist in the world today. In some embodiments, user 110 input 220, 230 instructions use constrained optimization to form one auction between two points or a series of multiple auctions that form one larger auction with price-time priority queues.

In some embodiments, the forward advertising community linked advertising attribute specification and advertising unit auctions subject to various constraints may be presented as a linear programming cost minimization problem in the exemplary case where the user 110 selects the cheapest route 1011 constraint. In such exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost auction path. In another such exemplary case, the user 110 may select instructions for the auction to minimize both cost and shortest route. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize cost subject to the shortest path that yields a path of 1815 to 1811 to 1802 to 1805 to 1808 to 1818. The plurality of combinations of linear programming sequences of auctions for advertising community linked advertising attribute specification or advertising units between two points may consider an infinite set of combinations and permutations.

In some embodiments, the forward transformed advertising community linked advertising attribute specification and advertising unit or transformed advertising community linked advertising attribute specification security unit auctions may be held side by side between two competing routes 4200. By way of example but not limiting by example a user may input instructions for the method and system to route between 1801 advertising community linked virtual hub and 1805 advertising community linked virtual hub. One route may be directly between 1801 advertising community linked virtual hub and 1805 advertising community linked virtual hub. Another route may be between advertising community linked virtual hub 1801 and advertising community linked virtual hub 1805 by way of advertising community linked virtual hub 1802. The time between the routes may vary due to traffic, construction, road conditions, accidents or a plurality of other exogenous factors, however, the data transformation of the disclosed method allows for two price-time priority queue auctions to form side by side. Side by side price-time priority auctions may be displayed on a market-based user interface 1300 or as a software layer of instructions over a navigation system 4200. The first advertising community linked advertising attribute specification unit price-time priority queue auction may be between advertising community linked virtual hub 1805 and advertising community linked virtual hub 1801 directly as one auction. A second auction may be by combining two smaller price-time priority queue auctions between advertising community linked virtual hub 1805 and advertising community linked virtual hub 1802 with the auction between 1802 advertising community linked virtual hub and 1801 advertising community linked virtual hub which could be expressed independently or as a combined auction. The plurality of route auctions for the advertising attribute specification unit (auction one directly between 1801 virtual hub and 1805 virtual hub) (auction two between 1801 advertising community linked virtual hub and 1805 advertising community linked virtual hub by way of 1802 advertising community linked virtual hub) may allow for the user to have transparent price auction information for the value of various proposed routes which have different price values.

Figure 19:
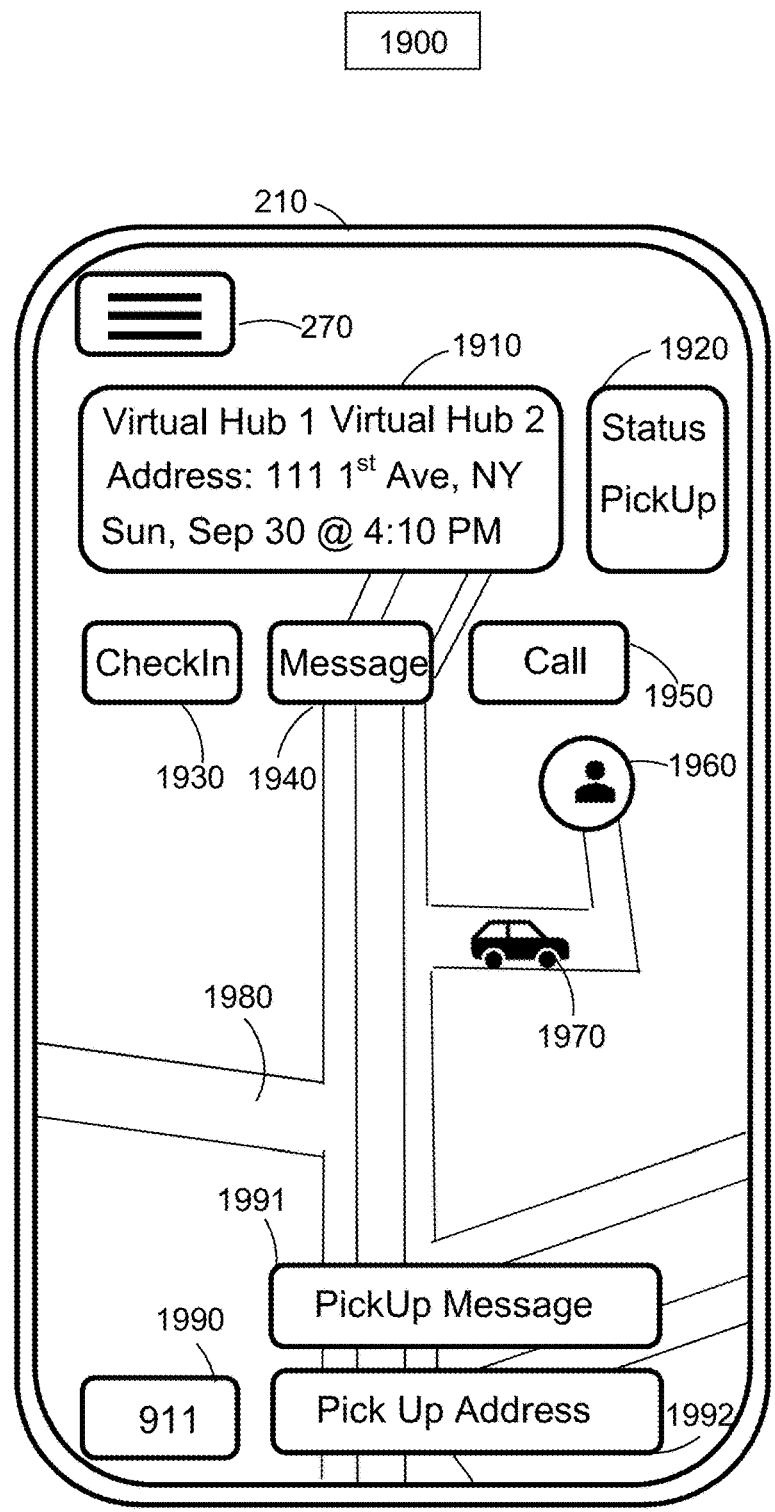
FIG. 19 illustrates an exemplary user interface to display the map of the advertising attribute specification community linked virtual hub to virtual hub route of a given transaction for advertising attribute specification community linked forward advertising attribute specification capacity with associated price-time priority queues units in accordance with some embodiments.

FIG. 19 illustrates an exemplary delivery and pick up status configuration 1900 in one exemplary implementation of participating, transacting and/or trading transformed advertising community linked advertising attribute specification or advertising capacity units or securities in accordance with some embodiments. In some embodiments, the delivery and pick up status configuration 1900 includes the following elements, or a subset or superset thereof:

computing device unit GUI 210 to display method of multi layered network node topology for forward market of advertising community linked advertising attribute specification and advertising units.

hamburger menu toggle 270 or "x" menu toggle 5106 to move between different application configurations;

advertising community linked virtual hub 1 pickup address and advertising community linked virtual hub 2 destination address at a contract specification with regards to quality, day, date and time 1910;

trip status for PickUp of advertising community linked advertising attribute specification or advertising unit 1920;

checkIn passenger or advertising status for advertising community linked advertising attribute specification unit 1930;

messaging texts and instructions between users to make pick up and delivery of advertising community linked advertising attribute specification or advertising capacity units 1940;

call between users with number masking for privacy security 1950;

GPS map location of user 110 who is a rider or if advertising cargo location 1960;

GPS map location of user 110 who is a driver or if advertising community linked advertising, cargo carrier advertising community linked unit location 1970;

GPS map of advertising community linked advertising attribute specification or advertising unit delivery and pickup 1980;

texting message window for advertising or advertising community linked advertising attribute specification unit communication between users 1991;

PickUp address data window during PickUp status 1992;

security button to report security issues to 911 and system database 1990;

In some embodiments, the GUI 210 transmits delivery instructions to the users 110 to help the user have a rendering or map of their GPS location 1960 relative to the selling user 1970 of advertising or advertising community linked advertising attribute specification units. In some embodiments, the GUI 210 displays the trips status such as PickUp 1920 status, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or advertising community linked advertising transformed advertising attribute specification unit has been moved into the transformed advertising community linked advertising attribute specification unit object which could be a home, business, apartment, car, airplane, autonomous vehicle, bike, boat, ship, bus, drone, limo, motorcycle, moped, shuttle, spaceship, subway, taxi, train, cargo, home, work, traveling or combination of transformed modes or other type of advertising attribute specification mode. In some embodiments, the user 110 may transmit a message using the message 1940 button which may transmit audio, visual or text messages between users 110, 1970, 1960. In some embodiments, the users 110, 1960, 1970 may call each other using the call 1950 button to communicate pickup or delivery instructions. In some embodiments, a user 110, 1960, 1970 may message another user 110, 1960, 1970 to communicate using the PickUp Message window 1991 which may utilize visual, audio or text communication modes as well as log a message history between users. In some embodiments the users 110, 1960, 1970 may toggle to other modes of the application using the menu hamburger button 270. In some embodiments the GPS display of a map with the relative position of an advertising community linked advertising attribute specification or advertising unit seller 1970 and a advertising attribute specification or advertising unit buyer 1960 are displayed to help users 110 understand each others relative position and location on a map 1980. In some embodiments the GPS location of the advertising community linked advertising attribute specification and advertising unit seller 1970 and advertising attribute specification or advertising unit buyer 1960 are tracked in real time with location updates on the map 1980.

Figure 20:
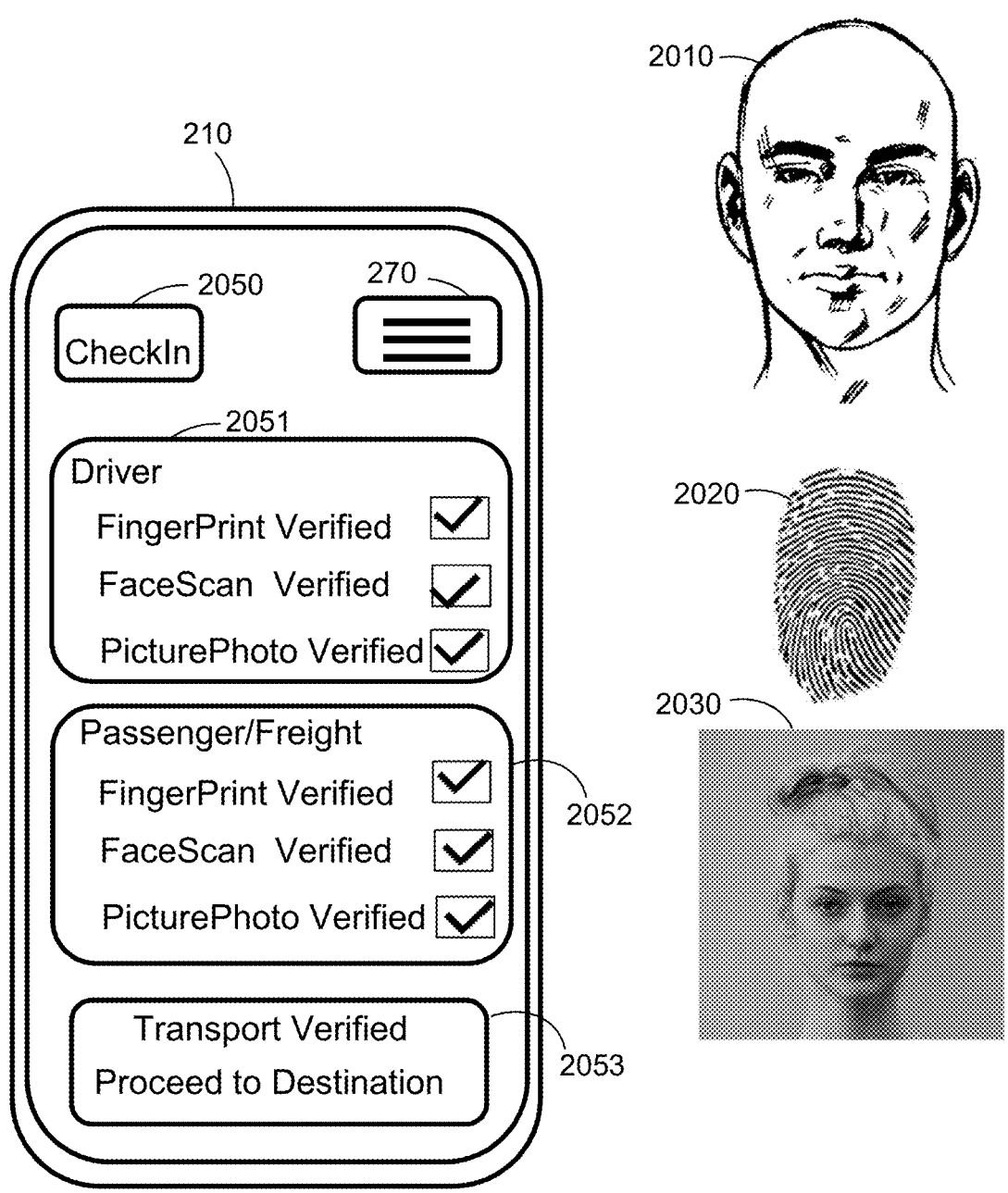
FIG. 20 illustrates an exemplary user interface to display the results of a security check and verification of users identity for advertising attribute specification community linked forward advertising attribute specification capacity units with associated price-time priority queues in accordance with some embodiments.

FIG. 20 illustrates an exemplary CheckIn configuration 2000 in one exemplary implementation of participating, transacting and/or trading advertising community linked advertising attribute specification or advertising capacity units in accordance with some embodiments. In some embodiments, the CheckIn 2050 for a buyer or seller of a advertising community linked advertising attribute specification or advertising unit includes the following elements, or a subset or superset thereof:

computing device unit GUI 210 to display method of multi layered network node topology for forward market of advertising community linked advertising attribute specification and advertising units with security CheckIn;

hamburger menu toggle 270 to move between different application configurations;

driver or seller of advertising community linked advertising attribute specification or advertising unit scan check for finger print, face scan or picture photo scan to verify identity of user 2051;

passenger or advertising and advertising community linked advertising attribute specification unit buyer unit scan check for finger print, face scan or picture photo scan to verify identity of user 2052;

transport verification confirmation window to confirm identities of users in the system at the application system level 2053;

buyer and seller of advertising community linked advertising attribute specification or advertising unit facial recognition confirmation 2010;

buyer and seller of advertising community linked advertising attribute specification or advertising unit finger print recognition confirmation 2020;

buyer and seller of advertising community linked advertising attribute specification or advertising unit photo recognition confirmation 2030;

In some embodiments, the GUI 210 of a computing device transmits and confirms the identity of users against identity records in the Network Member Database Server 160 which also confirms security checks for criminal records or other activity that would suspend a user from the platform environment. In some embodiments, the driver verification window 2051 may fail an identity verification due to a user not being the registered user 2010 on the Network 160. In some embodiments, the passenger or advertising verification window 2052 may fail an identity verification due to a user 2010 not being the registered user on the network 160. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique price-time priority queue auction forward market for transformed advertising community linked advertising attribute specification unit or advertising unit or securities over multiple nodes or virtual hubs topologies.

Figure 21:
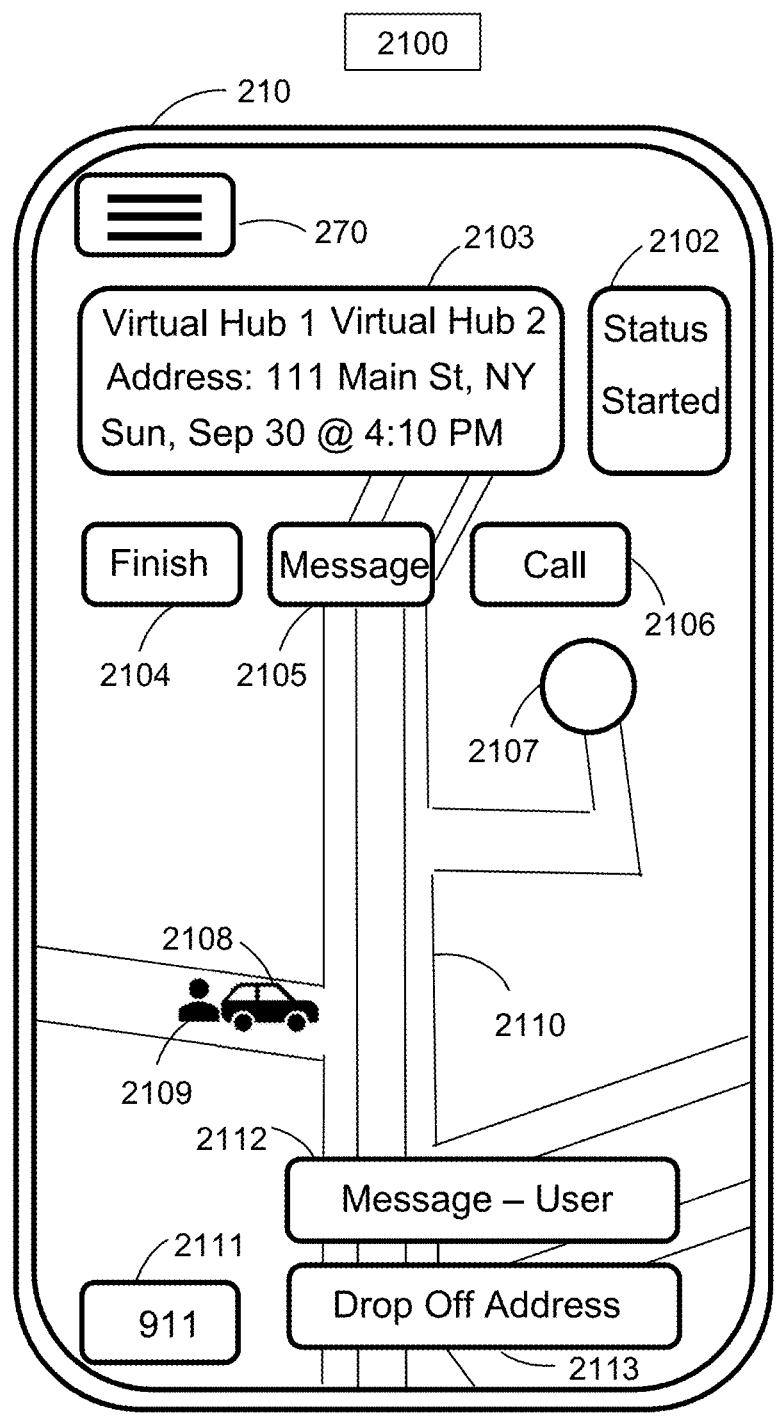
FIG. 21 illustrates an exemplary user interface to display the geolocation status of the advertising attribute specification community linked virtual hub to virtual hub route of a given transaction for advertising attribute specification community linked forward advertising attribute specification capacity units with associated price-time priority queues in accordance with some embodiments.

FIG. 21 illustrates an exemplary delivery and pick up status configuration 2100 once an advertising community linked advertising attribute specification or advertising unit delivery has started in one exemplary implementation of participating, transacting and/or trading advertising community linked advertising attribute specification or advertising capacity units in accordance with some embodiments. In some embodiments, the delivery and pick up status configuration 2100 includes the following elements, or a subset or superset thereof:

computing device unit GUI 210 to display method of multi layered network node topology for advertising community linked forward market of advertising attribute specification and advertising units;

hamburger menu toggle 270 to move between different application configurations;

advertising community linked virtual Hub 1 pickup address and advertising community linked Virtual Hub 2 destination address at a transformed contract specification with regards to quality, day, date and time 2103 of delivery of an advertising attribute specification or advertising unit;

trip status of started of advertising community linked advertising attribute specification or advertising unit or security 2102;

finish trip passenger or advertising status for advertising community linked advertising attribute specification unit 2104 once an advertising community linked advertising attribute specification or advertising unit has been delivered;

messaging texts and instructions between users to make pick-up, on-going route status and delivery complete of advertising community linked advertising attribute specification or advertising capacity units 2105;

call between system users with number masking for privacy security 2106;

GPS map location of user 2109 who is a rider or if advertising community linked advertising, cargo location 2109;

GPS map location of user 2108 who is a driver or if advertising community linked advertising, cargo carrier unit location 2108;

GPS map of advertising attribute specification or advertising unit delivery and pickup 2110;

texting message window for advertising or advertising community linked advertising attribute specification unit communication between users 2112;

starting point of virtual hub for forward advertising community linked advertising attribute specification or advertising units 2107;

security button to report security issues to 911 and system database 2111;

drop off address for delivery of passenger or advertising for advertising attribute specification or advertising unit 2111.

In some embodiments, the GUI 210 transmits delivery instructions to the users 110 to help the user have a rendering or map of their GPS location 2109 relative to the selling user 2108 of transformed advertising community linked advertising or advertising attribute specification units or securities. In some embodiments, the GUI 210 displays the trips status such as Started 2102 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2104 button to confirm a passenger or advertising community linked advertising advertising attribute specification unit has been delivered or completed by the advertising community linked advertising attribute specification unit object which could be a car, airplane, autonomous vehicle, bike, boat, ship, bus, drone, limo, motorcycle, moped, shuttle, spaceship, subway, taxi, train, cargo, home, work, travel, leisure, sleep or other types of advertising attribute specification modes. In some embodiments, the user 110 may transmit a message using the message 2105 button which may transmit audio, visual or text messages between users 110, 2109, 2108. In some embodiments, the users 110, 2109, 2109 may call each other using the call 2106 button to communicate pickup or delivery instructions or other necessary communication. In some embodiments, a user 110, 2109, 2108 may message another user 110, 2109, 2108 to communicate using the Message—User window 2112 which may utilize visual, audio or text communication modes as well as log a message history between users. In some embodiments the users 110, 2109, 2108 may toggle to other modes of the application using the menu hamburger button 270. In some embodiments the GPS display of a map with the relative position of a transformed advertising community linked advertising attribute specification or advertising unit or security seller 2108 and a transformed advertising community linked advertising attribute specification or advertising unit or security buyer 2109 are displayed to help users 110 understand each others relative position and location on a map 2110. In some embodiments the GPS location of the advertising community linked advertising attribute specification and advertising unit seller 2108 and advertising community linked advertising attribute specification or advertising unit buyer 2109 are tracked in real time with location updates on the map 2110.

Figure 22:
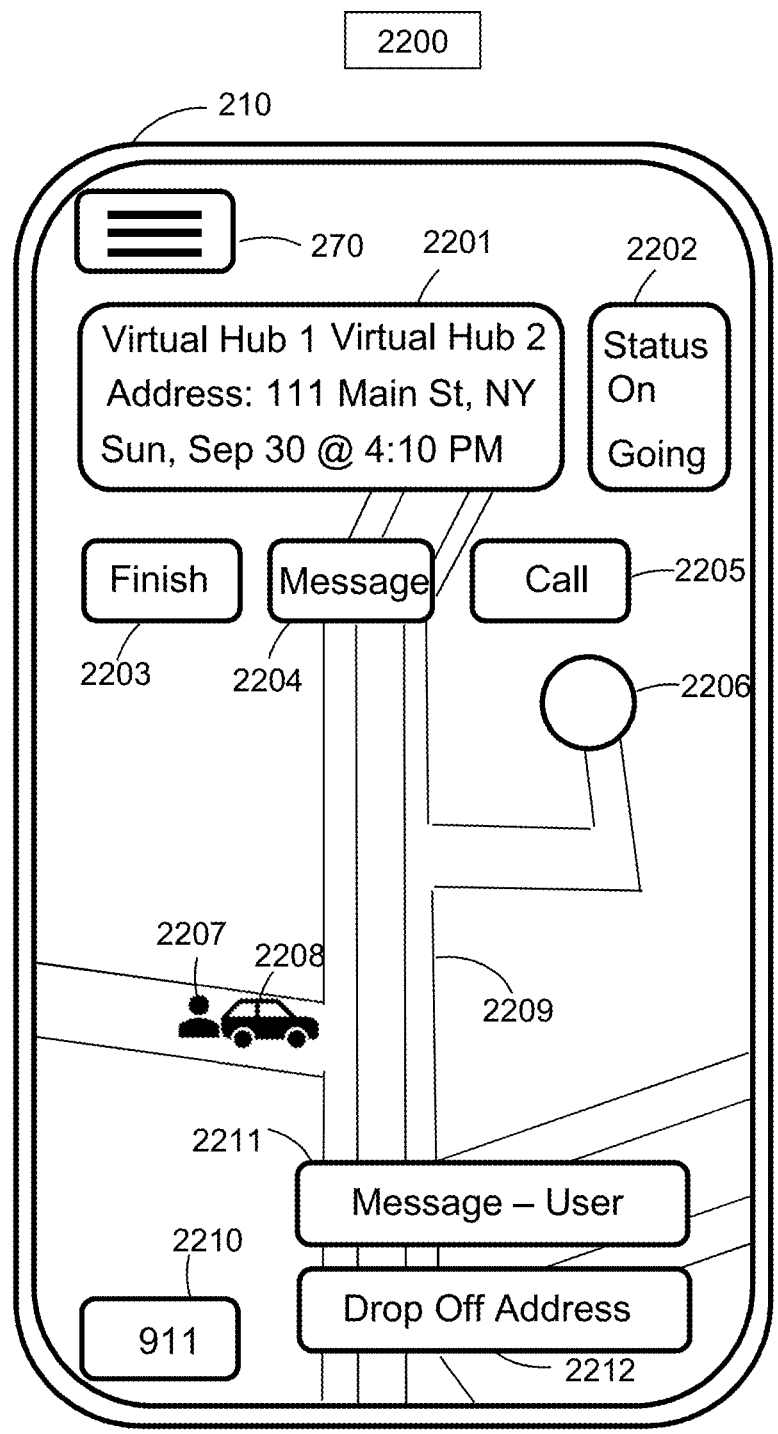
FIG. 22 illustrates an exemplary user interface to display the geolocation status of the advertising attribute specification community linked virtual hub to virtual hub route of a given transaction for advertising attribute specification community linked forward advertising attribute specification capacity units with associated price-time priority queues in accordance with some embodiments.

FIG. 22 illustrates an exemplary delivery and pick up status configuration 2200 once an advertising attribute specification or advertising unit delivery is ongoing in one exemplary implementation of participating, transacting and/or trading transformed advertising community linked advertising attribute specification or advertising capacity units or securities in accordance with some embodiments. In some embodiments, the delivery and pick up status configuration 2200 includes the following elements, or a subset or superset thereof:

computing device unit GUI 210 to display method of multi layered network node topology for forward market of advertising community linked advertising attribute specification and advertising units;

hamburger menu toggle 270 to move between different application configurations;

advertising community linked virtual Hub 1 pickup address and advertising community linked virtual Hub 2 destination address at a contract specification with regards to quality, day, date and time 2201 of delivery of an advertising community linked advertising attribute specification or advertising unit;

trip status of ongoing for advertising community linked advertising attribute specification or advertising unit 2202;

finish trip passenger or advertising status button for advertising community linked advertising attribute specification unit 2203 once an advertising community linked advertising attribute specification or advertising unit has been delivered;

messaging texts and instructions between users to make pick-up, on-going route status and delivery complete of advertising community linked advertising attribute specification or advertising capacity units 2204;

call between system users with number masking for privacy security 2205;

GPS map location of user 2209 who is a rider or if advertising community linked advertising, cargo location 2209;

GPS map location of user 2208 who is a driver or if advertising community linked advertising, cargo carrier unit location 2207;

GPS map of advertising community linked advertising attribute specification or advertising unit delivery and pickup 2206;

texting message window for advertising community linked advertising or advertising attribute specification unit communication between users 2211;

starting point of virtual hub for forward advertising community linked advertising attribute specification or advertising units 2206;

security button to report and record security issues to 911 and system database 2210;

drop off address for delivery of passenger or advertising community linked advertising for advertising attribute specification or advertising unit 2212.

In some embodiments, the GUI 210 transmits delivery instructions to the users 110 to help the user 110 have a rendering or map of their GPS location 2207 relative to the selling user 2208 of advertising community linked advertising or advertising attribute specification units. In some embodiments, the GUI 210 displays the trips status such as On-Going 2202 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2203 button to confirm a passenger or advertising community linked advertising attribute specification unit or security has been delivered or completed by the advertising attribute specification unit object which could be a car, airplane, autonomous vehicle, bike, boat, ship, bus, drone, limo, motorcycle, moped, shuttle, spaceship, subway, taxi, train, cargo, home, work, gym, travel space or other types of advertising attribute specification modes. In some embodiments, the user 110 may transmit a message using the message 2204 button which may transmit audio, visual or text messages between users 110, 2207, 2208. In some embodiments, the users 110, 2207, 2208 may call each other using the call 2205 button to communicate pickup or delivery instructions or other necessary communication. In some embodiments, a user 110, 2207, 2208 may message another user 110, 2207, 2208 to communicate using the Message—User window 2211 which may utilize visual, audio or text communication modes as well as log a message history between users 110, 2207, 2208. In some embodiments the users 110, 2207, 2208 may toggle to other modes of the application using the menu hamburger button 270 or in some embodiments, the "X" menu option 5106. In some embodiments the GPS display of a map with the relative position of an advertising community linked advertising attribute specification or advertising unit seller 2208 and an advertising community linked advertising attribute specification or advertising unit buyer 2207 are displayed to help users 110 understand each others relative position and location on a map 2209. In some embodiments the GPS location of the advertising community linked advertising attribute specification and advertising unit seller 2208 and advertising community linked advertising attribute specification or advertising unit buyer 2207 are tracked in real time with location updates on the map 2209. In some embodiments, the GUI 210 may display the Drop Off Address 2212 of the advertising community linked advertising attribute specification or advertising unit.

Figure 23:
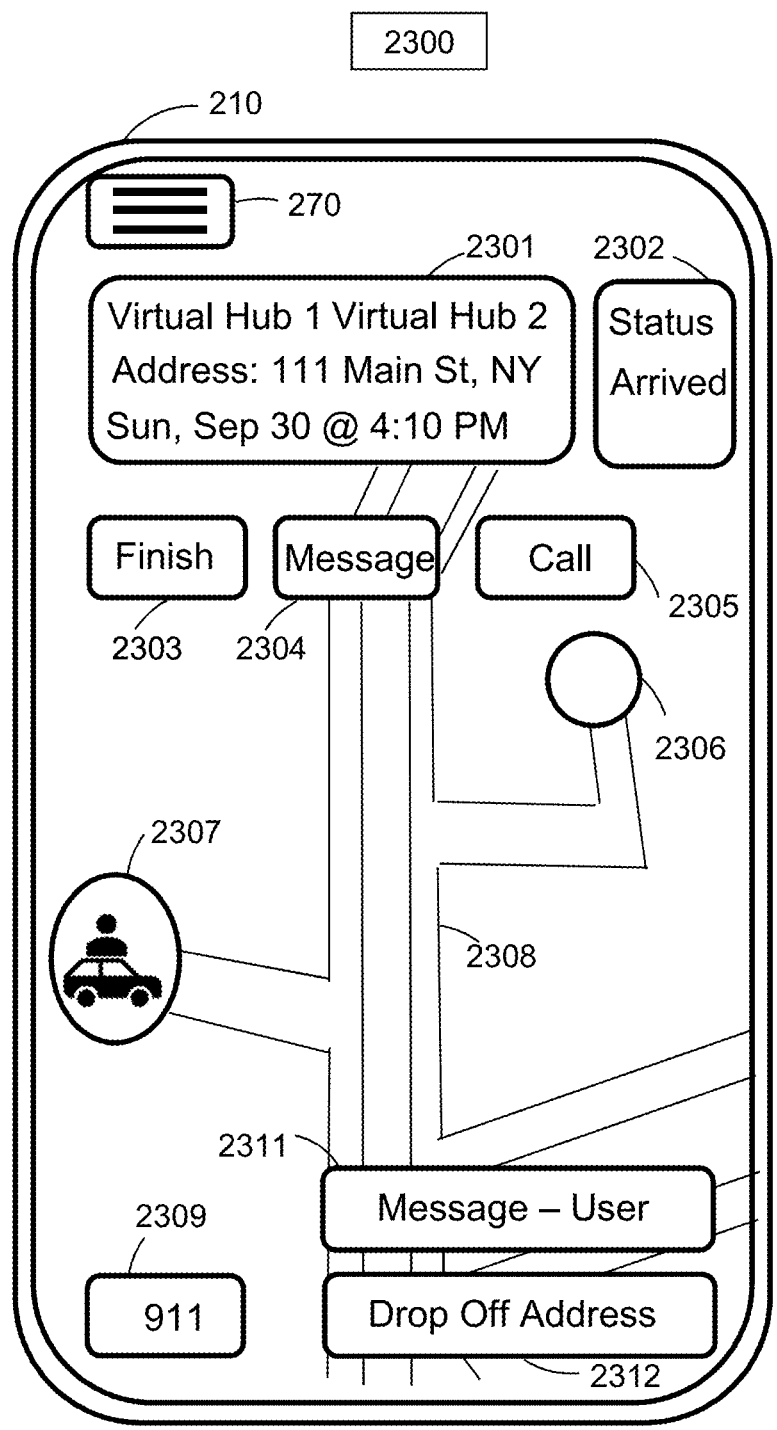
FIG. 23 illustrates an exemplary user interface to display the geolocation status of the advertising attribute specification community linked virtual hub to virtual hub route of a given transaction for advertising attribute specification community linked forward advertising attribute specification capacity units with associated price-time priority queues in accordance with some embodiments.

FIG. 23 illustrates an exemplary delivery and pick up status configuration 2300 once an advertising community linked advertising attribute specification or advertising unit delivery has arrived in one exemplary implementation of participating, transacting and/or trading advertising community linked advertising attribute specification or advertising capacity units in accordance with some embodiments. In some embodiments, the delivery and pick up status configuration 2300 includes the following elements, or a subset or superset thereof:

computing device unit GUI 210 to display method of multi layered network node topology for forward market of advertising community linked advertising attribute specification and advertising units;

hamburger menu toggle 270 to move between different application configurations;

advertising community linked virtual hub 1 pickup address and advertising community linked virtual hub 2 destination address at a contract specification with regards to quality, day, date and time 2301 of delivery of an advertising community linked advertising attribute specification or advertising unit;

trip status of arrived for advertising community linked advertising attribute specification or advertising unit 2302;

finish trip passenger or advertising status button for advertising community linked advertising attribute specification unit 2303 once an advertising community linked advertising attribute specification or advertising unit has been delivered;

messaging texts and instructions between users to make pick-up, on-going route status and delivery complete of advertising community linked advertising attribute specification or advertising capacity units 2304;

call between system users with number masking for privacy security 2305;

GPS map location of user 2307 who is a rider or if advertising, cargo location 2307;

GPS map location of user 2307 who is a driver or if advertising, cargo carrier unit location 2307;

GPS map of advertising community linked advertising attribute specification or advertising unit delivery and pickup 2308;

texting message window for advertising community linked advertising or advertising attribute specification unit communication between users 2311;

starting point of virtual hub for advertising community linked forward transformed advertising attribute specification or advertising units or securities 2306;

ending point of virtual hub for advertising community linked forward transformed advertising attribute specification units or advertising units or securities 2307;

security button to report and record security issues to 911 and system database 2309;

drop off address for delivery of advertising community linked advertising for advertising attribute specification or advertising unit 2312;

In some embodiments, the GUI 210 transmits delivery instructions to the users 110 to help the user 110 have a rendering or map of their GPS location 2307 relative to the selling user 2307 of advertising community linked advertising or advertising attribute specification units. In some embodiments, the GUI 210 displays the trips status such as "Arrived" 2302 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2303 button to confirm a advertising community linked advertising attribute specification unit has been delivered or completed by the advertising community linked advertising attribute specification unit object which could be a car, airplane, autonomous vehicle, bike, boat, ship, bus, drone, limo, motorcycle, moped, shuttle, spaceship, subway, taxi, train, cargo or other types of advertising attribute specification modes. In some embodiments, the user 110 may transmit a message using the message 2304 button which may transmit audio, visual or text messages between users 110, 2307. In some embodiments, the users 110, 2307 may call each other using the call 2305 button to communicate pickup or delivery instructions or other necessary communication. In some embodiments, a user 110, 2307 may message another user 110, 2307 to communicate using the Message—User window 2311 which may utilize visual, audio or text communication modes as well as log a message history between users 110, 2307. In some embodiments the users 110, 2307 may toggle to other modes of the application using the menu hamburger button 270. In some embodiments the GPS display of a map with the relative position of a advertising community linked advertising attribute specification or advertising unit seller 2307 and a advertising community linked advertising attribute specification or advertising unit buyer 2307 are displayed to help users 110 understand each others relative position and location on a map 2308. In some embodiments the GPS location of the advertising community linked advertising attribute specification and advertising unit seller 2307 and transformed advertising community linked advertising attribute specification or advertising unit or security buyer 2307 are tracked in real time with location updates on the map 2308. In some embodiments, the GUI 210 may display the Drop Off Address 2312 of the transformed advertising community linked advertising attribute specification or advertising unit or security. In some embodiments a user 110, 2307 may use a 911 button 2309 to submit a recording to the system servers and to authorities who are connected to the system if anything has occurred that may compromise the security of any user or advertising community linked advertising attribute specification unit.

FIG. 24 illustrates an exemplary delivery and pick up configuration 2400 for a advertising community linked advertising attribute specification or advertising unit multi layered network node topology in one exemplary implementation of participating, transacting and/or trading advertising community linked advertising attribute specification or advertising capacity units in accordance with some embodiments. In some embodiments, the multi layered network node topology of participating, transacting and/or trading advertising community linked advertising attribute specification or advertising capacity configuration 2400 includes the following elements, or a subset or superset thereof:

computing device unit GUI 210 to display method of multi layered network node topology for forward market of advertising community linked advertising attribute specification and advertising units;

hamburger menu toggle 270 to move between different application configurations;

from node starting point 2401 of a multi layered network node topology for forward market of advertising community linked advertising attribute specification and advertising units;

to or destination node ending point 2402 of a multi layered network node topology for forward market of advertising community linked advertising attribute specification and advertising units;

date module 2403 in GUI 210 of an auction for a multi layered network node topology for advertising community linked forward market of transformed advertising attribute specification and advertising units or securities;

time module 2404 in GUI 210 of pickup and delivery of an auction for a multi layered network node topology for advertising community linked forward market of advertising attribute specification and advertising units;

go button 2405 to form an auction for a multi layered network node topology for advertising community linked forward market of transformed advertising attribute specification and advertising units or securities;

My Routes button 2406 to quickly obtain common From 2401 or To 2402 points in a price-time priority auction for a multi layered network node topology for advertising community linked forward market of transformed advertising attribute specification and advertising units for a user on the system;

multi-hub network 2407, 2408, 2409, 2410 which may form a single dual node price-time priority auction 2407 to 2408 or 2407 to 2410 or any possible node combination or a multi-node auction series for a multi layered network node topology for advertising community linked forward market of advertising attribute specification and advertising units for a user on the system.

In some embodiments, the GUI 210 transmits a From node 2401 and To node 2402 with instructions to the users 110 with a specific date 2403 and time 2404 of a multi layered network node topology for forward market of transformed advertising community linked advertising attribute specification and advertising units for a user on the system to perform an auction by pressing the Go button 2405. The system may use a plurality of constraints such as but not limited by cheapest route 1011, single mode of advertising community linked advertising attribute specification 1012, multi method mode of advertising community linked advertising attribute specification 1013, fastest route 1014, most scenic route 1015, highest rated route or highest rated driver 1016, most available route 1017, highest volume route 1018, most frequent route 1019, service level route 1020, security and safety of route 1021, group restricted email or group criteria 1022 to use any two node points 2407, 2408, 2409, 2410 or any combination of points 2407, 2408, 2409, 2410. In some embodiments the system may use no constraint, one constraint or a plurality of constraints to allow the user 110 to participate, transact or trade in a multi layered network node topology for advertising community linked forward market of advertising attribute specification and advertising units in an auction. In some embodiments the price-time priority queue auction for advertising community linked forward market transformed advertising attribute specification or advertising units or securities may be comprised of an auction between only two points or a plurality of points subject to a plurality of constraints. In some embodiments the from or starting point or starting virtual hub may be 2407, but the system selects an auction between 2408 and 2409 rather than starting at 2407 because one or more constraints were selected to frame the price-time priority queue auction for advertising community linked forward market advertising attribute specification or advertising units. In some embodiments, an auction may be comprised of multiple modes of advertising community linked advertising attribute specification comprising a vehicle advertising community linked advertising attribute specification or advertising unit auction between 2407 and 2408 points, followed by an advertising community linked airplane advertising attribute specification or advertising unit auction between 2408 and 2409, followed by an advertising community linked video auction between 2410 and 2409 for advertising community linked advertising attribute specification or advertising units. In some embodiments the various plurality of auctions may be displayed as one price-time priority auction or a series of price-time priority auctions. In some embodiments, auctions for a multi layered network node topology for a advertising community linked forward market of advertising attribute specification and advertising units may consist of any subset or superset of the aforementioned possibilities including any constraints 1000 or any plurality of modes 800.

Figure 25:
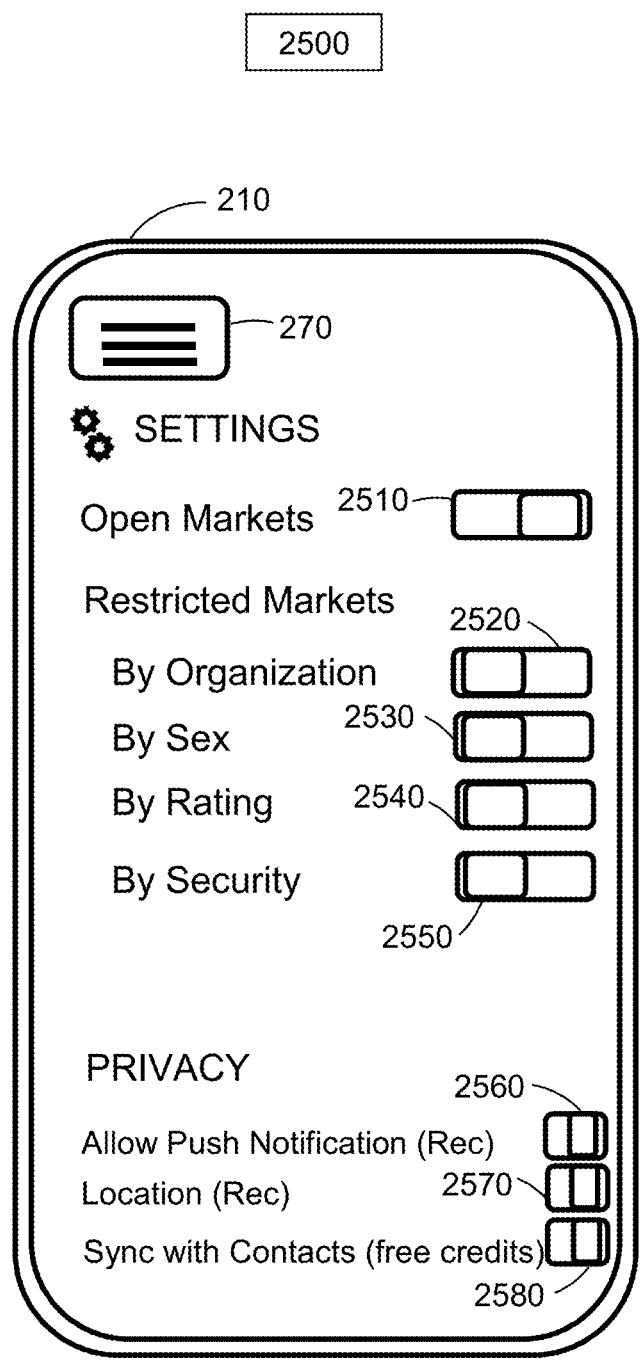
FIG. 25 illustrates an exemplary user interface to display open or restriction settings for auctions of the advertising attribute specification community linked advertising attribute specification forward market with associated price-time priority queues system and method in accordance with some embodiments.

FIG. 25 illustrates an exemplary setting configuration 2500 for an advertising community linked advertising attribute specification or advertising unit multi layered network node topology in one exemplary implementation of participating, transacting and/or trading advertising community linked advertising attribute specification or advertising capacity units in accordance with some embodiments. In some embodiments, the multi layered network node topology of participating, transacting and/or trading advertising community linked advertising attribute specification or advertising capacity configuration 2500 includes the following setting elements, or a subset or superset thereof:

computing device unit GUI 210 to display method of multi layered network node topology for forward market of transformed advertising community linked advertising attribute specification and advertising units or securities;

hamburger menu toggle 270 to move between different application configurations;

open markets setting toggle 2510 which allows a user to see all market participants of a given auction on a multi layered network node topology for a forward market of transformed advertising community linked advertising attribute specification and advertising units or securities;

restricted markets setting By Organization 2520, By Sex 2530, By Rating 2540, By Security 2550 or by any other restriction the user 110 defines which limit the price-time priority queue auction participants for the user;

privacy settings which restrict push notifications 2560, location information 2570; Sync with contacts 2580, or other privacy settings;

In some embodiments, a user 110 may select open markets 2510 which show every participant in a given auction for a multi layered network node topology for a forward market of advertising community linked advertising attribute specification and advertising units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market price-time priority auction for a multi layered network node topology for a forward market of advertising community linked advertising attribute specification and advertising units. In some embodiments, the settings toggles 2510, 2520, 2540, 2550, 2560, 2570, 2580 may include other restrictions that limit what may be placed into the specification data vault of the user 111. In some embodiments, the setting restrictions 2510, 2520, 2540, 2550, 2560, 2570, 2580 then limit the specification of the advertising attribute specification which then is placed in a limited auction which is associated with a plurality of price-time priority queue auctions 116, 300 for the advertising attribute specification of the user of record 111.

Figure 26:
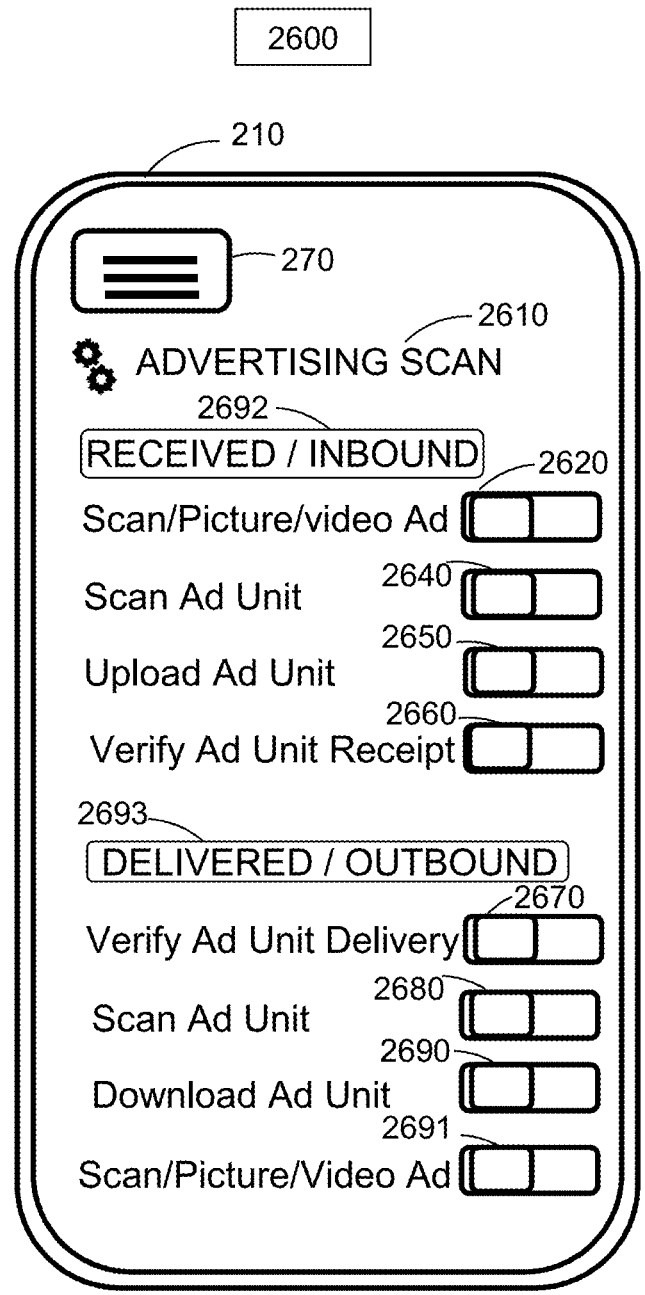
FIG. 26 illustrates an exemplary user interface to display inbound and outbound advertisement, package, cargo or advertising QR scans or UPC scans or pictures to document advertising attribute specification community linked advertising attribute specification units in which are delivered against the forward market advertising attribute specification community linked auction with associated price-time priority queues for two or more virtual hubs in accordance with some embodiments.

FIG. 26 illustrates an exemplary setting for an advertisement scan or upload configuration 2600 for a transformed advertising community linked advertising attribute specification or advertising unit multi layered network node topology in one exemplary implementation of participating, transacting and/or trading advertising community linked advertising attribute specification or advertising capacity units in accordance with some embodiments. In some embodiments, the multi layered network node topology of participating, transacting and/or trading advertising community linked advertising attribute specification or advertising capacity configuration 2600 includes the following setting for a package or cargo scan elements, or a subset or superset thereof:

computing device unit GUI 210 to display method of multi layered network node topology for forward market of advertising community linked transformed advertising attribute specification and advertising units;

hamburger menu toggle 270 to move between different application configurations;

advertising module 2610 to document the status and position of transformed forward market advertising or advertising community linked advertising attribute specification units or security;

advertising Inbound or received module 2692 to scan a picture, universal product code barcode, QR code, or other transformed advertising community linked advertising attribute specification or advertising unit identifier or security;

package or Cargo Inbound scan toggle switch 2620 to scan or upload a picture or image or text or video or audio interface advertisement, universal product code barcode, QR code, or other transformed advertising community linked advertising attribute specification or advertising unit identifier or security;

advertisement unit Inbound scan toggle switch 2640 to scan a picture or image or video or text or audio interface advertisement, universal product code barcode, QR code, or other transformed advertising community linked advertising attribute specification or advertising unit identifier or security;

upload advertising unit with an advertising attribute specification unit Inbound scan toggle switch 2650 to scan a picture or image or video or text or audio interface advertisement universal product code barcode, QR code, or other transformed advertising community linked advertising attribute specification or advertising unit identifier or security;

advertising unit Inbound scan toggle switch 2660 to scan and verify a picture or image or video or application or text or universal product code barcode, QR code, or other transformed advertising community linked advertising attribute specification or advertising unit identifier or security;

advertisement outbound or delivered module 2693 to scan a picture, advertisement, audio, video image, application, universal product code barcode, QR code, or other transformed advertising community linked advertising attribute specification or advertising unit or security identifier or security;

advertisement delivery to advertising attribute specification user outbound or delivered scan toggle 2670 to scan a picture, or image or video or application or text or universal product code barcode, QR code, or other transformed advertising community linked advertising attribute specification or advertising unit identifier or security;

advertising ad outbound or delivered scan toggle 2680 to scan a picture or image or application or video or audio or text or universal product code barcode, QR code, or other transformed advertising community linked advertising attribute specification or advertising unit identifier;

download advertisement outbound or delivered scan toggle 2690 to scan a picture, image, video, audio, text, universal product code barcode, QR code, or other transformed advertising community linked advertising attribute specification or advertising unit identifier;

scan/picture/video ad unit outbound or delivered scan toggle 2691 to scan a picture, image, video, text, application, audio, universal product code barcode, QR code, or other transformed advertising community linked advertising attribute specification or advertising unit identifier.

In some embodiments, a user 110 may select the advertising unit scan module 2610 to scan or take a picture of a advertising collateral, material, image, text, jingle, video, audio, website, identification code such as a QR code, Uniform Product code or other identifying advertising attribute specification characteristic. In some embodiments, the user 110 may select the inbound Scan/Picture advertisement toggle 2620, which captures the identification characteristic which may include advertising attribute specification, picture, image, audio, video, text, QR Codes, Uniform Product Codes, Serial Numbers or other advertising attribute specification identification characteristics of a advertising community linked advertising attribute specification or advertising unit. In some embodiments, inbound advertising may include a larger unit structure than a rendering device such as a radio, portable multifunction devise, screen, television, monitor, augmented reality, mixed reality, virtual reality unit with identification characteristics which may include advertising attribute specification QR Codes, Uniform Product Codes, Serial Numbers or other advertisement identification characteristics, for such larger units a user 110 may use the Scan advertising Unit toggle 2640 to capture the advertising collateral or material identification characteristic for inbound receipt of the advertising community linked advertising attribute specification or advertising unit. In some embodiments, an inbound Scan Trailer Unit toggle 2650 option may be used by a user 110 to instruct the system configuration that receipt of a large text, audio, picture, image, video, augmented reality, virtual reality, mixed reality unit such as may be scanned to identify the advertising community linked advertising attribute specification or advertising unit. In some embodiments, an inbound Scan advertising Unit 2660 toggle may be utilized to track the receipt or location of an advertising copy. In some embodiments, a user 110 may select the outbound advertising copy unit scan module 2693 to scan or take a picture of an advertising copy identification code such as a QR code, Uniform Product code or other identifying advertising copy characteristic to confirm delivery to a delivery address of the advertising community linked advertising attribute specification or advertising unit. In some embodiments, the user 110 may select the outbound Scan/Picture advertising copy toggle 2670 which captures the identification characteristic of a advertising copy advertising community linked advertising attribute specification or advertising unit once the unit is delivered to the delivery address. In some embodiments, advertising copy may include a larger unit structure than a multifunction or single function delivery device may carry such as unit with identification characteristics which may include QR Codes, Uniform Product Codes, Serial Numbers or other advertising copy identification characteristics, for such advertising copy units a user 110 may use the outbound Scan advertising copy Unit toggle 2680 to capture the advertising copy identification characteristic for outbound receipt of the transformed advertising community linked advertising attribute specification or advertising unit or security. In some embodiments, an outbound Scan advertising Unit toggle 2690 option may be used by a user 110 to instruct the system configuration that delivery of advertising copy units with advertising attribute specifications, may be scanned to identify the advertising community linked advertising attribute specification or advertising unit and confirm delivery. In some embodiments, an outbound Scan advertising attribute specification Unit 2691 toggle may be utilized to track the delivery or location of a advertising attribute specification which has been delivered. In some embodiments, transformed advertising community linked advertising attribute specification or advertising units or securities may be a subset or superset of the aforementioned in the formation of an open forward market auction for a multi layered network node topology for a forward market of transformed advertising community linked advertising attribute specification and advertising units or securities.

Figure 27:
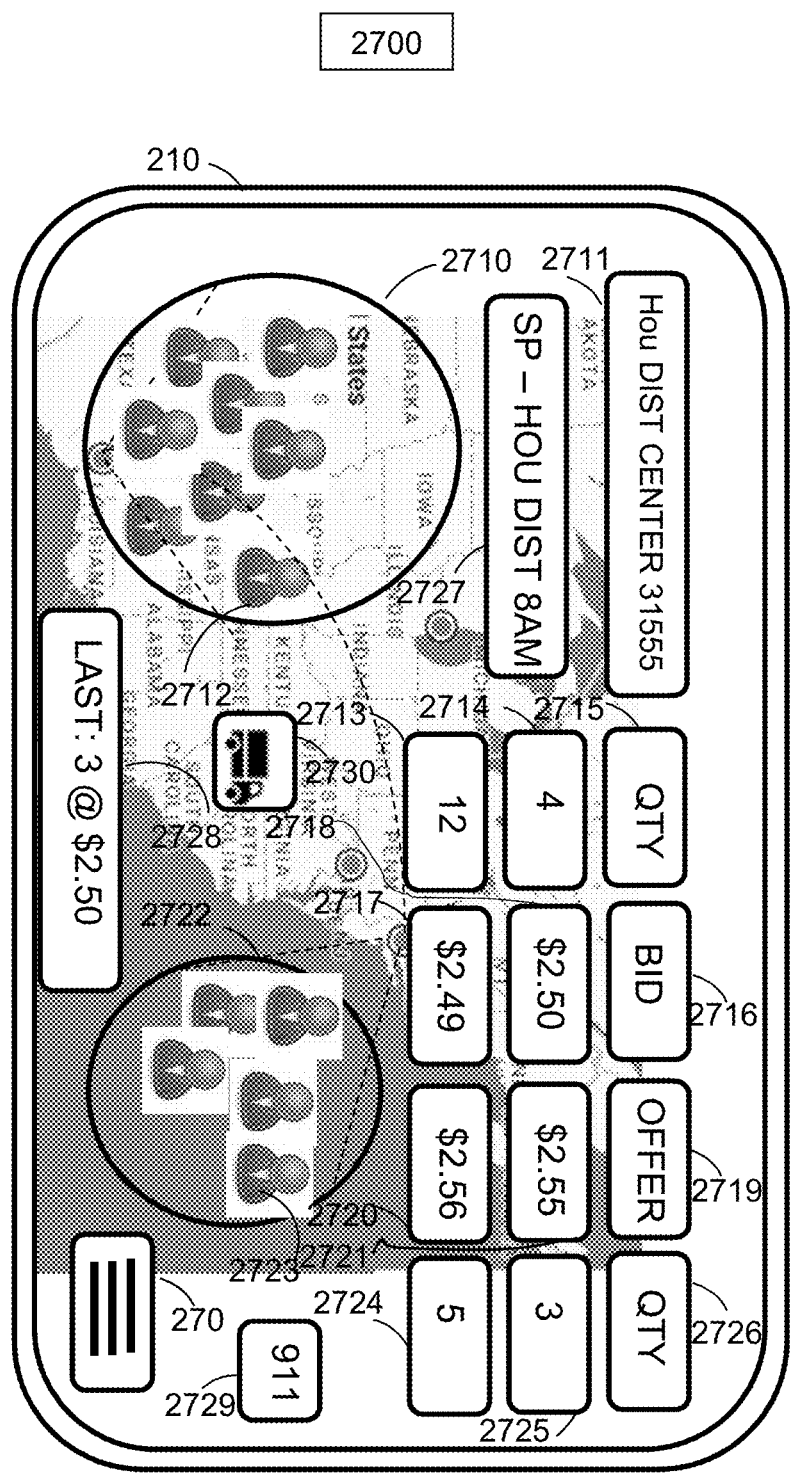
FIG. 27 illustrates an exemplary user interface to display an advertising attribute specification community linked forward advertising attribute specification auction for a advertising attribute specification unit with associated price-time priority queues a given hub or multi-hub combination in accordance with some embodiments.

FIG. 27 illustrates an exemplary setting for an advertising community linked package or cargo market configuration 2700 for a transformed advertising community linked advertising attribute specification or advertising unit or security multi layered network node topology in one exemplary implementation of participating, transacting and/or trading transformed advertising community linked advertising attribute specification or advertising capacity units or securities in accordance with some embodiments. In some embodiments, user interface 210 includes the following elements, or a subset or superset thereof:

exemplary advertising community linked virtual hub combination from a stationary or mobility center location (a data transformation) 2711;

exemplary advertising community linked virtual hub origin/from location 2710 with users or advertising originators 2712 within the advertising community linked virtual hub location 2710 (a data transformation);

exemplary specification summary of the market, level of service and time of delivery commencement 2727 (a data transformation);

exemplary mode of advertising attribute specification or advertising capacity type 2730 (a data transformation);

exemplary transaction summary of the last trades quantity and price 2728;

exemplary advertising community linked virtual hub destination/to location 2722 and user who is being delivered on the advertising community linked advertising attribute specification or advertising capacity unit 2723 (a data transformation);

exemplary bid/buy quantity title header 2715 for an exemplary advertising community linked virtual advertising attribute specification or advertising unit hub market (a data transformation);

exemplary bid/buy price title header 2716 for an exemplary virtual advertising community linked advertising attribute specification or advertising hub market (a data transformation);

exemplary offer/sell price title header 2719 for an exemplary virtual advertising community linked advertising attribute specification or advertising hub market (a data transformation);

exemplary offer/sell quantity title header 2726 for an exemplary virtual advertising community linked advertising attribute specification or advertising hub market (a data transformation);

exemplary bid/buy quantity 2414 for the best bid quantity from a plurality of users 110 for an exemplary respective advertising community linked advertising attribute specification or advertising capacity virtual hub combination 2711 (a data transformation);

exemplary bid/buy quantity 2713 for the second-best bid quantity from a plurality of users 110 for an exemplary respective advertising community linked advertising attribute specification or advertising capacity virtual hub combination 2711 (a data transformation);

exemplary bid/buy price 2718 for the best bid price from a plurality of users 110 for an exemplary respective advertising community linked advertising attribute specification or advertising capacity virtual hub combination 2711 (a data transformation);

exemplary bid/buy price 2717 for the second-best bid price from a plurality of users 110 for an exemplary respective advertising community linked advertising attribute specification or advertising capacity virtual hub combination 2711 (a data transformation);

exemplary offer/sell price 2721 for the best offer price from a plurality of users 110 for an exemplary respective advertising community linked advertising attribute specification or advertising capacity virtual hub combination 2711 (a data transformation);

exemplary offer/sell price 2720 for the second-best offer price from a plurality of users 110 for an exemplary respective advertising community linked advertising attribute specification or advertising capacity virtual hub combination (a data transformation) 2711;

exemplary offer/sell quantity 2725 for the best offer quantity from a plurality of users 110 for an exemplary respective advertising community linked advertising attribute specification or advertising capacity virtual hub combination (a data transformation) 2711;

exemplary offer/sell quantity 2724 for the second-best offer quantity from a plurality of users 110 for an exemplary respective advertising community linked advertising attribute specification or advertising capacity virtual hub combination (a data transformation) 2711;

exemplary safety dispatch "911" button 2729 to enact video and audio recording of the user 110 environment and dispatch of that information to authorities and system servers.

exemplary hamburger menu button 270 to move back to menu options and settings away from the participation, transaction, trading price-time priority auction GUI 210 embodiment.

In some embodiments, the user 110 may enter a transaction quantity and price for advertising community linked advertising attribute specification or advertising capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 2711. A plurality of prices and markets may be presented based on a plurality of transformed advertising community linked contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 110 may be displayed as user icons 2712 or 2723 for the amount of people logged in which desire to transact, trade or participate in a given virtual hub 2710 to virtual hub 2722 combination for advertising community linked advertising attribute specification or advertising units. In some embodiments, users 110 may select the advertising attribute specification mode 2730 such that the user allows a market for only one form of transformed advertising community linked advertising attribute specification or advertising capacity as a commodity or the user 110 may allow the system to show multiple forms of advertising community linked advertising attribute specification or advertising capacity between two advertising community linked virtual advertising attribute specification capacity hubs 2710, 2711, 2722. In some embodiments the GUI 210 may detect a user 110 selecting the 911 button 2729 which may activate voice and video recording functions on the mobile or stationary device 111 and transmit the data with a confirmation from the user 110 to the authorities and system servers to provide enhanced security while participating, transacting or trading forward transformed advertising community linked advertising attribute specification or advertising as a commodity or security. In some embodiments the user may toggle between the GUI 210 market view screen or additional price time priority queues in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits advertising community linked advertising attribute specification or advertising capacity data 241 through the network 226, 214 or wireless GPS network 215 to call upon instruction routines and instruction sub-routines on the advertising community linked advertising attribute specification forward market database server 271, virtual hub database server 223, network member database server 222, advertising community route processor 217, my vault virtual hub processor 218, application processor 219, server 220, sequence route processor 221, and memory which all interface together to make one system which may deliver advertising community linked advertising attribute specification or advertising capacity units to users 110 from and to a plurality of virtual hubs 2710, 2722 with a plurality of specifications at specific market prices.

Figure 28:
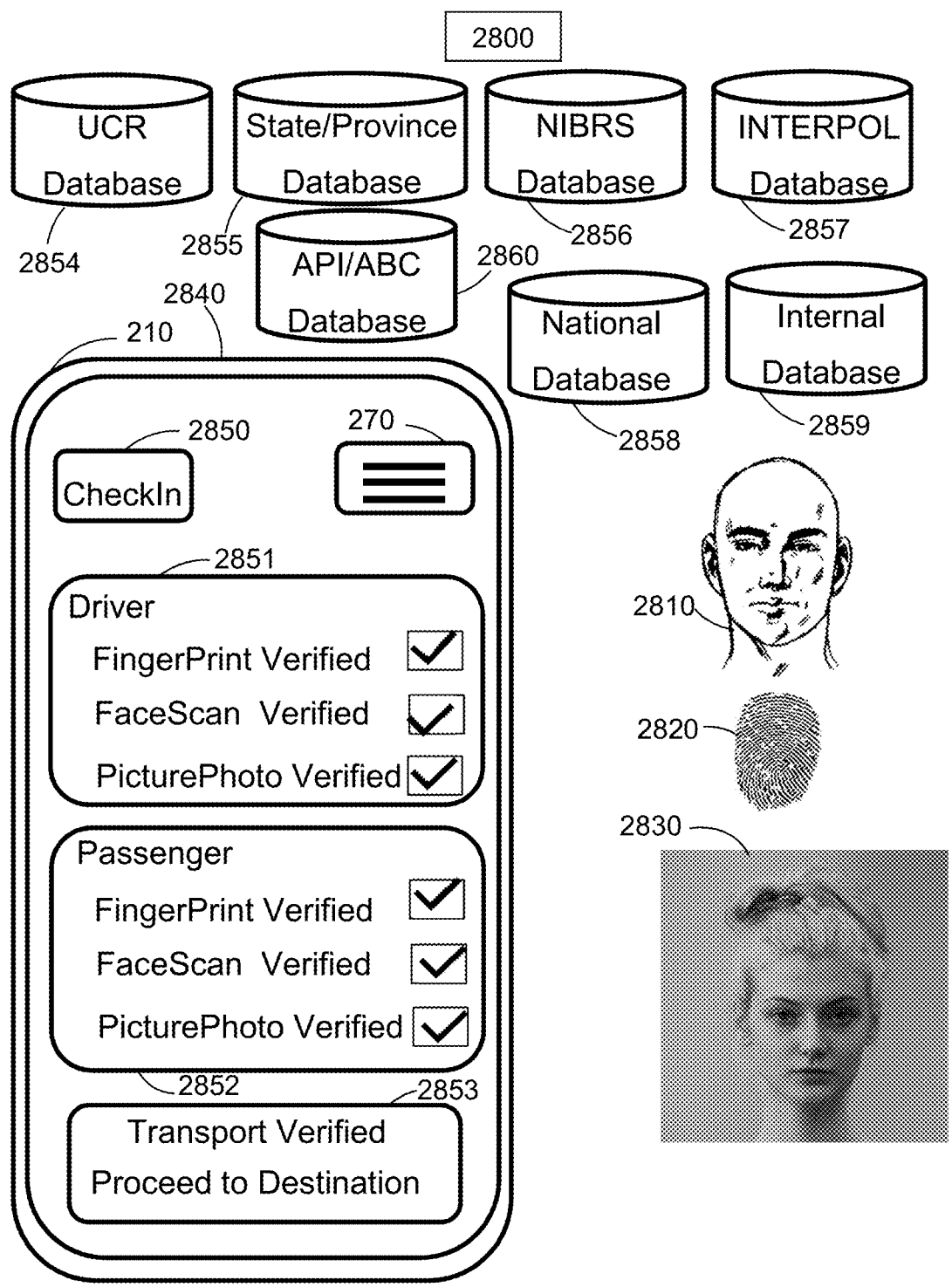
FIG. 28 illustrates an exemplary user interface and database configuration which allow user identity or criminal record or advertising attribute specification community linked transaction history with associated price-time priority queues to be verified in accordance with some embodiments.

FIG. 28 illustrates an exemplary check in and security database configuration 2800 for an advertising community linked advertising attribute specification or advertising unit multi layered network node topology in one exemplary implementation of participating, transacting and/or trading transformed advertising community linked advertising attribute specification or advertising capacity units or securities in accordance with some embodiments. In some embodiments, the multi layered network node topology of participating, transacting and/or trading advertising community linked advertising attribute specification or advertising capacity configuration 2800 includes the following security configuration elements, or a subset or superset thereof:

exemplary uniform crime reporting ("UCR") database 2854 from international agencies who report crime;

exemplary International State or Provincial crime reporting database 2855 from international governments who report crime;

exemplary International National Incident Based Reporting System ("NIBRS") crime reporting database 2856 from international governments who report crime;

exemplary Interpol crime reporting database 2857 from international governments who report crime which connects National Central Bureaus ("NCBs");

exemplary International application program interface and ABC ("API/ABC") crime reporting database 2860 from international governments who report crime;

exemplary national crime reporting database 2858 from international governments who report crime;

exemplary internal system crime reporting database 2859 from crimes which occurred on system;

exemplary facial scan to identify user 2810 against a plurality of crime databases;

exemplary fingerprint scan to identify user 2820 against a plurality of crime databases;

exemplary photo or photo scan to identify user 2830 against a plurality of crime databases;

exemplary voice scan to identify user 2810 against a plurality of crime databases;

exemplary Computing device unit GUI 210 to display method of multi layered network node topology for forward market of advertising community linked advertising attribute specification and advertising units.

hamburger menu toggle 270 to move between different application configurations;

exemplary advertising community linked Driver or Advertising transport or advertising or transport seller unit user interface 2851 to confirm identity verification against a plurality of crime databases;

exemplary advertising community linked passenger unit or advertising unit user interface 2852 to confirm identity verification against a plurality of crime databases;

exemplary handshake verification user interface 2853 to confirm both buyer and seller of advertising community linked advertising attribute specification or advertising units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, advertising community linked advertising attribute specification or advertising unit security may be a subset or superset of the aforementioned in the formation of an open forward market auction for a multi layered network node topology for a forward market of advertising community linked advertising attribute specification and advertising units. Such security checks are standard in airports, but they are not automated and they are not utilized in other modes of advertising attribute specification which degrades the overall safety of other advertising attribute specification methods if they are not utilized. In some embodiments, the check in instructions may reject a user from confirmed verified transport if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to advertising community linked transport verified status 2853 in the system.

Figure 29:
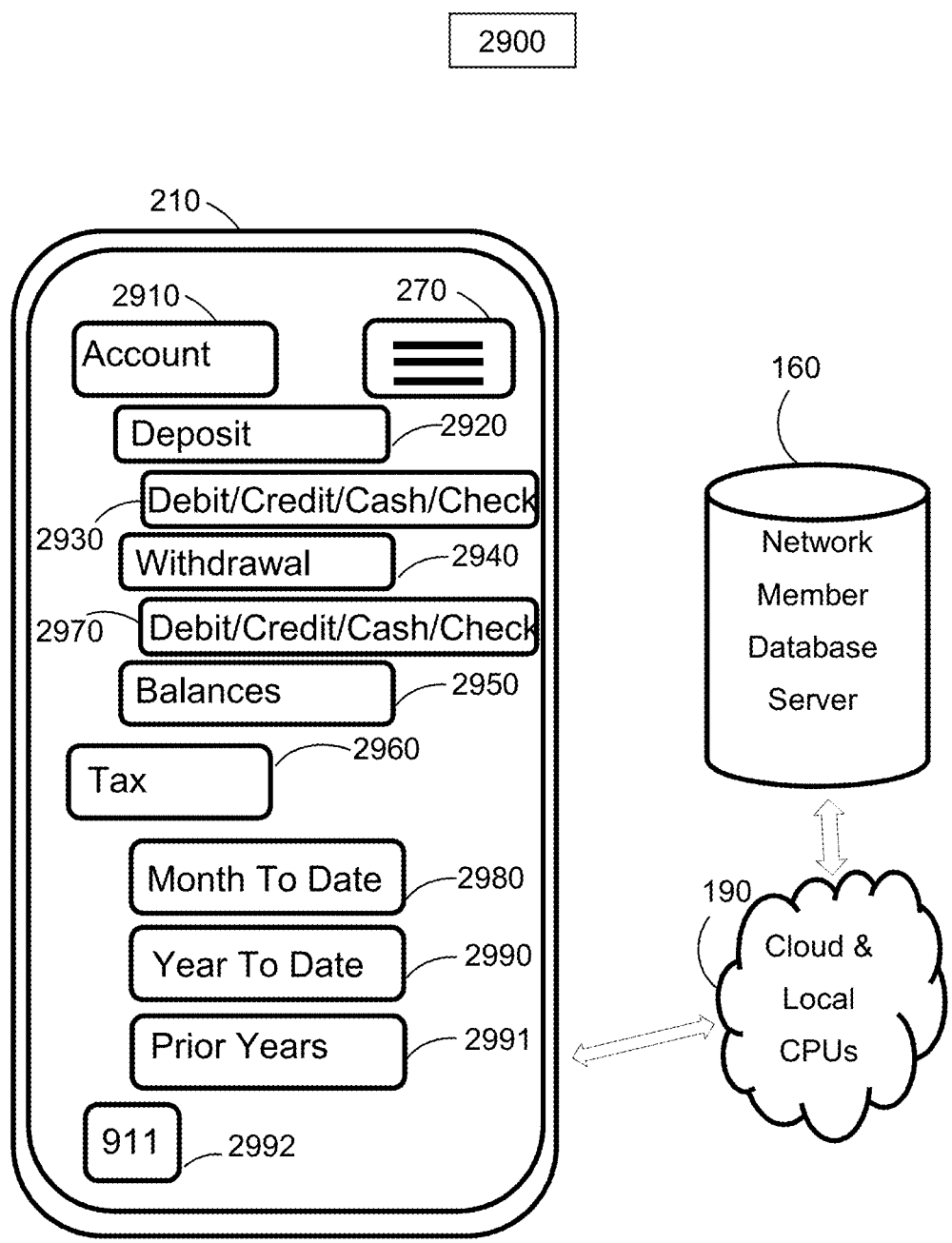
FIG. 29 illustrates an exemplary user interface and database configuration for account balances and payment for the forward market auctions of advertising attribute specification community linked advertising attribute specification capacity with associated price-time priority queues between virtual hubs in accordance with some embodiments.

FIG. 29 illustrates an exemplary user accounting configuration 2900 for a transformed advertising community linked advertising attribute specification or advertising unit or security multi layered network node topology in one exemplary implementation of participating, transacting and/or trading transformed advertising community linked advertising attribute specification or advertising capacity unit auctions in accordance with some embodiments. In some embodiments, the multi layered network node topology of participating, transacting and/or trading transformed advertising community linked advertising attribute specification or advertising capacity configuration 2900 includes the following accounting elements, or a subset or superset thereof:

computing device unit GUI 210 to display method of multi layered network node topology for forward market of advertising community linked advertising attribute specification and advertising units.

exemplary hamburger menu toggle 270 to move between different application configurations;

exemplary account button 2910 to edit or confirm user account data;

exemplary deposit button 2920 to add transaction funds or transaction currency or transaction balances to the user account;

exemplary deposit method button 2930 to add transaction funds or transaction currency or transaction balances to the user account through Debit, Credit, Cash, Check, virtual currency, digital currency or a plurality of other payment methods;

exemplary withdrawal button 2940 to send transaction funds or transaction currency or transaction balances to the user account in a different institution;

exemplary withdrawal method button 2970 to send transaction funds or transaction currency or transaction balances to the user account at a different institution through Debit, Credit, Cash, Check, virtual currency, digital currency or a plurality of other payment methods;

exemplary balances button 2950 to confirm user account balances;

exemplary tax button 2960 to track user account activity for taxation reporting;

exemplary month to date tax reporting button 2980;

exemplary year to date tax reporting button 2990;

exemplary prior year tax reporting button 2991;

exemplary "911" security button 2991;

exemplary Network Member Database Server 160;

exemplary cloud and CPU and Network configuration 190 to send and receive Network Member account data.

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 210 in accordance with instructions on the method and system to place money in the system account into a different institution specified by the user 110. In some embodiments, user balances 2950 data may be displayed with voice or screen or non-screen computing devices with instructions from the GUI 210 in accordance with instructions on the method and system. In some embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some embodiments, the accounting and tax information may be stored in the Network Member Database Server 222 and transmitted through the cloud, network and CPUs 224, 214 to the GUI computing device 210. In some embodiments, advertising attribute specification or advertising unit accounting and fund interfaces may be a subset or superset of the aforementioned in the formation of an open forward market price-time priority auction for a multi layered network node topology for a forward market of advertising community linked advertising attribute specification and advertising units.

Figure 30:
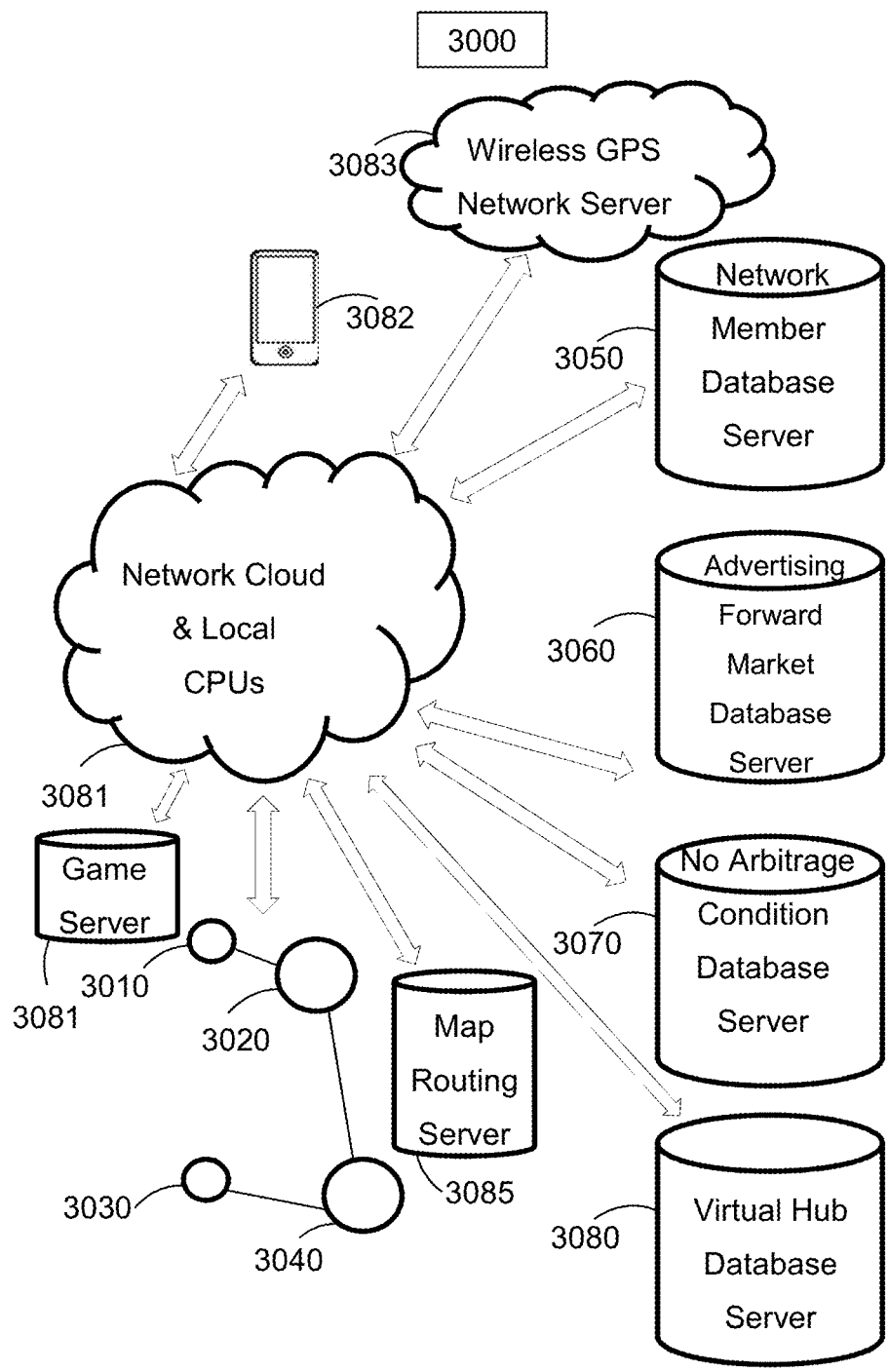
FIG. 30 illustrates an exemplary method and system configuration of multiple advertising attribute specification community linked virtual hub topology auctions with associated price-time priority queues in accordance with some embodiments.

FIG. 30 illustrates an exemplary network configuration 3000 for an advertising community linked advertising attribute specification or advertising unit multi layered network node topology in one exemplary implementation of participating, transacting and/or trading advertising attribute specification or advertising capacity unit auctions in accordance with some embodiments. In some embodiments, the multi layered network node topology of participating, transacting and/or trading advertising community linked advertising attribute specification or advertising capacity configuration 3000 includes the following accounting elements, or a subset or superset thereof:

exemplary wireless GPS Network and Server 3083;

exemplary wireless computing device that is audio, video, screen or non-screen interfaced 3082;

exemplary Network Member Database Server 3050;

exemplary advertising community linked Advertising attribute specification Forward Market Database Server 3060;

exemplary advertising community linked Advertising attribute specification Forward Market Database Server 3060;

exemplary advertising community linked No Arbitrage Condition Database Server 3070;

exemplary advertising community linked Virtual Hub Database Server 3080;

exemplary Network, Network Cloud, and local CPUs 3081;

exemplary Network Multi Layered Network Virtual Hub Node Topology for forward market advertising community linked advertising attribute specification of advertising unit price-time priority auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of advertising community linked advertising attribute specification or advertising with instructions and data from the Virtual Hub Database Server 3080, the No Arbitrage Condition Database Server 3070, the advertising community linked Advertising attribute specification Forward Market Database Server 3060, the Network Member Database Server 3050 and the Wireless GPS Network Server 3083. Network Data may be displayed with voice or screen or non-screen computing devices with instructions from the GUI 210 in accordance with instructions on the method and system.

Figure 31:
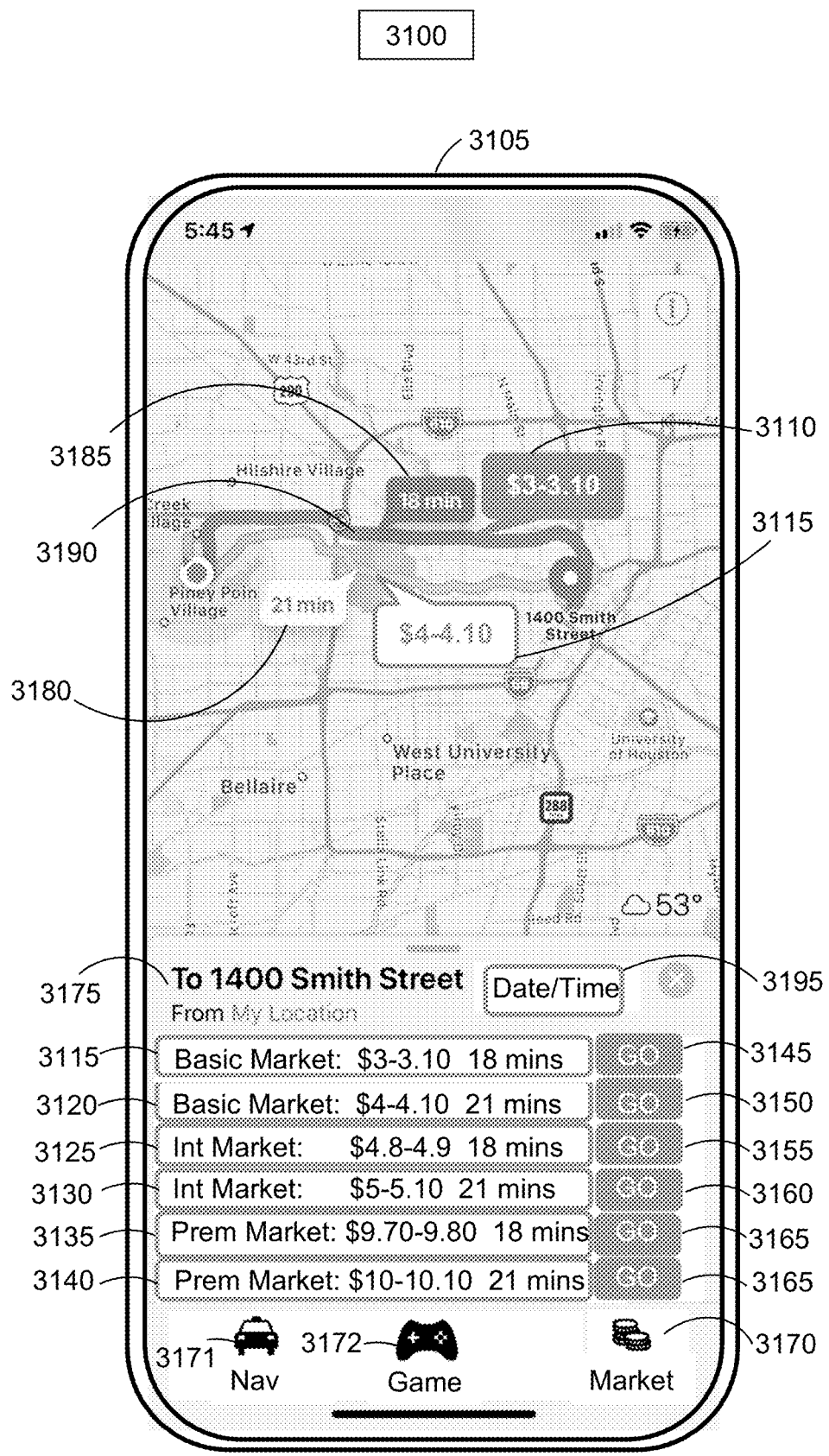
FIG. 31 illustrates an exemplary method and system configuration of the integration interface with GPS map advertising attribute specification community linked routing with associated price-time priority queues such as TomTom or Apple Maps or other third party map routing software applications.

FIG. 31 illustrates an exemplary network configuration 3100 integrating the disclosed method and system as an advertising community linked layer on a traditional third party map software. In some embodiments, the multi layered network node topology of participating, transacting and/or trading transformed advertising community linked advertising attribute specification or advertising capacity configuration 3100 includes the following accounting elements, or a subset or superset thereof:

exemplary computing device 3105;

exemplary route input by user 3175;

exemplary route node structure 3190 to satisfy user advertising community linked route request 3175;

exemplary alternative route node structure 3180 to satisfy user advertising community linked route request 3175 with associated time 3180;

exemplary time estimate 3185 for route 3190;

exemplary live auction price value 3110 for route 3190;

exemplary alternative live price-time priority queue auction price value 3115 for advertising community linked route 3180;

exemplary navigation mode button 3171;

exemplary game mode button 3172;

exemplary date and time modification button 3195 for disclosed route 3175;

exemplary transformed forward advertising community linked advertising attribute specification unit price-time priority auction value and modification feed 3115 and selection GO 3145 button to transact the given route with a basic advertising community linked advertising attribute specification unit or security feature and characteristic for one route 3190 that satisfies the user route request 3175;

exemplary alternative transformed forward advertising community linked advertising attribute specification unit price-time priority auction value and modification feed 3120 and selection GO 3150 button to transact the given route with a basic advertising community linked advertising attribute specification unit or security feature and characteristic for one alternative route 3180 that satisfies the user route request 3175;

exemplary transformed forward advertising community linked advertising attribute specification unit auction value and modification feed 3125 and selection GO 3155 button to transact the given route with an intermediate advertising community linked advertising attribute specification unit or security feature and characteristic for one route 3190 that satisfies the user route request 3175;

exemplary alternative transformed forward advertising community linked advertising attribute specification unit auction value and modification feed 3130 and selection GO 3160 button to transact the given route with an intermediate advertising community linked advertising attribute specification unit or security feature and characteristic for one alternative route 3180 that satisfies the user route request 3175;

exemplary transformed forward advertising community linked advertising attribute specification unit auction value and modification feed 3135 and selection GO 3165 button to transact the given route with a premium advertising community linked advertising attribute specification unit or security feature and characteristic for one route 3190 that satisfies the user route request 3175;

exemplary alternative advertising community linked transformed forward advertising community linked advertising attribute specification unit auction value and modification feed 3140 and selection GO 3165 button to transact the given route with a premium advertising community linked advertising attribute specification unit or security feature and characteristic for one alternative route 3180 that satisfies the user route request 3175;

exemplary market display feature 3170 as an overlay onto map routing for user requests 3175.

In some embodiments, map routing interfaces 3105 such as Apple Maps or TomTom or another third party, may integrate the disclosed method and system to display the transformed forward advertising community linked advertising attribute specification unit or security market auction price along a various route given various virtual hub topologies 1800 over the user 110 defined route request 3175. The computing device 3105 may disclose over visual, audio or other communication methods the forward transformed advertising community linked advertising attribute specification unit auction price 3110 on a given route 3190. In yet other embodiments, the disclosed advertising attribute specification unit transformation may communicate the forward transformed advertising community linked advertising attribute specification unit or security auction price 3115 of an alternative route 3180 such that a user may select either route 3190 or 3180 based on the disclosed method and system price 3110 or 3115 which was generated by instructions from a plurality of users between two virtual hubs on the user defined route 3175. The disclosed forward market advertising community linked advertising attribute specification unit auction may be communicated on an on demand basis representing the current time and day or on a forward basis by changing the Date/Time 3195 user interface button feature to represent the then current market pricing for future time intervals on a plurality of given routes 3190 and 3180 along the user requested virtual hub combination 3175. Advertising community linked virtual hubs may represent the end points of a route defined by the user 3175 or advertising community linked virtual hubs may represent points along a given route but not including the endpoints or advertising community linked virtual hubs may represent points not along the advertising community linked route the user defined 3175. Advertising community linked virtual hub combinations transform advertising attribute specification capacity units into a forward market which allow users of the method and system to transact in the physical market by either delivering transformed advertising community linked advertising attribute specification units as a driver of a vehicle or capacity holder or by receiving them as a passenger or package if the advertising community linked unit is a package rather than a person. An advertising community linked advertising attribute specification unit or security represents space which may be filled by an advertising community linked package or unit. Further the forward transformed advertising community linked advertising attribute specification unit market price-time priority queue auction 3170 overlay may be a layer on traditional GPS map routing software or as an alternative to time based routing or mileage based routing. The forward advertising community linked advertising attribute specification unit market specification such as "Basic" 3115, 3120 or "Intermediate" 3125, 3130 or "Premium" 3135, 3140 may also have a plurality of other characteristics or levels which form the basis of a fungible transformed contract or substitutable contract between users which is exchangeable with the same terms and conditions if one user is unable to fulfil their contract obligations for the transformed advertising community linked advertising attribute specification unit. In some embodiments, the navigation mode 3171 may move the user to turn by turn directions along the price based navigation advertising community linked route 3190. In some embodiments, the game mode 3172 may move the user to a game based overlay on the price based navigation advertising community linked advertising route 3190. In some embodiments, the market mode 3170 may move the user to a market based overlay on the priced based navigation advertising community linked route 3190.

The disclosed method and system of a transformed advertising community linked advertising attribute specification capacity unit may be fully functional as a layer in map routing software 3100 or as a stand alone application 200, 300, etc.

In some embodiments, the disclosed method and system advertising community linked advertising attribute specification unit price-time priority queue auction price 3110 and 3115 has two prices or more in other embodiments. Two advertising community linked route prices 3110 are disclosed at $3 and $3.10. The former price of $3 is the price where a user is willing to buy or pay for an advertising community linked advertising attribute specification unit along the given route 3190. The later price of $3.10 is the price at which a user is willing to sell a advertising community linked advertising attribute specification unit along the given route 3190. The instructions of the auction may match the highest bidding price of $3 with the lowest selling price in the price queue when the prices match. In other words, in the exemplary embodiment, if a user wanted to sell a advertising attribute specification unit at the current forward market price-time priority auction queue 3110 on route 3190, the user would enter a price of $3 which is the current highest bidding price in the method and system queue 3110. By way of further example, another user may desire to buy a advertising community linked advertising attribute specification unit on the forward transformed advertising community linked advertising attribute specification unit auction method and system on route 3190, to match, the user would enter a price of $3.10 which is the lowest selling price of a seller on the forward market advertising community linked advertising attribute specification unit auction method and system.

Figure 32:
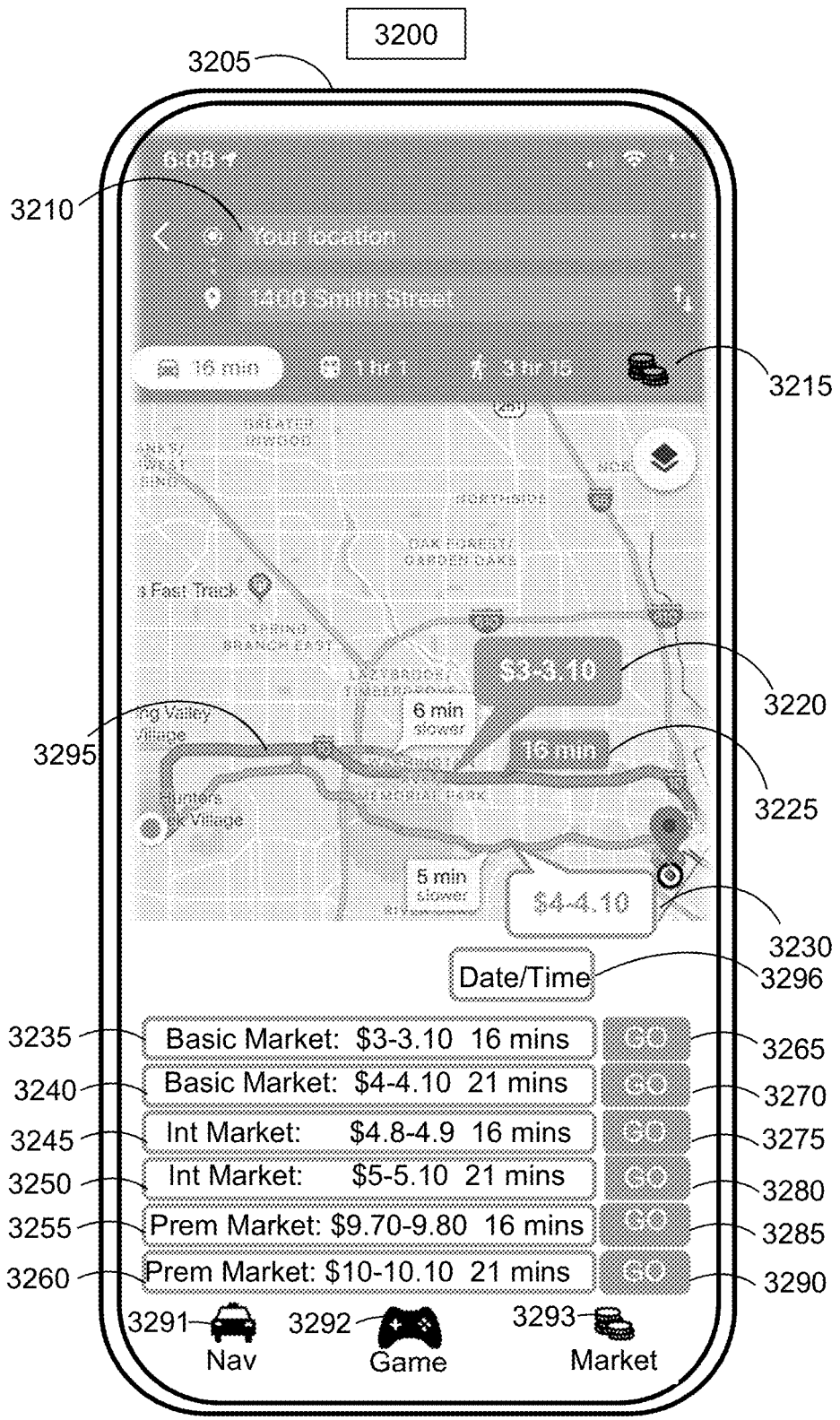
FIG. 32 illustrates an exemplary method and system configuration of the integration interface with GPS map advertising attribute specification community linked routing with associated price-time priority queues such as Google Maps or other third party map routing software applications.

FIG. 32 illustrates another exemplary network configuration 3200 integrating the disclosed method and system as an advertising community linked layer on another traditional third party map software. In some embodiments, the multi layered network node topology of participating, transacting and/or trading advertising community linked advertising attribute specification or advertising capacity configuration 3200 includes the following accounting elements, or a subset or superset thereof:

exemplary computing device 3205;
exemplary route input by user 3210;
exemplary advertising community linked route node structure 3295 to satisfy user advertising community linked route request 3210;
exemplary alternative advertising community linked route node structure 3230 to satisfy user advertising community linked route request 3210 with associated time;
exemplary time estimate 3225 for route 3295;
exemplary navigation mode button 3291;
exemplary game mode button 3292;
exemplary market mode button 3293;
exemplary live price-time priority queue auction price value 3220 for route 3295;
exemplary alternative live price-time priority auction price value 3230 for advertising community linked route 3230;
exemplary date and time modification button 3296 for disclosed advertising community linked route 3210;
exemplary transformed forward advertising community linked advertising attribute specification unit or security auction value and modification feed 3235 and selection GO 3265 button to transact the given route with a basic advertising community linked advertising attribute specification unit feature and characteristic for one route 3295 that satisfies the user route request 3210;
exemplary alternative transformed forward advertising community linked advertising attribute specification unit or security price-time priority auction value and modification feed 3240 and selection GO 3270 button to transact the given route with a basic advertising community linked advertising attribute specification unit feature and characteristic for one alternative route 3230 that satisfies the user route request 3210;
exemplary transformed forward advertising community linked advertising attribute specification unit or security auction value and modification feed 3245 and selection GO 3275 button to transact the given route with an intermediate advertising community linked advertising attribute specification unit feature and characteristic for one route 3295 that satisfies the user advertising community linked route request 3210;
exemplary alternative transformed forward advertising community linked advertising attribute specification unit or security auction value and modification feed 3250 and selection GO 3280 button to transact the given route with an intermediate advertising community linked advertising attribute specification unit feature and characteristic for one alternative advertising community linked route 3230 that satisfies the user advertising community linked route request 3210;
exemplary transformed forward advertising community linked advertising attribute specification unit or security auction value and modification feed 3255 and selection GO 3285 button to transact the given route with a premium advertising community linked advertising attribute specification unit feature and characteristic for one advertising community linked route 3295 that satisfies the user advertising community linked route request 3210;
exemplary alternative transformed forward advertising community linked advertising attribute specification unit or security price-time priority auction value and modification feed 3260 and selection GO 3290 button to transact the given route with a premium transformed advertising community linked advertising attribute specification unit feature and characteristic for one alternative advertising community linked route 3230 that satisfies the user advertising community linked route request 3210;
exemplary market display feature 3215 as an overlay onto map advertising community linked routing for user requests 3210.

In some embodiments, map routing interfaces 3205 such as Google Maps or Garmin or another third party navigation method, may integrate the disclosed method and system to display the transformed forward advertising community linked advertising attribute specification unit or security market auction price along a various route given various virtual hub topologies 1800 over the user 110 defined route request 3210. The computing device 3205 may disclose over visual, audio or other communication methods the forward transformed advertising community linked advertising attribute specification unit or security auction price 3220 on a given route 3295. In yet other embodiments, the disclosed advertising community linked advertising attribute specification unit transformation may communicate the forward transformed advertising community linked advertising attribute specification unit auction price 3230 of an alternative route 3230 such that a user may select either route 3295 or 3230 based on the disclosed method and system price 3230 or 3220 which was generated by instructions from a plurality of users between two advertising community linked virtual hubs on the user defined advertising community linked route 3210 and instructions to generate a price-time priority queue for buyers and sellers of advertising community linked advertising attribute specification units long given routes. In some embodiments, the user(s) 110 may alter the date 3296 such that the transformed advertising community linked advertising attribute specification unit or security may be updated with user 110 submitted prices 3235 for forward looking time periods. The disclosed forward market transformed advertising community linked advertising attribute specification unit or security price-time priority queue auction may be communicated on an on demand basis representing the current time and day or on a forward basis by changing the Date/Time 3296 user interface button feature to represent the then current market pricing for future time intervals on a plurality of given routes 3295 and 3230 along the user requested virtual hub combination 3210. Advertising community linked virtual hubs may represent the end points of a route defined by the user 3210 or virtual hubs may represent points along a given route but not including the endpoints or advertising community linked virtual hubs may represent points not along the route the user defined 3210. Advertising community linked virtual hub combinations transform advertising attribute specification capacity units or securities into a forward market which allow users of the method and system to transact in the physical market by either delivering transformed advertising community linked advertising attribute specification units as a driver of a vehicle or capacity holder or by receiving them as a passenger or package if the unit is a package rather than a person. A transformed advertising community linked advertising attribute specification unit represents space which may be filled by a person or a package. Further the forward transformed advertising community linked advertising attribute specification unit market auction 3215 overlay may be a layer on traditional GPS map routing software as an alternative to time based routing. The forward advertising community linked advertising attribute specification unit market specification such as "Basic" 3235, 3240 or "Intermediate" 3245, 3250 or "Premium" 3255, 3260 may also have a plurality of other characteristics or levels which form the basis of a fungible contract or substitutable contract between users which is exchangeable with the same terms and conditions if one user is unable to fulfil their contract obligations for the transformed advertising community linked advertising attribute specification unit. In some embodiments, the navigation mode 3291 may move the user to turn by turn directions along the price based navigation advertising community linked route 3295. In some embodiments, the game mode 3292 may move the user to a game based overlay on the price based navigation advertising community linked route 3295. In some embodiments, the market mode 3293 may move the user to a market based overlay on the priced based navigation advertising community linked route 3295.

The disclosed method and system of a transformed advertising community linked advertising attribute specification capacity unit may be fully functional as a layer in map routing software 3200 or as a stand alone application 200, 300, etc.

In some embodiments, the disclosed method and system transformed advertising community linked advertising attribute specification unit or security price-time priority auction price 3220 and 3230 has two prices or more in other embodiments. Two route prices 3220 are disclosed at $3 and $3.10. The former price of $3 is the price where a user is willing to buy or pay for an advertising community linked advertising attribute specification unit along the given route 3295. The later price of $3.10 is the price at which a user is willing to sell a advertising community linked advertising attribute specification unit along the given route 3295. The instructions of the price-time priority auction may match the highest bidding price of $3 with the lowest selling price in the price queue when the prices match. In other words, in the exemplary embodiment, if a user wanted to sell a advertising community linked advertising attribute specification unit at the current forward market price-time auction queue 3220 on route 3295, the user would enter a price of $3 which is the current highest bidding price in the method and system queue 3220. By way of further example, another user may desire to buy a transformed advertising community linked advertising attribute specification unit on the forward transformed advertising attribute specification unit or security auction method and system on route 3295, to match, the user would enter a price of $3.10 which is the lowest selling price of a seller on the forward market transformed advertising community linked advertising attribute specification unit price-time priority auction method and system.

Figure 33:
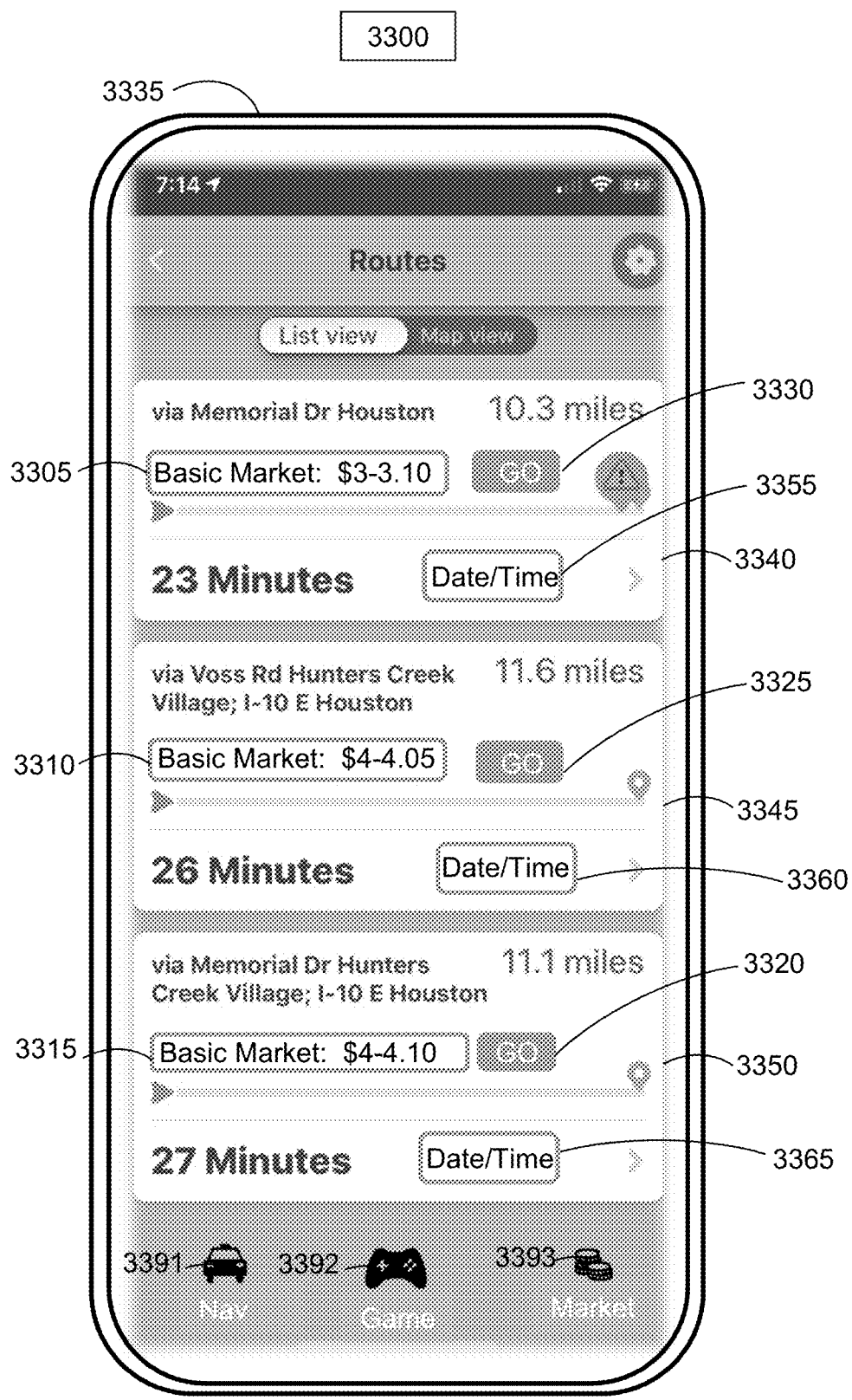
FIG. 33 illustrates an exemplary method and system configuration of the integration interface with GPS map advertising attribute specification community linked routing with associated price-time priority queues such as Waze Maps or other third party map routing software applications.

FIG. 33 illustrates another exemplary network configuration 3300 integrating the disclosed method and system as a layer on another traditional third party map software. In some embodiments, the multi layered network node topology of participating, transacting and/or trading advertising community linked advertising attribute specification or advertising capacity configuration 3300 includes the following accounting elements, or a subset or superset thereof:

exemplary computing device 3335;

exemplary advertising community linked route node structure 3340 to satisfy user route requests with associated time and price;

exemplary alternative advertising community linked route node structure 3345 to satisfy user route request with associated time and price;

exemplary alternative route node structure 3350 to satisfy user route request with associated time and price;

exemplary live price-time priority auction queue price value 3305 for price based advertising community linked route 3340;

exemplary navigation mode button 3391;

exemplary game mode button 3392;

exemplary market mode button 3393;

exemplary go 3330 button to transact or modify the price based advertising community linked routing;

exemplary go 3325 button to transact or modify the price based advertising community linked routing;

exemplary go 3320 button to transact or modify the price based advertising community linked routing;

exemplary alternative live price-time priority auction price value 3310 for advertising community linked route 3345;

exemplary alternative live price-time priority auction price value 3315 for advertising community linked route 3350;

exemplary date and time modification button 3355 for disclosed advertising community linked route 3340;

exemplary date and time modification button 3360 for disclosed advertising community linked route 3345;

exemplary date and time modification button 3365 for disclosed advertising community linked route 3350;

In some embodiments, map routing interfaces 3335 such as Waze Maps or another third party, may integrate the disclosed method and system to display the transformed forward advertising attribute specification unit market price-time priority auction price along a various route given various virtual hub topologies 1800 over the user 110 defined route requests. The computing device 3335 may disclose over visual, audio or other communication methods the forward transformed advertising community linked advertising attribute specification unit or security auction price 3305 on a given route 3340. In yet other embodiments, the disclosed advertising attribute specification unit advertising community linked transformation may communicate the forward transformed advertising attribute specification unit auction price 3310 of an alternative route 3345 such that a user may select either route 3340 or 3345 or 3350 based on the disclosed method and system price 3305 or 3310 or 3315 which was generated by instructions from a plurality of users between two advertising community linked virtual hubs on the user defined route and instructions to generate a price-time queue for buyers and sellers of advertising community linked advertising attribute specification units along given routes. The disclosed forward market transformed advertising community linked advertising attribute specification unit or security auction may be communicated on an on demand basis representing the current time and day or on a forward basis by changing the Date/Time 3340, 3360, 3365 user interface button feature to represent the then current market pricing for future time intervals on a plurality of given routes 3340 or 3345 or 3350 along the user requested virtual hub combination. In some embodiments, the user(s) 110 may alter the date 3355 such that the transformed advertising community linked advertising attribute specification unit or security may be updated with user 110 submitted prices 3305 for forward looking time periods. Advertising community linked virtual hubs may represent the end points of a route defined by the user or virtual hubs may represent points along a given route but not including the endpoints or advertising community linked virtual hubs may represent points not along the route the user defined. Virtual hub combinations transform advertising community linked advertising attribute specification capacity units into a forward market which allow users of the method and system to transact in the physical market by either delivering advertising community linked advertising attribute specification units as a driver of a vehicle or capacity holder or by receiving them as a passenger or package if the unit is a package rather than a person. An advertising community linked advertising attribute specification unit represents space which may be filled by an advertising community object unit. Further the forward advertising attribute specification unit market price-time priority auction 3305 overlay may be a layer on traditional GPS map routing software or as an alternative to time based routing. The forward advertising community linked advertising attribute specification unit market specification such as "Basic" 3305 may also have a plurality of other transformed characteristics or levels which form the basis of a fungible contract or substitutable contract specifications between users which is exchangeable with the same terms and conditions if one user is unable to fulfil their contract obligations for the transformed advertising community linked advertising attribute specification unit or security. In some embodiments, the navigation mode 3391 may move the user to turn by turn directions along the price based navigation advertising community linked route 3350. In some embodiments, the game mode 3392 may move the user to a game based overlay on the price based navigation advertising community linked route 3340. In some embodiments, the market mode 3393 may move the user to a market based overlay on the priced based navigation advertising community linked route 3350.

The disclosed method and system of a transformed advertising community linked advertising attribute specification capacity unit may be fully functional as a layer in map routing software 3300 or as a stand alone application 200, 300, etc.

In some embodiments, the disclosed method and system advertising attribute specification unit price-time priority auction price 3305 and 3310 and 3315 has two prices or more in other embodiments. Two route prices 3305 are disclosed at $3 and $3.10. The former price of $3 is the price where a user is willing to buy or pay for an advertising community linked advertising attribute specification unit along the given route 3340. The later price of $3.10 is the price at which a user is willing to sell an advertising community linked advertising attribute specification unit along the given route 3340. The instructions of the price-time priority auction may match the highest bidding price of $3 with the lowest selling price in the price queue when the prices match. In other words, in the exemplary embodiment, if a user wanted to sell an advertising attribute specification unit at the current forward market auction queue 3305 on route 3340, the user would enter a price of $3 which is the current highest bidding price in the method and system queue 3305. By way of further example, another user may desire to buy a advertising community linked advertising attribute specification unit on the forward advertising community linked advertising attribute specification unit auction method and system on route 3340, to match, the user would enter a price of $3.10 which is the lowest selling price of a seller on the forward market advertising community linked advertising attribute specification unit price-time priority auction method and system.

Figure 34:
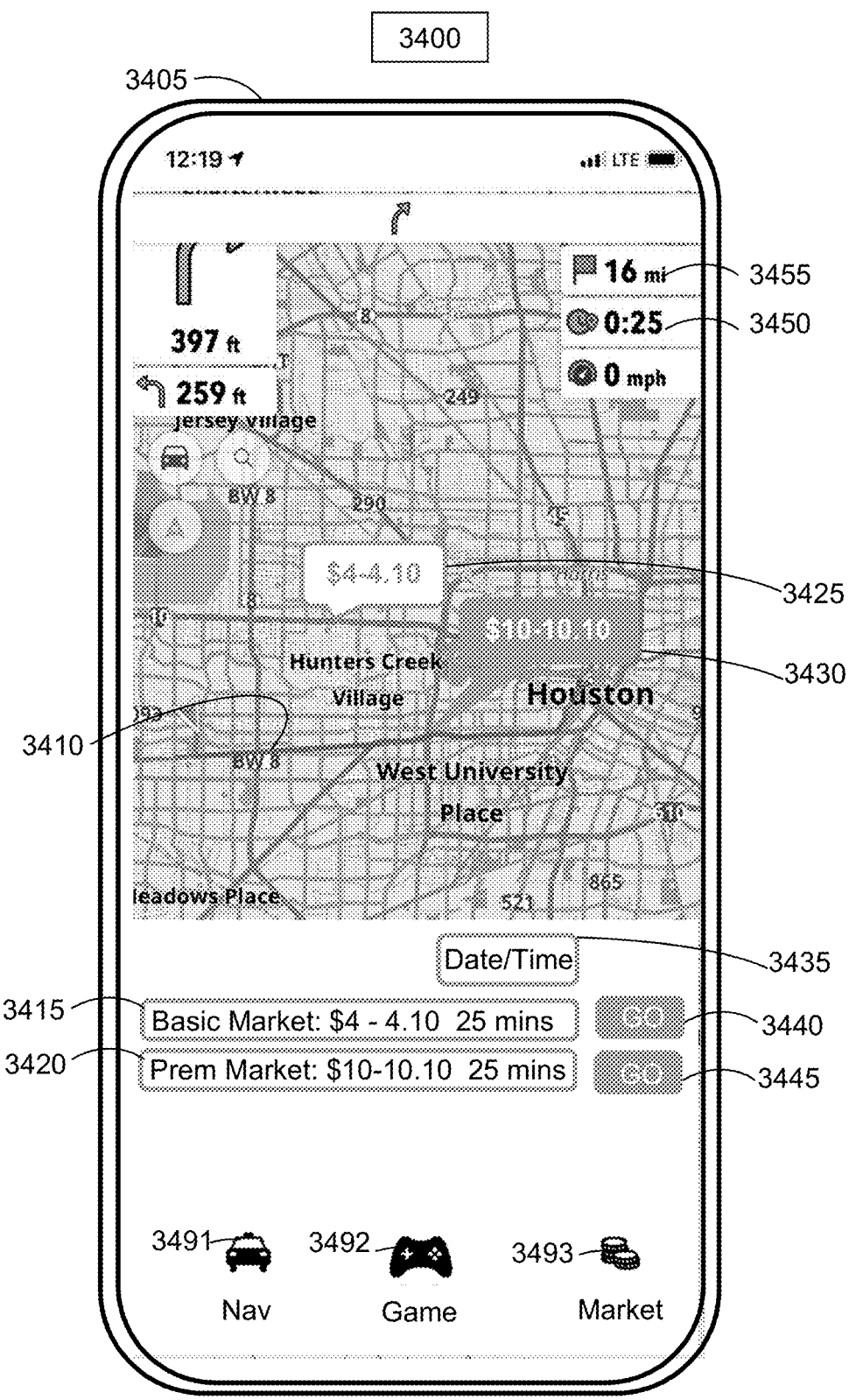
FIG. 34 illustrates an exemplary method and system configuration of the integration interface with GPS map advertising attribute specification community linked routing with associated price-time priority queues such as Open Street Maps or other third party map routing software applications.

FIG. 34 illustrates another exemplary network configuration 3400 integrating the disclosed method and system as a layer on another traditional third party map software. In some embodiments, the multi layered network node topology of participating, transacting and/or trading transformed advertising community linked advertising attribute specification or advertising capacity unit or security configuration 3400 includes the following accounting elements, or a subset or superset thereof:

exemplary computing device 3405;
exemplary route 3410;
exemplary live price-time priority auction price value 3430 for advertising community linked route 3410;
exemplary alternative live price-time priority auction price value 3425 for advertising community linked route 3425;
exemplary navigation mode button 3491;
exemplary game mode button 3492;
exemplary market mode button 3493;
exemplary date and time modification button 3435 for disclosed advertising community linked route 3410;
exemplary mileage estimate 3455 for disclosed route 3410;
exemplary route estimate 3450 for disclosed route 3410;
exemplary transformed forward advertising attribute specification unit auction value and modification feed 3415 and selection GO 3440 button to transact the given route with a basic advertising attribute specification unit or security feature and characteristic for one route 3425 that satisfies the user route request;

exemplary transformed forward advertising community linked advertising attribute specification unit or security auction value and modification feed 3420 and selection GO 3445 button to transact the given route with a premium advertising community linked advertising attribute specification unit feature and characteristic for one route 3410 that satisfies the user route request;

In some embodiments, the navigation mode 3491 may move the user to turn by turn directions along the price based navigation advertising community linked route 3410. In some embodiments, the game mode 3492 may move the user to a game based overlay on the price based navigation route 3410. In some embodiments, the market mode 3493 may move the user to a market based overlay on the priced based navigation route 3410.

Figure 35:
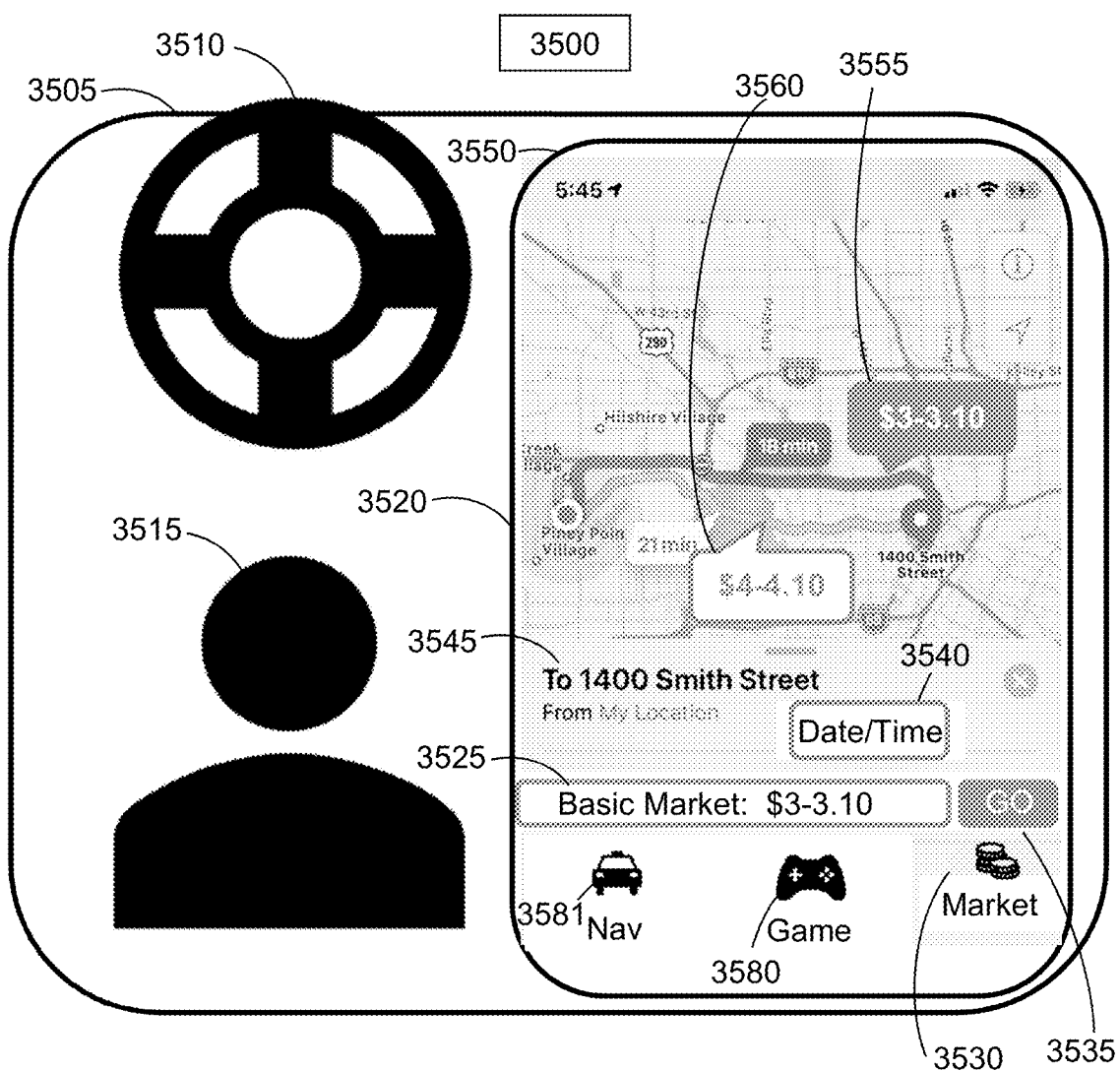
FIG. 35 illustrates an exemplary method and system configuration of the integration interface with GPS map routing in a vehicle such as Tesla, VW, Audi, Daimler, GM, Ford, Honda, Fiat, Nissan, Hyundai, Renault, Suzuki, BMW, Mazda, Dongfeng, Great Wall, Geely, BAIC, Tata, Toyota or any other third party map advertising attribute specification community linked routing software with associated price-time priority queue applications inside a vehicle.

FIG. 35 illustrates another exemplary network configuration 3500 integrating the disclosed method and system as a layer on another traditional third party map software in the setting of a vehicle GPS navigation system. In some embodiments, the multi layered network node topology of participating, transacting and/or trading advertising community linked advertising attribute specification or advertising capacity configuration 3500 includes the following accounting elements, or a subset or superset thereof:

exemplary computing device 3550;

exemplary vehicle advertising community linked advertising attribute specification unit carrier unit 3505;

exemplary vehicle advertising community linked advertising attribute specification unit steering wheel 3510;

exemplary navigation mode button 3581;

exemplary game mode button 3580;

exemplary market mode button 3530;

exemplary user of advertising community linked advertising attribute specification unit as seller or driver 3515;

exemplary user route request address information 3545;

exemplary date and time modification button 3540 for disclosed route 3545;

exemplary transformed forward advertising community linked advertising attribute specification unit auction value and modification feed 3525 and selection GO 3535 button to transact the given route with a basic advertising attribute specification unit feature and characteristic for one route 3545 that satisfies the user route request;

exemplary live price-time priority auction price value 3555 for price based advertising community linked route 3555;

exemplary live price-time priority auction price value 3560 for price based alternative advertising community linked route 3560;

exemplary market layer routing overlay 3530;

In some embodiments, the disclosed method and system transformed advertising community linked advertising attribute specification unit or security auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market price-time priority auction price based advertising community linked route 3555 from on demand or current time to a forward time or date. Market price-time priority auction based pricing 3555 may vary by date and time due to a plurality of market factors. In some embodiments the user 3515 may edit the market based auction price for the advertising community linked advertising attribute specification units by selecting the market feature button 3525. In some embodiments the user 3515 may select a give advertising community linked advertising attribute specification unit auction price to transact by selecting the go button 3535. In some embodiments, the navigation mode 3581 may move the user to turn by turn directions along the price based navigation advertising community linked route 3555. In some embodiments, the game mode 3580 may move the user to a game based overlay on the price based navigation route 3555. In some embodiments, the market mode 3530 may move the user to a market based overlay on the priced based navigation advertising community linked route 3555.

In some embodiments, the disclosed method and system advertising community linked advertising attribute specification unit auction price 3555 and 3560 has two prices or more in other embodiments. Two route prices 3555 are disclosed at $3 and $3.10. The former price of $3 is the price where a user is willing to buy or pay for an advertising attribute specification unit along the given route 3545. The later price of $3.10 is the price at which a user is willing to sell an advertising community linked advertising attribute specification unit along the given route 3545. The instructions of the auction may match the highest bidding price of $3 with the lowest selling price in the price queue when the prices match. In other words, in the exemplary embodiment, if a user 3515 wanted to sell a advertising community linked advertising attribute specification unit at the current forward market auction queue 3555 on route 3545, the user 3515 would enter a price of $3 which is the current highest bidding price in the method and system queue 3555. By way of further example, another user may desire to buy a advertising community linked advertising attribute specification unit on the forward transformed advertising community linked advertising attribute specification unit or security auction method and system on route 3545, to match, the user would enter a price of $3.10 which is the lowest selling price of a seller on the forward market transformed advertising community linked advertising attribute specification unit or security auction method and system. In some embodiments, alternative advertising community linked routes based on prices in alternative advertising community linked advertising attribute specification unit price-time priority auctions 3560 may have different prices based on supply and demand conditions. In some embodiments the market based routing layer 3530 serves as an alternative to time based routing or mileage based routing which are fundamentally different premises. In some embodiments, the overall software system 3505 and associated instructions may ask the user 3515 with visual or audio interface if the user 3515 would like to monetize their routes upon starting any navigation sequence for transformed advertising community linked advertising attribute specification units or securities.

Figure 36:
FIG. 36 illustrates an exemplary user interface and database configuration which allow the user to play a strategy based game overlay on the priced based navigation advertising attribute specification community linked route with associated advertising attribute specification price-time priority queues.

FIG. 36 illustrates another exemplary network configuration 3600 integrating the disclosed method and system as a game layer on another internal mapping system or traditional third party map system in the setting of a mobile computing device. In some embodiments, the multi layered network node topology of participating, transacting and/or trading transformed advertising community linked advertising attribute specification or advertising capacity unites or securities for price based navigation configuration 3600 includes the following accounting elements, or a subset or superset thereof:

exemplary computing device 3605;

exemplary game overlay user score 3610;

exemplary game overlay user power 3615;

exemplary game overlay SOV (single occupancy vehicle) count 3620;
exemplary game overlay weapon strength 3625;
exemplary game overlay account balance 3630;
exemplary game overlay passenger pick ups 3688;
exemplary game overlay Single Occupancy Vehicle target 3645;
exemplary game overlay Single Occupancy Vehicle weapon 3650;
exemplary game overlay GPS standard map view 3655;
exemplary game overlay augmented or mixed reality view 3660;
exemplary game overlay passenger mode 3687;
exemplary game overlay fire button 3665;
exemplary game overlay multi-purpose direction button 3670;
exemplary game overlay go button 3680;
exemplary game overlay stop button 3675;
exemplary navigation overlay button 3686;
exemplary game overlay button 3689;
exemplary market overlay button 3685;
exemplary market overlay weapon selection button 3683, 3682, 3681, 3694;
exemplary market overlay aim finder toggle 3684.

In some embodiments, the game overlay 3689 awards score and points for destroying the single occupancy vehicle 3620, compute and distribute positive or negative advertising community linked advertising attribute specification unit game auction strategy points 3610 or power 3615 or rewards 3630 based on any superset combination or subset combination of price 3635, route mileage 3640, number of single occupancy vehicles destroyed or passed 3620, number of passengers 3688, route time estimates 3640, advertising community linked advertising attribute specification unit route 3640, advertising community linked advertising attribute specification unit specifications 3415, advertising community linked advertising attribute specification unit model type 4000 based on model type and age 4000, advertising community linked advertising attribute specification unit make type 4000, advertising attribute specification unit age 4000, matched advertising attribute specification unit specification 800 and 620, matched advertising attribute specification unit fuel type 4000, matched advertising community linked advertising attribute specification unit emission specification 4000, cumulative user advertising community linked advertising attribute specification unit specifications 4100, advertising attribute specification unit rating 4100, advertising attribute specification unit safety 4100, advertising attribute specification unit time 4100, advertising attribute specification unit delay, advertising attribute specification unit driver rating 4100, advertising community linked advertising attribute specification unit rider rating 4100, advertising community linked advertising attribute specification unit timeliness relative to contract specification 4100.

In some embodiments, the game overlay 3689 may use a plurality of weapon or scoring configurations such as a rifle 3683, an axe 3681, a flower gift 3682, a X logo 3694 to take away points or gain points from other users on the system. In some embodiments the scoring may be independent of other players on the system, but dependent on the users actions in the game overlay 3689. In some embodiments a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation advertising community linked route to increase the score of the player 3610 and increase the balances 3630 by earning money on the system. In some embodiments user(s) may be identified by the X logo 3694 or by a person logo who is a bidder on the priced based navigation advertising community linked route 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation advertising community linked route 3640.

In some embodiments, the strategy of the priced based navigation game overlay is to pick up as many passengers or bidders as possible along the price based navigation route 3640, destroy as many single occupancy vehicles along the price based navigation route 3640 and to give flowers 3682 and rewards to advertising attribute specification unit providers who have more than one person in the vehicle along the price based navigation route 3640. In some embodiments user(s) may work independently or collectively in tribes to maximize user score in strategy.

Figure 37:
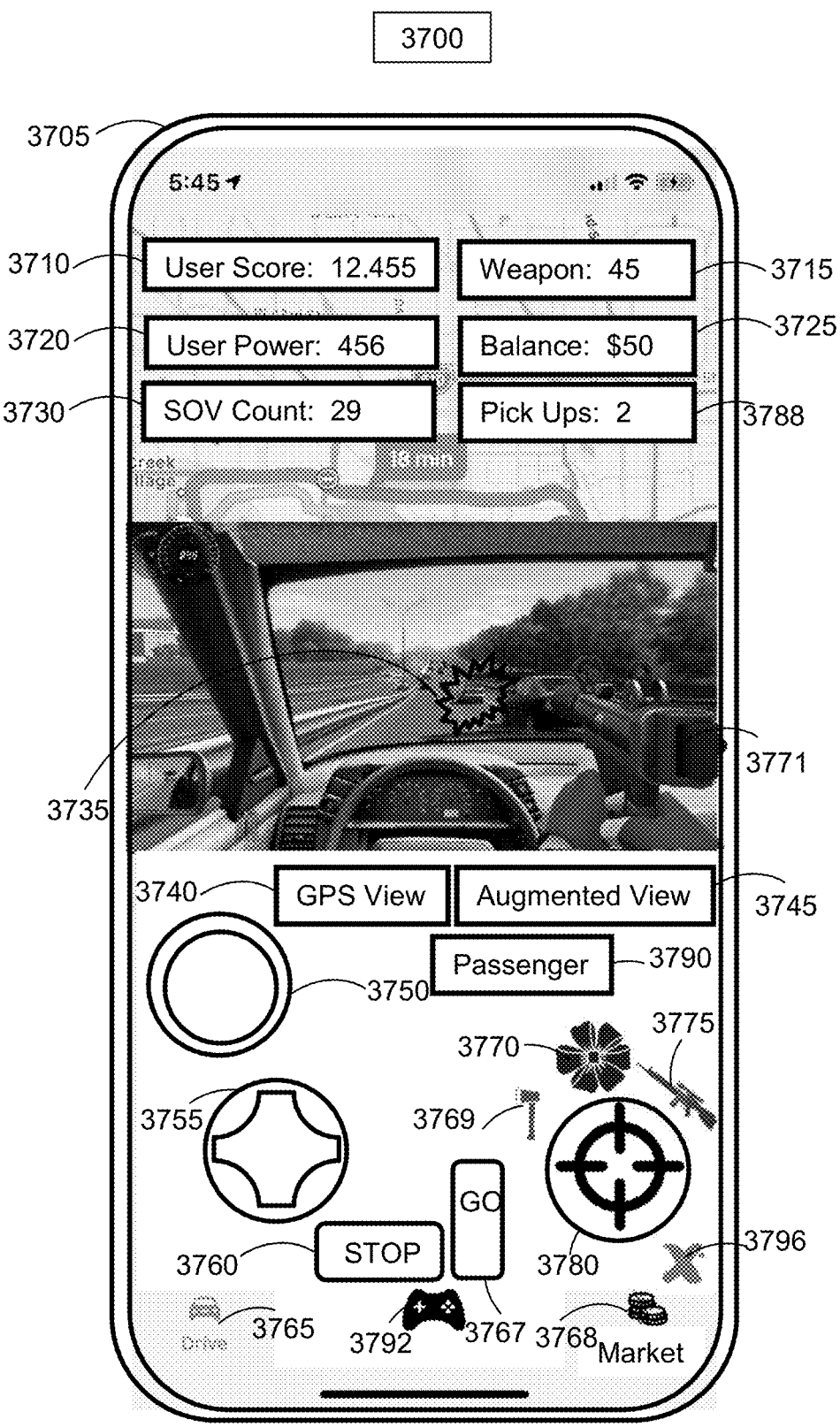
FIG. 37 illustrates an exemplary user interface and database configuration which allow the user to play a strategy based game overlay on the priced based navigation advertising attribute specification community linked route with associated advertising attribute specification price-time priority queues with augmented reality.

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading advertising community linked advertising attribute specification or advertising capacity for price based navigation advertising community linked configuration 3700 includes the following accounting elements, or a subset or superset thereof:
exemplary computing device 3705;
exemplary game overlay user score 3710;
exemplary game overlay user power 3720;
exemplary game overlay SOV (single occupancy vehicle) count 3730;
exemplary game overlay weapon strength 3715;
exemplary game overlay account balance 3725;
exemplary game overlay passenger pick ups 3788;
exemplary game overlay Single Occupancy Vehicle target 3735;
exemplary game overlay Single Occupancy Vehicle weapon 3771;
exemplary game overlay GPS standard map view 3740;
exemplary game overlay augmented or mixed reality view 3745;
exemplary game overlay passenger mode 3790;
exemplary game overlay fire button 3750;
exemplary game overlay multi-purpose direction button 3755;
exemplary game overlay go button 3767;
exemplary game overlay stop button 3760;
exemplary navigation overlay button 3765;
exemplary game overlay button 3792;
exemplary market overlay button 3768;
exemplary market overlay weapon selection button 3775, 3770, 3769, 3796;
exemplary market overlay aim finder toggle 3780.

In some embodiments, the game overlay view 3768 of the price based navigation system 3705 may alert the user to a single occupancy vehicle or a user who is not using privacy control software as outlined in the novel invention 3735 which would then be a target for the user to use a weapon 3771, 3775, 3769 to destroy the single occupancy vehicle to increase user score 3710. In some embodiments, the user may identify a vehicle as having more than one passenger in the vehicle and therefore award or gift flowers 3770 to the vehicle or advertising community linked advertising attribute specification user in the price based navigation advertising community linked game strategy. In some embodiments, the user may use a weapon 3771 against a single occupancy vehicle 3735 at which point the vehicle would explode and the passenger would be left without a vehicle in the augmented reality view 3745 or GPS view 3740. In some embodiments, the user may award flowers 3770 to a vehicle with more than one passenger to increase their score 3710 and the score of the user that has more than one passenger in their vehicle.

Figure 38:
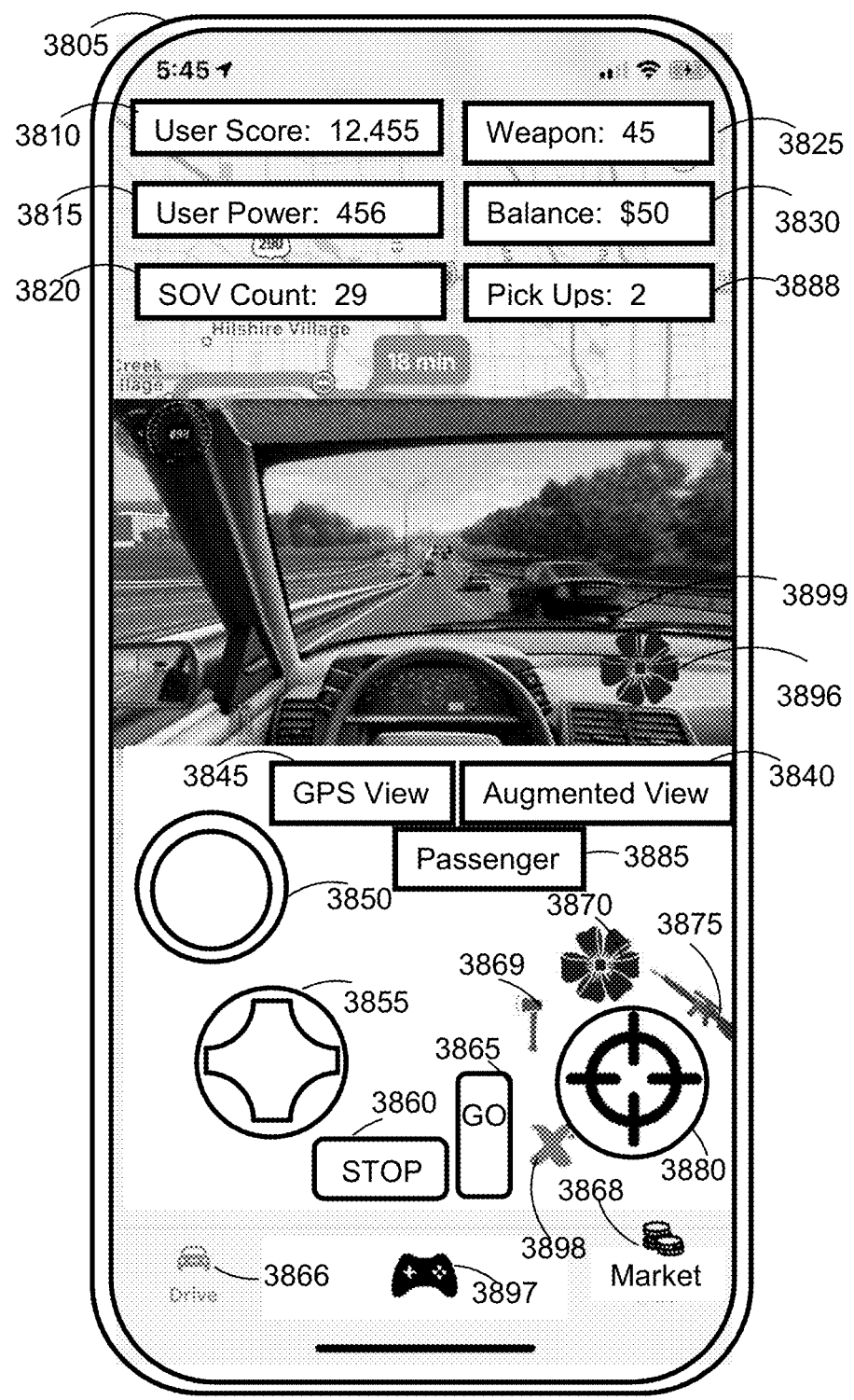
FIG. 38 illustrates an exemplary user interface and database configuration which allow the user to play a strategy based game overlay on the priced based navigation advertising attribute specification community linked route with associated advertising attribute specification price-time priority queues with augmented reality.

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading advertising community linked advertising attribute specification or advertising capacity for price based navigation configuration 3800 includes the following accounting elements, or a subset or superset thereof:

exemplary computing device 3805;
exemplary game overlay user score 3810;
exemplary game overlay user power 3815;
exemplary game overlay SOV (single occupancy vehicle) count 3820;
exemplary game overlay weapon strength 3825;
exemplary game overlay account balance 3830;
exemplary game overlay passenger pick ups 3888;
exemplary game overlay flower gift 3896;
exemplary game overlay GPS standard map view 3845;
exemplary game overlay augmented or mixed reality view 3840;
exemplary game overlay passenger mode 3885;
exemplary game overlay fire button 3850;
exemplary game overlay multi-purpose direction button 3855;
exemplary game overlay go button 3865;
exemplary game overlay stop button 3860;
exemplary navigation overlay button 3866;
exemplary game overlay button 3897;
exemplary market overlay button 3868;
exemplary market overlay weapon selection button 3869, 3870, 3875, 3898;
exemplary market overlay aim finder toggle 3880.

In some embodiments, the game overlay view 3897 of the price based navigation advertising community linked system 3805 may alert the user to a vehicle with more than one passenger 3899 which would then be a way for the user to gift a flower to the other user 3899.

Figure 39:
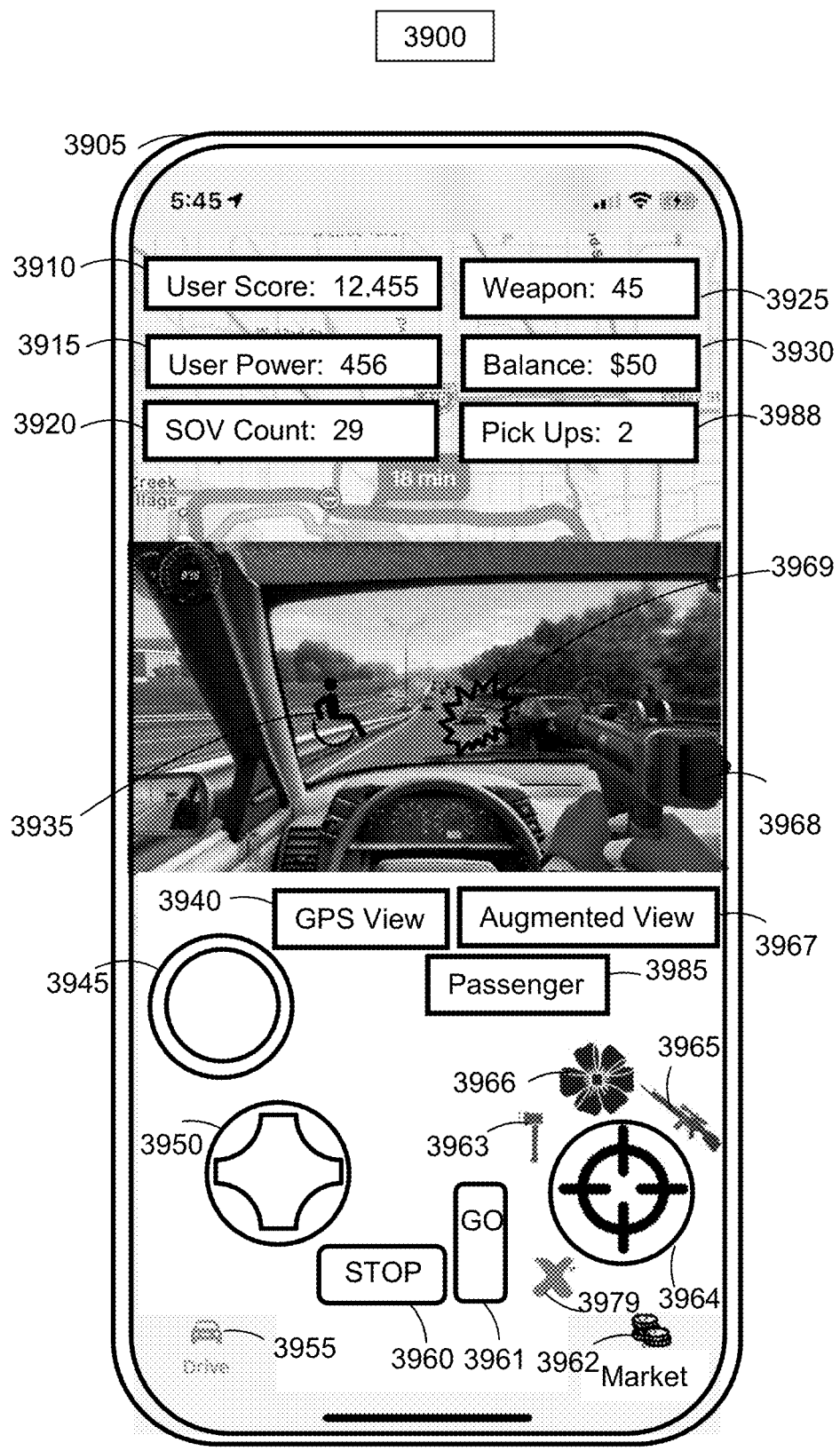
FIG. 39 illustrates an exemplary user interface and database configuration which allow the user to play a strategy based game overlay on the priced based navigation advertising attribute specification community linked route with associated advertising attribute specification price-time priority queues with augmented reality.

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading advertising community linked advertising attribute specification or advertising capacity for price based navigation configuration 3900 includes the following accounting elements, or a subset or superset thereof:

exemplary computing device 3905;
exemplary game overlay user score 3910;
exemplary game overlay user power 3915;
exemplary game overlay SOV (single occupancy vehicle) count 3920;
exemplary game overlay weapon strength 3925;
exemplary game overlay account balance 3930;
exemplary game overlay passenger pick ups 3988;
exemplary game overlay weapon 3968;
exemplary game overlay GPS standard map view 3940;
exemplary game overlay augmented or mixed reality view 3967;
exemplary game overlay passenger mode 3985;
exemplary game overlay fire button 3945;
exemplary game overlay multi-purpose direction button 3950;
exemplary game overlay go button 3961;
exemplary game overlay stop button 3960;
exemplary navigation overlay button 3955;
exemplary market overlay button 3962;
exemplary market overlay weapon selection button 3963, 3966, 3965, 3979;
exemplary market overlay aim finder toggle 3964;
exemplary user in augmented reality view who has had their single occupancy vehicle destroyed 3935.

In some embodiments, the game overlay view 3905 of the price based navigation advertising community linked system 3905 may show a user who has had their single occupancy vehicle destroyed 3935 which increases the score of the user 3910. In some embodiments, the user may target additional single occupancy vehicles 3969 to destroy along the priced based navigation route.

FIG. 40 illustrates another exemplary network configuration 4000 module of the disclosed method and system which records the vehicle specifications for a given user on the system 4010 in the setting of a mobile computing device. In some embodiments, the multi layered network node topology of participating, transacting and/or trading transformed advertising community linked advertising attribute specification or advertising capacity units or securities for price based navigation configuration 4000 includes the following elements, or a subset or superset thereof:

exemplary computing device 4010;
exemplary advertising attribute specification unit model make 4015;
exemplary advertising attribute specification unit model type 4025;
exemplary advertising attribute specification unit model year 4035;
exemplary system menu toggle box 4051;
exemplary advertising community linked advertising attribute specification unit model fuel type 4045;
exemplary advertising community linked advertising attribute specification unit model make selection box toggle 4020;
exemplary advertising community linked advertising attribute specification unit model type selection box toggle 4030;
exemplary advertising community linked advertising attribute specification unit model year selection box toggle 4040;
exemplary advertising community linked advertising attribute specification unit model fuel type selection box toggle 4050;

In some embodiments, the disclosed method and system may allow the user to select the model make such as by example an Acura 4020 as a model make 4015. In some embodiments the user may select an unlimited variety of vehicle types in the method and system not limiting the system to those vehicle make 4015 or model 4025 types in FIG. 40. In some embodiments, the user may configure the system for the advertising community linked advertising attribute specification unit specification model year 4035 or the model fuel type 4045 or a plurality of other vehicle specifications for the purpose of recording specification for the priced based navigation advertising community linked system 4010. In some embodiments, the data transformation of the transformed advertising community linked advertising attribute specification unit or security links the attributes or supersets or subsets of the model make 4015, model type 4025, model year 4035, model fuel type 4045, or a plurality of other vehicle features to create specification pools as a feature in the data transformations for the transformed advertising attribute specification units or securities. In some embodiments, the combinations of similar vehicle model make 4015, model type 4025, model year 4035, model fuel type 4045 and plurality of other vehicle attributes are fungible or substitutable in the method of the transformed advertising community linked advertising attribute specification unit or security. To avoid confusion, and to provide further example, but not limit by example, bus or subway or train or air or private automobile or other transformed advertising community linked advertising attribute specification units or securities may be substitutable under broad specifications of the transformed advertising attribute specification or security pool provided that the broad transformed specifications are met for delivery within the transformed advertising community linked advertising attribute specification unit or security pool.

Figure 41:
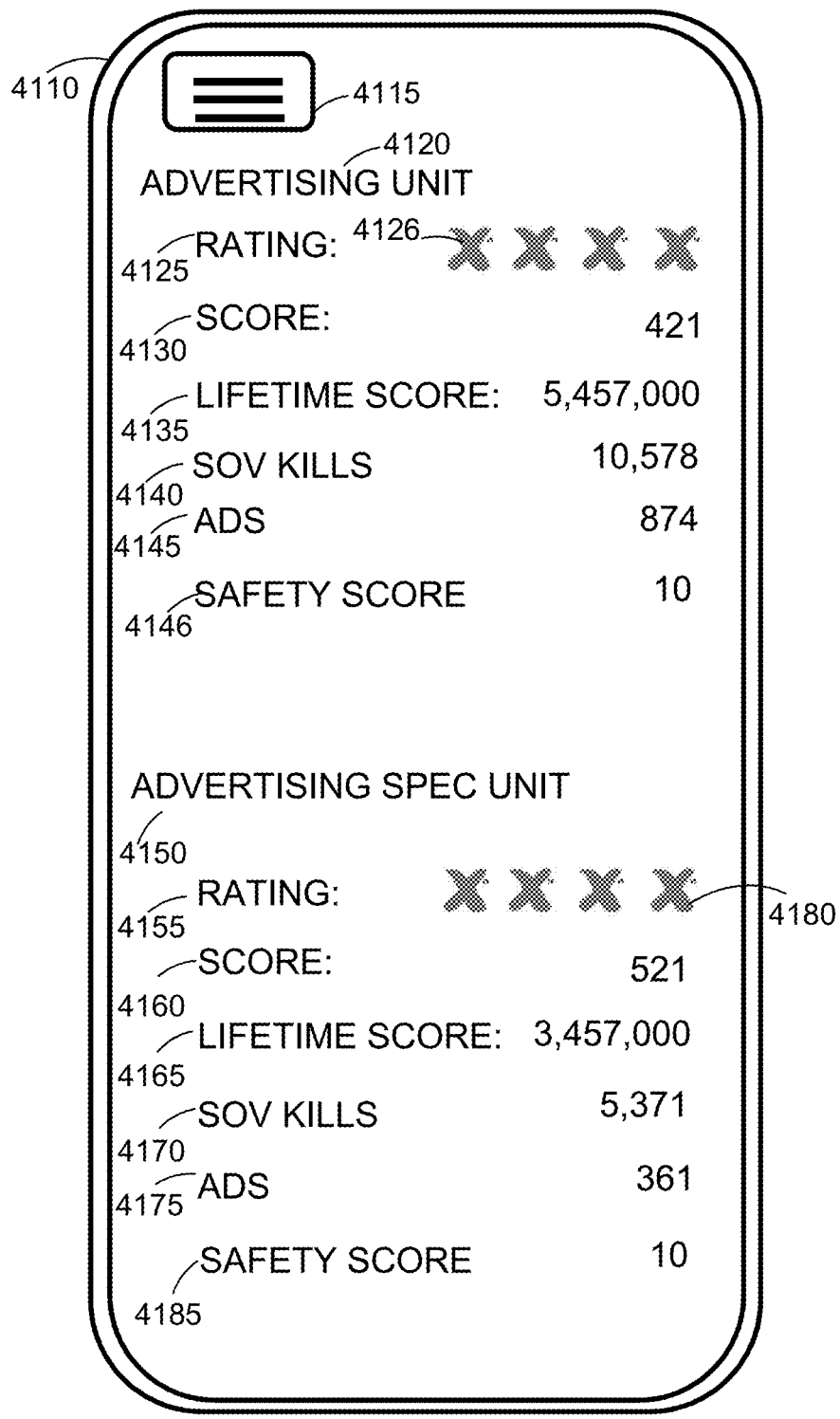
FIG. 41 illustrates an exemplary user interface and database configuration which displays a plurality of metrics for the performance of the user in the advertising portal game overlay and general system and method of advertising attribute specification community linked priced based navigation with associated advertising attribute specification price-time priority queues.

FIG. 41 illustrates another exemplary network configuration 4100 module of the disclosed method and system which records the rider or driver advertising community linked advertising attribute specification unit specification ratings for a given user on the system 4110 in the setting of a mobile computing device. In some embodiments, the multi layered network node topology of participating, transacting and/or trading advertising community linked advertising attribute specification or advertising capacity for price based navigation configuration 4100 includes the following elements, or a subset or superset thereof:

exemplary menu toggle box 4115;

exemplary rider advertising community linked advertising attribute specification unit rating category summary 4120;

exemplary rider advertising community linked advertising attribute specification unit rating summary 4125;

exemplary rider advertising community linked advertising attribute specification unit rating X logo amount 4126;

exemplary rider advertising community linked advertising attribute specification unit rating score for navigation route 4130;

exemplary rider advertising community linked advertising attribute specification unit rating lifetime score 4135;

exemplary rider advertising community linked advertising attribute specification unit SOV kills 4140;

exemplary rider advertising community linked advertising attribute specification unit ride count 4145;

exemplary rider advertising community linked advertising attribute specification unit ride safety score 4146;

exemplary driver advertising community linked advertising attribute specification unit rating category summary 4150;

exemplary driver advertising community linked advertising attribute specification unit rating summary 4155;

exemplary driver advertising community linked advertising attribute specification unit rating X logo amount 4180;

exemplary driver advertising community linked advertising attribute specification unit rating score for navigation route 4160;

exemplary driver advertising community linked advertising attribute specification unit rating lifetime score 4165;

exemplary driver advertising community linked advertising attribute specification unit SOV kills 5,371;

exemplary driver advertising community linked advertising attribute specification unit ride count 4175;

exemplary driver advertising community linked advertising attribute specification unit ride safety score 4185;

In some embodiments the price based navigation advertising community linked system game overlay layer uses a plurality of the aforementioned combinations to account for user actions in the game overlay of the disclosed method and system.

Figure 42:
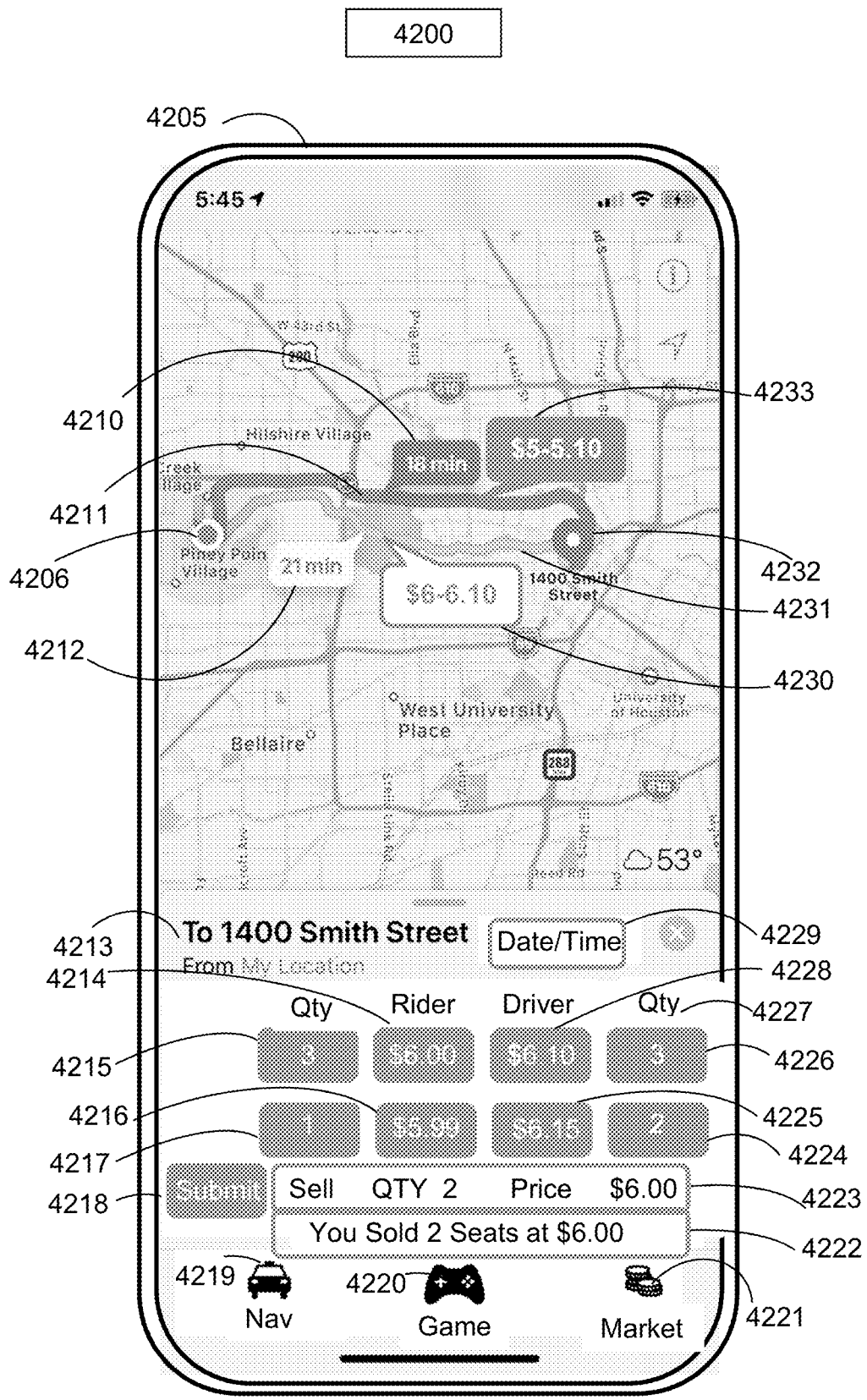
FIG. 42 illustrates an exemplary user interface and database configuration which displays a plurality of advertising attribute specification community linked routes between two user requested hubs indexed based on the pricing of advertising attribute specification community linked advertising attribute specification units or advertising attribute specification community linked advertising attribute specification unit securities with associated price-time priority queues and the associated open market transaction interface for those transformed advertising attribute specification community linked advertising attribute specification unit securities.

FIG. 42 illustrates another exemplary network configuration 4200 module of the disclosed method and system which records the rider or driver transformed advertising community linked advertising attribute specification unit or security specification and market framework for the transformation for a specified plurality of routes. In some embodiments, the multi layered network node topology of participating, transacting and/or trading transformed advertising community linked advertising attribute specification or advertising capacity units or securities for price based navigation configuration 4200 includes the following elements, or a subset or superset thereof:

exemplary computing device to display the method or system 4205;

exemplary estimated time of a primary indexed price based navigation route of a transformed advertising community linked advertising attribute specification unit or security 4120;

exemplary market price of a buyer and seller of primary price based navigation route of a transformed advertising community linked advertising attribute specification unit or security 4233;

exemplary price based navigation route of a primary transformed advertising community linked advertising attribute specification unit or security 4211;

exemplary estimated time of a secondary indexed price based navigation advertising community linked route of a transformed advertising community linked advertising attribute specification unit or security 4231;

exemplary estimated time of a secondary indexed price based navigation advertising community linked route of a transformed advertising community linked advertising attribute specification unit or security 4212;

exemplary market price of a buyer and seller of secondary price based navigation route of a transformed advertising attribute specification unit or security 4230;

exemplary starting point virtual hub of an indexed price based navigation advertising community linked route of a transformed advertising community linked advertising attribute specification unit or security 4206;

exemplary ending point virtual hub of an indexed price based navigation advertising community linked route of a transformed advertising community linked advertising attribute specification unit or security 4232;

exemplary ending point and starting point address of virtual hub(s) of an indexed price based navigation advertising community linked route of a transformed advertising community linked advertising attribute specification unit or security 4213;

exemplary date and time specification of an indexed price based navigation advertising community linked route of a transformed advertising community linked advertising attribute specification unit or security 4213;

exemplary number or quantity of transformed advertising community linked advertising attribute specification units or securities that are bidding or buying for purchase by riders of a secondary indexed price based navigation route of a transformed advertising community linked advertising attribute specification unit or security which is first in the rider queue indexed by highest price 4215;

exemplary price of transformed advertising community linked advertising attribute specification units or securities that are bidding or buying for purchase by riders of a secondary indexed price based navigation route of a transformed advertising community linked advertising attribute specification unit or security which is first in the rider queue indexed by highest price 4214;

exemplary price of transformed advertising community linked advertising attribute specification units or securities that are bidding or buying for purchase by riders of a secondary indexed price based navigation route of a transformed advertising community linked advertising attribute specification unit or security which is second in the rider queue indexed by second highest price 4216;

exemplary number or quantity of transformed advertising community linked advertising attribute specification units or securities that are bidding or buying for purchase by riders of a secondary indexed price based navigation route of a transformed advertising community linked advertising attribute specification unit or security which is second in the rider queue indexed by second highest price 4217;

exemplary number or quantity of transformed advertising community linked advertising attribute specification units or securities that are offering or selling by drivers of a secondary indexed price based navigation route of a transformed advertising community linked advertising attribute specification unit or security which is first in the driver queue indexed by lowest price 4226;

exemplary price of transformed advertising community linked advertising attribute specification units or securities that are offering or selling by drivers of a secondary indexed price based navigation route of a transformed advertising community linked advertising attribute specification unit or security which is first in the driver queue indexed by lowest price 4228;

exemplary number or quantity of transformed advertising community linked advertising attribute specification units or securities that are offering or selling by drivers of a secondary indexed price based navigation route of a transformed advertising community linked advertising attribute specification unit or security which is second in the driver queue indexed by second lowest price 4224;

exemplary price of transformed advertising community linked advertising attribute specification units or securities that are offering or selling by drivers of a secondary indexed price based navigation route of a transformed advertising community linked advertising attribute specification unit or security which is second in the driver queue indexed by second lowest price 4225;

exemplary order entry submit button to the method and system for a user order 4218;

exemplary order on the method and system by a driver to sell a specified quantity of transformed advertising community linked advertising attribute specification units or securities 4223;

exemplary order confirmation on the method and system by a driver sold two units of transformed advertising community linked advertising attribute specification units or securities 4222;

exemplary market view of priced based navigation layer to display indexed prices of a plurality routes which may be one, two, three, or an infinite number of routes between two virtual hubs 4222;

exemplary game view layer of a transformed advertising community linked advertising attribute specification unit or security 4220;

exemplary navigation view layer of a transformed advertising community linked advertising attribute specification unit or security 4219;

In some embodiments, the disclosed method and system may allow the user to select the model make such as by example an Acura 4020 as a model make 4015 which is placed in a certain transformed advertising community linked advertising attribute specification pool that may be aggregated with similar transformed advertising attribute specification unit specification participants or units that then display a user 110 selected navigation route 4211 or plurality of routes 4231 and 4211 or an infinite number of routes between the advertising community linked virtual hub start point 4206 and advertising community linked virtual hub endpoint 4232. In some embodiments the prices 4230 on a route 4231 may display the buy price of the highest bidder or rider on a given route 4231 which is listed in more detail in the rider queue display for highest indexed price bid 4214 for a route 4231. In some embodiments, the highest bid price 4214 for a rider on a given route 4231 has an associated quantity 4215 of transformed advertising community linked advertising attribute specification units or securities. Similarly, in some embodiments, the lowest offer or sale price 4228 for a driver on a given route 4231 has an associated quantity 4226 of transformed advertising community linked advertising attribute specification units or securities. In some embodiments, the rider quantity 4215 listed as three units, may be one rider, two riders, or three riders who desire to purchase a given transformed advertising community linked advertising attribute specification unit(s) or securities so long as the indexed price is queued to the top based on a highest price index and time stamp for a given specification of a transformed advertising community linked advertising attribute specification unit or security. In some embodiments, transformed advertising community linked advertising attribute specification units or securities may represent a similar pool of transformed advertising community linked advertising attribute specification units or securities based on a superset or subset or the plurality of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cardo 829, virtual 830, order types 710, 720, term specification 600, timing specification 500, virtual hub end point 230 and start point 220, or a plurality of other specifications. In some embodiments, the match of rider price 4214 and driver price 4228 for a transformed advertising community linked advertising attribute specification unit(s) or securities occurs the lowest price in the driver queue 4228 equals the highest price in the rider queue 4214. In some embodiments, if no such match of prices occur between driver and rider queues for a given specification of a transformed advertising community linked advertising attribute specification unit or security, then prices remain in the queue until a match or a new order entry re-indexes the order of all the deals because the price is higher than the current highest bid in the rider queue 4214 or the queue entries for the transformed advertising community linked advertising attribute specification unit or security may become re-indexed to place an order with the appropriate price index ranking in a queue that places the highest rider price 4214 in the top and descends by price 4216, then time of order entry all other things equal. In some embodiments, the driver price queue 4228, 4225 similarly ranks from lowest driver price 4228 at the top of the queue to highest driver price 4228 at the bottom on the queue, then indexing by time subordinate to price for a given pool specification of transformed advertising community linked advertising attribute specification units or securities. In some embodiments, a plurality of routes 4231 and 4211 may be displayed as price based advertising community linked navigation options indexed by market pricing. In some embodiments, the user may select one, two or many, many more routes as to how many they desire to be displayed as options between their virtual hubs to perform calculations that may maximize the number of advertising community linked advertising attribute specification units or securities they sell on a given route specification or the prices which they obtain or any combination of specifications or objectives the user may have in the price based navigation method and display of transformed advertising community linked advertising attribute specification unit or security.

Figure 43:
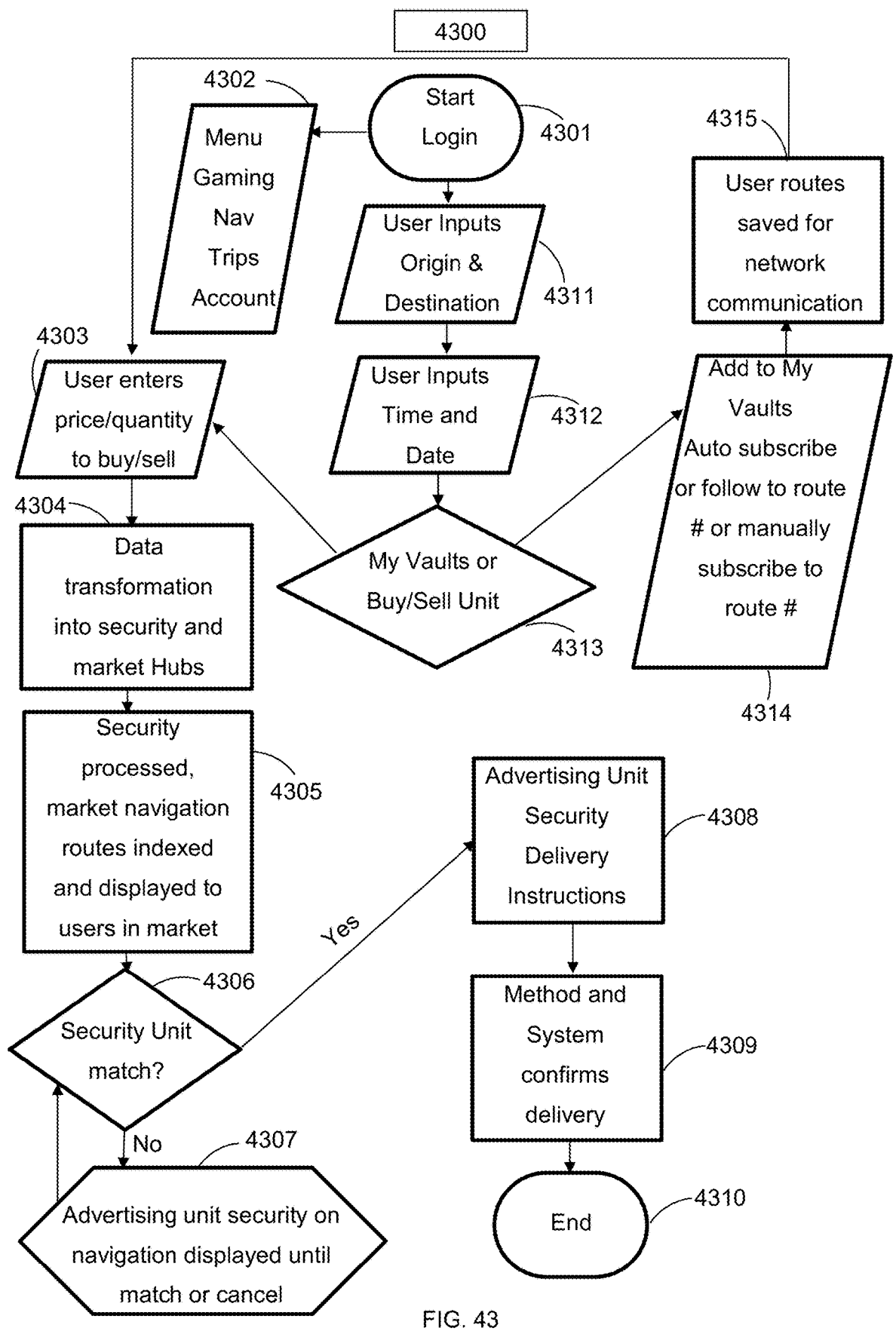
FIG. 43 illustrates an exemplary flow chart of steps in the advertising attribute specification community linked advertising attribute specification unit security data transformation and presentation of the advertising attribute specification unit security with integration to navigation systems with associated price-time priority queues which is another data transformation.

FIG. 43 illustrates an exemplary flow chart 4300 of user 110 experience during a transformed advertising attribute specification unit or security life cycle. In some embodiments the user 110 may login 4301 to the system which requires the user to go to a plurality of menu options 4302 or user input for origin and destination of advertising community linked virtual hubs 4311 alongside user inputs of time and date 4312 for a given specification that may contain a subset or superset of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cardo 829, virtual 830, order types 710, 720, term specification 600, timing specification 500, advertising community linked virtual hub end point 230 and start point 220, or a plurality of other specifications. In some embodiments, the user may save a route or vault to the "My Vaults" 4313 in "Add My Vaults" 4314 whereby the user route or vault is saved in the system for one touch retrieval in the future. In some embodiments, the user may enter a price or quantity to buy or sell a transformed advertising community linked advertising attribute specification unit or security of a given specification or specification combination 4303 which has many steps involved with the transformation of the advertising community linked advertising attribute specification unit or security. In some embodiments, additional data transformations occur to process 4305, market navigation route options and indexing 4305, virtual hub or virtual hub combination data transformations 4305, advertising community linked advertising attribute specification unit transformations 4305 and many other subsets or supersets of transformed advertising attribute specification unit combinations and combination specifications 4305. In some embodiments, if a transformed advertising community linked advertising attribute specification unit or security matches 4306 in price and specification, then the transformed advertising community linked advertising attribute specification unit or security moves into delivery 4308 and the delivery process has many steps of electric signal handoff 4308, 4309 and security checks 4308, 4309, 911 system checks 4308, 4309, GPS server and user 110 position checks 4308, 4309 as well as advertising attribute specification unit rating checks 4308, 4309 and many other possible checks for all the data elements of the transformed advertising community linked advertising attribute specification unit or security for verification of delivery 4308, 4309. In some embodiments, if prices of the buyer and seller queue do not match 4307, then the steps of processing 4304, 4305, 4306 repeat until a match is made 4306 to 4308 or an order is cancelled before it expires for the transformed advertising community linked advertising attribute specification unit or security.

Figure 44:
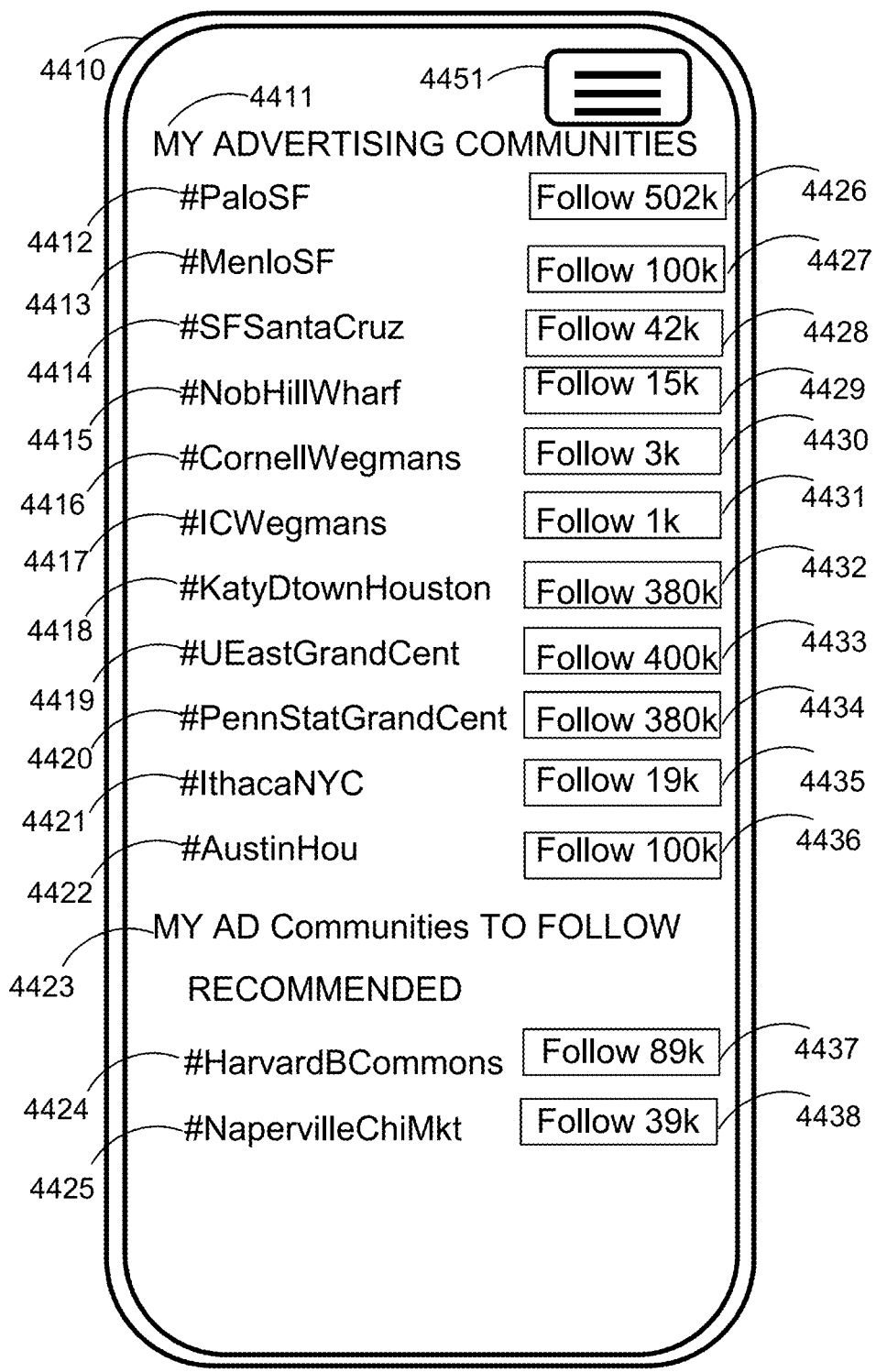
FIG. 44 illustrates an exemplary user interface of advertising attribute specification community linked virtual hub sequences with associated price-time priority queues as community object(s) to which users may subscribe.

FIG. 44 illustrates an exemplary user interface 4410 for the My Advertising Communities functions 4411. In some embodiments, the user interface 4410 may have a menu option 4451 to move to other areas of the method and system. In some embodiments, the virtual advertising community linked advertising attribute specification hub sequence as an object may be meta data tag #PaloSF 4412 to represent Palo Alto, California to San Francisco, California. In some embodiments, #PaloSF 4412 may have an option for the user 110 to Follow or Join or subscribe, or add 4426 the advertising community linked virtual advertising attribute specification hub sequence #PaloSF 4412. In some embodiments, the number of followers or network members who are joined to that community object transformed data structure 4412 are 502k 4426. In some embodiments, the virtual advertising attribute specification hub sequence as an object may be meta data tag #MenloSF 4413 to represent Menlo Park, California to San Francisco, California. In some embodiments, #MenloSF 4413 may have an option for the user 110 to Follow or Join or subscribe, or add 4427 the virtual advertising community linked advertising attribute specification hub sequence #MenloSF 4413. In some embodiments, the number of followers or network members who are joined to that community object transformed data structure 4413 are 100k 4427. In some embodiments, the virtual advertising community linked advertising attribute specification hub sequence as an object may be meta data tag #SFSantaCruz 4414 to represent San Francisco, California to Santa Cruz, California. In some embodiments, #SFSantaCruz 4414 may have an option for the user 110 to Follow or Join or subscribe, or add 4428 the virtual advertising community linked advertising attribute specification hub sequence #SFSantaCruz 4414. In some embodiments, the number of followers or network members who are joined to that community object transformed data structure 4414 are 42k 4428. In some embodiments, the virtual advertising community linked advertising attribute specification hub sequence as an object may be meta data tag #NobHillWharf 4415 to represent Nob Hill San Francisco, California to Fishermans Wharf, San Francisco, California. In some embodiments, #NobHillWharf 4415 may have an option for the user 110 to Follow or Join or subscribe, or add 4429 the virtual advertising community linked advertising attribute specification hub sequence #NobHillWharf 4415. In some embodiments, the number of followers or network members who are joined to that community object transformed data structure 4415 are 15k 4429. In some embodiments, the virtual advertising community linked advertising attribute specification hub sequence as an object may be meta data tag #CornellWegmans 4416 to represent Cornell University, Ithaca, NY to Wegmans, Ithaca, NY In some embodiments, #CornellWegmans 4416 may have an option for the user 110 to Follow or Join or subscribe, or add 4430 the virtual advertising community linked advertising attribute specification hub sequence #CornellWegmans 4416. In some embodiments, the number of followers or network members who are joined to that community object transformed data structure 4416 are 3k 4430. In some embodiments, the virtual advertising community linked advertising attribute specification hub sequence as an object may be meta data tag #ICWegmans 4417 to represent Ithaca College, Ithaca, NY to Wegmans, Ithaca, NY In some embodiments, #ICWegmans 4417 may have an option for the user 110 to Follow or Join or subscribe, or add 4431 the virtual advertising community linked advertising attribute specification hub sequence #ICWegmans 4417. In some embodiments, the number of followers or network members who are joined to that community object transformed data structure 4417 are 1k 4431. In some embodiments, the virtual advertising community linked advertising attribute specification hub sequence as an object may be meta data tag #KatyDtownHouston 4418 to represent Katy, Texas to Houston, Texas. In some embodiments, #KatyDtownHouston 4418 may have an option for the user 110 to Follow or Join or subscribe, or add 4432 the virtual advertising community linked advertising attribute specification hub sequence #KatyDtownHouston 4418. In some embodiments, the number of followers or network members who are joined to that community object transformed data structure 4418 are 380k 4432. In some embodiments, the virtual advertising community linked advertising attribute specification hub sequence as an object may be meta data tag #UEastGrandCent 4419 to represent Upper East Side, NYC to Grand Central Station, NYC. In some embodiments, #UEastGrandCent 4419 may have an option for the user 110 to Follow or Join or subscribe, or add 4433 the virtual advertising community linked advertising attribute specification hub sequence #UEastGrandCent 4419. In some embodiments, the number of followers or network members who are joined to that community object transformed data structure 4419 are 400k 4433. In some embodiments, the virtual advertising attribute specification hub sequence as an object may be meta data tag #PennStatGrandCent 4420 to represent Penn Station, NYC to Grand Central Station, NYC. In some embodiments, #PennStatGrandCent 4420 may have an option for the user 110 to Follow or Join or subscribe, or add 4434 the virtual advertising community linked advertising attribute specification hub sequence #PennStatGrandCent 4420. In some embodiments, the number of followers or network members who are joined to that community object transformed data structure 4420 are 280k 4434. In some embodiments, the virtual advertising attribute specification hub sequence as an object may be meta data tag #IthacaNYC 4421 to represent Ithaca, NY to Grand Central Station, NYC. In some embodiments, #IthacaNYC 4421 may have an option for the user 110 to Follow or Join or subscribe, or add 4435 the virtual advertising community linked advertising attribute specification hub sequence #IthacaNYC 4421. In some embodiments, the number of followers or network members who are joined to that community object transformed data structure 4421 are 19k 4435. In some embodiments, the virtual advertising community linked advertising attribute specification hub sequence as an object may be meta data tag #AustinHou 4422 to represent Austin, TX to Houston, TX In some embodiments, #AustinHou 4422 may have an option for the user 110 to Follow or Join or subscribe, or add 4436 the virtual advertising community linked advertising attribute specification hub sequence #AustinHou 4422. In some embodiments, the number of followers or network members who are joined to that advertising community linked community object transformed data structure 4422 are 100k 4436. In some embodiments, the virtual advertising community linked advertising attribute specification hub sequences may be recommended 4423 to follow as an object may be meta data tag #HarvardBCommons 4424 to represent Harvard, Cambridge, Mass to Boston Commons. In some embodiments, #HarvardBCommons 4424 may have an option for the user 110 to Follow or Join or subscribe, or add 4437 the virtual advertising community linked advertising attribute specification hub sequence #HarvardBCommons 4424. In some embodiments, the number of followers or network members who are joined to that community object transformed data structure 4424 are 89k 4437. In some embodiments, the virtual advertising community linked advertising attribute specification hub sequences may be recommended 4423 to follow as an object may be meta data tag #NapervilleChiMkt 4425 to represent Naperville, Chicago to Marketplace, Chicago, Ill. In some embodiments, #NapervilleChiMkt 4425 may have an option for the user 110 to Follow or Join or subscribe, or add 4438 the virtual advertising community linked advertising attribute specification hub sequence #NapervilleChiMkt 4425. In some embodiments, the number of followers or network members who are joined to that advertising community linked community object transformed data structure 4425 are 39k 4438.

Figure 45:
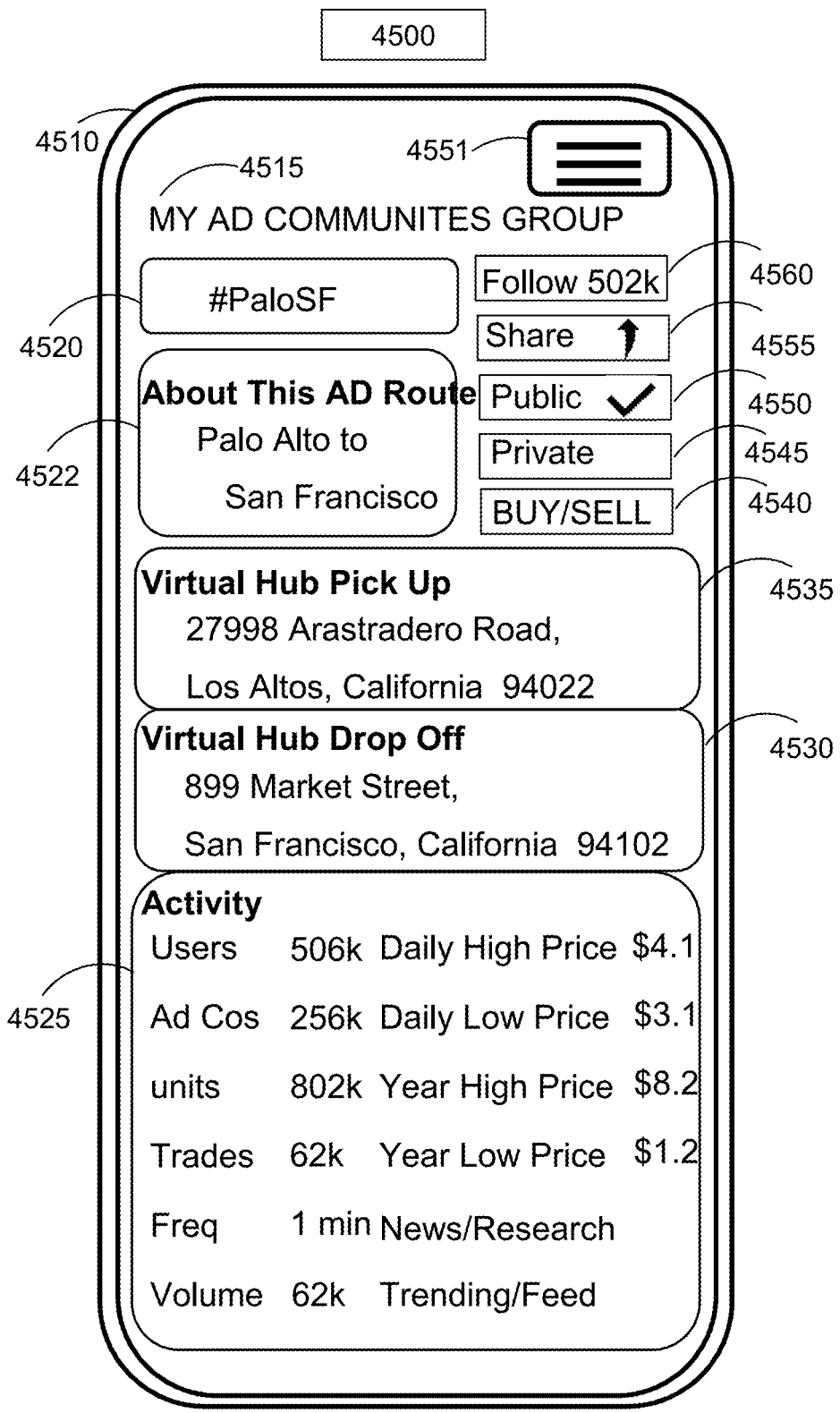
FIG. 45 illustrates an exemplary user interface of an exemplary advertising attribute specification community linked virtual hub sequence as a community object with associated price-time priority queues and the associated attributes.

FIG. 45 illustrates an exemplary user interface 4500 for the My Ad Communities Group 4515 for a specific transformed data structure of a transformed advertising community linked community virtual hub sequence 4520. In some embodiments, the meta data virtual hub sequence #PaloSF 4520 may list the long form route details in the about the advertising community linked route section 4522. In some embodiments, the specific hub sequence #PaloSF 4520 may list the amount of followers and an option to follow 4560. In some embodiments, the specific hub sequence #PaloSF 4520 may list the ability to share the advertising community linked community group with another social network or text or email or other network protocol. In some embodiments, the specific hub sequence #PaloSF 4520 may list group as public 4550 or private 4545. In some embodiments, the specific hub sequence #PaloSF 4520 may list gateway to buy or sell 4540 transformed advertising attribute specification units using the LOB 300 for a advertising community 241. In some embodiments, the specific hub sequence #PaloSF 4520 may list specific pick up hub address location 4535 or drop off point address 4530. In some embodiments, the specific hub sequence #PaloSF 4520 may list the activity statistics and data with respect to the number of riders 4525, number of drivers 4525, number of seats 4525, number of trades 4525, frequency of advertising community linked advertising attribute specification units 4525, volume of advertising community linked advertising attribute specification units 4525, daily high price for advertising attribute specification units 4525, daily low price for advertising community linked advertising attribute specification units on the community object of #PaloSF 4520, yearly high price

4525, yearly low price 4525, news, research, trending, feeds for the #PaloSF 4520 virtual hub sequence.

Figure 46:
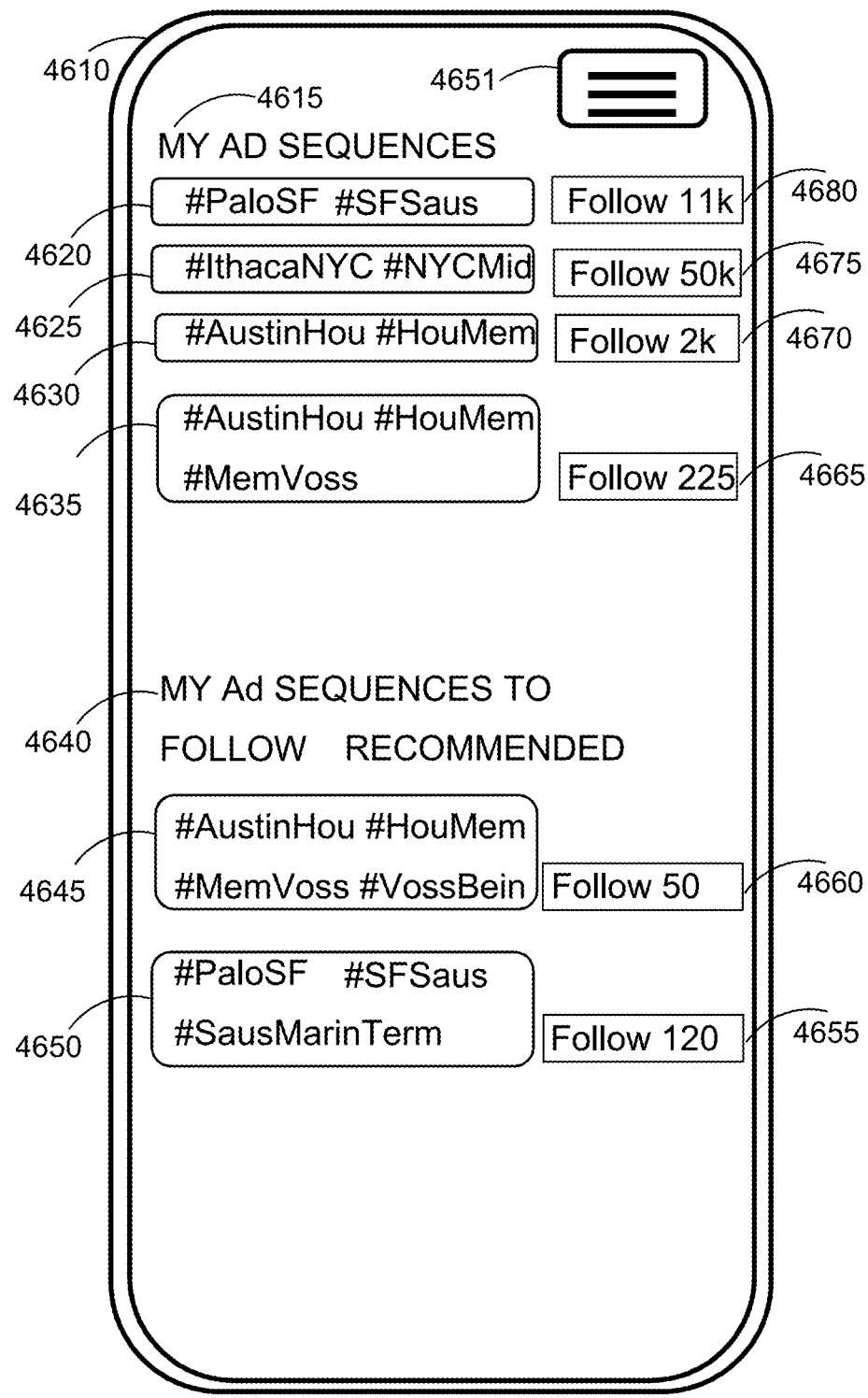
FIG. 46 illustrates an exemplary multi-virtual hub sequence advertising attribute specification community linked object combination with associated advertising attribute specification price-time priority queues.

FIG. 46 illustrates an exemplary user interface 4600 with respect to My Ad Sequences 4615 which may transform sequences with more than two virtual hubs into sequences as two or three or more series of route sequences 4620. In some embodiments, #PaloSF #SFSaus 4620 may represent an origin virtual hub sequence of Palo Alto, California to San Francisco, California followed by a secondary sequence of San Francisco, California to Sausalito, California 4620. Multi leg virtual hub sequences allow for the power of the data transformation to link the villages, cities or states from a network advertising community linked advertising attribute specification topology structure from multiple providers of advertising community linked advertising attribute specification units to provide higher levels of frequency and market opportunity to link public and private systems among many other benefits. In some embodiments, #PaloSF #SFSaus 4620 may allow input from users to join, follow, subscribe or become a member of multi leg sequences which help solve potential last mile issues within advertising community linked advertising attribute specification systems 4680. In some embodiments, #IthacaNYC #NYCMid 4625, may allow for an advertising community linked advertising attribute specification unit seller or buyer to connect two disparate advertising community linked advertising attribute specification networks to provide last mile advertising community linked advertising attribute specification to a destination at the lowest market cost because each leg or series of advertising community linked virtual hub sequences has an independent market associated with the leg or advertising community linked virtual hub sequence #IthacaNYC #NYCMid 4625. In some embodiments, #IthacaNYC #NYCMid 4625 may allow input from users to join, follow, subscribe or become a member of multi leg sequences which help solve potential last mile issues within advertising community linked advertising attribute specification systems 4675. In some embodiments, three two leg sequences may be attached through data transformations such that #AustinHou then takes a advertising attribute specification unit to #HouMem which then takes a advertising attribute specification unit to #MemVoss. The #AustinHou #HouMem #MemVoss 4635 three leg virtual hub sequence combination may further solve last mile issues for travelers where public transport may be an issue 4665 or private rides simply are going a different direction, but the sequence advertising community linked community object transformation helps travelers understand options and piece multiple advertising community linked advertising attribute specification systems onto a single community based object to aggregate communication and transaction benefits of the system. In some embodiments, prior history navigation searches and locations may be used to build recommended additional sequences 4640 which may be recommended for users to subscribe, join, follow or become a member. In some embodiments, the virtual hub route sequence may link 4 or more virtual hub sequence pairs or even combinations of already linked community object pairs 4645. In some embodiments, #AustinHou #HouMem #MemVoss #VossBein 4645 may be linked to provide a last mile sequence to a traveler or driver from Austin to the Memorial Area of Houston in a specific address. Traversing a series of linked trips may allow for the cost of non-linked trips to be dramatically lower due to using a series of connected local transformed community advertising units rather than a private for hire vehicle which may be 10 times the cost and add a reverse dead head trip that further pollutes the environment and leaves the driver without additional income on the dead head return leg. The transformed virtual hub sequence methodology allows for advertising community linked advertising attribute specification systems to be integrated in ways that were not formerly possible because the systems were disparate or simply did not allow for linked trips or linked community objects that could optimize topological network structures over existing inefficient structures. In some embodiments, virtual hub sequences which have been linked 4645 may also allow users to subscribe 4660. In some embodiments, #PaloSF #SFSaus #SausMarinTerm 4650 may be linked to provide a last mile sequence to a traveler or driver from Palo Alto, California to Marin Terminal in Sausilito, California in a specific address. In some embodiments, virtual hub sequences which have been linked 4650 may also allow users to subscribe 4655.

Figure 47:
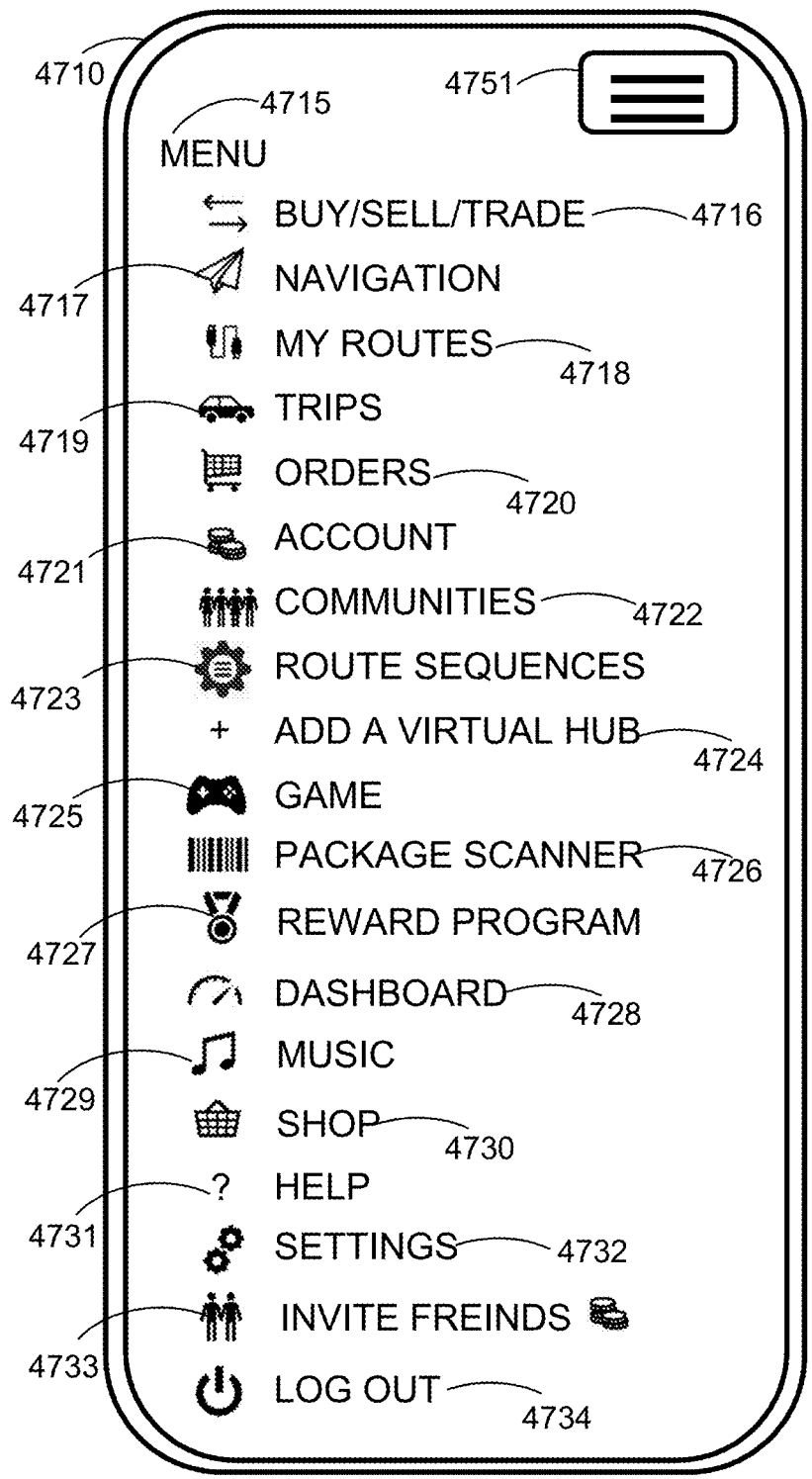
FIG. 47 illustrates an exemplary menu user interface for the method and system of advertising attribute specification community linked virtual hub advertising attribute specification sequence unit market with associated advertising attribute specification price-time priority queues system and method.

FIG. 47 illustrates an exemplary user menu interface 4700. In some embodiments, menu options may list as buy/sell/trade 4716 to go to the advertising community linked advertising attribute specification unit gateway trading platform for virtual hub combinations and virtual hub sequences. In some embodiments, the user interface may allow a user to go to the navigation 4717 module for price based navigation or route selection based on cost or earnings from a route as described in U.S. patent application Ser. No. 16/242,967, "Price Based Navigation," filed Jan. 8, 2019; the entirety of which is incorporated by reference herein. Furthermore, as described in U.S. patent application Publication Ser. No. 15/877,393, "Electronic Forward market exchange for transportation seats and capacity in transportation spaces and vehicles," filed Jan. 23, 2018, the entirety of which is incorporated by reference herein. In some embodiments, a user 110 may select my routes 4718 to toggle to routes that are important to their user profile or needs in the network member database 222. In some embodiments, trips 4719 may be selected to toggle to the trip delivery view. In some embodiments, orders 4720 may be selected to toggle to cancel or adjust orders in the system that are unfilled. In some embodiments, users may toggle to the account 4721 page or advertising community linked communities object page 4400 or the route sequences page 4723. In some embodiments, users 110 may add additional hubs 4724 or may toggle to the gaming interface 3700. In some embodiments, advertising community linked advertising attribute specification units may need to be scanned on the advertising scanning module 4726. In some embodiments, users may select the reward program module 4727 or the dashboard module 4728. In some embodiments, the user may select the music 4729 or shopping module 4730. In some embodiments, the user may select help 4731 or settings 4732 to update account information or privacy settings. In some embodiments, users 110 may invite friends 4733 for rewards or bonuses or cash or credits 4733. In some embodiments, users may also logout 4734.

Figure 48:
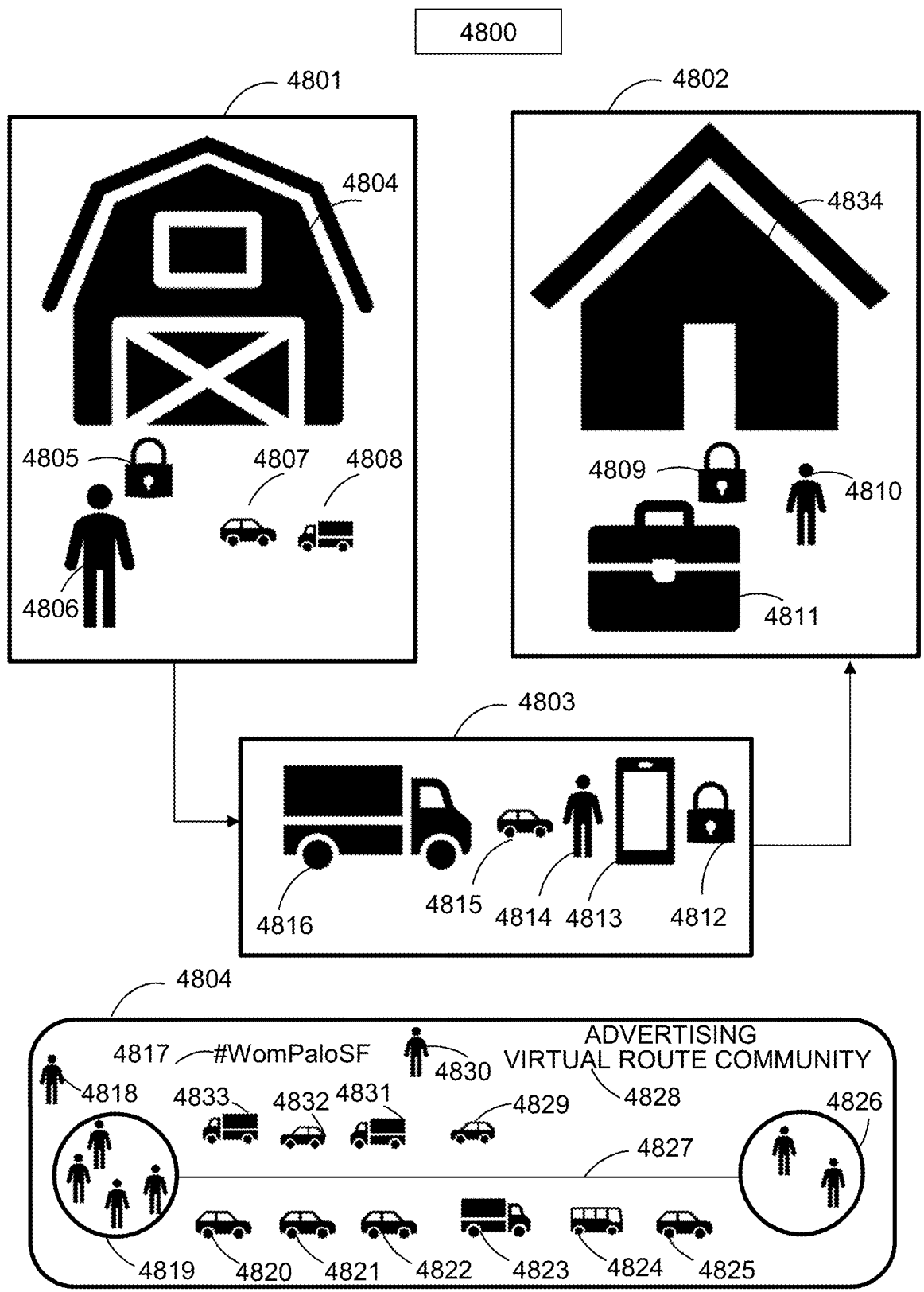
FIG. 48 illustrates an exemplary menu user interface for the method and system of advertising attribute specification community linked advertising attribute specification price-time priority queues with delivery security sequence.

FIG. 48 illustrates another exemplary network configuration 4800 module of the disclosed method and system which records the network architecture of a typical advertising community linked object with a price-time priority queue and resulting delivery sequence and integration with the advertising linked virtual community object. In some embodiments, the multi layered network node topology of participating, transacting and/or trading transformed advertising community linked advertising attribute specification or advertising capacity units or securities for advertising community linked objects 4800 includes the following elements, or a subset or superset thereof:

exemplary advertising community object waypoint origin 4801;

exemplary advertising community object waypoint destination 4802;

exemplary advertising community object during transit 4803;

exemplary advertising community object 4804 to which a user may subscribe, join, friend, follow, etc. . . . ;

exemplary barn or advertising community unit storage unit at a advertising community waypoint origin 4804;

exemplary storage security device which electronically locks or unlocks the advertising community object for transport 4805 at waypoint origin;

exemplary advertising community object user at waypoint origin 4806;

exemplary advertising community object unit in the form of an exemplary car at the advertising community waypoint origin 4807;

exemplary advertising community object unit in the form of an exemplary truck at the advertising community waypoint origin 4808;

exemplary storage security device which electronically locks or unlocks the advertising community object for transport 4809 at destination advertising waypoint;

exemplary advertising community object user at waypoint destination 4810;

exemplary advertising community delivery lock box or electronic confirmation of arrival at waypoint destination 4811 for advertising community unit;

exemplary advertising community unit transport vehicle in transit between origin and destination waypoint 4816;

exemplary advertising community unit in transit between origin and destination waypoint 4815;

exemplary advertising community unit transport driver in transit between origin and destination waypoint 4814;

exemplary advertising community unit transport mobile computer device method and system interface in transit between origin and destination waypoint 4813;

exemplary advertising community unit transport mobile computer device method and system security interface in transit between origin and destination waypoint 4812;

exemplary advertising community object tag between origin and destination waypoint(s) for a specified advertising community object such as a hammer 4817;

exemplary advertising community linked transport unit user at origin waypoint 4818;

exemplary advertising community linked virtual transport route object 4828;

exemplary advertising community linked transport user 4830;

exemplary advertising community linked object origin waypoint 4819 with users and advertising units;

exemplary advertising community linked object destination waypoint 4826 with users and advertising units;

exemplary advertising community virtual route user 4830;

exemplary advertising community linked object unit transport vehicles on an exemplary waypoint combination 4833, 4832, 4831, 4829, 4820, 4821, 4822, 4823, 4824, 4825.

In some embodiments, users 4806, 4810, 4814, 4818, 4830, 4819, 4826 may follow or subscribe or friend a advertising community linked virtual route 4828 for a particular advertising unit 4817 such as a banner ad or video ad by example, but not limited by example. In some embodiments, the advertising community linked advertising attribute specification unit 4817 may be comprised of such as open air lots, covered lots, assigned spots, street advertising, handicapped advertising, work advertising, school advertising, private home advertising, private garage advertising, advertising with an electric charge, large vehicle or a plurality of other advertising types. In some embodiments, the advertising community linked transport unit 4817 may be comprised of trucks 4808, cars 4807 or other vehicle types or advertising types. In some embodiments, the advertising community linked transport unit user may be a community member 4806 who owns advertising unit inventory 4807 at a waypoint origin 4819 and desires to participate or transact in the price-time priority queue 300 for a certain advertising unit 4807 on a waypoint sequence 4819, 4826 or 4801, 4802. In some embodiments, the advertising community linked transport unit user may be an end consumer, restaurant, hotel, carpenter or other end user 4810 who desires to participate in the price-time priority queue 300 for certain advertising units 4807, 4808. In some embodiments, the end user 4810 or origin owner 4806 of the advertising community linked object with waypoints 4804 may use a mobile or fixed or visual or audio interface computer unit 4813 to enter price-time priority queue 300 based transactions for advertising units 4807, 4808, 4819, 4826, 4815 along a advertising community linked waypoint combination path 4827. In some embodiments, advertising virtual route communities may serve as virtual rental markets 4804 with associated price time priority queues 300 and GPS tracking of the advertising units 4807, 4808, 4819, 4826, 4815 through the scanning of advertising units 2600 at advertising unit waypoint origin 4801, waypoint destination 4802, or along the waypoint sequence path 4803. In some embodiments, the user 4806 may transfer advertising units 4807, 4808 by using the scan feature 2600 of the mobile or fixed or visual or audio interface computer unit 4813 to a advertising community linked transport user 4814 in the advertising community linked vehicle 4816 as a security authorized transaction participant 4812 of the price-time priority queue 300 of the advertising community linked transport unit 4815. In some embodiments, the advertising community linked transport unit 4815 may be delivered to an end user 4810 at an end user destination waypoint 4834 by using the mobile or fixed or visual or audio interface computer unit 4813 unlock sequence 4809 interface to deliver the advertising community linked transport unit 4815 to a secure 4809 delivery storage unit 4811. In some embodiments, scanning procedures 2600 of the mobile or fixed or visual or audio interface computer unit 4813 may comprise secure transfer and records or the advertising community linked transport unit 4815 for both pickup transfer at the advertising community unit object origin 4801, waypoint combination transfer transport 4803 and waypoint destination delivery 4802.

FIG. 49 illustrates an exemplary advertising community inventory uplink interface 4900 of the disclosed method and system which may be user to upload advertising community linked transport unit inventory to the advertising linked virtual community object. In some embodiments, the uplink element of the multi layered network node topology of participating, transacting and/or trading transformed advertising community linked advertising attribute specification or advertising capacity units or securities for advertising community linked objects 4900 includes the following elements, or a subset or superset thereof:

exemplary advertising community object unit uplink interface 4901 for advertising unit inventory automation;

exemplary advertising community object unit header interface 4902;

exemplary advertising community object unit product type, quantity, specification, price, date and time 4903;

exemplary advertising community unit object of specification men eighteen to forty-nine 4904 with a plurality of additional specifications;

exemplary advertising community unit object of specification women eighteen to forty-nine 4905 with a plurality of additional specifications;

exemplary advertising community unit object of specification adults twenty-five to fifty-four 4906 with a plurality of additional specifications;

exemplary advertising community unit object of a women twenty-five to fifty-four unit 4907 with a plurality of additional specifications;

exemplary advertising community unit object of a men twenty-five to fifty-four unit 4908 with a plurality of additional specifications;

exemplary advertising community unit object of a children ten to eighteen 4909 with a plurality of additional specifications;

exemplary advertising community unit object of a seniors fifty-four to seventy-four 4911 with a plurality of additional specifications;

exemplary advertising community unit object of mothers eighteen to forty-nine 4912 with a plurality of additional specifications;

exemplary advertising community unit object of a mobile driver eighteen to forty-nine 4913 with a plurality of additional specifications;

exemplary advertising community unit object at origin waypoint 4916;

exemplary advertising community linked advertising attribute specification unit object transfer or bypass waypoint 4917;

exemplary advertising community linked advertising attribute specification unit object transfer or bypass waypoint 4918;

exemplary advertising community linked advertising attribute specification unit object destination waypoint 4919 and fixed area delivery advertising unit 4920;

In some embodiments, the method and system of advertising community linked advertising attribute specification units 4916 with advertising community linked advertising attribute specification price-time priority queues 300 may utilize an uplink module interface 4901 to upload advertising unit inventory 4901 to the advertising community linked advertising attribute specification unit object which may also be a form of a virtual advertising market interface to users of the method and system. In some embodiments, the advertising may include a subset or superset of the following advertising unit examples but not limiting by example: men eighteen to forty-nine 4904, women eighteen to forty-nine 4905, adults twenty-five to fifty-four 4906, women twenty-five to fifty-four 4907, twenty-five to fifty-four 4908, children ten to eighteen advertising 4909, seniors fifty-four to seventy-four advertising 4911, advertising with mothers eighteen to forty-nine 4912, mobile driver eighteen to forty-nine 4913 or a plurality of other advertising units common to the advertising market. In some embodiments, the advertising units may include specifications and specification profiles in the specifications to standardize the units in the data transformations of the advertising units 4916.

Figure 50:
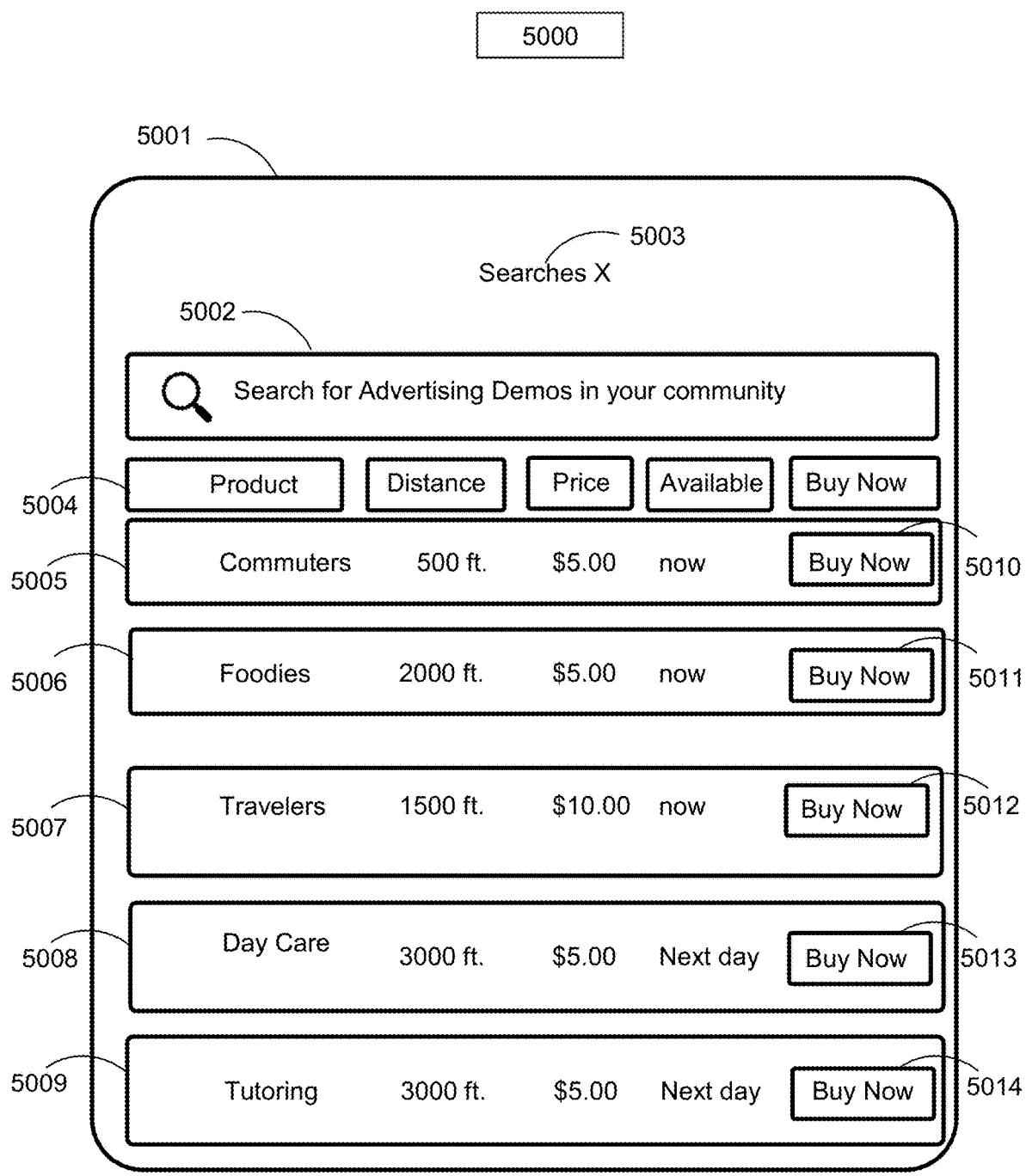
FIG. 50 illustrates an exemplary advertising attribute specification unit search interface with the advertising attribute specification community linked virtual hub advertising attribute specification sequence unit market with associated price-time priority queues.

FIG. 50 illustrates an exemplary advertising community search interface 5000 of the disclosed method and system which may be user to search for an advertising community linked advertising attribute specification unit inventory to the advertising linked virtual community object. In some embodiments, the search element of the multi layered network node topology of participating, transacting and/or trading transformed advertising community linked advertising attribute specification or advertising capacity units or securities for advertising community linked objects 4900 includes the following elements, or a subset or superset thereof:

exemplary advertising community unit object search interface mobile or fixed or audio computer unit 5001;

exemplary advertising community unit object search interface title 5003;

exemplary advertising community unit object search interface for user advertising search input 5002;

exemplary advertising community unit object category title header such as advertising unit product, distance to advertising, price of transformed advertising unit, availability of transformed advertising unit, rent or buy option for associated price-time priority queue of transformed advertising unit 5004;

exemplary advertising community unit object of an commuter advertising specification 5005 with a distance of 500 feet from the user at a price of $5.00 in the price-time priority queue with an immediate availability and an associated rent or buy now option button 5010;

exemplary advertising community unit object of a foodie advertising specification 5006 with a distance of 2000 feet from the user at a price of $5.00 in the price-time priority queue with an immediate availability and an associated rent or buy now option button 5011;

exemplary advertising community unit object of a traveler advertising specification 5007 with a distance of 1500 feet from the user at a price of $10.00 in the price-time priority queue with an immediate availability and an associated rent or buy now option button 5012;

exemplary advertising community unit object of a day care advertising spot 5008 with a distance of 3000 feet from the user at a price of $5.00 in the price-time priority queue with an immediate availability and an associated rent or buy now option button 5013;

exemplary advertising community unit object of a tutoring advertising spot 5009 with a distance of 3000 feet from the user at a price of $5.00 in the price-time priority queue with an immediate availability and an associated rent or buy now option button 5014.

In some embodiments, the search function 5002 for the advertising community object 4804 with a price-time priority queue auction indexes the search result with the following prioritization of first the advertising unit, then second the distance of the advertising unit from the user in the community object sequence, then by price-time priority. In some embodiments, the search function may prioritize as a second priority price-time prioritization followed by distance as a third index ranking. In some embodiments, the search function 5002 may provide instructions for the graphical user interface 5001 to state if availability of the transformed advertising unit is immediately available, available the next day or available a plurality of other time and date designations. In some embodiments, the advertising community object 5005 may state only the lowest price $5.00 of the then current price-time priority queue 300 for the specific object requested in the search function 5002. In some embodiments, the transformed advertising unit may be a commuter advertising unit 5005, a foodie advertising unit 5006, a traveler advertising unit 5007, a day care advertising spot 5008, a tutoring spot 5009 or a plurality of other alternative transformed advertising units. In some embodiments, the specific transformed advertising unit may have a buy now or rent now 5010 button. In some embodiments, the rent now button 5010 instantiates the instructions for allow the application to consummate a transaction with geolocation and step by step delivery instructions 900, 2100, 2200, 2300 with the user interface as shown from the match of the user who owns the transformed advertising unit the user who seeks to rent or buy the transformed advertising unit.

Figure 51:
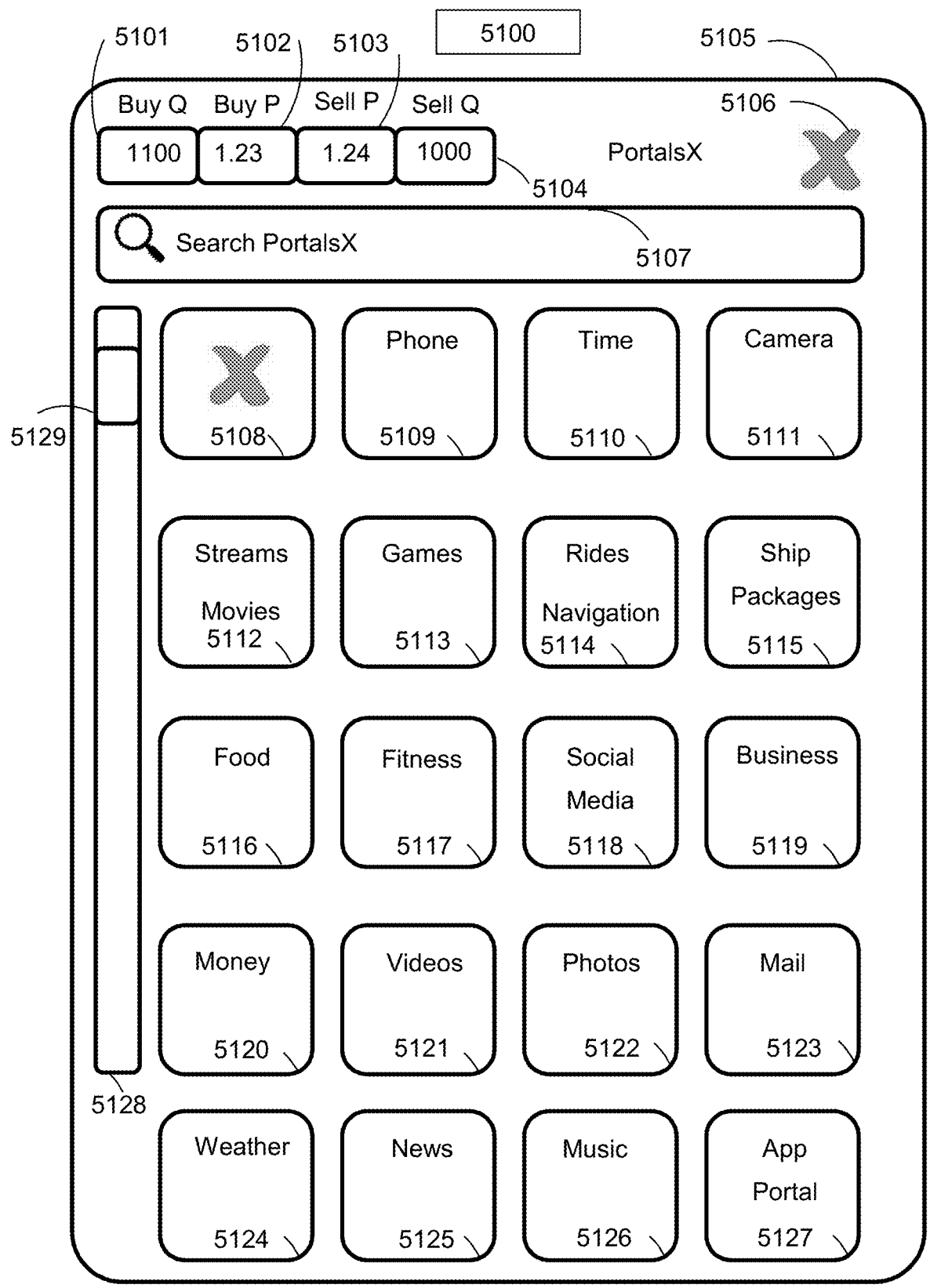
FIG. 51 illustrates an exemplary operating system portal with a plurality of applications and portal applications with the associated user data vault to transform the user data into an advertising attribute specification with the advertising attribute specification unit linked advertising attribute specification price-time priority market pricing and trading exchange queues.

FIG. 51 illustrates an exemplary advertising community operating system search interface 5100 of the disclosed method and system which may be user to search for an advertising community linked advertising attribute specification unit inventory to the advertising linked virtual community object. In some embodiments, the search and operating system element of the multi layered network node topology of participating, transacting and/or trading transformed advertising community linked advertising attribute specification or advertising capacity units or securities for advertising community linked objects 5100 includes the following elements, or a subset or superset thereof:

exemplary advertising community unit object and advertising attribute specification unit price-time priority queue bid quantity of eleven hundred with first priority position for a given user data vault 5101;

exemplary advertising community unit object and advertising attribute specification unit price-time priority queue bid price of one dollar and twenty-three cents with first priority position for a given user data vault 5102;

exemplary advertising community unit object and advertising attribute specification unit price-time priority queue offer or sell price of one dollar and twenty-four cents with first priority position for a given user data vault 5103;

exemplary advertising community unit object and advertising attribute specification unit price-time priority queue offer or sell quantity of one thousand with first priority position for a given user data vault 5104;

exemplary advertising community unit object and advertising attribute specification unit price-time priority queue operating system graphic user interface for a given user data vault 5105;

exemplary advertising community unit object setting for a specific user "x" for a given user data vault 5106;

exemplary advertising community unit object search input field for the operating system graphic user interface data socket for internet, application, picture, image, audio, augmented reality, mixed reality, virtual reality or other computing interface for a specific user "x" for a given user data vault 5107;

exemplary advertising community unit object and advertising attribute specification exchange application of "x" for a specific user "x" for a given user data vault 5108;

exemplary advertising community unit object and advertising attribute specification phone application for a specific user "x" for a given user data vault 5109;

exemplary advertising community unit object and advertising attribute specification time or clock application for a specific user "x" for a given user data vault 5110;

exemplary advertising community unit object and advertising attribute specification camera application for a specific user "x" for a given user data vault 5111;

exemplary advertising community unit object and advertising attribute specification streams and movies and videos application for a specific user "x" for a given user data vault 5112;

exemplary advertising community unit object and advertising attribute specification games application for a specific user "x" for a given user data vault 5113;

exemplary advertising community unit object and advertising attribute specification rides, mobility and transportation and navigation application for a specific user "x" for a given user data vault 5114;

exemplary advertising community unit object and advertising attribute specification freight and shipping and navigation application for a specific user "x" for a given user data vault 5115;

exemplary advertising community unit object and advertising attribute specification food order application for a specific user "x" for a given user data vault 5116;

exemplary advertising community unit object and advertising attribute specification fitness application for a specific user "x" for a given user data vault 5117;

exemplary advertising community unit object and advertising attribute specification social media application suite including general social, work or other social network for a specific user "x" for a given user data vault 5118;

exemplary advertising community unit object and advertising attribute specification business or work application for a specific user "x" for a given user data vault 5119;

exemplary advertising community unit object and advertising attribute specification money and investing application for a specific user "x" for a given user data vault 5120;

exemplary advertising community unit object and advertising attribute specification video application for a specific user "x" for a given user data vault 5121;

exemplary advertising community unit object and advertising attribute specification photo application for a specific user "x" for a given user data vault 5122;

exemplary advertising community unit object and advertising attribute specification mail or email application for a specific user "x" for a given user data vault 5123;

exemplary advertising community unit object and advertising attribute specification weather application for a specific user "x" for a given user data vault 5124;

exemplary advertising community unit object and advertising attribute specification news application for a specific user "x" for a given user data vault 5125;

exemplary advertising community unit object and advertising attribute specification music application for a specific user "x" for a given user data vault 5126;

exemplary advertising community unit object and advertising attribute specification general application or third-party application for a specific user "x" for a given user data vault 5127;

exemplary advertising community unit object and advertising attribute specification application scroll bar for a specific user "x" for a given user data vault 5128;

exemplary advertising community unit object and advertising attribute specification application scroll bar location distance for a specific user "x" for a given user data vault 5129.

In some embodiments, the operating system portal may have a plurality of applications such as a series of exchanges 5108, phone 5109, time and clock 5110, cameral 5111, movies and streams and screens 5112, games 5113, rides and navigation 5114, shipping and packages 5115, food delivery and search 5116, fitness 5117, social media 5118, business 5119, money and investing 5120, videos 5121, photos 5122, mail or email 5123, weather 5124, news 5125, music 5126, general application or third party application 5127, and a general search interface input screen 5107 to search existing applications, internet browsing or any data socket data exchange. In some embodiments, the advertising attribute specification trading market with price-time priority queues 5101, 5102, 5103, 5104 for a general user specification associated with their private user specification data vault 5106. In some embodiments, the graphic user interface of the operation system 5105 may display full lists of installed applications, data socket search results from the internet, uninstalled but available applications, which are associated with the private user data vault advertising attribute specification 5106. In some embodiments, a user may decide to sell or buy all, some or no portion of their given user data vault for their user advertising attribute specification 5106. In some embodiments, a user 110 may scroll applications and data socket exchanges with the operating system scroll bar distance locator 5129 and scroll bar 5128. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5101, 5102, 5103, 5104.

Figure 52:
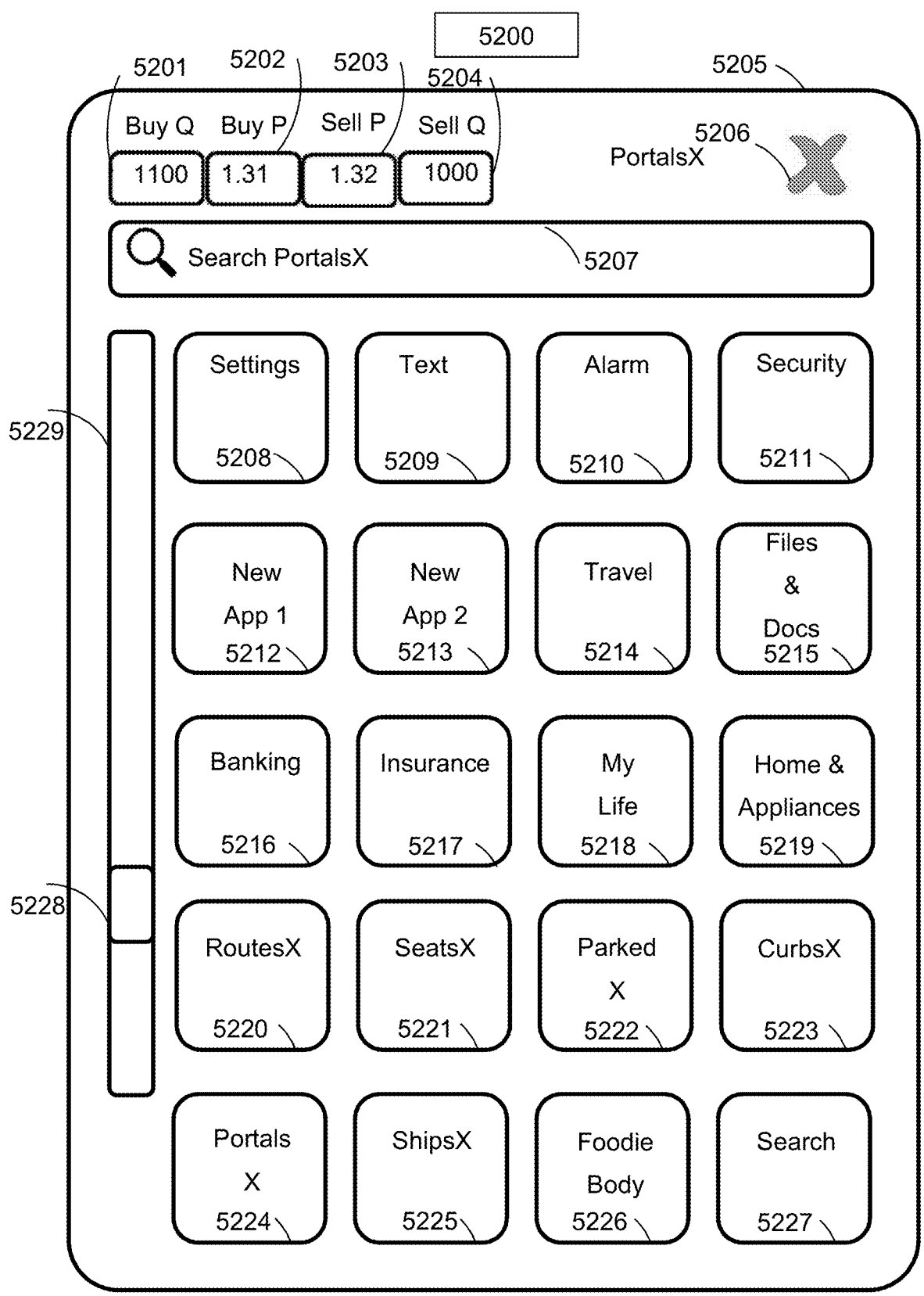
FIG. 52 illustrates an exemplary operating system portal with an additional plurality of applications and portal applications with the associated user data vault to transform the user data into an advertising attribute specification with the advertising attribute specification unit linked advertising attribute specification price-time priority market pricing and trading exchange queues.

FIG. 52 illustrates an exemplary advertising community operating system search interface 5200 of the disclosed method and system which may be user to search for an advertising community linked advertising attribute specification unit inventory to the advertising linked virtual community object. In some embodiments, the search and operating system element of the multi layered network node topology of participating, transacting and/or trading transformed advertising community linked advertising attribute specification or advertising capacity units or securities for advertising community linked objects 5200 includes the following elements, or a subset or superset thereof:

exemplary advertising community unit object and advertising attribute specification unit price-time priority queue bid quantity of eleven hundred with first priority position for a given user data vault 5201;

exemplary advertising community unit object and advertising attribute specification unit price-time priority queue bid price of one dollar and thirty-one cents with first priority position for a given user data vault 5202;

exemplary advertising community unit object and advertising attribute specification unit price-time priority queue offer or sell price of one dollar and thirty two cents with first priority position for a given user data vault 5203;

exemplary advertising community unit object and advertising attribute specification unit price-time priority queue offer or sell quantity of one thousand with first priority position for a given user data vault 5204;

exemplary advertising community unit object and advertising attribute specification unit price-time priority queue operating system graphic user interface for a given user data vault 5205;

exemplary advertising community unit object setting for a specific user "x" for a given user data vault 5206;

exemplary advertising community unit object search input field for the operating system graphic user interface data socket for internet, application, picture, image, audio, augmented reality, mixed reality, virtual reality or other computing interface for a specific user "x" for a given user data vault 5207;

exemplary advertising community unit object and advertising attribute specification settings application of "x" for a specific user "x" for a given user data vault 5208;

exemplary advertising community unit object and advertising attribute specification text application for a specific user "x" for a given user data vault 5209;

exemplary advertising community unit object and advertising attribute specification alarm application for a specific user "x" for a given user data vault 5210;

exemplary advertising community unit object and advertising attribute specification security application for a specific user "x" for a given user data vault 5211;

exemplary advertising community unit object and advertising attribute specification general new third-party application for a specific user "x" for a given user data vault 5212;

exemplary advertising community unit object and advertising attribute specification general new third party two application for a specific user "x" for a given user data vault 5213;

exemplary advertising community unit object and advertising attribute specification travel application for a specific user "x" for a given user data vault 5214;

exemplary advertising community unit object and advertising attribute specification files and documents application for a specific user "x" for a given user data vault 5215;

exemplary advertising community unit object and advertising attribute specification banking and investing application for a specific user "x" for a given user data vault 5216;

exemplary advertising community unit object and advertising attribute specification insurance application for a specific user "x" for a given user data vault 5217;

exemplary advertising community unit object and advertising attribute specification my life application suite including general social, work or other social network for a specific user "x" for a given user data vault 5118;

exemplary advertising community unit object and advertising attribute specification home and appliance application for a specific user "x" for a given user data vault 5219;

exemplary advertising community unit object and advertising attribute specification RoutesX navigation application for a specific user "x" for a given user data vault 5220;

exemplary advertising community unit object and advertising attribute specification SeatsX transportation and freight exchange application for a specific user "x" for a given user data vault 5221;

exemplary advertising community unit object and advertising attribute specification ParkedX transportation and parking exchange application for a specific user "x" for a given user data vault 5222;

exemplary advertising community unit object and advertising attribute specification CurbsX city curb management exchange application for a specific user "x" for a given user data vault 5223;

exemplary advertising community unit object and advertising attribute specification PortalsX application for a specific user "x" for a given user data vault 5224;

exemplary advertising community unit object and advertising attribute specification ShipsX shipping and freight application for a specific user "x" for a given user data vault 5225;

exemplary advertising community unit object and advertising attribute specification foodie body application for a specific user "x" for a given user data vault 5226;

exemplary advertising community unit object and advertising attribute specification search application for a specific user "x" for a given user data vault 5227;

exemplary advertising community unit object and advertising attribute specification application scroll bar for a specific user "x" for a given user data vault 5228;

exemplary advertising community unit object and advertising attribute specification application scroll bar location distance for a specific user "x" for a given user data vault 5229.

In some embodiments, the operating system portal may have an additional plurality of applications such as a series of settings 5208, text 5209, alarm 5210, security application 5211, third party one application 5212, third party two 5213, travel application 5214, files and document application 5215, banking and investment 5216, insurance application 5217, my life social media 5218, home and appliances 5219, RoutesX 5220, SeatsX 5221, ParkedX 5222, CurbsX 5223, PortalsX 5224, ShipsX 5225, Foodie Body 5226, general search application or third party search application 5227, and a general search interface input screen 5207 to search existing applications, internet browsing or any data socket data exchange. In some embodiments, the advertising attribute specification trading market with price-time priority queues 5201, 5202, 5203, 5204 for a general user specification associated with their private user specification data vault 5206. In some embodiments, the graphic user interface of the operation system 5205 may display full lists of installed applications, data socket search results from the internet, uninstalled but available applications, which are associated with the private user data vault advertising attribute specification 5206. In some embodiments, a user may decide to sell or buy all, some or no portion of their given user data vault for their user advertising attribute specification 5206. In some embodiments, a user 110 may scroll applications and data socket exchanges with the operating system scroll bar distance locator 5229 and scroll bar 5228. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5201, 5202, 5203, 5204.

Figure 53:
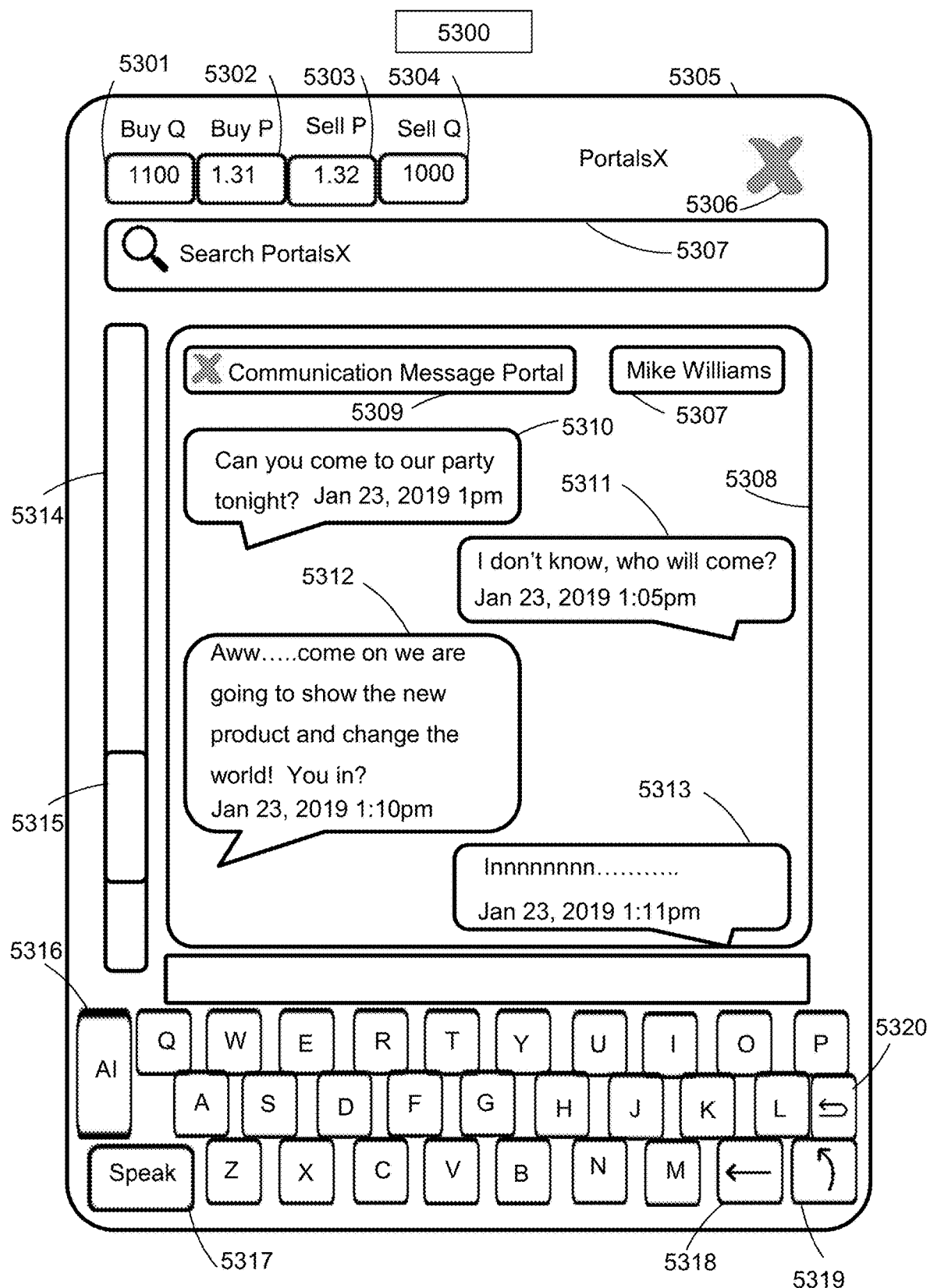
FIG. 53 illustrates an exemplary operating system communication text messaging portal or data socket communication portal linking one to one communication or one to many communication with the associated user data vault to transform the user data into an advertising attribute specification with the advertising attribute specification unit linked advertising attribute specification price-time priority market pricing and trading exchange queues.

FIG. 53 illustrates an exemplary advertising community operating system search interface 5300 for the messaging or text application 5209 of the disclosed method and system which may be user to search for an advertising community linked advertising attribute specification unit inventory to the advertising linked virtual community object. In some embodiments, the text, search and operating system element of the multi layered network node topology of participating, transacting and/or trading transformed advertising community linked advertising attribute specification or advertising capacity units or securities for advertising community linked objects 5300 includes the following elements, or a subset or superset thereof:

exemplary advertising community unit object and advertising attribute specification unit price-time priority queue bid quantity of eleven hundred with first priority position for a given user data vault 5301;

exemplary advertising community unit object and advertising attribute specification unit price-time priority queue bid price of one dollar and thirty-one cents with first priority position for a given user data vault 5302;

exemplary advertising community unit object and advertising attribute specification unit price-time priority queue offer or sell price of one dollar and thirty-two cents with first priority position for a given user data vault 5303;

exemplary advertising community unit object and advertising attribute specification unit price-time priority queue offer or sell quantity of one thousand with first priority position for a given user data vault 5304;

exemplary advertising community unit object and advertising attribute specification unit price-time priority queue operating system graphic user interface for a given user data vault 5305;

exemplary advertising community unit object setting for a specific user "x" for a given user data vault 5306;

exemplary advertising community unit object search input field for the operating system and text graphic user interface data socket for internet, application, picture, image, audio, augmented reality, mixed reality, virtual reality or other computing interface for a specific user "x" for a given user data vault 5307;

exemplary advertising community unit object and advertising attribute specification text or messaging application of "x" for a specific user "x" for a given user data vault 5308;

exemplary advertising community unit object and advertising attribute specification text or messaging portal application of "x" for a specific user "x" for a given user data vault 5309;

exemplary advertising community unit object and advertising attribute specification text or messaging portal application of text message priority four for a given user data vault 5310 with another user or one to many group;

exemplary advertising community unit object and advertising attribute specification text or messaging portal application of text message priority three for a given user data vault 5311 with another user or one to many group;

exemplary advertising community unit object and advertising attribute specification text or messaging portal application of text message priority two for a given user data vault 5312 with another user or one to many group;

exemplary advertising community unit object and advertising attribute specification text or messaging portal application of text message priority one or most recent for a given user data vault 5313 with another user or one to many group;

exemplary advertising community unit object and advertising attribute specification message or text scroll bar application for a specific user "x" for a given user data vault 5314;

exemplary advertising community unit object and advertising attribute specification scroll bar meter distance application for a specific user "x" for a given user data vault 5315;

exemplary advertising community unit object and advertising attribute specification AI or artificial intelligence Markovian network function for a specific user "x" for a given user data vault 5316 to recommend additional next text responses and markets in a ranked node list;

exemplary advertising community unit object and advertising attribute specification audio or voice command interface interpreter application for a specific user "x" for a given user data vault 5317;

exemplary advertising community unit object and advertising attribute specification keyboard backspace in standard QWERTY keyboard context for a specific user "x" for a given user data vault 5318;

exemplary advertising community unit object and advertising attribute specification keyboard rotation tool for additional keyboards in standard QWERTY keyboard context for a specific user "x" for a given user data vault 5319;

exemplary advertising community unit object and advertising attribute specification keyboard return or enter key in standard QWERTY keyboard context for a specific user "x" for a given user data vault 5320.

In some embodiments, the operating system portal may have an additional plurality of applications such as a series of text and messaging interface tools 5308, and a general search interface input screen 5307 to search existing operating system applications, internet browsing or any data socket data exchange. In some embodiments, the advertising attribute specification trading market with price-time priority queues 5301, 5302, 5303, 5304 for a general user specification associated with their private user specification data vault 5306. In some embodiments, the graphic user interface of the operation system 5305 may display full lists of installed applications, data socket search results from the internet, uninstalled but available applications, which are associated with the private user data vault advertising attribute specification 5306. In some embodiments, a user may decide to sell or buy all, some or no portion of their given user data vault for their user advertising attribute specification 5306. In some embodiments, a user 110 may scroll applications and data socket exchanges with the operating system scroll bar distance locator 5315 and scroll bar 5314. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5301, 5302, 5303, 5304. In some embodiments, a user 110 may enable their data vault 111 to allow the Markovian Networks 5316 to interpret and log texting and messaging of the user 110 so advertisers may directly buy their advertising attribute specification on the exchange and corresponding price-time priority queues for advertising attribute specifications 5301, 5302, 5303, 5304. In some embodiments, the user 110 may use the QWERTY keyboard or Markovian network generated responses 5316 or audio responses 5317 or keyboard entered or gesture responses to be entered 5320. In some embodiments, the user 110 may require a plurality of additional keyboard interfaces 5319. In some embodiments, the text and messaging interface may render the one to one text user name such as "Mike Williams" 5307 and a plurality of text messages 5310, 5311, 5312, 5313 between one on one communication or group text and messages with one to many communications.

Figure 54:
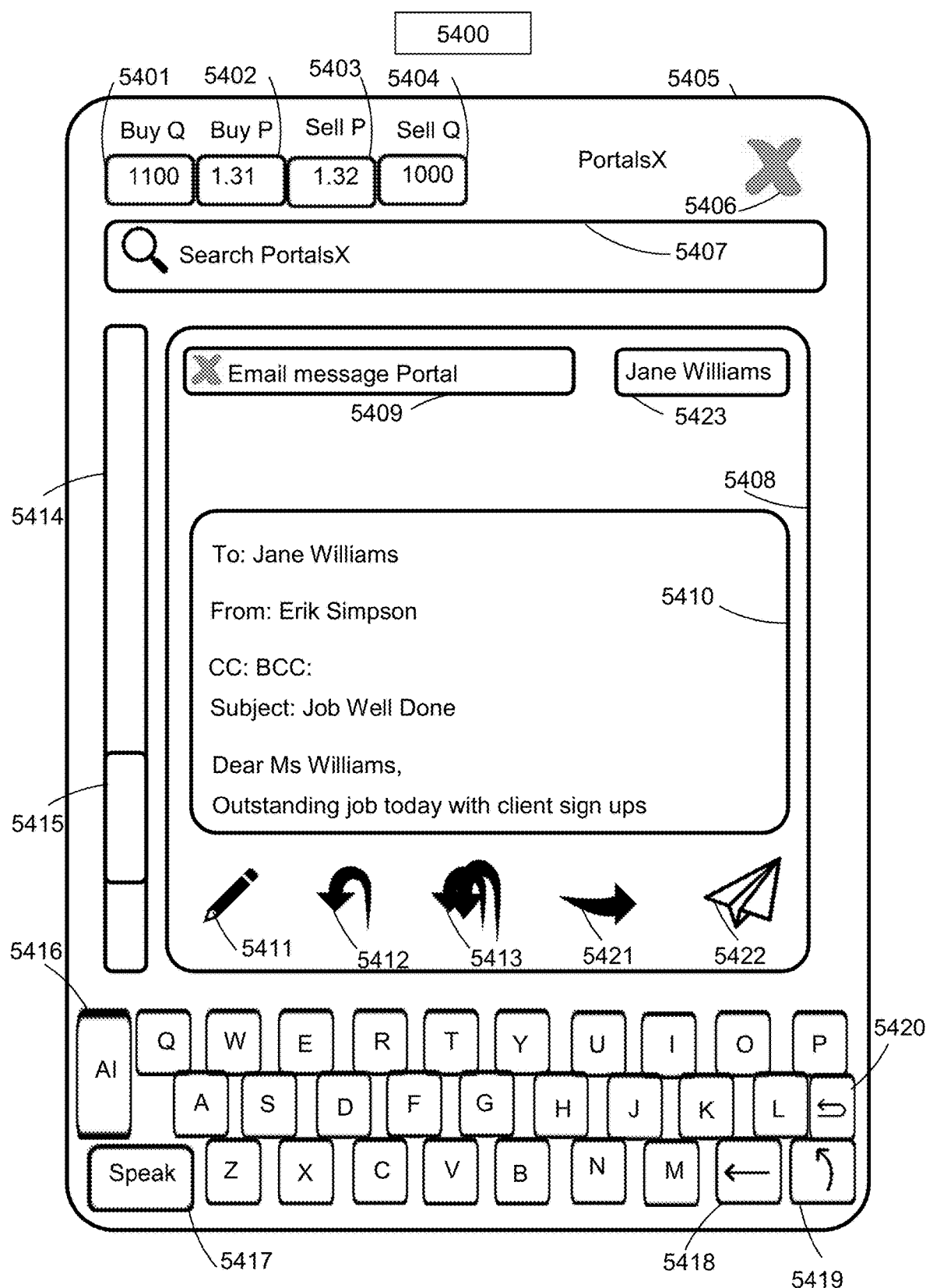
FIG. 54 illustrates an exemplary operating system communication email portal or data socket communication portal linking one to one communication or one to many communication with the associated user data vault to transform the user data into an advertising attribute specification with the advertising attribute specification unit linked advertising attribute specification price-time priority market pricing and trading exchange queues.

FIG. 54 illustrates an exemplary advertising community operating system search interface 5400 for the messaging or email application 5408 of the disclosed method and system which may be user to search for an advertising community linked advertising attribute specification unit inventory to the advertising linked virtual community object. In some embodiments, the email, search and operating system element of the multi layered network node topology of participating, transacting and/or trading transformed advertising community linked advertising attribute specification or advertising capacity units or securities for advertising community linked objects 5400 includes the following elements, or a subset or superset thereof:

exemplary advertising community unit object and advertising attribute specification unit price-time priority queue bid quantity of eleven hundred with first priority position for a given user data vault 5401;

exemplary advertising community unit object and advertising attribute specification unit price-time priority queue bid price of one dollar and thirty-one cents with first priority position for a given user data vault 5402;

exemplary advertising community unit object and advertising attribute specification unit price-time priority queue offer or sell price of one dollar and thirty-two cents with first priority position for a given user data vault 5403;

exemplary advertising community unit object and advertising attribute specification unit price-time priority queue offer or sell quantity of one thousand with first priority position for a given user data vault 5404;

exemplary advertising community unit object and advertising attribute specification unit price-time priority queue operating system graphic user interface for a given user data vault 5405;

exemplary advertising community unit object setting for a specific user "x" for a given user data vault 5406;

exemplary advertising community unit object search input field for the operating system and text graphic user interface data socket for internet, application, picture, image, audio, augmented reality, mixed reality, virtual reality or other computing interface for a specific user "x" for a given user data vault 5407;

exemplary advertising community unit object and advertising attribute specification email or messaging application of "x" for a specific user "x" for a given user data vault 5408;

exemplary advertising community unit object and advertising attribute specification email or messaging portal application of "x" for a specific user "x" for a given user data vault 5310;

exemplary advertising community unit object and advertising attribute specification email start new message button for a given user data vault 5311 with another user or one to many group;

exemplary advertising community unit object and advertising attribute specification email reply message button for a given user data vault 5312 with another user or one to many group;

exemplary advertising community unit object and advertising attribute specification email reply to all message button for a given user data vault 5313 with another user or one to many group;

exemplary advertising community unit object and advertising attribute specification email scroll bar for a given user data vault 5314 with another user or one to many group;

exemplary advertising community unit object and advertising attribute specification email scroll bar distance bar for a given user data vault 5315 with another user or one to many group;

exemplary advertising community unit object and advertising attribute specification scroll bar meter distance application for a specific user "x" for a given user data vault 5315;

exemplary advertising community unit object and advertising attribute specification AI or artificial intelligence Markovian network function for a specific user "x" for a given user data vault 5316 to recommend additional next text responses and markets in a ranked node list;

exemplary advertising community unit object and advertising attribute specification audio or voice command interface interpreter application for a specific user "x" for a given user data vault 5317;

exemplary advertising community unit object and advertising attribute specification keyboard backspace in standard QWERTY keyboard context for a specific user "x" for a given user data vault 5318;

exemplary advertising community unit object and advertising attribute specification keyboard rotation tool for additional keyboards in standard QWERTY keyboard context for a specific user "x" for a given user data vault 5319;

exemplary advertising community unit object and advertising attribute specification keyboard return or enter key in standard QWERTY keyboard context for a specific user "x" for a given user data vault 5320;

exemplary advertising community unit object and advertising attribute specification email send button for a given user data vault 5322 with another user or one to many group;

exemplary advertising community unit object and advertising attribute specification email name field for a given user data vault 5323 with another user or one to many group;

In some embodiments, the operating system portal may have an additional plurality of applications such as a series of email and messaging interface tools 5408, and a general search interface input screen 5407 to search existing operating system applications, internet browsing or any data socket data exchange. In some embodiments, the advertising attribute specification trading market with price-time priority queues 5401, 5402, 5403, 5404 for a general user specification associated with their private user specification data vault 5406. In some embodiments, the graphic user interface of the operation system 5405 may display full lists of installed applications, data socket search results from the internet, uninstalled but available applications, which are associated with the private user data vault advertising attribute specification 5406. In some embodiments, a user may decide to sell or buy all, some or no portion of their given user data vault for their user advertising attribute specification 5406. In some embodiments, a user 110 may scroll applications and data socket exchanges with the operating system scroll bar distance locator 5415 and scroll bar 5414. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5401, 5402, 5403, 5404. In some embodiments, a user 110 may enable their data vault 111 to allow the Markovian Networks 5416 to interpret and log texting and messaging of the user 110 so advertisers may directly buy their advertising attribute specification on the exchange and corresponding price-time priority queues for advertising attribute specifications 5401, 5402, 5403, 5404. In some embodiments, the user 110 may use the QWERTY keyboard or Markovian network generated responses 5416 or audio responses 5417 or keyboard entered or gesture responses to be entered 5420. In some embodiments, the user 110 may require a plurality of additional keyboard interfaces 5419. In some embodiments, the text and messaging interface may render the one to one text user name such as "Jane Williams" 5423 and a plurality of email messages 5410 between one on one communication or group text and messages with one to many communications. In some embodiments, the user 110 may initiate or compose a new message or email with the new message or new composition button 5411, they may reply to sender with the reply to sender button 5412, they may reply to all with the reply to all button 5413, they may forward the email or message with the forward button 5421, they may send the message or email with the send button 5422.

Figure 55:
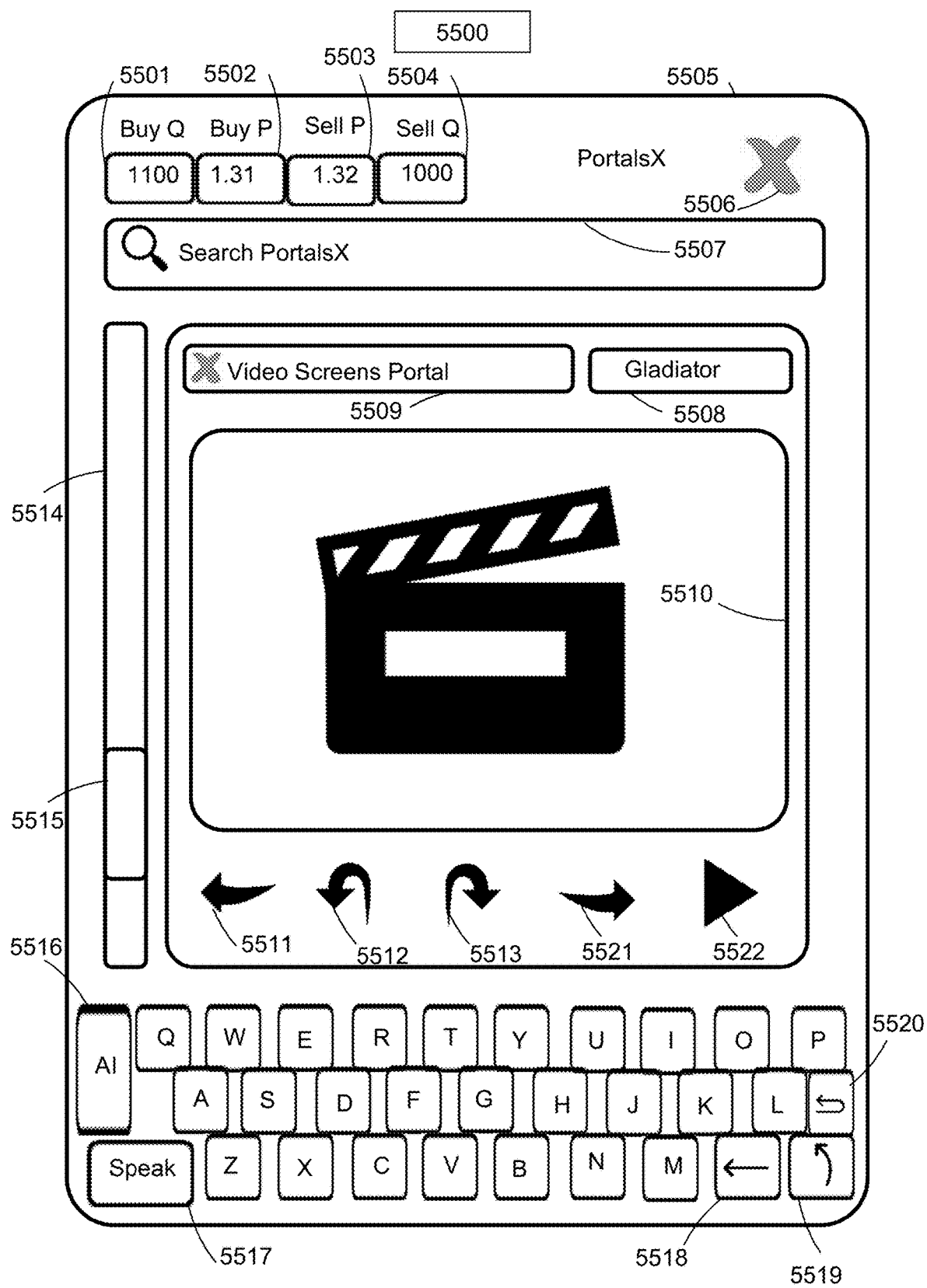
FIG. 55 illustrates an exemplary operating system video, television, video communication, movie portal or data socket communication portal linking content or one to one communication or one to many communication with the associated user data vault to transform the user data into an advertising attribute specification with the advertising attribute specification unit linked advertising attribute specification price-time priority market pricing and trading exchange queues.

FIG. 55 illustrates an exemplary advertising community operating system search interface 5500 for the video render and search application 5508 of the disclosed method and system which a user may search for an advertising community linked advertising attribute specification unit inventory to the advertising linked virtual community object. In some embodiments, the video, video search and operating system element of the multi layered network node topology of participating, transacting and/or trading transformed advertising community linked advertising attribute specification or advertising capacity units or securities for advertising community linked objects 5500 includes the following elements, or a subset or superset thereof:

exemplary advertising community unit object and advertising attribute specification unit price-time priority queue bid quantity of eleven hundred with first priority position for a given user data vault 5501;

exemplary advertising community unit object and advertising attribute specification unit price-time priority queue bid price of one dollar and thirty-one cents with first priority position for a given user data vault 5502;

exemplary advertising community unit object and advertising attribute specification unit price-time priority queue offer or sell price of one dollar and thirty-two cents with first priority position for a given user data vault 5503;

exemplary advertising community unit object and advertising attribute specification unit price-time priority queue offer or sell quantity of one thousand with first priority position for a given user data vault 5504;

exemplary advertising community unit object and advertising attribute specification unit price-time priority queue operating system graphic user interface for a given user data vault 5505;

exemplary advertising community unit object setting for a specific user "x" for a given user data vault 5506;

exemplary advertising community unit object search input field for the operating system and text graphic user interface data socket for internet, application, picture, image, audio, augmented reality, mixed reality, virtual reality or other computing interface for a specific user "x" for a given user data vault 5507;

exemplary advertising community unit object and advertising attribute specification video title application of "x" for a specific user "x" for a given user data vault 5508;

exemplary advertising community unit object and advertising attribute specification video application of "x" for a specific user "x" for a given user data vault 5509;

exemplary advertising community unit object and advertising attribute specification video portal application of "x" for a specific user "x" for a given user data vault 5510;

exemplary advertising community unit object and advertising attribute specification back to last video button for a given user data vault 5511 with another user or one to many group;

exemplary advertising community unit object and advertising attribute specification rewind video button for a given user data vault 5512 with another user or one to many group;

exemplary advertising community unit object and advertising attribute specification forward video for a given user data vault 5513 with another user or one to many group;

exemplary advertising community unit object and advertising attribute specification email scroll bar for a given user data vault 5514 with another user or one to many group;

exemplary advertising community unit object and advertising attribute specification email scroll bar distance bar for a given user data vault 5515 with another user or one to many group;

exemplary advertising community unit object and advertising attribute specification AI or artificial intelligence Markovian network function for a specific user "x" for a given user data vault 5516 to recommend additional next text responses and markets in a ranked node list;

exemplary advertising community unit object and advertising attribute specification audio or voice command interface interpreter application for a specific user "x" for a given user data vault 5517;

exemplary advertising community unit object and advertising attribute specification keyboard backspace in standard QWERTY keyboard context for a specific user "x" for a given user data vault 5518;

exemplary advertising community unit object and advertising attribute specification keyboard rotation tool for additional keyboards in standard QWERTY keyboard context for a specific user "x" for a given user data vault 5519;

exemplary advertising community unit object and advertising attribute specification keyboard return or enter key in standard QWERTY keyboard context for a specific user "x" for a given user data vault 5520;

exemplary advertising community unit object and advertising attribute specification video share button for a given user data vault 5521 with another user or one to many group;

exemplary advertising community unit object and advertising attribute specification video play button for a given user data vault 5522 with another user or one to many group;

In some embodiments, the operating system portal may have an additional plurality of applications such as a series of video interface tools 5508, and a general search interface input screen 5507 to search existing operating system applications, internet browsing or any data socket data exchange. In some embodiments, the advertising attribute specification trading market with price-time priority queues 5501, 5502, 5503, 5504 for a general user specification associated with their private user specification data vault 5506. In some embodiments, the graphic user interface of the operation system 5505 may display full lists of installed applications, data socket search results from the internet, uninstalled but available applications, which are associated with the private user data vault advertising attribute specification 5506. In some embodiments, a user may decide to sell or buy all, some or no portion of their given user data vault for their user advertising attribute specification 5506. In some embodiments, a user 110 may scroll applications and data socket exchanges with the operating system scroll bar distance locator 5515 and scroll bar 5514. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5501, 5502, 5503, 5504. In some embodiments, a user 110 may enable their data vault 111 to allow the Markovian Networks 5516 to interpret and log video history or search of the user 110 so advertisers may directly buy their advertising attribute specification on the exchange and corresponding price-time priority queues for advertising attribute specifications 5501, 5502, 5503, 5504. In some embodiments, the user 110 may use the QWERTY keyboard or Markovian network generated responses 5516 or audio responses 5517 or keyboard entered or gesture responses to be entered 5520. In some embodiments, the user 110 may require a plurality of additional keyboard interfaces 5519. In some embodiments, a user 110 may rewind video 5512, forward video 5513, share video 5521, play video 5522, go back to a video search list 5511 or a plurality of other search functions 5509.

Figure 56:
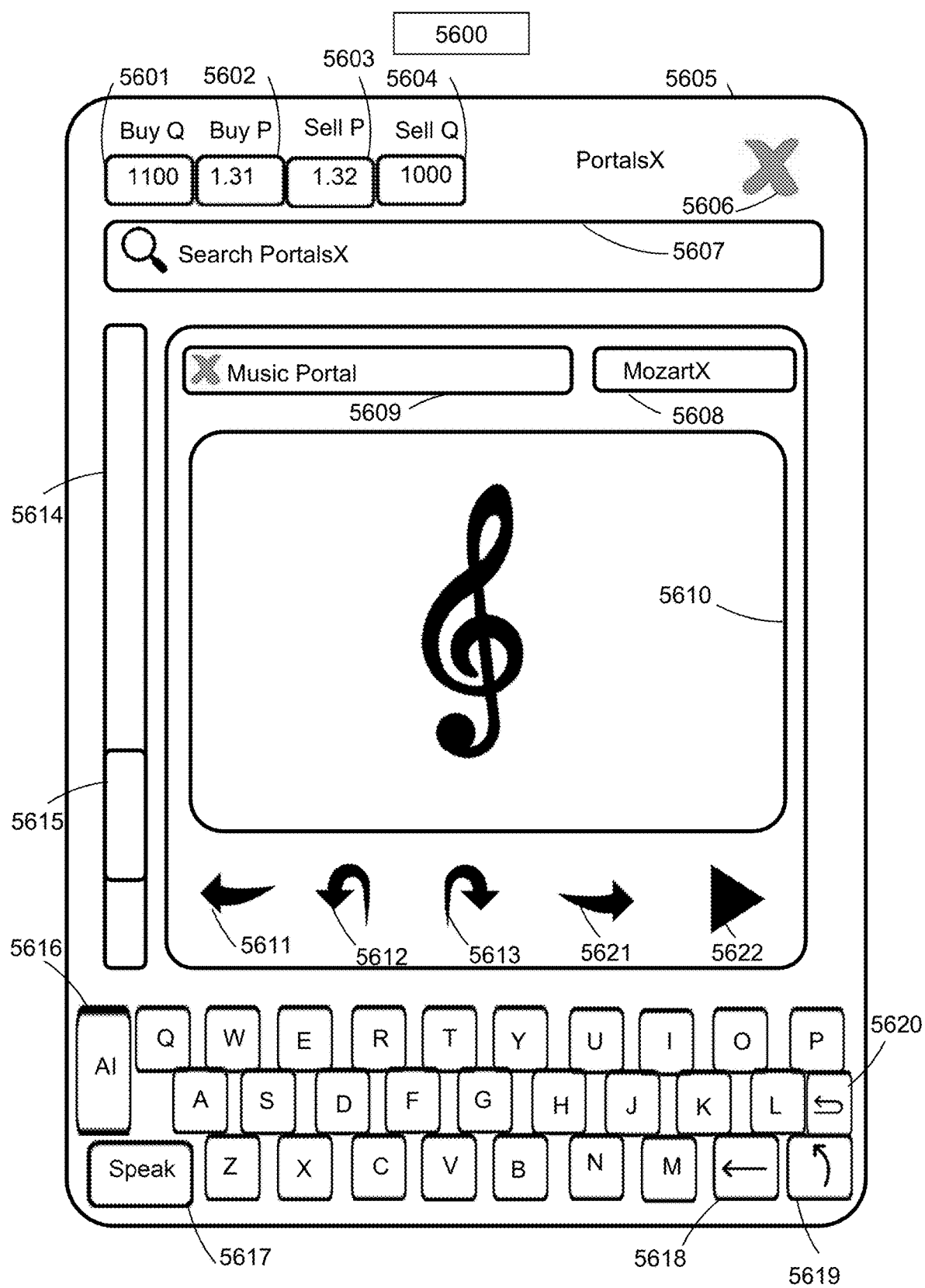
FIG. 56 illustrates an exemplary operating system music, music communication, audio portal or data socket communication portal linking content or one to one communication or one to many communication with the associated user data vault to transform the user data into an advertising attribute specification with the advertising attribute specification unit linked advertising attribute specification price-time priority market pricing and trading exchange queues.

FIG. 56 illustrates an exemplary advertising community operating system search interface 5600 for the music render and play and search application 5608 of the disclosed method and system which a user may search for an advertising community linked advertising attribute specification unit inventory to the advertising linked virtual community object. In some embodiments, the video, video search and operating system element of the multi layered network node topology of participating, transacting and/or trading transformed advertising community linked advertising attribute specification or advertising capacity units or securities for advertising community linked objects 5600 includes the following elements, or a subset or superset thereof:

exemplary advertising community unit object and advertising attribute specification unit price-time priority queue bid quantity of eleven hundred with first priority position for a given user data vault 5601;

exemplary advertising community unit object and advertising attribute specification unit price-time priority queue bid price of one dollar and thirty-one cents with first priority position for a given user data vault 5602;

exemplary advertising community unit object and advertising attribute specification unit price-time priority queue offer or sell price of one dollar and thirty-two cents with first priority position for a given user data vault 5603;

exemplary advertising community unit object and advertising attribute specification unit price-time priority queue offer or sell quantity of one thousand with first priority position for a given user data vault 5604;

exemplary advertising community unit object and advertising attribute specification unit price-time priority queue operating system graphic user interface for a given user data vault 5605;

exemplary advertising community unit object setting for a specific user "x" for a given user data vault 5606;

exemplary advertising community unit object search input field for the operating system and text graphic user interface data socket for internet, application, picture, image, audio, augmented reality, mixed reality, virtual reality or other computing interface for a specific user "x" for a given user data vault 5607;

exemplary advertising community unit object and advertising attribute specification music title application of "x" for a specific user "x" for a given user data vault 5608;

exemplary advertising community unit object and advertising attribute specification music application of "x" for a specific user "x" for a given user data vault 5609;

exemplary advertising community unit object and advertising attribute specification music audio or video portal application of "x" for a specific user "x" for a given user data vault 5610;

exemplary advertising community unit object and advertising attribute specification back to last song or track button for a given user data vault 5621 with another user or one to many group;

exemplary advertising community unit object and advertising attribute specification rewind song or track button for a given user data vault 5612 with another user or one to many group;

exemplary advertising community unit object and advertising attribute specification forward song or track for a given user data vault 5613 with another user or one to many group;

exemplary advertising community unit object and advertising attribute specification email scroll bar for a given user data vault 5614 with another user or one to many group;

exemplary advertising community unit object and advertising attribute specification email scroll bar distance bar for a given user data vault 5615 with another user or one to many group;

exemplary advertising community unit object and advertising attribute specification AI or artificial intelligence Markovian network function for a specific user "x" for a given user data vault 5616 to recommend additional next text responses and markets in a ranked node list;

exemplary advertising community unit object and advertising attribute specification audio or voice command interface interpreter application for a specific user "x" for a given user data vault 5617;

exemplary advertising community unit object and advertising attribute specification keyboard backspace in standard QWERTY keyboard context for a specific user "x" for a given user data vault 5618;

exemplary advertising community unit object and advertising attribute specification keyboard rotation tool for additional keyboards in standard QWERTY keyboard context for a specific user "x" for a given user data vault 5619;

exemplary advertising community unit object and advertising attribute specification keyboard return or enter key in standard QWERTY keyboard context for a specific user "x" for a given user data vault 5620;

exemplary advertising community unit object and advertising attribute specification music, track or video share button for a given user data vault 5621 with another user or one to many group;

exemplary advertising community unit object and advertising attribute specification music, track or video play button for a given user data vault 5622 with another user or one to many group;

In some embodiments, the operating system portal may have an additional plurality of applications such as a series of video interface tools 5608, and a general search interface input screen 5607 to search existing operating system applications, internet browsing or any data socket data exchange. In some embodiments, the advertising attribute specification trading market with price-time priority queues 5601, 5602, 5603, 5604 for a general user specification associated with their private user specification data vault 5606. In some embodiments, the graphic user interface of the operation system 5605 may display full lists of installed applications, data socket search results from the internet, uninstalled but available applications, which are associated with the private user data vault advertising attribute specification 5606. In some embodiments, a user may decide to sell or buy all, some or no portion of their given user data vault for their user advertising attribute specification 5606. In some embodiments, a user 110 may scroll applications and data socket exchanges with the operating system scroll bar distance locator 5615 and scroll bar 5614. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5601, 5602, 5603, 5604. In some embodiments, a user 110 may enable their data vault 111 to allow the Markovian Networks 5616 to interpret and log video history or search of the user 110 so advertisers may directly buy their advertising attribute specification on the exchange and corresponding price-time priority queues for advertising attribute specifications 5601, 5602, 5603, 5604. In some embodiments, the user 110 may use the QWERTY keyboard or Markovian network generated responses 5616 or audio responses 5617 or keyboard entered or gesture responses to be entered 5620. In some embodiments, the user 110 may require a plurality of additional keyboard interfaces 5619. In some embodiments, a user 110 may rewind music or track or video 5612, forward music or track or video 5613, share music or track or video 5621, play music or track or video 5622, go back to a music or track or video search list 5611 or a plurality of other search functions 5609.

Figure 57:
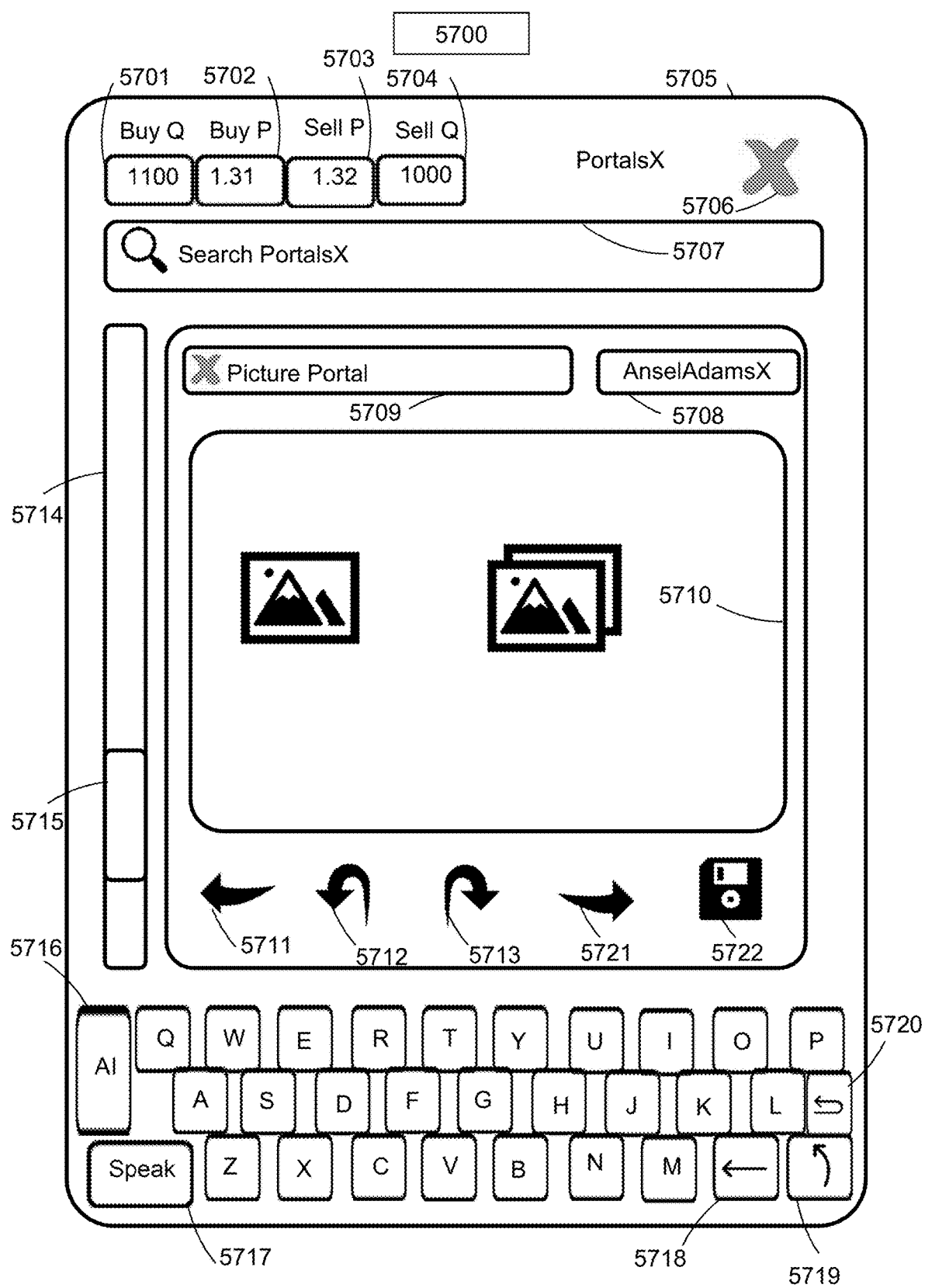
FIG. 57 illustrates an exemplary operating system photo, picture communication, image portal or data socket communication portal linking content or one to one communication or one to many communication with the associated user data vault to transform the user data into an advertising attribute specification with the advertising attribute specification unit linked advertising attribute specification price-time priority market pricing and trading exchange queues.

FIG. 57 illustrates an exemplary advertising community operating system search interface 5700 for the image render and play and search application 5708 of the disclosed method and system which a user may search for an advertising community linked advertising attribute specification unit inventory to the advertising linked virtual community object. In some embodiments, the image, video, video search and operating system element of the multi layered network node topology of participating, transacting and/or trading transformed advertising community linked advertising attribute specification or advertising capacity units or securities for advertising community linked objects 5700 includes the following elements, or a subset or superset thereof:

exemplary advertising community unit object and advertising attribute specification unit price-time priority queue bid quantity of eleven hundred with first priority position for a given user data vault 5701;

exemplary advertising community unit object and advertising attribute specification unit price-time priority queue bid price of one dollar and thirty-one cents with first priority position for a given user data vault 5702;

exemplary advertising community unit object and advertising attribute specification unit price-time priority queue offer or sell price of one dollar and thirty-two cents with first priority position for a given user data vault 5703;

exemplary advertising community unit object and advertising attribute specification unit price-time priority queue offer or sell quantity of one thousand with first priority position for a given user data vault 5704;

exemplary advertising community unit object and advertising attribute specification unit price-time priority queue operating system graphic user interface for a given user data vault 5705;

exemplary advertising community unit object setting for a specific user "x" for a given user data vault 5706;

exemplary advertising community unit object search input field for the operating system and text graphic user interface data socket for internet, application, picture, image, audio, augmented reality, mixed reality, virtual reality or other computing interface for a specific user "x" for a given user data vault 5707;

exemplary advertising community unit object and advertising attribute specification image title application of "x" for a specific user "x" for a given user data vault 5708;

exemplary advertising community unit object and advertising attribute specification image application of "x" for a specific user "x" for a given user data vault 5709;

exemplary advertising community unit object and advertising attribute specification image, audio or video portal application of "x" for a specific user "x" for a given user data vault 5710;

exemplary advertising community unit object and advertising attribute specification back to last image or track button for a given user data vault 5721 with another user or one to many group;

exemplary advertising community unit object and advertising attribute specification rewind image or track button for a given user data vault 5712 with another user or one to many group;

exemplary advertising community unit object and advertising attribute specification forward image for a given user data vault 5713 with another user or one to many group;

exemplary advertising community unit object and advertising attribute specification image scroll bar for a given user data vault 5714 with another user or one to many group;

exemplary advertising community unit object and advertising attribute specification image scroll bar distance bar for a given user data vault 5715 with another user or one to many group;

exemplary advertising community unit object and advertising attribute specification AI or artificial intelligence Markovian network function for a specific user "x" for a given user data vault 5716 to recommend additional next text responses and markets in a ranked node list;

exemplary advertising community unit object and advertising attribute specification image, audio or voice command interface interpreter application for a specific user "x" for a given user data vault 5717;

exemplary advertising community unit object and advertising attribute specification keyboard backspace in standard QWERTY keyboard context for a specific user "x" for a given user data vault 5718;

exemplary advertising community unit object and advertising attribute specification keyboard rotation tool for additional keyboards in standard QWERTY keyboard context for a specific user "x" for a given user data vault 5719;

exemplary advertising community unit object and advertising attribute specification keyboard return or enter key in standard QWERTY keyboard context for a specific user "x" for a given user data vault 5720;

exemplary advertising community unit object and advertising attribute specification image, track or video share button for a given user data vault 5721 with another user or one to many group;

exemplary advertising community unit object and advertising attribute specification image, track or video play button for a given user data vault 5722 with another user or one to many group;

In some embodiments, the operating system portal may have an additional plurality of applications such as a series of image interface tools 5708, and a general search interface input screen 5707 to search existing operating system applications, internet browsing or any data socket data exchange. In some embodiments, the advertising attribute specification trading market with price-time priority queues 5701, 5702, 5703, 5704 for a general user specification associated with their private user specification data vault 5706. In some embodiments, the graphic user interface of the operation system 5705 may display full lists of installed applications, data socket search results from the internet, uninstalled but available applications, which are associated with the private user data vault advertising attribute specification 5706. In some embodiments, a user may decide to sell or buy all, some or no portion of their given user data vault for their user advertising attribute specification 5706. In some embodiments, a user 110 may scroll applications and data socket exchanges with the operating system scroll bar distance locator 5715 and scroll bar 5714. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5701, 5702, 5703, 5704. In some embodiments, a user 110 may enable their data vault 111 to allow the Markovian Networks 5716 to interpret and log video history or search of the user 110 so advertisers may directly buy their advertising attribute specification on the exchange and corresponding price-time priority queues for advertising attribute specifications 5701, 5702, 5703, 5704. In some embodiments, the user 110 may use the QWERTY keyboard or Markovian network generated responses 5716 or audio responses 5617 or keyboard entered or gesture responses to be entered 5720. In some embodiments, the user 110 may require a plurality of additional keyboard interfaces 5719. In some embodiments, a user 110 may rewind image or music or track or video 5712, forward image or music or track or video 5713, share image or music or track or video 5721, play music or track or video 5722, go back to an image or music or track or video search list 5711 or a plurality of other search functions 5709.

Figure 58:
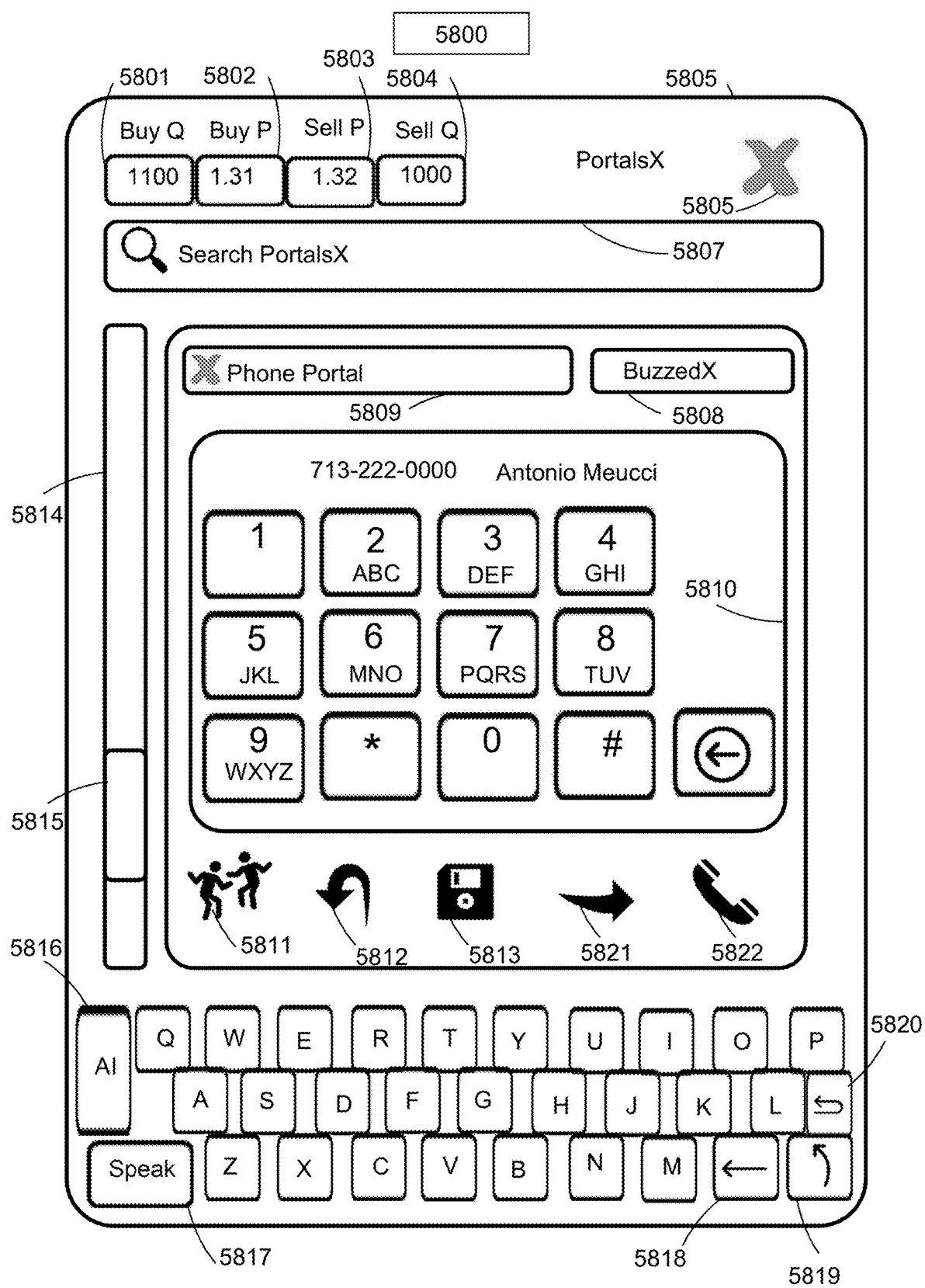
FIG. 58 illustrates an exemplary operating system phone, tele communication, audio communication or video communication portal or data socket communication portal linking content or one to one communication or one to many communication with the associated user data vault to transform the user data into an advertising attribute specification with the advertising attribute specification unit linked advertising attribute specification price-time priority market pricing and trading exchange queues.

FIG. 58 illustrates an exemplary advertising community operating system search interface 5800 for the phone and communication and play and search application 5808 of the disclosed method and system which a user may search for an advertising community linked advertising attribute specification unit inventory to the advertising linked virtual community object. In some embodiments, the phone, image, video, video search and operating system element of the multi layered network node topology of participating, transacting and/or trading transformed advertising community linked advertising attribute specification or advertising capacity units or securities for advertising community linked objects 5800 includes the following elements, or a subset or superset thereof:

exemplary advertising community unit object and advertising attribute specification unit price-time priority queue bid quantity of eleven hundred with first priority position for a given user data vault 5801;

exemplary advertising community unit object and advertising attribute specification unit price-time priority queue bid price of one dollar and thirty-one cents with first priority position for a given user data vault 5802;

exemplary advertising community unit object and advertising attribute specification unit price-time priority queue offer or sell price of one dollar and thirty-two cents with first priority position for a given user data vault 5803;

exemplary advertising community unit object and advertising attribute specification unit price-time priority queue offer or sell quantity of one thousand with first priority position for a given user data vault 5804;

exemplary advertising community unit object and advertising attribute specification unit price-time priority queue operating system graphic user interface for a given user data vault 5805;

exemplary advertising community unit object setting for a specific user "x" for a given user data vault 5806;

exemplary advertising community unit object search input field for the operating system and text graphic user interface data socket for internet, application, picture, image, audio, augmented reality, mixed reality, virtual reality or other computing interface for a specific user "x" for a given user data vault 5807;

exemplary advertising community unit object and advertising attribute specification phone call user application of "x" for a specific user "x" for a given user data vault 5808;

exemplary advertising community unit object and advertising attribute specification phone application of "x" for a specific user "x" for a given user data vault 5809;

exemplary advertising community unit object and advertising attribute specification phone, image, audio or video portal application of "x" for a specific user "x" for a given user data vault 5810;

exemplary advertising community unit object and advertising attribute specification contacts portal for phone call number ID or messaging or track button for a given user data vault 5811 with another user or one to many group;

exemplary advertising community unit object and advertising attribute specification rewind phone call message or track button for a given user data vault 5812 with another user or one to many group;

exemplary advertising community unit object and advertising attribute specification save a phone call or contact for a given user data vault 5813 with another user or one to many group;

exemplary advertising community unit object and advertising attribute specification phone scroll bar for a given user data vault 5814 with another user or one to many group;

exemplary advertising community unit object and advertising attribute specification phone scroll bar distance bar for a given user data vault 5815 with another user or one to many group;

exemplary advertising community unit object and advertising attribute specification AI or artificial intelligence Markovian network function for a specific user "x" for a given user data vault 5816 to recommend additional next phone responses and markets in a ranked node list;

exemplary advertising community unit object and advertising attribute specification image, audio or voice command interface interpreter application for a specific user "x" for a given user data vault 5817;

exemplary advertising community unit object and advertising attribute specification keyboard backspace in standard QWERTY keyboard context for a specific user "x" for a given user data vault 5818;

exemplary advertising community unit object and advertising attribute specification keyboard rotation tool for additional keyboards in standard QWERTY keyboard context for a specific user "x" for a given user data vault 5819;

exemplary advertising community unit object and advertising attribute specification keyboard return or enter key in standard QWERTY keyboard context for a specific user "x" for a given user data vault 5820;

exemplary advertising community unit object and advertising attribute specification phone, image, track or video share button for a given user data vault 5821 with another user or one to many group;

exemplary advertising community unit object and advertising attribute specification phone, image, track or video play button for a given user data vault 5822 with another user or one to many group;

In some embodiments, the operating system portal may have an additional plurality of applications such as a series of image interface tools 5808, and a general search interface input screen 5807 to search existing operating system applications, internet browsing or any data socket data exchange. In some embodiments, the advertising attribute specification trading market with price-time priority queues 5801, 5802, 5803, 5804 for a general user specification associated with their private user specification data vault 5806. In some embodiments, the graphic user interface of the operation system 5805 may display full lists of installed applications, data socket search results from the internet, uninstalled but available applications, which are associated with the private user data vault advertising attribute specification 5806. In some embodiments, a user may decide to sell or buy all, some or no portion of their given user data vault for their user advertising attribute specification 5806. In some embodiments, a user 110 may scroll applications and data socket exchanges with the operating system scroll bar distance locator 5815 and scroll bar 5814. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5801, 5802, 5803, 5804. In some embodiments, a user 110 may enable their data vault 111 to allow the Markovian Networks 5816 to interpret and log phone history or search of the user 110 so advertisers may directly buy their advertising attribute specification on the exchange and corresponding price-time priority queues for advertising attribute specifications 5801, 5802, 5803, 5804. In some embodiments, the user 110 may use the QWERTY keyboard or Markovian network generated responses 5816 or audio responses 5817 or keyboard entered or gesture responses to be entered 5820. In some embodiments, the user 110 may require a plurality of additional keyboard interfaces 5819. In some embodiments, a user 110 may rewind phone calls, image or music or track or video 5812, forward phone calls, image or music or track or video 5813, share phone calls, image or music or track or video 5821, play phone calls, music or track or video 5822, go back to a phone call, image or music or track or video search list 5811 or a plurality of other search functions 5809.

Figure 59:
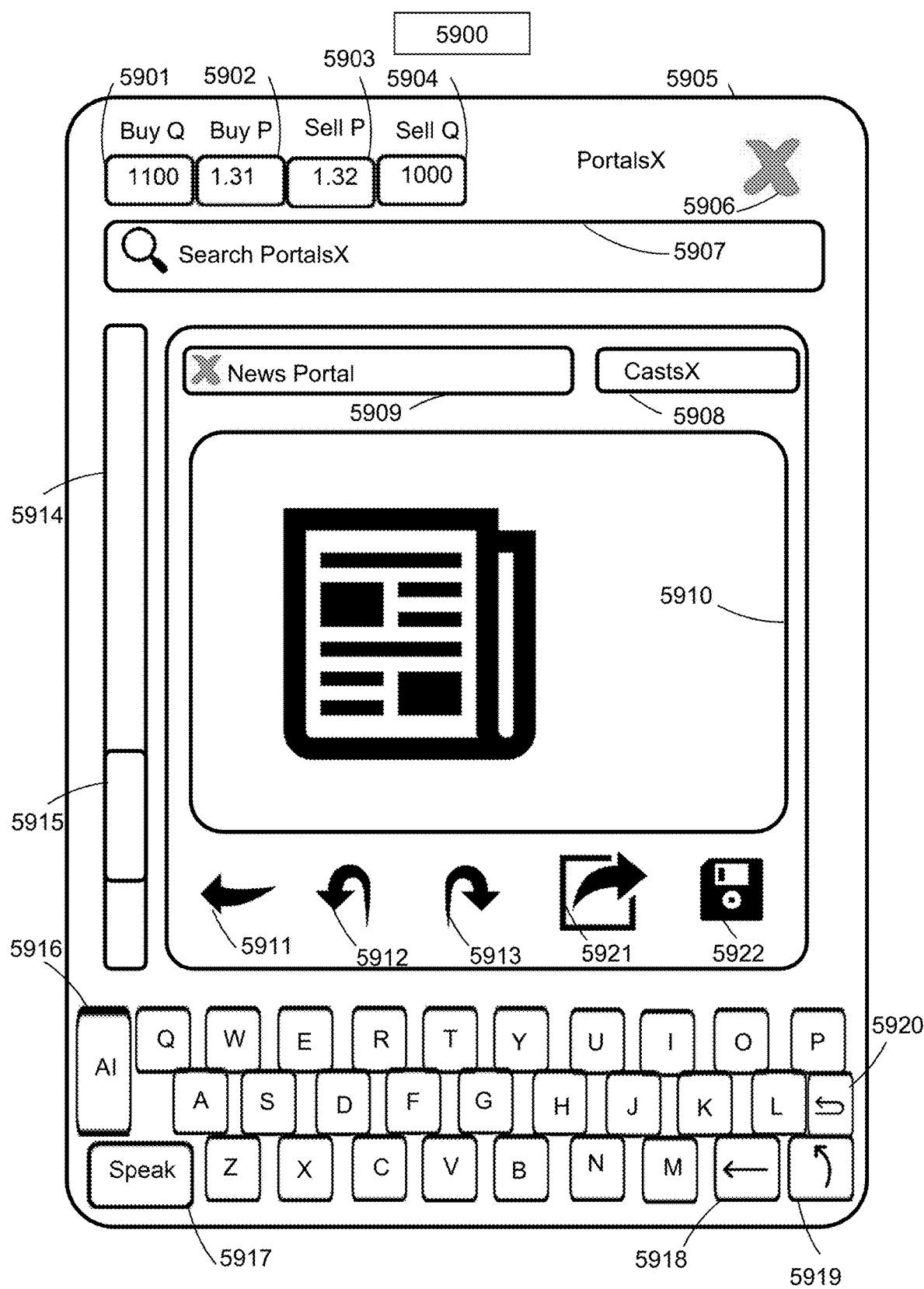
FIG. 59 illustrates an exemplary operating system news, news communication, static or dynamic news content with text, images and video as a portal or data socket communication portal linking content or one to one communication or one to many communication with the associated user data vault to transform the user data into an advertising attribute specification with the advertising attribute specification unit linked advertising attribute specification price-time priority market pricing and trading exchange queues.

FIG. 59 illustrates an exemplary advertising community operating system search interface 5900 for the news and communication and play and search application 5908 of the disclosed method and system which a user may search for an advertising community linked advertising attribute specification unit inventory to the advertising linked virtual community object. In some embodiments, the news, phone, image, video, video search and operating system element of the multi layered network node topology of participating, transacting and/or trading transformed advertising community linked advertising attribute specification or advertising capacity units or securities for advertising community linked objects 5900 includes the following elements, or a subset or superset thereof:

exemplary advertising community unit object and advertising attribute specification unit price-time priority queue bid quantity of eleven hundred with first priority position for a given user data vault 5901;

exemplary advertising community unit object and advertising attribute specification unit price-time priority queue bid price of one dollar and thirty-one cents with first priority position for a given user data vault 5902;

exemplary advertising community unit object and advertising attribute specification unit price-time priority queue offer or sell price of one dollar and thirty-two cents with first priority position for a given user data vault 5903;

exemplary advertising community unit object and advertising attribute specification unit price-time priority queue offer or sell quantity of one thousand with first priority position for a given user data vault 5904;

exemplary advertising community unit object and advertising attribute specification unit price-time priority queue operating system graphic user interface for a given user data vault 5905;

exemplary advertising community unit object setting for a specific user "x" for a given user data vault 5906;

exemplary advertising community unit object search input field for the operating system and text graphic user interface data socket for internet, application, picture, image, audio, augmented reality, mixed reality, virtual reality or other computing interface for a specific user "x" for a given user data vault 5907;

exemplary advertising community unit object and advertising attribute specification news user application of "x" for a specific user "x" for a given user data vault 5908;

exemplary advertising community unit object and advertising attribute specification news application of "x" for a specific user "x" for a given user data vault 5909;

exemplary advertising community unit object and advertising attribute specification news, image, audio or video portal application of "x" for a specific user "x" for a given user data vault 5910;

exemplary advertising community unit object and advertising attribute specification news list back button for a given user data vault 5911 with another user or one to many group;

exemplary advertising community unit object and advertising attribute specification rewind news story or track button for a given user data vault 5912 with another user or one to many group;

exemplary advertising community unit object and advertising attribute specification forward news story list for a given user data vault 5913 with another user or one to many group;

exemplary advertising community unit object and advertising attribute specification news scroll bar for a given user data vault 5914 with another user or one to many group;

exemplary advertising community unit object and advertising attribute specification news scroll bar distance bar for a given user data vault 5915 with another user or one to many group;

exemplary advertising community unit object and advertising attribute specification AI or artificial intelligence Markovian network function for a specific user "x" for a given user data vault 5916 to recommend additional next phone responses and markets in a ranked node list;

exemplary advertising community unit object and advertising attribute specification news, image, audio or voice command interface interpreter application for a specific user "x" for a given user data vault 5917;

exemplary advertising community unit object and advertising attribute specification keyboard backspace in standard QWERTY keyboard context for a specific user "x" for a given user data vault 5918;

exemplary advertising community unit object and advertising attribute specification keyboard rotation tool for additional keyboards in standard QWERTY keyboard context for a specific user "x" for a given user data vault 5919;

exemplary advertising community unit object and advertising attribute specification keyboard return or enter key in standard QWERTY keyboard context for a specific user "x" for a given user data vault 5920;

exemplary advertising community unit object and advertising attribute specification news, image, track or video share button for a given user data vault 5921 with another user or one to many group;

exemplary advertising community unit object and advertising attribute specification news, image, track or video play button for a given user data vault 5922 with another user or one to many group;

In some embodiments, the operating system portal may have an additional plurality of applications such as a series of image interface tools 5908, and a general search interface input screen 5907 to search existing operating system applications, internet browsing or any data socket data exchange. In some embodiments, the advertising attribute specification trading market with price-time priority queues 5901, 5902, 5903, 5904 for a general user specification associated with their private user specification data vault 5906. In some embodiments, the graphic user interface of the operation system 5905 may display full lists of installed applications, data socket search results from the internet, uninstalled but available applications, which are associated with the private user data vault advertising attribute specification 5906. In some embodiments, a user may decide to sell or buy all, some or no portion of their given user data vault for their user advertising attribute specification 5906. In some embodiments, a user 110 may scroll applications and data socket exchanges with the operating system scroll bar distance locator 5915 and scroll bar 5914. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 5901, 5902, 5903, 5904. In some embodiments, a user 110 may enable their data vault 111 to allow the Markovian Networks 5916 to interpret and log news history or search of the user 110 so advertisers may directly buy their advertising attribute specification on the exchange and corresponding price-time priority queues for advertising attribute specifications 5901, 5902, 5903, 5904. In some embodiments, the user 110 may use the QWERTY keyboard or Markovian network generated responses 5916 or audio responses 5917 or keyboard entered or gesture responses to be entered 5920. In some embodiments, the user 110 may require a plurality of additional keyboard interfaces 5919. In some embodiments, a user 110 may rewind news, image or music or track or video 5912, forward news, image or music or track or video 5913, share news, image or music or track or video 5921, play news, music or track or video 5922, go back to a phone call, image or music or track or video search list 5911 or a plurality of other search functions 5909.

Figure 60:
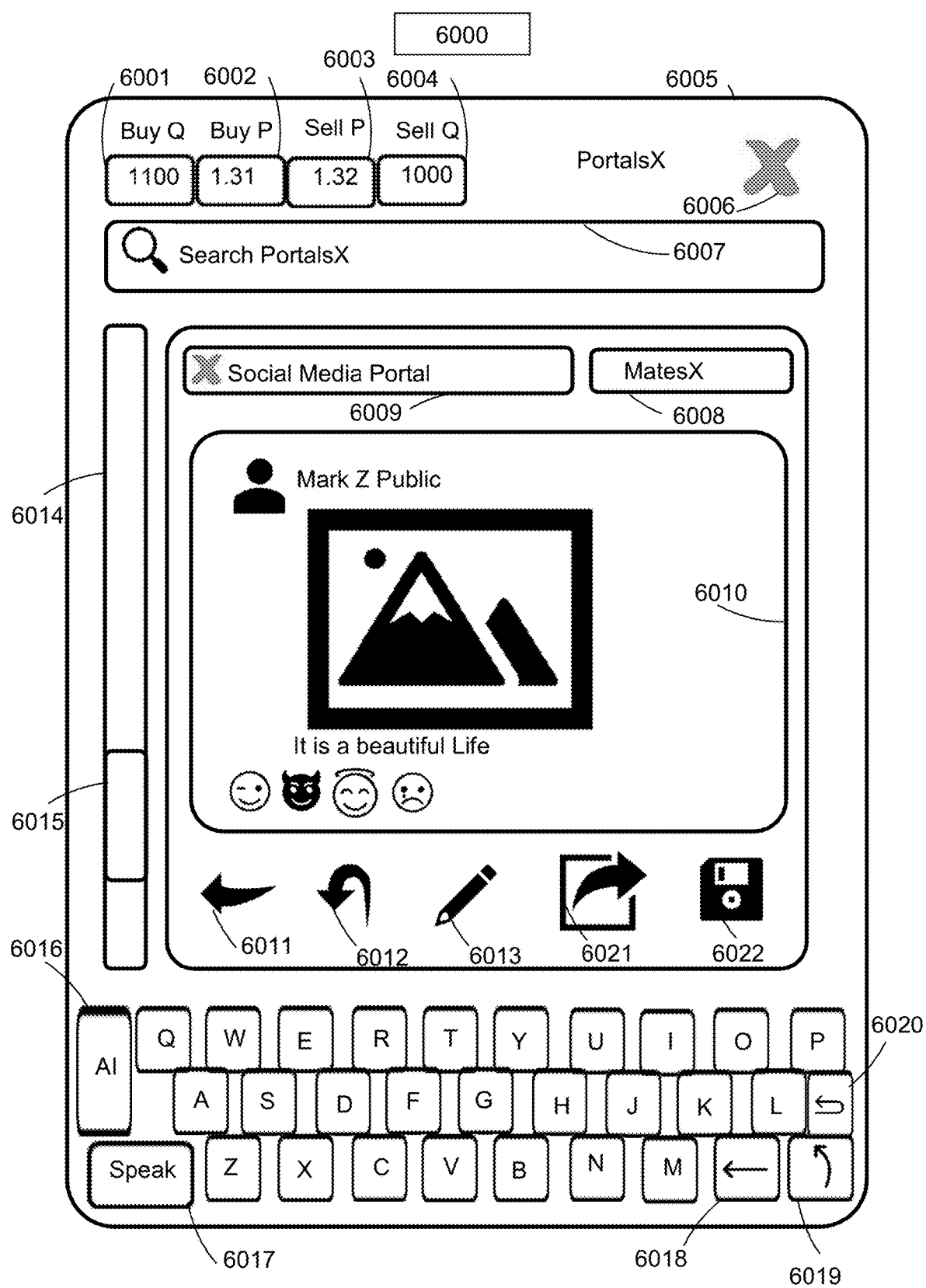
FIG. 60 illustrates an exemplary operating system or data socket communication social media portal for both existing social media applications and static or dynamic social media content with text, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 60 illustrates an exemplary advertising community operating system search interface 6000 for the social network and communication and play and search application 6008 of the disclosed method and system which a user may search for an advertising community linked advertising attribute specification unit inventory to the advertising linked virtual community object. In some embodiments, the social network, phone, image, video, video search and operating system element of the multi layered network node topology of participating, transacting and/or trading transformed advertising community linked advertising attribute specification or advertising capacity units or securities for advertising community linked objects 6000 includes the following elements, or a subset or superset thereof:

exemplary advertising community unit object and advertising attribute specification unit price-time priority queue bid quantity of eleven hundred with first priority position for a given user data vault 6001;

exemplary advertising community unit object and advertising attribute specification unit price-time priority queue bid price of one dollar and thirty-one cents with first priority position for a given user data vault 6002;

exemplary advertising community unit object and advertising attribute specification unit price-time priority queue offer or sell price of one dollar and thirty-two cents with first priority position for a given user data vault 6003;

exemplary advertising community unit object and advertising attribute specification unit price-time priority queue offer or sell quantity of one thousand with first priority position for a given user data vault 6004;

exemplary advertising community unit object and advertising attribute specification unit price-time priority queue operating system graphic user interface for a given user data vault 6005;

exemplary advertising community unit object setting for a specific user "x" for a given user data vault 6006;

exemplary advertising community unit object search input field for the operating system and social network graphic user interface data socket for internet, application, picture, image, audio, augmented reality, mixed reality, virtual reality or other computing interface for a specific user "x" for a given user data vault 6007;

exemplary advertising community unit object and advertising attribute specification social network user application of "x" for a specific user "x" for a given user data vault 6008;

exemplary advertising community unit object and advertising attribute specification social network application of "x" for a specific user "x" for a given user data vault 6009;

exemplary advertising community unit object and advertising attribute specification social network, image, audio or video portal application of "x" for a specific user "x" for a given user data vault 6010;

exemplary advertising community unit object and advertising attribute specification go back button for a given user data vault 6011 with another user or one to many group;

exemplary advertising community unit object and advertising attribute specification reply social network story or track button for a given user data vault 6012 with another user or one to many group;

exemplary advertising community unit object and advertising attribute specification compose social network story list for a given user data vault 6013 with another user or one to many group;

exemplary advertising community unit object and advertising attribute specification social network scroll bar for a given user data vault 6014 with another user or one to many group;

exemplary advertising community unit object and advertising attribute specification social network scroll bar distance bar for a given user data vault 6015 with another user or one to many group;

exemplary advertising community unit object and advertising attribute specification AI or artificial intelligence Markovian network function for a specific user "x" for a given user data vault 6016 to recommend additional next social responses and markets in a ranked node list;

exemplary advertising community unit object and advertising attribute specification social network, image, audio or voice command interface interpreter application for a specific user "x" for a given user data vault 6017;

exemplary advertising community unit object and advertising attribute specification keyboard backspace in standard QWERTY keyboard context for a specific user "x" for a given user data vault 6018;

exemplary advertising community unit object and advertising attribute specification keyboard rotation tool for additional keyboards in standard QWERTY keyboard context for a specific user "x" for a given user data vault 6019;

exemplary advertising community unit object and advertising attribute specification keyboard return or enter key in standard QWERTY keyboard context for a specific user "x" for a given user data vault 6020;

exemplary advertising community unit object and advertising attribute specification share social network, image, track or video share button for a given user data vault 6021 with another user or one to many group;

exemplary advertising community unit object and advertising attribute specification save social network, image, track or video play button for a given user data vault 6022 with another user or one to many group;

In some embodiments, the operating system portal may have an additional plurality of applications such as a series of image interface tools 6008, and a general search interface input screen 6007 to search existing operating system applications, internet browsing or any data socket data exchange. In some embodiments, the advertising attribute specification trading market with price-time priority queues 6001, 6002, 6003, 6004 for a general user specification associated with their private user specification data vault 6006. In some embodiments, the graphic user interface of the operation system 6005 may display full lists of installed applications, data socket search results from the internet, uninstalled but available applications, which are associated with the private user data vault advertising attribute specification 6006. In some embodiments, a user may decide to sell or buy all, some or no portion of their given user data vault for their user advertising attribute specification 6006. In some embodiments, a user 110 may scroll applications and data socket exchanges with the operating system scroll bar distance locator 6015 and scroll bar 6014. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6001, 6002, 6003, 6004. In some embodiments, a user 110 may enable their data vault 111 to allow the Markovian Networks 6016 to interpret and log social network history or search of the user 110 so advertisers may directly buy their advertising attribute specification on the exchange and corresponding price-time priority queues for advertising attribute specifications 6001, 6002, 6003, 6004. In some embodiments, the user 110 may use the QWERTY keyboard or Markovian network generated responses 6016 or audio responses 6017 or keyboard entered or gesture responses to be entered 6020. In some embodiments, the user 110 may require a plurality of additional keyboard interfaces 6019. In some embodiments, a user 110 may rewind news, image or music or track or video 6012, forward news, image or music or track or video 6013, share news, image or music or track or video 6021, play news, music or track or video 6022, go back to a phone call, image or music or track or video search list 6011 or a plurality of other search functions 6009.

Figure 61:
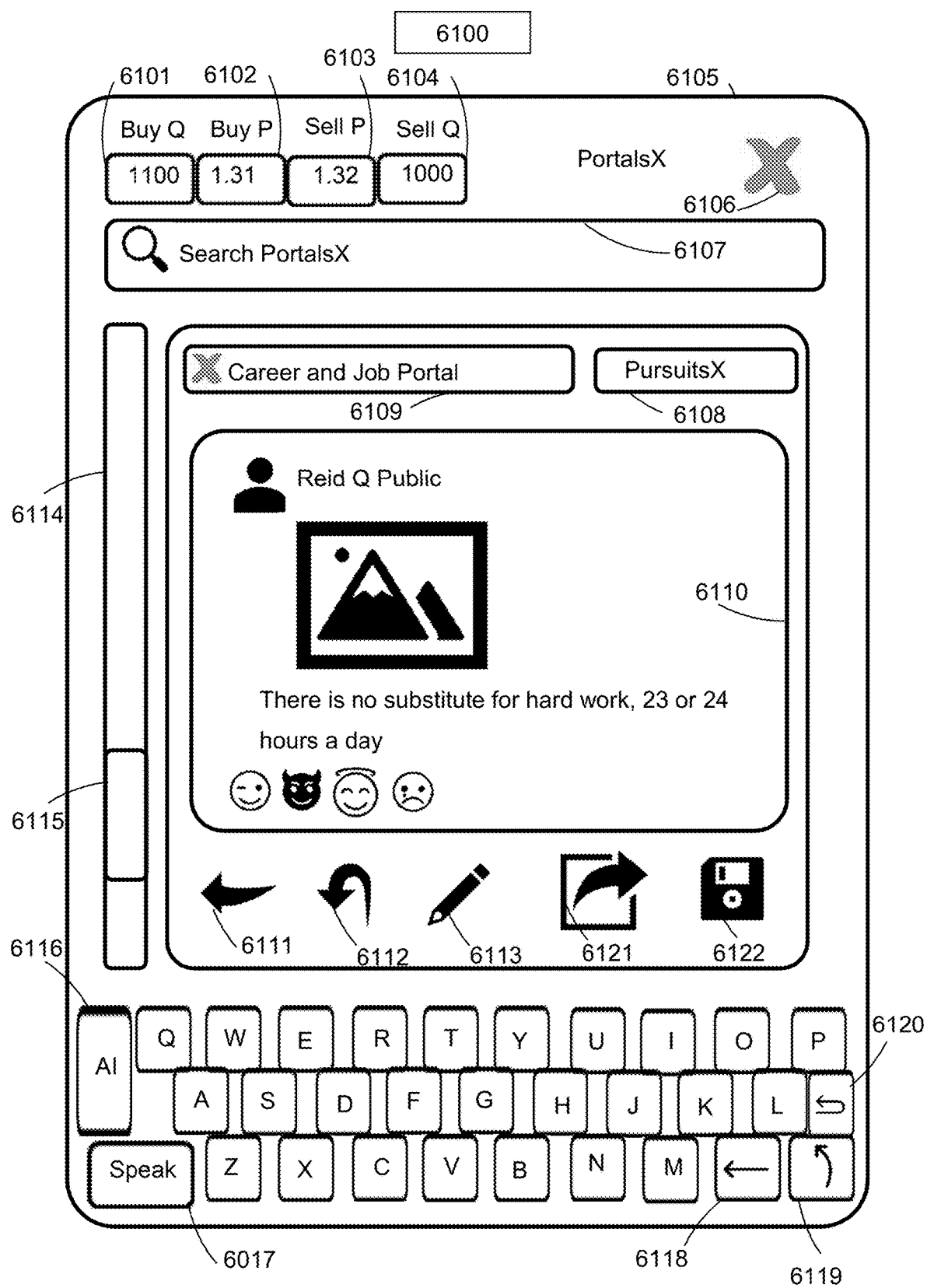
FIG. 61 illustrates an exemplary operating system or data socket communication social media career portal for both existing social media career applications and static or dynamic social media content with text, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 61 illustrates an exemplary advertising community operating system search interface 6100 for the social network and communication and play and search application 6108 of the disclosed method and system which a user may search for an advertising community linked advertising attribute specification unit inventory to the advertising linked virtual community object. In some embodiments, the social network, phone, image, video, video search and operating system element of the multi layered network node topology of participating, transacting and/or trading transformed advertising community linked advertising attribute specification or advertising capacity units or securities for advertising community linked objects 6100 includes the following elements, or a subset or superset thereof:

exemplary advertising community unit object and advertising attribute specification unit price-time priority queue bid quantity of eleven hundred with first priority position for a given user data vault 6101;

exemplary advertising community unit object and advertising attribute specification unit price-time priority queue bid price of one dollar and thirty-one cents with first priority position for a given user data vault 6102;

exemplary advertising community unit object and advertising attribute specification unit price-time priority queue offer or sell price of one dollar and thirty-two cents with first priority position for a given user data vault 6103;

exemplary advertising community unit object and advertising attribute specification unit price-time priority queue offer or sell quantity of one thousand with first priority position for a given user data vault 6104;

exemplary advertising community unit object and advertising attribute specification unit price-time priority queue operating system graphic user interface for a given user data vault 6105;

exemplary advertising community unit object setting for a specific user "x" for a given user data vault 6106;

exemplary advertising community unit object search input field for the operating system and work or career social network graphic user interface data socket for internet, application, picture, image, audio, augmented reality, mixed reality, virtual reality or other computing interface for a specific user "x" for a given user data vault 6107;

exemplary advertising community unit object and advertising attribute specification work or career social network user application of "x" for a specific user "x" for a given user data vault 6108;

exemplary advertising community unit object and advertising attribute specification work or career social network application of "x" for a specific user "x" for a given user data vault 6109;

exemplary advertising community unit object and advertising attribute specification work or career social network, image, audio or video portal application of "x" for a specific user "x" for a given user data vault 6110;

exemplary advertising community unit object and advertising attribute specification work or career social network list back button for a given user data vault 6111 with another user or one to many group;

exemplary advertising community unit object and advertising attribute specification reply to work or career social network story or track button for a given user data vault 6112 with another user or one to many group;

exemplary advertising community unit object and advertising attribute specification compose work or career social network story list for a given user data vault 6113 with another user or one to many group;

exemplary advertising community unit object and advertising attribute specification work or career social network scroll bar for a given user data vault 6114 with another user or one to many group;

exemplary advertising community unit object and advertising attribute specification work or career social network scroll bar distance bar for a given user data vault 6115 with another user or one to many group;

exemplary advertising community unit object and advertising attribute specification AI or artificial intelligence Markovian network function for a specific user "x" for a given user data vault 6116 to recommend additional next social network responses and markets in a ranked node list;

exemplary advertising community unit object and advertising attribute specification work or career social network, image, audio or voice command interface interpreter application for a specific user "x" for a given user data vault 6117;

exemplary advertising community unit object and advertising attribute specification keyboard backspace in standard QWERTY keyboard context for a specific user "x" for a given user data vault 6118;

exemplary advertising community unit object and advertising attribute specification keyboard rotation tool for additional keyboards in standard QWERTY keyboard context for a specific user "x" for a given user data vault 6119;

exemplary advertising community unit object and advertising attribute specification keyboard return or enter key in standard QWERTY keyboard context for a specific user "x" for a given user data vault 6120;

exemplary advertising community unit object and advertising attribute specification share career and work social network, image, track or video share button for a given user data vault 6121 with another user or one to many group;

exemplary advertising community unit object and advertising attribute specification save career and work social network, save image, track or video play button for a given user data vault 6122 with another user or one to many group;

In some embodiments, the operating system portal may have an additional plurality of applications such as a series of image interface tools 6108, and a general search interface input screen 6107 to search existing operating system applications, internet browsing or any data socket data exchange. In some embodiments, the advertising attribute specification trading market with price-time priority queues 6101, 6102, 6103, 6104 for a general user specification associated with their private user specification data vault 6106. In some embodiments, the graphic user interface of the operation system 6105 may display full lists of installed applications, data socket search results from the internet, uninstalled but available applications, which are associated with the private user data vault advertising attribute specification 6106. In some embodiments, a user may decide to sell or buy all, some or no portion of their given user data vault for their user advertising attribute specification 6106. In some embodiments, a user 110 may scroll applications and data socket exchanges with the operating system scroll bar distance locator 6115 and scroll bar 6114. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6101, 6102, 6103, 6104. In some embodiments, a user 110 may enable their data vault 111 to allow the Markovian Networks 6116 to interpret and log career and work social network history or search of the user 110 so advertisers may directly buy their advertising attribute specification on the exchange and corresponding price-time priority queues for advertising attribute specifications 6101, 6102, 6103, 6104. In some embodiments, the user 110 may use the QWERTY keyboard or Markovian network generated responses 6116 or audio responses 6117 or keyboard entered or gesture responses to be entered 6120. In some embodiments, the user 110 may require a plurality of additional keyboard interfaces 6119. In some embodiments, a user 110 may rewind social media, image or music or track or video 6112, forward social media, image or music or track or video 6113, share social media, image or music or track or video 6121, play social media, music or track or video

6122, go back to a social media, image or music or track or video search list 6111 or a plurality of other search functions 6109.

Figure 62:
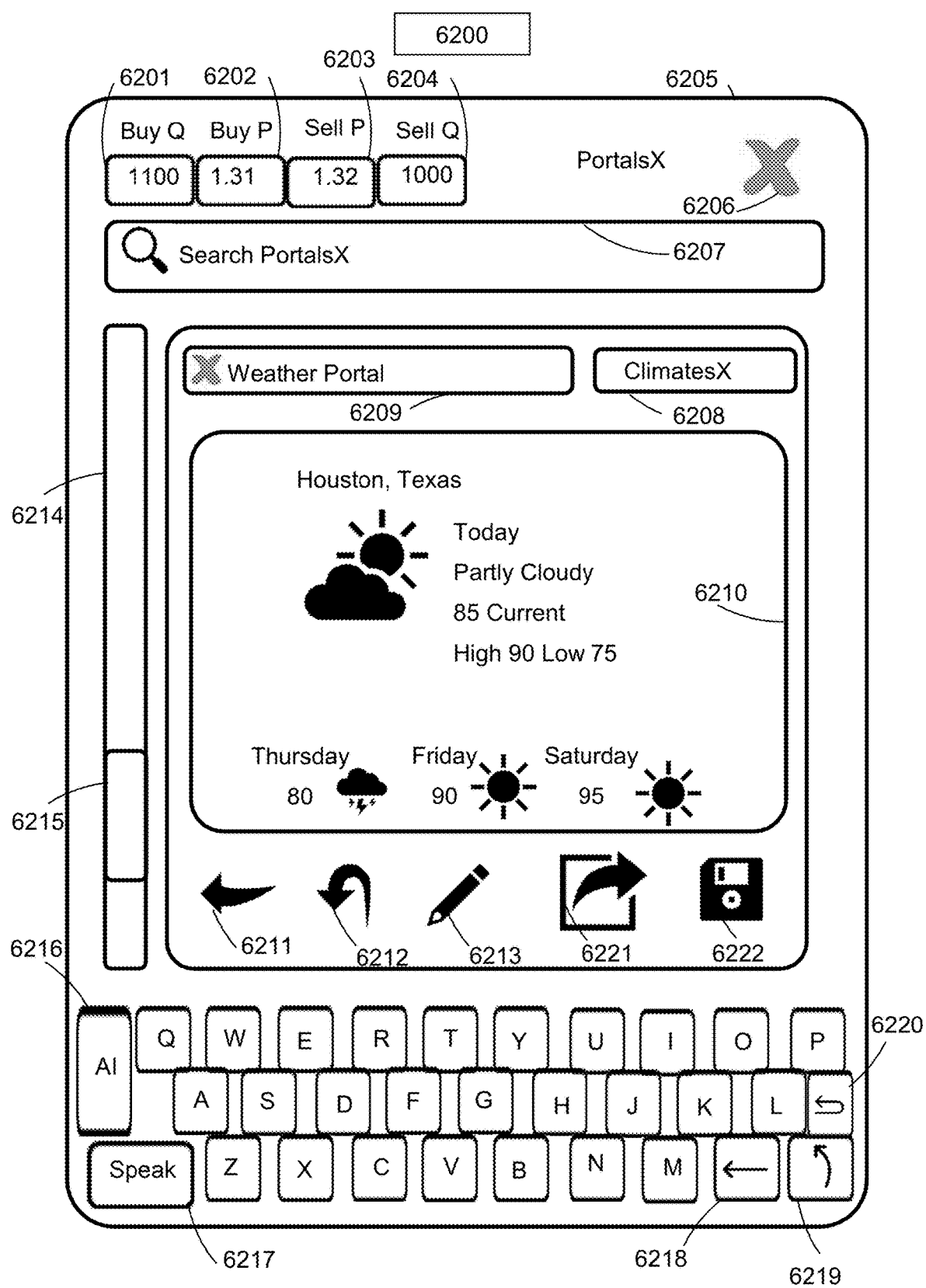
FIG. 62 illustrates an exemplary operating system or data socket communication weather portal for both existing weather subscriptions and static in app or dynamic social media content with text, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 62 illustrates an exemplary advertising community operating system search interface 6200 for the weather integration and search application 6208 of the disclosed method and system which a user may search for an advertising community linked advertising attribute specification unit inventory to the advertising linked virtual community object. In some embodiments, the social network, phone, image, video, video search and operating system element of the multi layered network node topology of participating, transacting and/or trading transformed advertising community linked advertising attribute specification or advertising capacity units or securities for advertising community linked objects 6200 includes the following elements, or a subset or superset thereof:

exemplary advertising community unit object and advertising attribute specification unit price-time priority queue bid quantity of eleven hundred with first priority position for a given user data vault 6201;

exemplary advertising community unit object and advertising attribute specification unit price-time priority queue bid price of one dollar and thirty-one cents with first priority position for a given user data vault 6202;

exemplary advertising community unit object and advertising attribute specification unit price-time priority queue offer or sell price of one dollar and thirty-two cents with first priority position for a given user data vault 6203;

exemplary advertising community unit object and advertising attribute specification unit price-time priority queue offer or sell quantity of one thousand with first priority position for a given user data vault 6204;

exemplary advertising community unit object and advertising attribute specification unit price-time priority queue operating system graphic user interface for a given user data vault 6205;

exemplary advertising community unit object setting for a specific user "x" for a given user data vault 6206;

exemplary advertising community unit object search input field for the operating system and weather portal graphic user interface data socket for internet, application, picture, image, audio, augmented reality, mixed reality, virtual reality or other computing interface for a specific user "x" for a given user data vault 6207;

exemplary advertising community unit object and advertising attribute specification weather portal user application of "x" for a specific user "x" for a given user data vault 6208;

exemplary advertising community unit object and advertising attribute specification weather portal application of "x" for a specific user "x" for a given user data vault 6209;

exemplary advertising community unit object and advertising attribute specification weather portal, image, audio or video portal application of "x" for a specific user "x" for a given user data vault 6210;

exemplary advertising community unit object and advertising attribute specification weather portal list back button for a given user data vault 6211 with another user or one to many group;

exemplary advertising community unit object and advertising attribute specification reply to weather portal or track button for a given user data vault 6212 with another user or one to many group;

exemplary advertising community unit object and advertising attribute specification compose weather portal story list for a given user data vault 6213 with another user or one to many group;

exemplary advertising community unit object and advertising attribute specification work or career social network scroll bar for a given user data vault 6214 with another user or one to many group;

exemplary advertising community unit object and advertising attribute specification weather portal scroll bar distance bar for a given user data vault 6215 with another user or one to many group;

exemplary advertising community unit object and advertising attribute specification AI or artificial intelligence Markovian network function for a specific user "x" for a given user data vault 6216 to recommend additional next weather portal responses and markets in a ranked node list;

exemplary advertising community unit object and advertising attribute specification weather portal, image, audio or voice command interface interpreter application for a specific user "x" for a given user data vault 6217;

exemplary advertising community unit object and advertising attribute specification keyboard backspace in standard QWERTY keyboard context for a specific user "x" for a given user data vault 6218;

exemplary advertising community unit object and advertising attribute specification keyboard rotation tool for additional keyboards in standard QWERTY keyboard context for a specific user "x" for a given user data vault 6219;

exemplary advertising community unit object and advertising attribute specification keyboard return or enter key in standard QWERTY keyboard context for a specific user "x" for a given user data vault 6220;

exemplary advertising community unit object and advertising attribute specification share weather portal, image, track or video share button for a given user data vault 6221 with another user or one to many group;

exemplary advertising community unit object and advertising attribute specification save weather portal, save image, track or video play button for a given user data vault 6222 with another user or one to many group;

In some embodiments, the operating system portal may have an additional plurality of applications such as a series of weather interface tools 6208, and a general search interface input screen 6207 to search existing operating system applications, internet browsing or any data socket data exchange. In some embodiments, the advertising attribute specification trading market with price-time priority queues 6201, 6202, 6203, 6204 for a general user specification associated with their private user specification data vault 6206. In some embodiments, the graphic user interface of the operation system 6205 may display full lists of installed applications, data socket search results from the internet, uninstalled but available applications, which are associated with the private user data vault advertising attribute specification 6206. In some embodiments, a user may decide to sell or buy all, some or no portion of their given user data vault for their user advertising attribute specification 6206. In some embodiments, a user 110 may scroll applications and data socket exchanges with the operating system scroll bar distance locator 6215 and scroll bar 6214. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6201, 6202, 6203, 6204. In some embodiments, a user 110 may enable their data vault 111 to allow the Markovian Networks 6116 to interpret and log weather portal network history or search of the user 110 so advertisers may directly buy their advertising attribute specification on the exchange and corresponding price-time priority queues for advertising attribute specifications 6201, 6202, 6203, 6204. In some embodiments, the user 110 may use the QWERTY keyboard or Markovian network generated responses 6216 or audio responses 6217 or keyboard entered or gesture responses to be entered 6220. In some embodiments, the user 110 may require a plurality of additional keyboard interfaces 6219. In some embodiments, a user 110 may rewind weather portal views, image or music or track or video 6212, forward weather portal views, image or music or track or video 6213, share weather portal, image or music or track or video 6221, play or save weather portal, music or track or video 6222, go back to a weather portal, image or music or track or video search list 6211 or a plurality of other search functions 6209.

Figure 63:
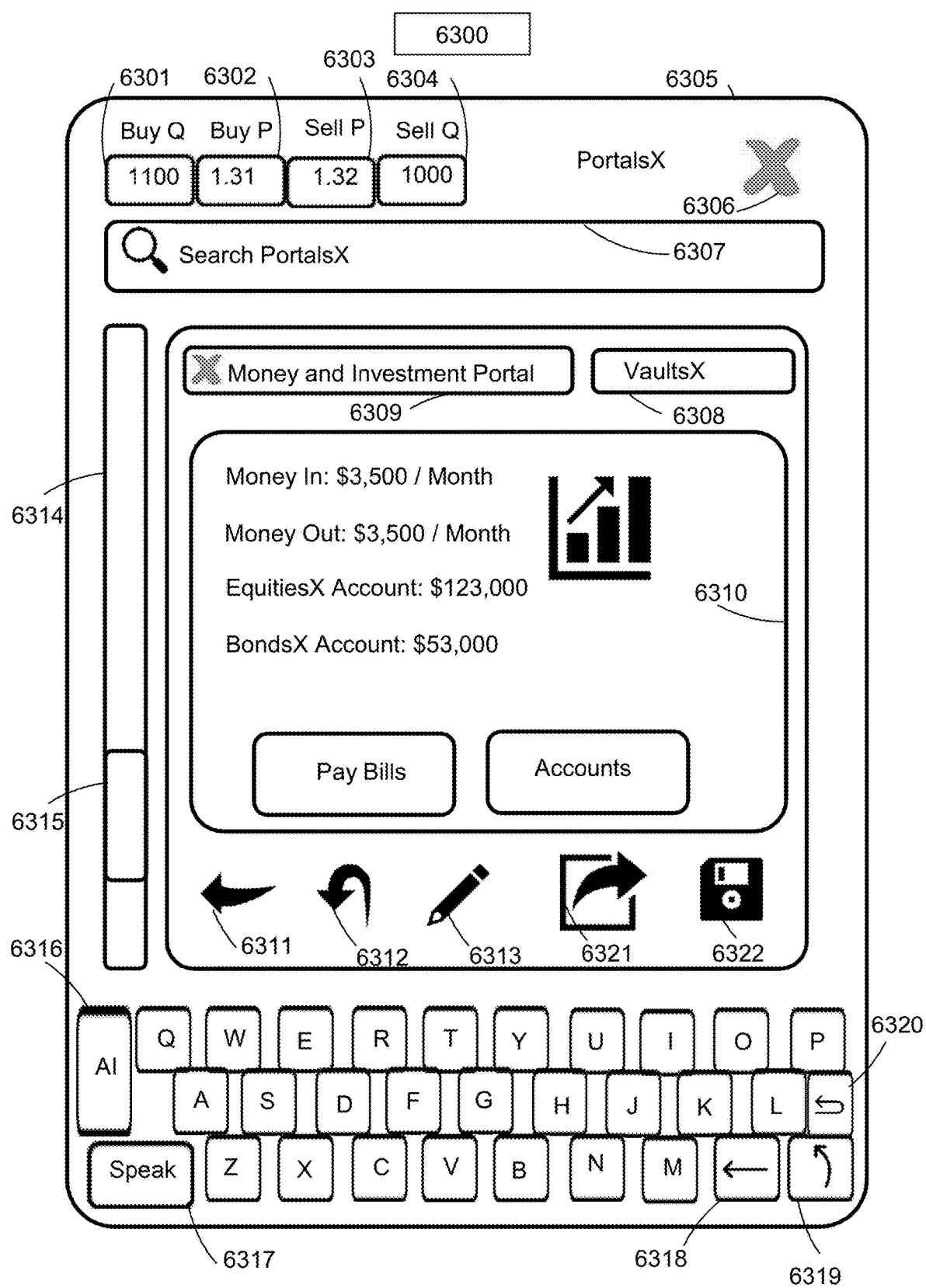
FIG. 63 illustrates an exemplary operating system or data socket communication finance, banking and investment portal for both existing financial services subscriptions and static in app or dynamic social media content with text, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 63 illustrates an exemplary advertising community operating system search interface 6300 for the money and investing integration and search application 6308 of the disclosed method and system which a user may search for an advertising community linked advertising attribute specification unit inventory to the advertising linked virtual community object. In some embodiments, the money and investing, phone, image, video, video search and operating system element of the multi layered network node topology of participating, transacting and/or trading transformed advertising community linked advertising attribute specification or advertising capacity units or securities for advertising community linked objects 6300 includes the following elements, or a subset or superset thereof:

exemplary advertising community unit object and advertising attribute specification unit price-time priority queue bid quantity of eleven hundred with first priority position for a given user data vault 6301;

exemplary advertising community unit object and advertising attribute specification unit price-time priority queue bid price of one dollar and thirty-one cents with first priority position for a given user data vault 6302;

exemplary advertising community unit object and advertising attribute specification unit price-time priority queue offer or sell price of one dollar and thirty-two cents with first priority position for a given user data vault 6303;

exemplary advertising community unit object and advertising attribute specification unit price-time priority queue offer or sell quantity of one thousand with first priority position for a given user data vault 6304;

exemplary advertising community unit object and advertising attribute specification unit price-time priority queue operating system graphic user interface for a given user data vault 6305;

exemplary advertising community unit object setting for a specific user "x" for a given user data vault 6306;

exemplary advertising community unit object search input field for the operating system and money and investing portal graphic user interface data socket for internet, application, picture, image, audio, augmented reality, mixed reality, virtual reality or other computing interface for a specific user "x" for a given user data vault 6307;

exemplary advertising community unit object and advertising attribute specification money and investing portal user application of "x" for a specific user "x" for a given user data vault 6308;

exemplary advertising community unit object and advertising attribute specification money and investing portal application of "x" for a specific user "x" for a given user data vault 6309;

exemplary advertising community unit object and advertising attribute specification money and investing portal, image, audio or video portal application of "x" for a specific user "x" for a given user data vault 6310;

exemplary advertising community unit object and advertising attribute specification money and investing portal list back button for a given user data vault 6311 with another user or one to many group;

exemplary advertising community unit object and advertising attribute specification reply to money and investing portal or track button for a given user data vault 6312 with another user or one to many group;

exemplary advertising community unit object and advertising attribute specification compose money and investing portal story list for a given user data vault 6313 with another user or one to many group;

exemplary advertising community unit object and advertising attribute specification money and investing scroll bar for a given user data vault 6314 with another user or one to many group;

exemplary advertising community unit object and advertising attribute specification money and investing portal scroll bar distance bar for a given user data vault 6315 with another user or one to many group;

exemplary advertising community unit object and advertising attribute specification AI or artificial intelligence Markovian network function for a specific user "x" for a given user data vault 6316 to recommend additional next weather portal responses and markets in a ranked node list;

exemplary advertising community unit object and advertising attribute specification money and investing portal, image, audio or voice command interface interpreter application for a specific user "x" for a given user data vault 6317;

exemplary advertising community unit object and advertising attribute specification keyboard backspace in standard QWERTY keyboard context for a specific user "x" for a given user data vault 6318;

exemplary advertising community unit object and advertising attribute specification keyboard rotation tool for additional keyboards in standard QWERTY keyboard context for a specific user "x" for a given user data vault 6319;

exemplary advertising community unit object and advertising attribute specification keyboard return or enter key in standard QWERTY keyboard context for a specific user "x" for a given user data vault 6320;

exemplary advertising community unit object and advertising attribute specification share money and investing portal, image, track or video share button for a given user data vault 6321 with another user or one to many group;

exemplary advertising community unit object and advertising attribute specification save money and investing portal, save image, track or video play button for a given user data vault 6322 with another user or one to many group;

In some embodiments, the operating system portal may have an additional plurality of applications such as a series of money and investing interface tools 6308, and a general search interface input screen 6307 to search existing operating system applications, internet browsing or any data socket data exchange. In some embodiments, the advertising attribute specification trading market with price-time priority queues 6301, 6302, 6303, 6304 for a general user specification associated with their private user specification data vault 6306. In some embodiments, the graphic user interface of the operation system 6305 may display full lists of installed applications, data socket search results from the internet, uninstalled but available applications, which are associated with the private user data vault advertising attribute specification 6306. In some embodiments, a user may decide to sell or buy all, some or no portion of their given user data vault for their user advertising attribute specification 6306. In some embodiments, a user 110 may scroll applications and data socket exchanges with the operating system scroll bar distance locator 6315 and scroll bar 6314. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6301, 6302, 6303, 6304. In some embodiments, a user 110 may enable their data vault 111 to allow the Markovian Networks 6116 to interpret and log money and investing portal network history or search of the user 110 so advertisers may directly buy their advertising attribute specification on the exchange and corresponding price-time priority queues for advertising attribute specifications 6301, 6302, 6303, 6304. In some embodiments, the user 110 may use the QWERTY keyboard or Markovian network generated responses 6316 or audio responses 6317 or keyboard entered or gesture responses to be entered 6320. In some embodiments, the user 110 may require a plurality of additional keyboard interfaces 6319. In some embodiments, a user 110 may rewind money and investing portal views, image or music or track or video 6312, forward money and investing portal views, image or music or track or video 6313, share money and investing portal, image or music or track or video 6321, play or save money and investing portal, music or track or video 6322, go back to a money and investing portal, image or music or track or video search list 6311 or a plurality of other search functions 6309. In some embodiments, the money and investing user interface includes, but is not limited to a bill pay interface and accounts interface 6310 as well as money inflow and money outflow and investment gains and losses in equities, debt and hybrid investment flows 6310.

Figure 64:
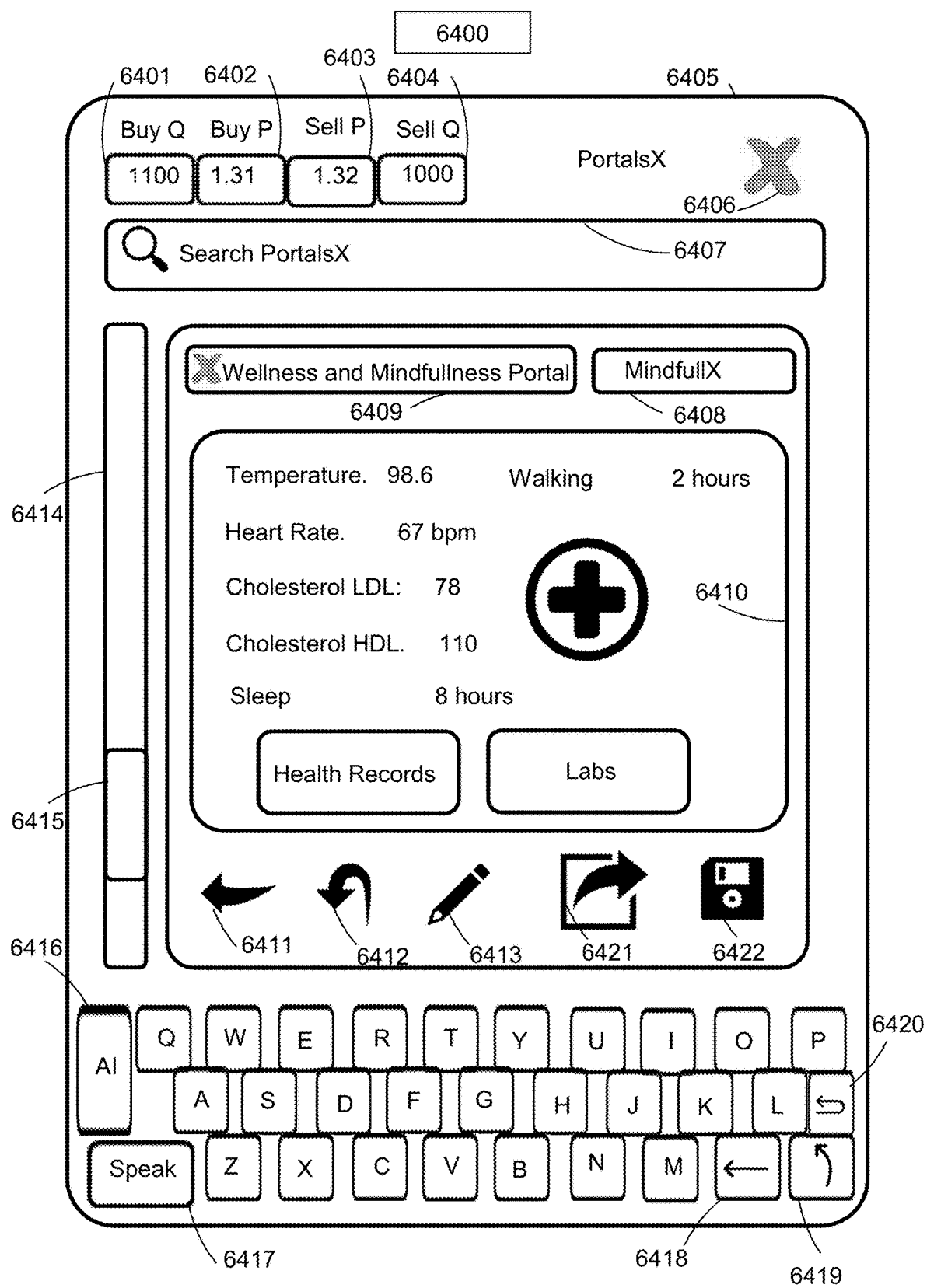
FIG. 64 illustrates an exemplary operating system or data socket communication health and wellness portal for both existing health and wellness services subscriptions and static in app or dynamic social media content with text, data, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 64 illustrates an exemplary advertising community operating system search interface 6400 for the health and wellness integration and search application 6408 of the disclosed method and system which a user may search for an advertising community linked advertising attribute specification unit inventory to the advertising linked virtual community object. In some embodiments, the health and wellness, phone, image, video, video search and operating system element of the multi layered network node topology of participating, transacting and/or trading transformed advertising community linked advertising attribute specification or advertising capacity units or securities for advertising community linked objects 6400 includes the following elements, or a subset or superset thereof:

exemplary advertising community unit object and advertising attribute specification unit price-time priority queue bid quantity of eleven hundred with first priority position for a given user data vault 6401;

exemplary advertising community unit object and advertising attribute specification unit price-time priority queue bid price of one dollar and thirty-one cents with first priority position for a given user data vault 6402;

exemplary advertising community unit object and advertising attribute specification unit price-time priority queue offer or sell price of one dollar and thirty-two cents with first priority position for a given user data vault 6403;

exemplary advertising community unit object and advertising attribute specification unit price-time priority queue offer or sell quantity of one thousand with first priority position for a given user data vault 6404;

exemplary advertising community unit object and advertising attribute specification unit price-time priority queue operating system graphic user interface for a given user data vault 6405;

exemplary advertising community unit object setting for a specific user "x" for a given user data vault 6406;

exemplary advertising community unit object search input field for the operating system and health and wellness portal graphic user interface data socket for internet, application, picture, image, audio, augmented reality, mixed reality, virtual reality or other computing interface for a specific user "x" for a given user data vault 6407;

exemplary advertising community unit object and advertising attribute specification health and wellness portal user application of "x" for a specific user "x" for a given user data vault 6408;

exemplary advertising community unit object and advertising attribute specification health and wellness portal application of "x" for a specific user "x" for a given user data vault 6409;

exemplary advertising community unit object and advertising attribute specification health and wellness portal, image, audio or video portal application of "x" for a specific user "x" for a given user data vault 6410;

exemplary advertising community unit object and advertising attribute specification health and wellness portal list back button for a given user data vault 6411 with another user or one to many group;

exemplary advertising community unit object and advertising attribute specification reply to health and wellness portal or track button for a given user data vault 6412 with another user or one to many group;

exemplary advertising community unit object and advertising attribute specification compose health and wellness portal story list for a given user data vault 6413 with another user or one to many group;

exemplary advertising community unit object and advertising attribute specification health and wellness scroll bar for a given user data vault 6414 with another user or one to many group;

exemplary advertising community unit object and advertising attribute specification health and wellness portal scroll bar distance bar for a given user data vault 6415 with another user or one to many group;

exemplary advertising community unit object and advertising attribute specification AI or artificial intelligence Markovian network function for a specific user "x" for a given user data vault 6416 to recommend additional next health and wellness portal responses and markets in a ranked node list;

exemplary advertising community unit object and advertising attribute specification health and wellness portal, image, audio or voice command interface interpreter application for a specific user "x" for a given user data vault 6417;

exemplary advertising community unit object and advertising attribute specification keyboard backspace in standard QWERTY keyboard context for a specific user "x" for a given user data vault 6418;

exemplary advertising community unit object and advertising attribute specification keyboard rotation tool for additional keyboards in standard QWERTY keyboard context for a specific user "x" for a given user data vault 6419;

exemplary advertising community unit object and advertising attribute specification keyboard return or enter key in standard QWERTY keyboard context for a specific user "x" for a given user data vault 6420;

exemplary advertising community unit object and advertising attribute specification share health and wellness portal, image, track or video share button for a given user data vault 6421 with another user or one to many group;

exemplary advertising community unit object and advertising attribute specification save health and wellness portal, save image, track or video play button for a given user data vault 6422 with another user or one to many group;

In some embodiments, the operating system portal may have an additional plurality of applications such as a series of health and wellness interface tools 6408, and a general search interface input screen 6407 to search existing operating system applications, internet browsing or any data socket data exchange. In some embodiments, the advertising attribute specification trading market with price-time priority queues 6401, 6402, 6403, 6404 for a general user specification associated with their private user specification data vault 6406. In some embodiments, the graphic user interface of the operation system 6405 may display full lists of installed applications, data socket search results from the internet, uninstalled but available applications, which are associated with the private user data vault advertising attribute specification 6406. In some embodiments, a user may decide to sell or buy all, some or no portion of their given user data vault for their user advertising attribute specification 6406. In some embodiments, a user 110 may scroll applications and data socket exchanges with the operating system scroll bar distance locator 6415 and scroll bar 6414. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6401, 6402, 6403, 6404. In some embodiments, a user 110 may enable their data vault 111 to allow the Markovian Networks 6416 to interpret and log health and wellness portal network history or search of the user 110 so advertisers may directly buy their advertising attribute specification on the exchange and corresponding price-time priority queues for advertising attribute specifications 6401, 6402, 6403, 6404. In some embodiments, the user 110 may use the QWERTY keyboard or Markovian network generated responses 6416 or audio responses 6417 or keyboard entered or gesture responses to be entered 6420. In some embodiments, the user 110 may require a plurality of additional keyboard interfaces 6419. In some embodiments, a user 110 may rewind health and wellness portal views, image or music or track or video 6412, forward health and wellness portal views, image or music or track or video 6413, share health and wellness portal, image or music or track or video 6421, play or save health and wellness portal, music or track or video 6422, go back to a health and wellness portal, image or music or track or video search list 6411 or a plurality of other search functions 6409. In some embodiments, the health and wellness user interface includes, but is not limited to a health records interface and labs interface 6410 as well as temperature of user, heart rate of user, cholesterol of user, sleep of user or walking distances of user 6410.

Figure 65:
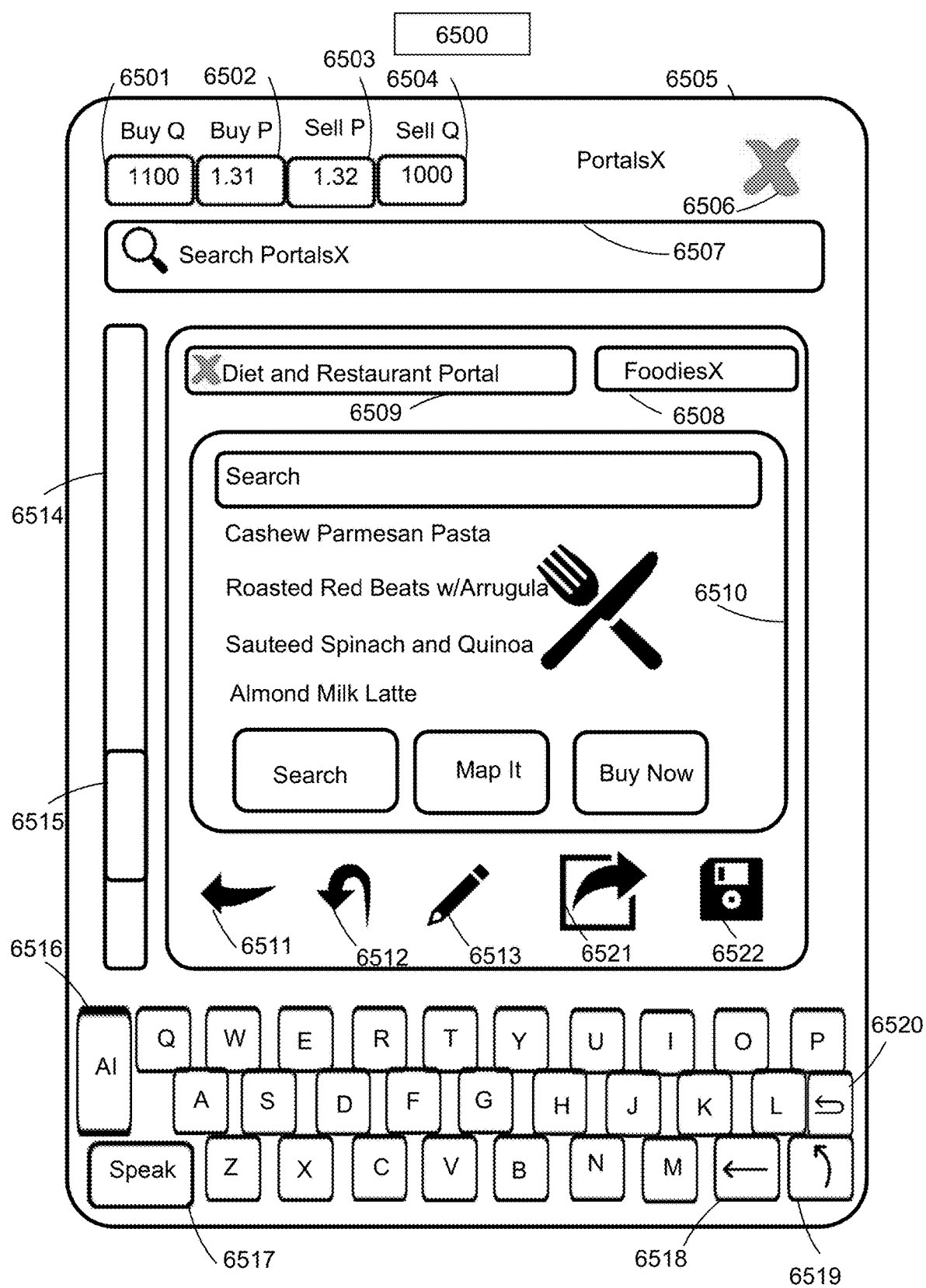
FIG. 65 illustrates an exemplary operating system or data socket communication diet and restaurant and food service portal for both existing diet and meal ordering services subscriptions and static in app or dynamic social media content with text, data, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 65 illustrates an exemplary advertising community operating system search interface 6500 for the diet and wellness integration and search application 6508 of the disclosed method and system which a user may search for an advertising community linked advertising attribute specification unit inventory to the advertising linked virtual community object. In some embodiments, the diet and restaurant, phone, image, video, video search and operating system element of the multi layered network node topology of participating, transacting and/or trading transformed advertising community linked advertising attribute specification or advertising capacity units or securities for advertising community linked objects 6500 includes the following elements, or a subset or superset thereof:

exemplary advertising community unit object and advertising attribute specification unit price-time priority queue bid quantity of eleven hundred with first priority position for a given user data vault 6501;

exemplary advertising community unit object and advertising attribute specification unit price-time priority queue bid price of one dollar and thirty-one cents with first priority position for a given user data vault 6502;

exemplary advertising community unit object and advertising attribute specification unit price-time priority queue offer or sell price of one dollar and thirty-two cents with first priority position for a given user data vault 6503;

exemplary advertising community unit object and advertising attribute specification unit price-time priority queue offer or sell quantity of one thousand with first priority position for a given user data vault 6504;

exemplary advertising community unit object and advertising attribute specification unit price-time priority queue operating system graphic user interface for a given user data vault 6505;

exemplary advertising community unit object setting for a specific user "x" for a given user data vault 6506;

exemplary advertising community unit object search input field for the operating system and diet and restaurant portal graphic user interface data socket for internet, application, picture, image, audio, augmented reality, mixed reality, virtual reality or other computing interface for a specific user "x" for a given user data vault 6507;

exemplary advertising community unit object and advertising attribute specification diet and restaurant portal user application of "x" for a specific user "x" for a given user data vault 6508;

exemplary advertising community unit object and advertising attribute specification diet and restaurant portal application of "x" for a specific user "x" for a given user data vault 6509;

exemplary advertising community unit object and advertising attribute specification diet and restaurant portal, image, audio or video portal application of "x" for a specific user "x" for a given user data vault 6510;

exemplary advertising community unit object and advertising attribute specification diet and restaurant portal list back button for a given user data vault 6511 with another user or one to many group;

exemplary advertising community unit object and advertising attribute specification reply to diet and restaurant portal or track button for a given user data vault 6512 with another user or one to many group;

exemplary advertising community unit object and advertising attribute specification compose diet and restaurant portal story list for a given user data vault 6513 with another user or one to many group;

exemplary advertising community unit object and advertising attribute specification diet and restaurant scroll bar for a given user data vault 6514 with another user or one to many group;

exemplary advertising community unit object and advertising attribute specification diet and restaurant portal scroll bar distance bar for a given user data vault 6515 with another user or one to many group;

exemplary advertising community unit object and advertising attribute specification AI or artificial intelligence Markovian network function for a specific user "x" for a given user data vault 6516 to recommend additional next diet and wellness portal responses and markets in a ranked node list;

exemplary advertising community unit object and advertising attribute specification diet and restaurant portal, image, audio or voice command interface interpreter application for a specific user "x" for a given user data vault 6517;

exemplary advertising community unit object and advertising attribute specification keyboard backspace in standard QWERTY keyboard context for a specific user "x" for a given user data vault 6518;

exemplary advertising community unit object and advertising attribute specification keyboard rotation tool for additional keyboards in standard QWERTY keyboard context for a specific user "x" for a given user data vault 6519;

exemplary advertising community unit object and advertising attribute specification keyboard return or enter key in standard QWERTY keyboard context for a specific user "x" for a given user data vault 6520;

exemplary advertising community unit object and advertising attribute specification share diet and restaurant portal, image, track or video share button for a given user data vault 6521 with another user or one to many group;

exemplary advertising community unit object and advertising attribute specification save diet and restaurant portal, save image, track or video play button for a given user data vault 6522 with another user or one to many group;

In some embodiments, the operating system portal may have an additional plurality of applications such as a series of diet and restaurant interface tools 6508, and a general search interface input screen 6507 to search existing operating system applications, internet browsing or any data socket data exchange. In some embodiments, the advertising attribute specification trading market with price-time priority queues 6501, 6502, 6503, 6504 for a general user specification associated with their private user specification data vault 6506. In some embodiments, the graphic user interface of the operation system 6505 may display full lists of installed applications, data socket search results from the internet, uninstalled but available applications, which are associated with the private user data vault advertising attribute specification 6506. In some embodiments, a user may decide to sell or buy all, some or no portion of their given user data vault for their user advertising attribute specification 6506. In some embodiments, a user 110 may scroll applications and data socket exchanges with the operating system scroll bar distance locator 6515 and scroll bar 6514. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6501, 6502, 6503, 6504. In some embodiments, a user 110 may enable their data vault 111 to allow the Markovian Networks 6516 to interpret and log diet and restaurant portal network history or search of the user 110 so advertisers may directly buy their advertising attribute specification on the exchange and corresponding price-time priority queues for advertising attribute specifications 6501, 6502, 6503, 6504. In some embodiments, the user 110 may use the QWERTY keyboard or Markovian network generated responses 6516 or audio responses 6517 or keyboard entered or gesture responses to be entered 6520. In some embodiments, the user 110 may require a plurality of additional keyboard interfaces 6519. In some embodiments, a user 110 may rewind diet and restaurant portal views, image or music or track or video 6512, forward diet and restaurant portal views, image or music or track or video 6513, share diet and restaurant portal, image or music or track or video 6521, play or save diet and restaurant portal, music or track or video 6522, go back to a diet and restaurant portal, image or music or track or video search list 6511 or a plurality of other search functions 6509. In some embodiments, the diet and restaurant user interface includes, but is not limited to a search interface and map it interface 6510 as well as buy now function for a user 6510.

Figure 66:
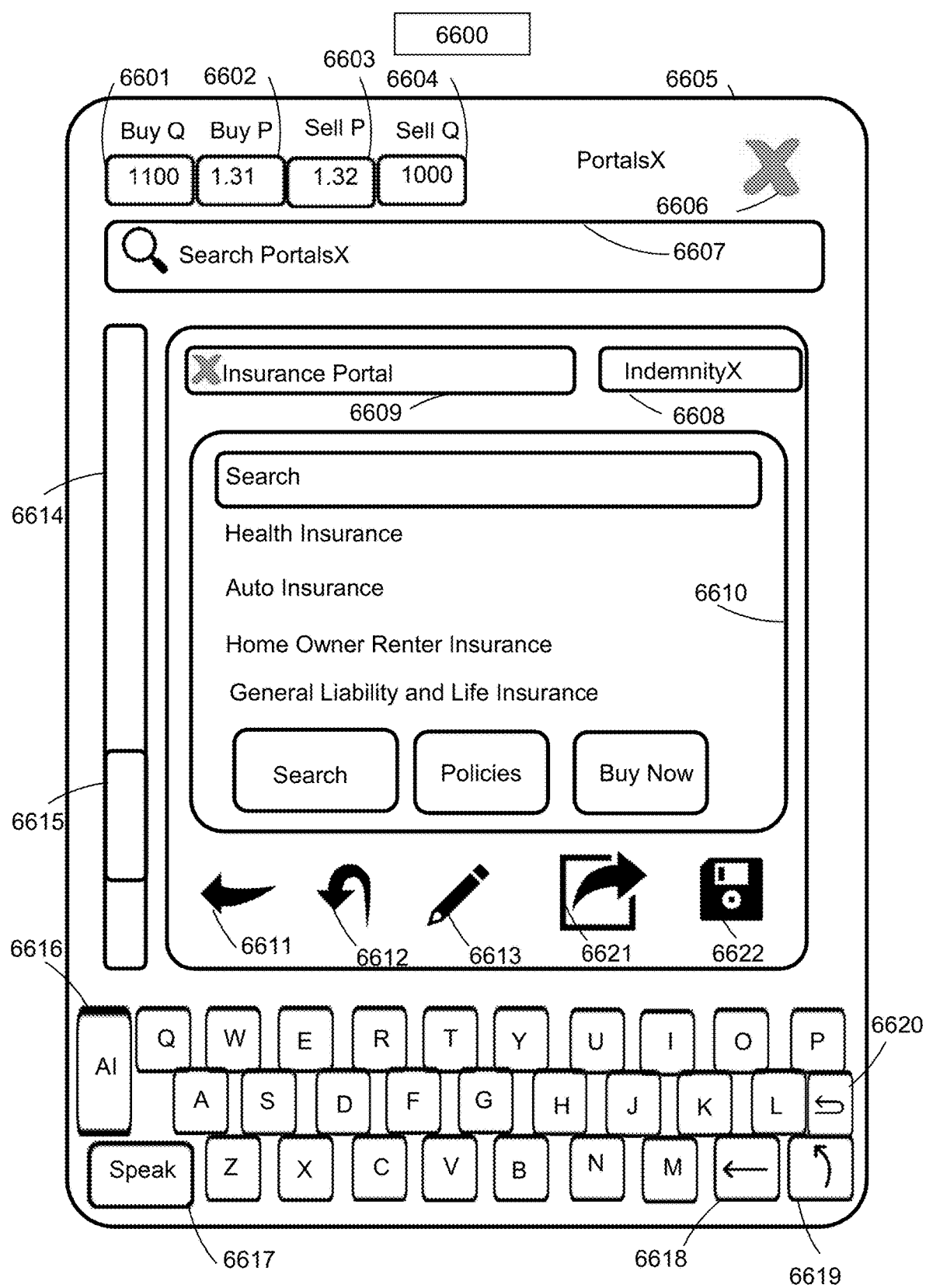
FIG. 66 illustrates an exemplary operating system or data socket communication insurance service portal for both existing insurance service subscriptions and policies and static in app or dynamic social media content with text, data, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 66 illustrates an exemplary advertising community operating system search interface 6600 for the insurance integration portal and search application 6608 of the disclosed method and system which a user may search for an advertising community linked advertising attribute specification unit inventory to the advertising linked virtual community object. In some embodiments, the insurance, phone, image, video, video search and operating system element of the multi layered network node topology of participating, transacting and/or trading transformed advertising community linked advertising attribute specification or advertising capacity units or securities for advertising community linked objects 6600 includes the following elements, or a subset or superset thereof:

exemplary advertising community unit object and advertising attribute specification unit price-time priority queue bid quantity of eleven hundred with first priority position for a given user data vault 6601;

exemplary advertising community unit object and advertising attribute specification unit price-time priority queue bid price of one dollar and thirty-one cents with first priority position for a given user data vault 6602;

exemplary advertising community unit object and advertising attribute specification unit price-time priority queue offer or sell price of one dollar and thirty-two cents with first priority position for a given user data vault 6603;

exemplary advertising community unit object and advertising attribute specification unit price-time priority queue offer or sell quantity of one thousand with first priority position for a given user data vault 6604;

exemplary advertising community unit object and advertising attribute specification unit price-time priority queue operating system graphic user interface for a given user data vault 6605;

exemplary advertising community unit object setting for a specific user "x" for a given user data vault 6606;

exemplary advertising community unit object search input field for the operating system and insurance portal graphic user interface data socket for internet, application, picture, image, audio, augmented reality, mixed reality, virtual reality or other computing interface for a specific user "x" for a given user data vault 6607;

exemplary advertising community unit object and advertising attribute specification insurance portal user application of "x" for a specific user "x" for a given user data vault 6608;

exemplary advertising community unit object and advertising attribute specification insurance portal application of "x" for a specific user "x" for a given user data vault 6609;

exemplary advertising community unit object and advertising attribute specification insurance portal, image, audio or video portal application of "x" for a specific user "x" for a given user data vault 6610;

exemplary advertising community unit object and advertising attribute specification insurance portal list back button for a given user data vault 6611 with another user or one to many group;

exemplary advertising community unit object and advertising attribute specification reply to insurance portal or track button for a given user data vault 6612 with another user or one to many group;

exemplary advertising community unit object and advertising attribute specification compose insurance portal story list for a given user data vault 6613 with another user or one to many group;

exemplary advertising community unit object and advertising attribute specification insurance scroll bar for a given user data vault 6614 with another user or one to many group;

exemplary advertising community unit object and advertising attribute specification insurance portal scroll bar distance bar for a given user data vault 6615 with another user or one to many group;

exemplary advertising community unit object and advertising attribute specification AI or artificial intelligence Markovian network function for a specific user "x" for a given user data vault 6616 to recommend additional next insurance portal responses and markets in a ranked node list;

exemplary advertising community unit object and advertising attribute specification insurance portal, image, audio or voice command interface interpreter application for a specific user "x" for a given user data vault 6617;

exemplary advertising community unit object and advertising attribute specification keyboard backspace in standard QWERTY keyboard context for a specific user "x" for a given user data vault 6618;

exemplary advertising community unit object and advertising attribute specification keyboard rotation tool for additional keyboards in standard QWERTY keyboard context for a specific user "x" for a given user data vault 6619;

exemplary advertising community unit object and advertising attribute specification keyboard return or enter key in standard QWERTY keyboard context for a specific user "x" for a given user data vault 6620;

exemplary advertising community unit object and advertising attribute specification share insurance portal, image, track or video share button for a given user data vault 6621 with another user or one to many group;

exemplary advertising community unit object and advertising attribute specification save insurance portal, save image, track or video play button for a given user data vault 6622 with another user or one to many group;

In some embodiments, the operating system portal may have an additional plurality of applications such as a series of interface interface tools 6608, and a general search interface input screen 6607 to search existing operating system applications, internet browsing or any data socket data exchange. In some embodiments, the advertising attribute specification trading market with price-time priority queues 6601, 6602, 6603, 6604 for a general user specification associated with their private user specification data vault 6506. In some embodiments, the graphic user interface of the operation system 6605 may display full lists of installed applications, data socket search results from the internet, uninstalled but available applications, which are associated with the private user data vault advertising attribute specification 6606. In some embodiments, a user may decide to sell or buy all, some or no portion of their given user data vault for their user advertising attribute specification 6606. In some embodiments, a user 110 may scroll applications and data socket exchanges with the operating system scroll bar distance locator 6615 and scroll bar 6614. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6601, 6602, 6603, 6604. In some embodiments, a user 110 may enable their data vault 111 to allow the Markovian Networks 6616 to interpret and log insurance portal network history or search of the user 110 so advertisers may directly buy their advertising attribute specification on the exchange and corresponding price-time priority queues for advertising attribute specifications 6601, 6602, 6603, 6604. In some embodiments, the user 110 may use the QWERTY keyboard or Markovian network generated responses 6616 or audio responses 6617 or keyboard entered or gesture responses to be entered 6620. In some embodiments, the user 110 may require a plurality of additional keyboard interfaces 6619. In some embodiments, a user 110 may rewind insurance portal views, image or music or track or video 6612, forward insurance portal views, image or music or track or video 6613, share insurance portal, image or music or track or video 6621, play or save insurance portal, music or track or video 6622, go back to a insurance portal, image or music or track or video search list 6611 or a plurality of other search functions 6609. In some embodiments, the insurance user interface includes, but is not limited to a search interface and map it interface 6610 as well as buy now function for a user 6610.

Figure 67:
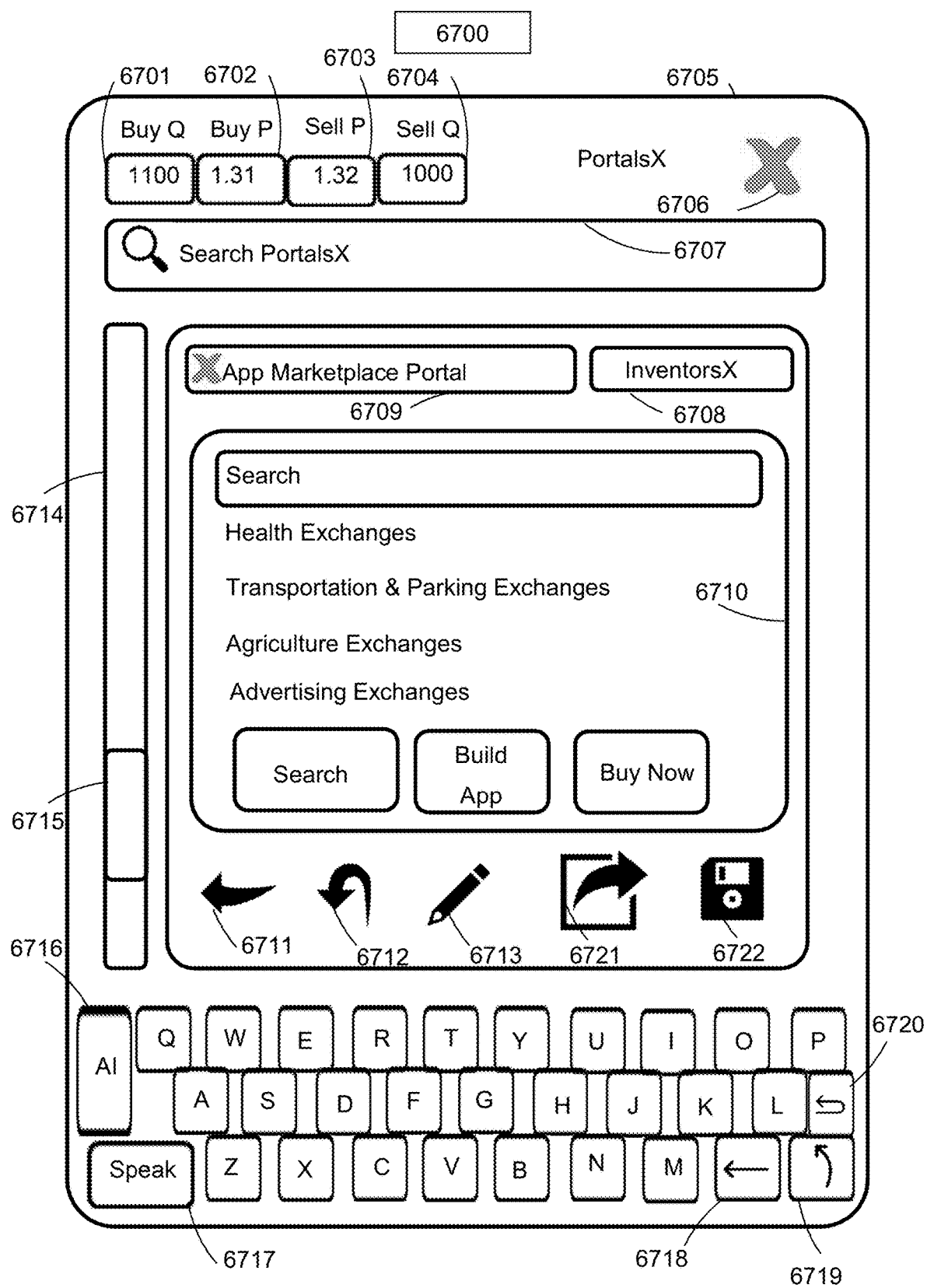
FIG. 67 illustrates an exemplary operating system or data socket communication application developers marketplace for exchange based apps and exchange based service portal for both existing service subscriptions and policies and static in app or dynamic social media content with text, data, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 67 illustrates an exemplary advertising community operating system search interface 6700 for the developer application marketplace integration portal and search application to help developers build out the application exchange eco system 6608 of the disclosed method and system which a user may search for an advertising community linked advertising attribute specification unit inventory to the advertising linked virtual community object. In some embodiments, the exchange developer marketplace, phone, image, video, video search and operating system element of the multi layered network node topology of participating, transacting and/or trading transformed advertising community linked advertising attribute specification or advertising capacity units or securities for advertising community linked objects 6700 includes the following elements, or a subset or superset thereof:

exemplary advertising community unit object and advertising attribute specification unit price-time priority queue bid quantity of eleven hundred with first priority position for a given user data vault 6701;

exemplary advertising community unit object and advertising attribute specification unit price-time priority queue bid price of one dollar and thirty-one cents with first priority position for a given user data vault 6702;

exemplary advertising community unit object and advertising attribute specification unit price-time priority queue offer or sell price of one dollar and thirty-two cents with first priority position for a given user data vault 6703;

exemplary advertising community unit object and advertising attribute specification unit price-time priority queue offer or sell quantity of one thousand with first priority position for a given user data vault 6704;

exemplary advertising community unit object and advertising attribute specification unit price-time priority queue operating system graphic user interface for a given user data vault 6705;

exemplary advertising community unit object setting for a specific user "x" for a given user data vault 6706;

exemplary advertising community unit object search input field for the operating system and exchange based developer marketplace portal graphic user interface data socket for internet, application, picture, image, audio, augmented reality, mixed reality, virtual reality or other computing interface for a specific user "x" for a given user data vault 6707;

exemplary advertising community unit object and advertising attribute specification exchange based developer marketplace portal user application of "x" for a specific user "x" for a given user data vault 6708;

exemplary advertising community unit object and advertising attribute specification exchange based developer marketplace portal application of "x" for a specific user "x" for a given user data vault 6709;

exemplary advertising community unit object and advertising attribute specification exchange based developer marketplace portal, image, audio or video portal application of "x" for a specific user "x" for a given user data vault 6710;

exemplary advertising community unit object and advertising attribute specification exchange based developer marketplace portal list back button for a given user data vault 6711 with another user or one to many group;

exemplary advertising community unit object and advertising attribute specification reply to exchange based developer marketplace portal or track button for a given user data vault 6712 with another user or one to many group;

exemplary advertising community unit object and advertising attribute specification compose exchange based developer marketplace portal story list for a given user data vault 6713 with another user or one to many group;

exemplary advertising community unit object and advertising attribute specification exchange based developer marketplace scroll bar for a given user data vault 6714 with another user or one to many group;

exemplary advertising community unit object and advertising attribute specification exchange based developer marketplace portal scroll bar distance bar for a given user data vault 6715 with another user or one to many group;

exemplary advertising community unit object and advertising attribute specification AI or artificial intelligence Markovian network function for a specific user "x" for a given user data vault 6716 to recommend additional next exchange based developer marketplace portal responses and markets in a ranked node list;

exemplary advertising community unit object and advertising attribute specification exchange based developer marketplace portal, image, audio or voice command interface interpreter application for a specific user "x" for a given user data vault 6717;

exemplary advertising community unit object and advertising attribute specification keyboard backspace in standard QWERTY keyboard context for a specific user "x" for a given user data vault 6718;

exemplary advertising community unit object and advertising attribute specification keyboard rotation tool for additional keyboards in standard QWERTY keyboard context for a specific user "x" for a given user data vault 6719;

exemplary advertising community unit object and advertising attribute specification keyboard return or enter key in standard QWERTY keyboard context for a specific user "x" for a given user data vault 6720;

exemplary advertising community unit object and advertising attribute specification share exchange based developer marketplace portal, image, track or video share button for a given user data vault 6721 with another user or one to many group;

exemplary advertising community unit object and advertising attribute specification save exchange based developer marketplace portal, save image, track or video play button for a given user data vault 6722 with another user or one to many group;

In some embodiments, the operating system portal may have an additional plurality of applications such as a series of exchange based developer marketplace interface tools 6708, and a general search interface input screen 6707 to search existing operating system applications, internet browsing or any data socket data exchange. In some embodiments, the advertising attribute specification trading market with price-time priority queues 6701, 6702, 6703, 6704 for a general user specification associated with their private user specification data vault 6706. In some embodiments, the graphic user interface of the operation system 6705 may display full lists of installed applications, data socket search results from the internet, uninstalled but available applications, which are associated with the private user data vault advertising attribute specification 6706. In some embodiments, a user may decide to sell or buy all, some or no portion of their given user data vault for their user advertising attribute specification 6706. In some embodiments, a user 110 may scroll applications and data socket exchanges with the operating system scroll bar distance locator 6715 and scroll bar 6714. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6701, 6702, 6703, 6704. In some embodiments, a user 110 may enable their data vault 111 to allow the Markovian Networks 6716 to interpret and log exchange based developer marketplace portal network history or search of the user 110 so advertisers may directly buy their advertising attribute specification on the exchange and corresponding price-time priority queues for advertising attribute specifications 6701, 6702, 6703, 6704. In some embodiments, the user 110 may use the QWERTY keyboard or Markovian network generated responses 6716 or audio responses 6717 or keyboard entered or gesture responses to be entered 6720. In some embodiments, the user 110 may require a plurality of additional keyboard interfaces 6719. In some embodiments, a user 110 may rewind exchange based developer marketplace portal views, image or music or track or video 6712, forward exchange based developer marketplace portal views, image or music or track or video 6713, share exchange based developer marketplace portal, image or music or track or video 6721, play or save exchange based developer marketplace portal, music or track or video 6722, go back to a exchange based developer marketplace portal, image or music or track or video search list 6711 or a plurality of other search functions 6709. In some embodiments, the exchange based developer marketplace user interface includes, but is not limited to a build app and buy now app interface 6710 as well as buy now app function for a user 6710. In some embodiments, developers build third party applications with the exchange model of the method and system.

Figure 68:
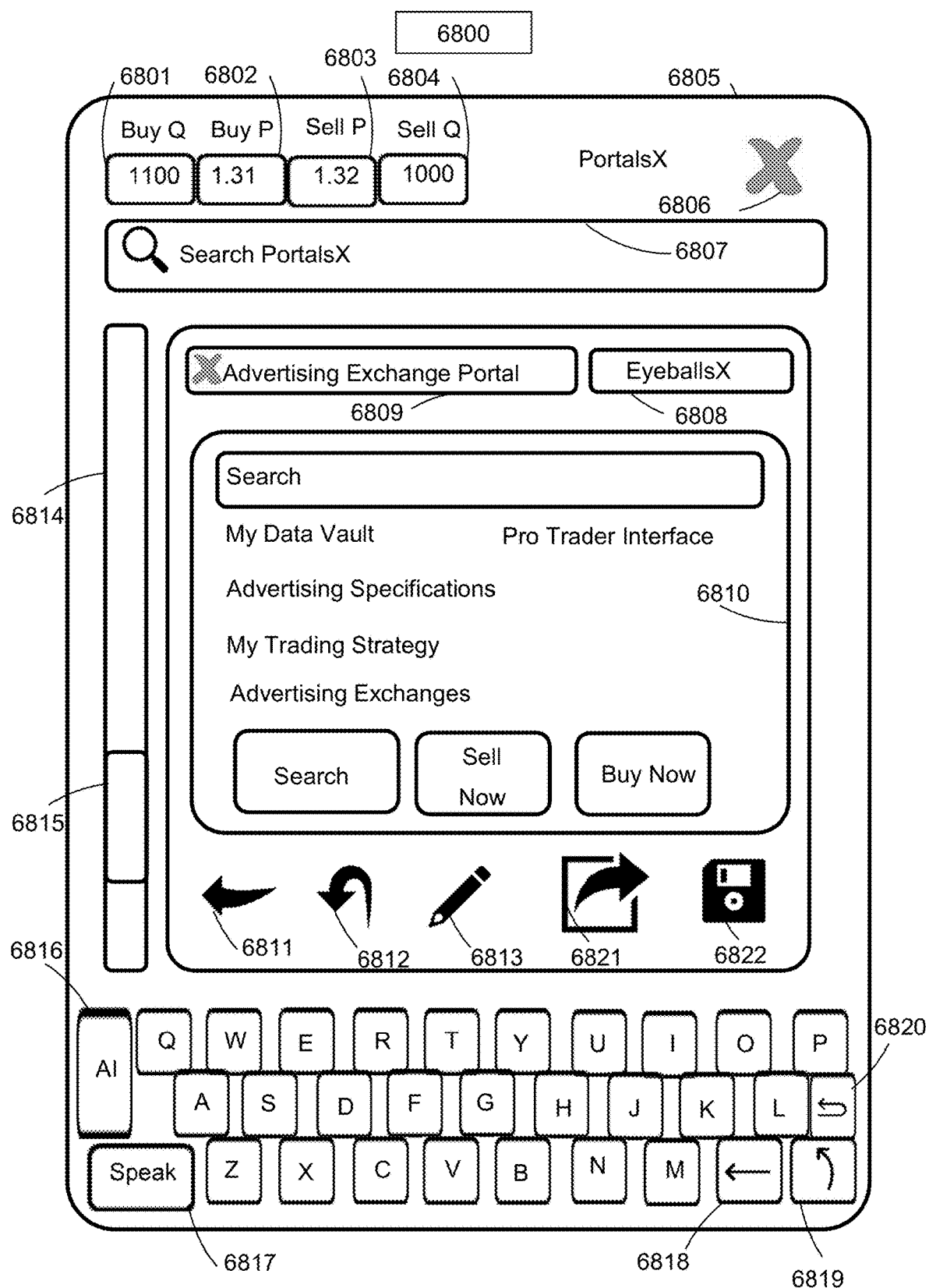
FIG. 68 illustrates an exemplary operating system or data socket communication advertising exchange portal and associated user data vault, advertising specifications, Advertising Strategies, Advertising Exchanges and Pro Trader Interface for exchange based apps and exchange based service portal for both existing service subscriptions and policies and static in app or dynamic social media content with text, data, images and video as a portal linking content or one to one communication or one to many communication with the associated user data vault to transform the user data into an advertising attribute specification with the advertising attribute specification unit linked advertising attribute specification price-time priority market pricing and trading exchange queues.

FIG. 68 illustrates an exemplary advertising community operating system search interface 6800 for the advertising exchange integration portal and search application to help users manage their advertising exchange risk and privacy and earnings and data vault 6808 of the disclosed method and system which a user may search for an advertising community linked advertising attribute specification unit inventory to the advertising linked virtual community object. In some embodiments, the advertising exchange, phone, image, video, video search and operating system element of the multi layered network node topology of participating, transacting and/or trading transformed advertising community linked advertising attribute specification or advertising capacity units or securities for advertising community linked objects 6800 includes the following elements, or a subset or superset thereof:

exemplary advertising community unit object and advertising attribute specification unit price-time priority queue bid quantity of eleven hundred with first priority position for a given user data vault 6801;

exemplary advertising community unit object and advertising attribute specification unit price-time priority queue bid price of one dollar and thirty-one cents with first priority position for a given user data vault 6802;

exemplary advertising community unit object and advertising attribute specification unit price-time priority queue offer or sell price of one dollar and thirty-two cents with first priority position for a given user data vault 6803;

exemplary advertising community unit object and advertising attribute specification unit price-time priority queue offer or sell quantity of one thousand with first priority position for a given user data vault 6804;

exemplary advertising community unit object and advertising attribute specification unit price-time priority queue operating system graphic user interface for a given user data vault 6805;

exemplary advertising community unit object setting for a specific user "x" for a given user data vault 6806;

exemplary advertising community unit object search input field for the operating system and advertising exchange portal graphic user interface data socket for internet, application, picture, image, audio, augmented reality, mixed reality, virtual reality or other computing interface for a specific user "x" for a given user data vault 6807;

exemplary advertising community unit object and advertising attribute specification advertising exchange portal user application of "x" for a specific user "x" for a given user data vault 6808;

exemplary advertising community unit object and advertising attribute specification advertising exchange portal application of "x" for a specific user "x" for a given user data vault 6809;

exemplary advertising community unit object and advertising attribute specification advertising exchange portal, image, audio or video portal application of "x" for a specific user "x" for a given user data vault 6810;

exemplary advertising community unit object and advertising attribute specification advertising exchange portal list back button for a given user data vault 6811 with another user or one to many group;

exemplary advertising community unit object and advertising attribute specification reply to advertising exchange portal or track button for a given user data vault 6812 with another user or one to many group;

exemplary advertising community unit object and advertising attribute specification compose advertising exchange portal start building a new exchange app for a given user data vault 6813 with another user or one to many group;

exemplary advertising community unit object and advertising attribute specification advertising exchange scroll bar for a given user data vault 6814 with another user or one to many group;

exemplary advertising community unit object and advertising attribute specification advertising exchange portal scroll bar distance bar for a given user data vault 6815 with another user or one to many group;

exemplary advertising community unit object and advertising attribute specification AI or artificial intelligence Markovian network function for a specific user "x" for a given user data vault 6816 to recommend additional next advertising exchange portal responses and markets in a ranked node list;

exemplary advertising community unit object and advertising attribute specification advertising exchange portal, image, audio or voice command interface interpreter application for a specific user "x" for a given user data vault 6817;

exemplary advertising community unit object and advertising attribute specification keyboard backspace in standard QWERTY keyboard context for a specific user "x" for a given user data vault 6818;

exemplary advertising community unit object and advertising attribute specification keyboard rotation tool for additional keyboards in standard QWERTY keyboard context for a specific user "x" for a given user data vault 6819;

exemplary advertising community unit object and advertising attribute specification keyboard return or enter key in standard QWERTY keyboard context for a specific user "x" for a given user data vault 6820;

exemplary advertising community unit object and advertising attribute specification share advertising exchange portal, image, track or video share button for a given user data vault 6821 with another user or one to many group;

exemplary advertising community unit object and advertising attribute specification save advertising exchange portal, save image, track or video play button for a given user data vault 6722 with another user or one to many group;

In some embodiments, the operating system portal may have an additional plurality of applications such as a series of advertising exchange interface tools 6808, and a general search interface input screen 6807 to search existing operating system applications, internet browsing or any data socket data exchange. In some embodiments, the advertising attribute specification trading market with price-time priority queues 6801, 6802, 6803, 6804 for a general user specification associated with their private user specification data vault 6806. In some embodiments, the graphic user interface of the operation system 6805 may display full lists of installed applications, data socket search results from the internet, uninstalled but available applications, which are associated with the private user data vault advertising attribute specification 6806. In some embodiments, a user may decide to sell or buy all, some or no portion of their given user data vault for their user advertising attribute specification 6806. In some embodiments, a user 110 may scroll applications and data socket exchanges with the operating system scroll bar distance locator 6815 and scroll bar 6814. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 6801, 6802, 6803, 6804. In some embodiments, a user 110 may enable their data vault 111 to allow the Markovian Networks 6816 to interpret and log advertising exchange portal network history or search of the user 110 so advertisers may directly buy their advertising attribute specification on the exchange and corresponding price-time priority queues for advertising attribute specifications 6801, 6802, 6803, 6804. In some embodiments, the user 110 may use the QWERTY keyboard or Markovian network generated responses 6716 or audio responses 6817 or keyboard entered or gesture responses to be entered 6620. In some embodiments, the user 110 may require a plurality of additional keyboard interfaces 6719. In some embodiments, a user 110 may rewind advertising exchange portal views, image or music or track or video 6812, forward advertising exchange portal views, image or music or track or video 6813, share advertising exchange portal, image or music or track or video 6821, play or save advertising exchange portal, music or track or video 6822, go back to an advertising exchange portal, image or music or track or video search list 6811 or a plurality of other search functions 6809. In some embodiments, the advertising exchange user interface includes, but is not limited to a search interface and map it interface 6810 as well as buy now function for a user 6810.

FIG. 69 illustrates an exemplary advertising community operating system search and data socket interface and advertising attribute specification from a legal transformation perspective 6900 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 70 illustrates an exemplary advertising community operating system search and data socket interface and advertising attribute specification from a legal transformation perspective 7000 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 71 illustrates an exemplary advertising community operating system search and data socket interface and advertising attribute specification from a legal transformation perspective 7100 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 72 illustrates an exemplary advertising community operating system search and data socket interface and advertising attribute specification from a legal transformation perspective 7200 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 73 illustrates an exemplary advertising community operating system search and data socket interface and advertising attribute specification from a legal transformation perspective 7300 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 74 illustrates an exemplary advertising community operating system search and data socket interface and advertising attribute specification from a legal transformation perspective 7400 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 75 illustrates an exemplary advertising community operating system search and data socket interface and advertising attribute specification from a legal transformation perspective 7500 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 76 illustrates an exemplary advertising community operating system search and data socket interface and advertising attribute specification from a legal transformation perspective 7600 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 77 illustrates an exemplary advertising community operating system search and data socket interface and advertising attribute specification from a legal transformation perspective 7700 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 78 illustrates an exemplary advertising community operating system search and data socket interface and advertising attribute specification from a legal transformation perspective 7800 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 79 illustrates an exemplary advertising community operating system search and data socket interface and advertising attribute specification from a legal transformation perspective 7900 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 80 illustrates an exemplary advertising community operating system search and data socket interface and advertising attribute specification from a legal transformation perspective 8000 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 81 illustrates an exemplary advertising community operating system search and data socket interface and advertising attribute specification from a legal transformation perspective 8100 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 82 illustrates an exemplary advertising community operating system search and data socket interface and advertising attribute specification from a legal transformation perspective 8200 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 83 illustrates an exemplary advertising community operating system search and data socket interface and advertising attribute specification from a legal transformation perspective 8300 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 84 illustrates an exemplary advertising community operating system search and data socket interface and advertising attribute specification from a legal transformation perspective 8400 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 85 illustrates an exemplary advertising community operating system search and data socket interface and advertising attribute specification from a legal transformation perspective 8500 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 86 illustrates an exemplary advertising community operating system search and data socket interface and advertising attribute specification from a legal transformation perspective 8600 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 87 illustrates an exemplary advertising community operating system search and data socket interface and advertising attribute specification from a legal transformation perspective 8700 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

FIG. 88 illustrates an exemplary advertising community operating system search and data socket interface and advertising attribute specification from a legal transformation perspective 8800 for the advertising exchange integration portal and search application and operating system. Diagrams contain novel legal transformations to transform the advertising attribute specification associated with a plurality to user data vault characteristics legal assets which may be bought, sold, delivered and traded many times as any forward, futures, swap, option, equity or debt contract based upon the advertising attribute specification structured transformation. In some embodiments, the legal contract is self explanatory with defined terms, and calculations for cost of cover, force majeure, bankruptcy, unwind, termination payments, default and other futures and forward contract transformations.

Figure 89:
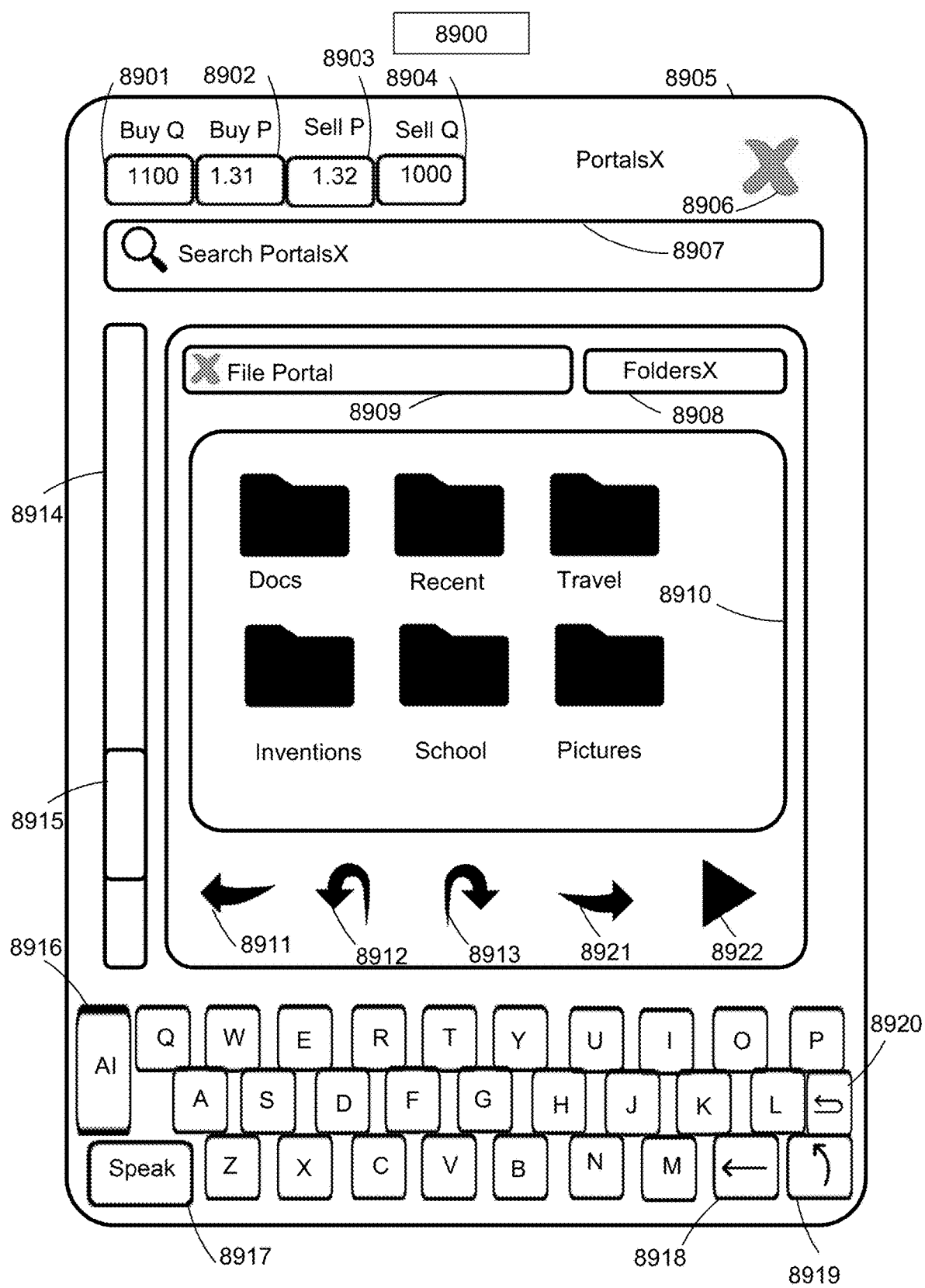
FIG. 89 illustrates an exemplary operating system file and data storage portal or data socket communication portal linking content files and images, videos, folders or storage for one to one communication or one to many communication with the associated user data vault to transform the user data into an advertising attribute specification with the advertising attribute specification unit linked advertising attribute specification price-time priority market pricing and trading exchange queues.

FIG. 89 illustrates an exemplary advertising community operating system search interface and file storage system 8900 for the file and data storage integration portal and search application to help users manage their file and data storage and data vault 8908 of the disclosed method and system which a user may search for an advertising community linked advertising attribute specification unit inventory to the advertising linked virtual community object. In some embodiments, the file and data storage, phone, image, video, video search and operating system element of the multi layered network node topology of participating, transacting and/or trading transformed advertising community linked advertising attribute specification or advertising capacity units or securities for advertising community linked objects 8900 includes the following elements, or a subset or superset thereof:

exemplary advertising community unit object and advertising attribute specification unit price-time priority queue bid quantity of eleven hundred with first priority position for a given user data vault 8901;

exemplary advertising community unit object and advertising attribute specification unit price-time priority queue bid price of one dollar and thirty-one cents with first priority position for a given user data vault 8902;

exemplary advertising community unit object and advertising attribute specification unit price-time priority queue offer or sell price of one dollar and thirty-two cents with first priority position for a given user data vault 8903;

exemplary advertising community unit object and advertising attribute specification unit price-time priority queue offer or sell quantity of one thousand with first priority position for a given user data vault 8904;

exemplary advertising community unit object and advertising attribute specification unit price-time priority queue operating system graphic user interface for a given user data vault 8905;

exemplary advertising community unit object setting for a specific user "x" for a given user data vault 8906;

exemplary advertising community unit object search input field for the operating system and file and data storage portal graphic user interface data socket for internet, application, picture, image, audio, augmented reality, mixed reality, virtual reality or other computing interface for a specific user "x" for a given user data vault 8907;

exemplary advertising community unit object and advertising attribute specification file and data storage portal user application of "x" for a specific user "x" for a given user data vault 8908;

exemplary advertising community unit object and advertising attribute specification file and data storage portal application of "x" for a specific user "x" for a given user data vault 8909;

exemplary advertising community unit object and advertising attribute specification file and data storage portal, image, audio or video portal application of "x" for a specific user "x" for a given user data vault 8910;

exemplary advertising community unit object and advertising attribute specification file and data storage portal list back button for a given user data vault 8911 with another user or one to many group;

exemplary advertising community unit object and advertising attribute specification reply to file and data storage portal or track button for a given user data vault 8912 with another user or one to many group;

exemplary advertising community unit object and advertising attribute specification compose file and data storage portal start building a new exchange app for a given user data vault 8913 with another user or one to many group;

exemplary advertising community unit object and advertising attribute specification file and data storage scroll bar for a given user data vault 8914 with another user or one to many group;

exemplary advertising community unit object and advertising attribute specification file and data storage portal scroll bar distance bar for a given user data vault 8915 with another user or one to many group;

exemplary advertising community unit object and advertising attribute specification AI or artificial intelligence Markovian network function for a specific user "x" for a given user data vault 8916 to recommend additional next file and data storage portal responses and markets in a ranked node list;

exemplary advertising community unit object and advertising attribute specification file and data storage portal, image, audio or voice command interface interpreter application for a specific user "x" for a given user data vault 8917;

exemplary advertising community unit object and advertising attribute specification keyboard backspace in standard QWERTY keyboard context for a specific user "x" for a given user data vault file and data storage 8918;

exemplary advertising community unit object and advertising attribute specification keyboard rotation tool for additional keyboards in standard QWERTY keyboard context for a specific user "x" for a given user data vault 8919;

exemplary advertising community unit object and advertising attribute specification keyboard return or enter key in standard QWERTY keyboard context for a specific user "x" for a given user data vault 8920;

exemplary advertising community unit object and advertising attribute specification share file and data storage portal, image, track or video share button for a given user data vault 8921 with another user or one to many group;

exemplary advertising community unit object and advertising attribute specification save advertising exchange portal, save image, track or video play button for a given user data vault 8922 with another user or one to many group;

In some embodiments, the operating system portal may have an additional plurality of applications such as a series of file and data storage interface tools 8908, and a general search interface input screen 8907 to search existing operating system applications, internet browsing or any data socket data exchange. In some embodiments, the advertising attribute specification trading market with price-time priority queues 8901, 8902, 8903, 8904 for a general user specification associated with their private user specification data vault 8906. In some embodiments, the graphic user interface of the operation system 8905 may display full lists of installed applications, data socket search results from the internet, uninstalled but available applications, which are associated with the private user data vault advertising attribute specification 8906. In some embodiments, a user may decide to sell or buy all, some or no portion of their given user data vault for their user advertising attribute specification 8906. In some embodiments, a user 110 may scroll applications and data socket exchanges with the operating system scroll bar distance locator 8915 and scroll bar 8914. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 8901, 8902, 8903, 8904. In some embodiments, a user 110 may enable their data vault 111 to allow the Markovian Networks 8916 to interpret and log file and data storage portal network history or search of the user 110 so advertisers may directly buy their advertising attribute specification on the exchange and corresponding price-time priority queues for advertising attribute specifications 8901, 8902, 8903, 8904. In some embodiments, the user 110 may use the QWERTY keyboard or Markovian network generated responses 8916 or audio responses 8917 or keyboard entered or gesture responses to be entered 8920. In some embodiments, the user 110 may require a plurality of additional keyboard interfaces 8919. In some embodiments, a user 110 may rewind file and data storage portal views, image or music or track or video 8912, forward file and data storage portal views, image or music or track or video 8913, share file and data storage portal, image or music or track or video 8921, play or save advertising exchange portal, music or track or video 8922, go back to an advertising exchange portal, image or music or track or video search list 8911 or a plurality of other search functions 8909. In some embodiments, the file and data storage user interface includes, but is not limited to a search interface and map it interface 8910 as well as buy now function for a user 8910.

Figure 90:
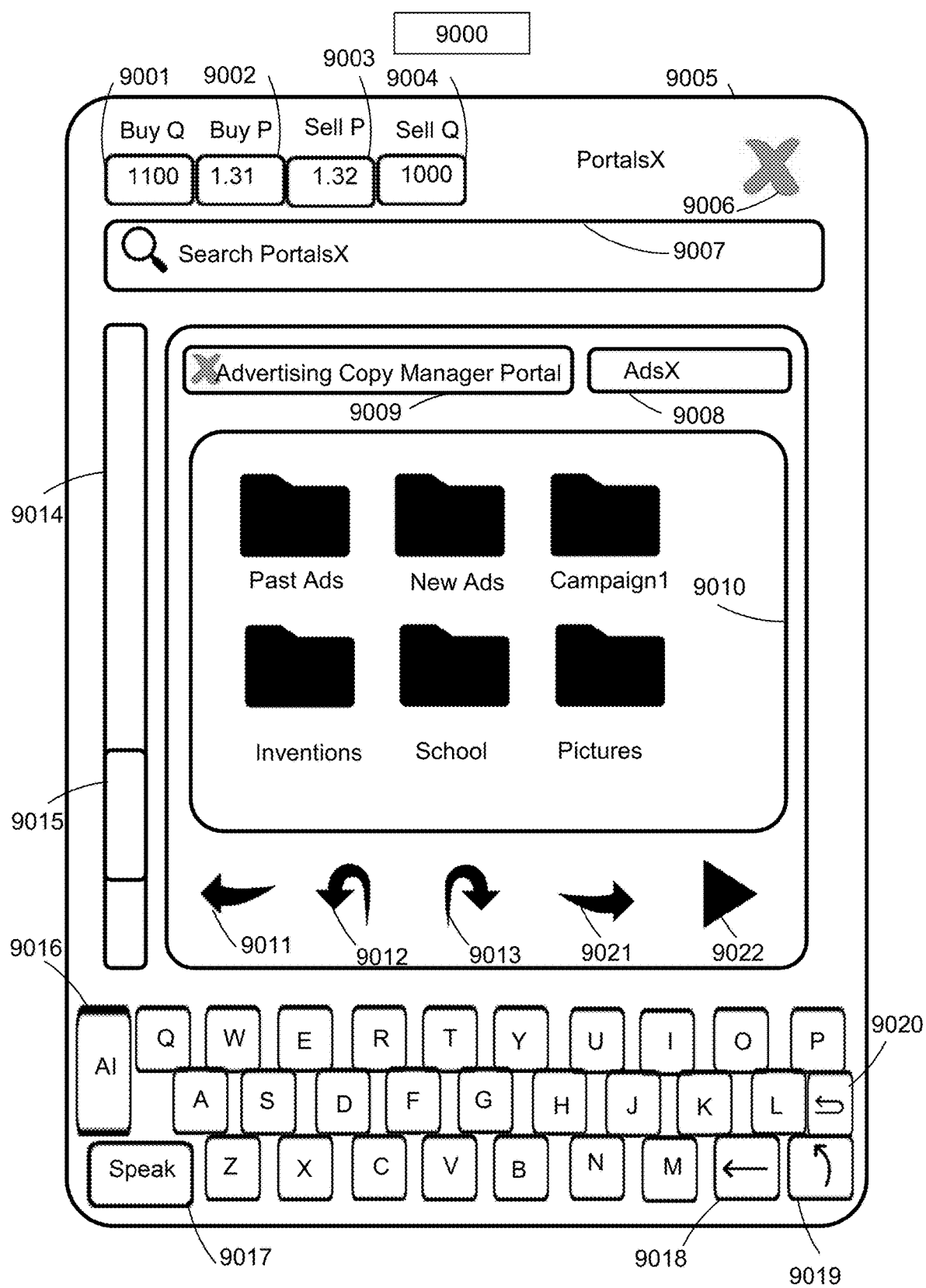
FIG. 90 illustrates an exemplary operating system advertising copy file and data storage manager portal or data socket communication portal linking advertising copy manager with the advertising attribute specification unit linked advertising attribute specification price-time priority market pricing and trading exchange queues.

FIG. 90 illustrates an exemplary advertising community operating system search interface and advertising copy file uplink and downlink management storage system 9000 for the advertising file and data storage integration portal and search application to help users manage their file and data storage and data vault 9008 of the disclosed method and system which a user may search for an advertising community linked advertising attribute specification unit inventory to the advertising linked virtual community object. In some embodiments, the file and data storage, phone, image, video, video search and operating system element of the multi layered network node topology of participating, transacting and/or trading transformed advertising community linked advertising attribute specification or advertising capacity units or securities for advertising community linked objects 9000 includes the following elements, or a subset or superset thereof:

exemplary advertising community unit object and advertising attribute specification unit price-time priority queue bid quantity of eleven hundred with first priority position for a given user data vault 9001;

exemplary advertising community unit object and advertising attribute specification unit price-time priority queue bid price of one dollar and thirty-one cents with first priority position for a given user data vault 9002;

exemplary advertising community unit object and advertising attribute specification unit price-time priority queue offer or sell price of one dollar and thirty-two cents with first priority position for a given user data vault 9003;

exemplary advertising community unit object and advertising attribute specification unit price-time priority queue offer or sell quantity of one thousand with first priority position for a given user data vault 9004;

exemplary advertising community unit object and advertising attribute specification unit price-time priority queue operating system graphic user interface for a given user data vault 9005;

exemplary advertising community unit object setting for a specific user "x" for a given user data vault 9006;

exemplary advertising community unit object search input field for the operating system and advertising copy management portal graphic user interface data socket for internet, application, picture, image, audio, augmented reality, mixed reality, virtual reality or other computing interface for a specific user "x" for a given user data vault 9007;

exemplary advertising community unit object and advertising attribute specification advertising copy management portal user application of "x" for a specific user "x" for a given user data vault 9008;

exemplary advertising community unit object and advertising attribute specification advertising copy management portal application of "x" for a specific user "x" for a given user data vault 9009;

exemplary advertising community unit object and advertising attribute specification advertising copy management portal, image, audio or video portal application of "x" for a specific user "x" for a given user data vault 9010;

exemplary advertising community unit object and advertising attribute specification advertising copy management portal list back button for a given user data vault 9011 with another user or one to many group;

exemplary advertising community unit object and advertising attribute specification reply to advertising copy management portal or track button for a given user data vault 9012 with another user or one to many group;

exemplary advertising community unit object and advertising attribute specification compose advertising copy management portal start building a new exchange app for a given user data vault 9013 with another user or one to many group;

exemplary advertising community unit object and advertising attribute specification advertising copy management scroll bar for a given user data vault 9014 with another user or one to many group;

exemplary advertising community unit object and advertising attribute specification advertising copy management portal scroll bar distance bar for a given user data vault 9015 with another user or one to many group;

exemplary advertising community unit object and advertising attribute specification AI or artificial intelligence Markovian network function for a specific user "x" for a given user data vault 9016 to recommend additional next advertising copy management portal responses and markets in a ranked node list;

exemplary advertising community unit object and advertising attribute specification advertising copy management portal, image, audio or voice command interface interpreter application for a specific user "x" for a given user data vault 9017;

exemplary advertising community unit object and advertising attribute specification keyboard backspace in standard QWERTY keyboard context for a specific user "x" for a given user data vault file and data storage 9018;

exemplary advertising community unit object and advertising attribute specification keyboard rotation tool for additional keyboards in standard QWERTY keyboard context for a specific user "x" for a given user data vault 9019;

exemplary advertising community unit object and advertising attribute specification keyboard return or enter key in standard QWERTY keyboard context for a specific user "x" for a given user data vault 9020;

exemplary advertising community unit object and advertising attribute specification share advertising copy management portal, image, track or video share button for a given user data vault 9021 with another user or one to many group;

exemplary advertising community unit object and advertising attribute specification save advertising copy management portal, save image, track or video play button for a given user data vault 9022 with another user or one to many group;

In some embodiments, the operating system portal may have an additional plurality of applications such as a series of advertising copy management interface tools 8908, and a general search interface input screen 9007 to search existing operating system applications, internet browsing or any data socket data exchange. In some embodiments, the advertising attribute specification trading market with price-time priority queues 9001, 9002, 9003, 9004 for a general user specification associated with their private user specification data vault 9006. In some embodiments, the graphic user interface of the operation system 9005 may display full lists of installed applications, data socket search results from the internet, uninstalled but available applications, which are associated with the private user data vault advertising attribute specification 9006. In some embodiments, a user may decide to sell or buy all, some or no portion of their given user data vault for their user advertising attribute specification 9006. In some embodiments, a user 110 may scroll applications and data socket exchanges with the operating system scroll bar distance locator 9015 and scroll bar 9014. In some embodiments, a user 110 may select any application from the aforementioned lists by selecting a particular application through text, voice, touch, audio command, movement of fingers with an associated gesture or other interface methods. In some embodiments, a user 110 may sell or buy advertising attribute specifications on the futures or forward advertising attribute specification exchange and price-time priority queues 9001, 9002, 9003, 9004. In some embodiments, a user 110 may enable their data vault 111 to allow the Markovian Networks 9016 to interpret and log advertising copy management portal network history or search of the user 110 so advertisers may directly buy their advertising attribute specification on the exchange and corresponding price-time priority queues for advertising attribute specifications 9001, 9002, 9003, 9004. In some embodiments, the user 110 may use the QWERTY keyboard or Markovian network generated responses 8916 or audio responses 9017 or keyboard entered or gesture responses to be entered 8920. In some embodiments, the user 110 may require a plurality of additional keyboard interfaces 8919. In some embodiments, a user 110 may rewind advertising copy management portal views, image or music or track or video 9012, forward advertising copy management portal views, image or music or track or video 9013, share advertising copy management storage portal, image or music or track or video 9021, play or save advertising exchange portal, music or track or video 9022, go back to an advertising exchange portal, image or music or track or video search list 9011 or a plurality of other search functions 8909. In some embodiments, the advertising copy management user interface includes, but is not limited to a search interface and map it interface 9010 as well as buy now function for a user 9010.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   receiving user attribute data from a plurality of users over a wireless or wired communication network, wherein the user attribute data comprises data corresponding to one or more user attributes for the plurality of users;
   determining one or more virtual hub communities based on the user attribute data, wherein a respective virtual hub community corresponds to at least a portion of the user attribute data;
   storing the one or more virtual hub communities on a first database server;
   detecting, at respective user interfaces of the plurality of users, user network logins of the user interfaces using one or more of facial recognition, fingerprint recognition and photo-scan security for authentication;
   determining an advertising attribute exchange for one or more advertising attribute units based on the one or more virtual hub communities, wherein:
      the one or more advertising attribute units correspond to at least a portion of the user attribute data from the plurality of users; and
      the advertising attribute exchange corresponds to market depth data, the market depth data comprising data indicating one or more bid prices and one or more offer prices from the plurality of users for the one or more advertising attribute units, wherein the data indicating the one or more bid prices and the one or more offer prices comprises data indicating a first bid price or a first offer price from the detected user interface of a first user of the plurality of users for a respective advertising attribute unit of the one or more advertising attribute units;
   storing the advertising attribute exchange on a second database server;
   generating one or more integrated or overlayed layers for the detected respective user interfaces of the plurality of users, wherein the one or more integrated or overlayed layers correspond to a network node topology for the advertising attribute exchange in real time; and
   receiving transaction input data on the one or more integrated or overlayed layers from the detected user interface of a second user of the plurality of users, wherein the transaction input data comprises data indicating an acceptance by the second user of the first bid price or the first offer price for the respective advertising attribute unit.

2. The method of claim 1, wherein:
   the detected user interfaces comprise one of: touchscreen displays, augmented non-screen displays, or audio interfaces of the plurality of users; and
   the one or more user attributes comprise user hair color, user weight, user sex, user height, user address, user city, user state, user zip code, user location, user dietary preferences, user historical orders of merchandise food or other goods and services, user purchasing frequency, user login frequency, user music tastes, user color tastes, user family size, user family type, user friends, user travel patterns, user reading lists, user movie preferences, user text preferences, user mail preferences, user mail content, user text content, user application preferences, user browsing history, user date of birth, user country of birth, user parents, user siblings, user fitness patterns, user fitness preferences, user travel location, user career, user job history, user worker colleagues, user advertising patterns, user shipping patterns, user mood, user education, user love life, user dating life, user divorce, user children, user extended family, user alumni network, user school or work network, user religious network or religious affiliation, or combinations thereof.

3. The method of claim 2, wherein the one or more user attributes further comprise user credit score, user payment patterns, user investments, user music preferences and comparison, user comparison rankings of all preferences, user philosophies, user news consumption, user dietary consumption, user sexual orientation, user love languages, user housing preferences, user environment preferences, user city preferences, user birthday preferences, user holiday preferences, user story preferences, user television history, user movie history, user sleep preferences, user driving preferences, user distance from work, user distance from home, user distance from places of importance to user, user mode of transportation, user beverage preferences, user health data, user doctor exam, user blood and biomarker exam laboratory work, user psychology, user vacation preferences, user hero preferences, user dreams, user visions, user languages spoken, user mother tongue, user conversations, user patents, user perceptions, user income, user economic class, user race, user ethnicity, user awards, user accomplishments, user attitude, or combinations thereof.

4. The method of claim 1, wherein the user attribute data comprises data determined using artificial intelligence.

5. The method of claim 1, wherein determining the one or more virtual hub communities comprises determining the one or more virtual hub communities based on user location, user date of birth, or combinations thereof, wherein a respective node of the network node topology corresponds to a virtual hub of the plurality of virtual hubs.

6. The method of claim 1, further comprising transmitting the market depth data to the plurality of users, wherein the market depth data is at least one of configured to be displayed as a graphical layer of the one or more integrated or overlayed layers for the detected respective user interfaces or configured to be displayed in a graphical list view corresponding to the one or more integrated or overlayed layers for the detected respective user interfaces.

7. The method of claim 6, wherein transmitting the market depth data comprises:
   receiving term specification data from a respective user, wherein the term specification data indicates a selection by the respective user of a time period for using a respective predetermined space; and
   transmitting the market depth data to the respective user based on at least the received term specification data.

8. The method of claim 1, wherein providing the advertising attribute exchange comprises:
   receiving the data indicating the one or more bid prices and the one or more offer prices from at least a subset of the plurality of users; and
   providing the advertising attribute exchange for the one or more advertising attribute units based on the received data indicating the one or more bid prices and the one or more offer prices.

9. The method of claim 1, further comprising:
   receiving updated market depth data for the advertising attribute exchange in real time, wherein the updated market depth data comprises data corresponding to one or more updated bid prices and one or more updated offer prices for the one or more advertising attribute units; and transmitting at least a portion of the updated market depth data to the plurality of users.

10. The method of claim 1, wherein the transaction input data further comprises time in force data, wherein the time in force data indicates a selection of one or more time in force conditions by the second user for the acceptance of the first bid price or the first offer price.

11. The method of claim 1, further comprising generating a forward commodity contract between the first user and the second user based on the received transaction input data, wherein the forward commodity contract comprises one or more conditional attributes to provide substitutability between first and second advertising attribute units of the one or more advertising attribute units.

12. The method of claim 1, wherein the market depth data further comprises data corresponding to:
   a bid queue for the one or more bid prices, wherein the one or more bid prices are ranked in the bid queue from highest price to lowest price, and wherein respective bid prices of the same value are ranked by time in the bid queue; and
   an offer queue for the one or more offer prices, wherein the one or more offer prices are ranked in the offer queue from lowest price to highest price, and wherein respective offer prices of the same value are ranked by time in the offer queue.

13. The method of claim 1, wherein the one or more advertising attribute units comprise one or more commodity contract specifications.

14. The method of claim 1, further comprising:
   tracking real time location updates of the detected respective user interfaces of the first and second user and respective term specification data.

15. The method of claim 1, wherein:
   the detected respective user interfaces comprise one or more navigational user interfaces;
   the one or more integrated or overlayed layers comprise at least one or more of: buttons; icons; settings; tables; or menus; and
   the transaction input data is received by a selection or a manipulation of at least one of the one or more layers.

16. A computing system, comprising:
   one or more processors; and
   at least one memory comprising program instructions executable by the one or more processors to:
      receive user attribute data from a plurality of users over a wireless or wired communication network, wherein the user attribute data comprises data corresponding to one or more user attributes for the plurality of users;
      determine one or more virtual hub communities based on the user attribute data, wherein a respective virtual hub community corresponds to at least a portion of the user attribute data;
      store the one or more virtual hub communities on a first database server;
      detect, at respective user interfaces of the plurality of users, user network logins of the user interfaces using one or more of facial recognition, fingerprint recognition and photo-scan security for authentication;
      determine an advertising attribute exchange for one or more advertising attribute units based on the one or more virtual hub communities, wherein:
         the one or more advertising attribute units correspond to at least a portion of the user attribute data from the plurality of users; and
         the advertising attribute exchange corresponds to market depth data, the market depth data comprising data indicating one or more bid prices and one or more offer prices from the plurality of users for the one or more advertising attribute units,
         wherein the data indicating the one or more bid prices and the one or more offer prices comprises data indicating a first bid price or a first offer price from the detected user interface of a first user of the plurality of users for a respective advertising attribute unit of the one or more advertising attribute units;
      store the advertising attribute exchange on a second database server;
      generate one or more integrated or overlayed layers for the detected respective user interfaces, wherein the one or more integrated or overlayed layers correspond to a network node topology for the advertising attribute exchange in real time; and
      receive transaction input data on the one or more integrated or overlayed layers from the detected user interface of a second user of the plurality of users, wherein the transaction input data comprises data indicating an acceptance by the second user of the first bid price or the first offer price for the respective advertising attribute unit.

17. The computing system of claim 16, wherein:
the detected user interfaces comprise one of: touchscreen displays, augmented non-screen displays, or audio interfaces of the plurality of users; and
the one or more user attributes further comprise user credit score, user payment patterns, user investments, user music preferences and comparison, user comparison rankings of all preferences, user philosophies, user news consumption, user dietary consumption, user sexual orientation, user love languages, user housing preferences, user environment preferences, user city preferences, user birthday preferences, user holiday preferences, user story preferences, user television history, user movie history, user sleep preferences, user driving preferences, user distance from work, user distance from home, user distance from places of importance to user, user mode of transportation, user beverage preferences, user health data, user doctor exam, user blood and biomarker exam laboratory work, user psychology, user vacation preferences, user hero preferences, user dreams, user visions, user languages spoken, user mother tongue, user conversations, user patents, user perceptions, user income, user economic class, user race, user ethnicity, user awards, user accomplishments, user attitude, or combinations thereof, and further comprising:
generating a forward commodity contract between the first user and the second user based on the received transaction input data, wherein the forward commodity contract comprises one or more conditional attributes to provide substitutability between first and second advertising attribute units of the one or more advertising attribute units.

18. A non-transitory computer-readable medium having stored thereon a plurality of computer-executable instructions which, when executed by a computer, cause the computer to:
- receive user attribute data from a plurality of users over a wireless or wired communication network, wherein the user attribute data comprises data corresponding to one or more user attributes for the plurality of users;
- determine one or more virtual hub communities based on the user attribute data, wherein a respective virtual hub community corresponds to at least a portion of the user attribute data;
- store the one or more virtual hub communities on a first database server;
- detect, at respective user interfaces of the plurality of users, user network logins of the user interfaces using one or more of facial recognition, fingerprint recognition and photo-scan security for authentication;
- determine an advertising attribute exchange for one or more advertising attribute units based on the one or more virtual hub communities, wherein:
  - the one or more advertising attribute units correspond to at least a portion of the user attribute data from the plurality of users; and
  - the advertising attribute exchange corresponds to market depth data, the market depth data comprising data indicating one or more bid prices and one or more offer prices from the plurality of users for the one or more advertising attribute units,
  - wherein the data indicating the one or more bid prices and the one or more offer prices comprises data indicating a first bid price or a first offer price from the detected user interface of a first user of the plurality of users for a respective advertising attribute unit of the one or more advertising attribute units;
- store the advertising attribute exchange on a second database server;
- generate one or more integrated or overlayed layers for the detected respective user interfaces, wherein the one or more integrated or overlayed layers correspond to a network node topology for the advertising attribute exchange in real time; and
- receive transaction input data on the one or more integrated or overlayed layers from the detected user interface of a second user of the plurality of users, wherein the transaction input data comprises data indicating an acceptance by the second user of the first bid price or the first offer price for the respective advertising attribute unit.

19. The non-transitory computer-readable medium of claim 18, wherein the user attribute data comprises data determined using artificial intelligence, and further comprising:
- generating a forward commodity contract between the first user and the second user based on the received transaction input data, wherein the forward commodity contract comprises one or more conditional attributes to provide substitutability between first and second advertising attribute units of the one or more advertising attribute units.

20. The non-transitory computer-readable medium of claim 18, wherein the data indicating the one or more bid prices and the one or more offer prices comprises data indicating a first bid price or a first offer price from a first user of the plurality of users for the respective advertising attribute unit.

* * * * *